(12) United States Patent
Boissel et al.

(10) Patent No.: US 12,435,122 B2
(45) Date of Patent: *Oct. 7, 2025

(54) FC-EPSILON CAR

(71) Applicant: ImmunityBio, Inc., Culver City, CA (US)

(72) Inventors: Laurent H. Boissel, San Diego, CA (US); Hans G. Klingemann, San Diego, CA (US); Abhijit Dandapat, San Diego, CA (US); Himani Chinnapen, San Diego, CA (US)

(73) Assignee: ImmunityBio, Inc., San Diego, CA (US)

( * ) Notice: Subject to any disclaimer, the term of this patent is extended or adjusted under 35 U.S.C. 154(b) by 1020 days.

This patent is subject to a terminal disclaimer.

(21) Appl. No.: 17/056,385

(22) PCT Filed: May 21, 2019

(86) PCT No.: PCT/US2019/033407
§ 371 (c)(1),
(2) Date: Nov. 17, 2020

(87) PCT Pub. No.: WO2019/226708
PCT Pub. Date: Nov. 28, 2019

(65) Prior Publication Data
US 2021/0198342 A1    Jul. 1, 2021

Related U.S. Application Data

(60) Provisional application No. 62/674,936, filed on May 22, 2018.

(51) Int. Cl.
*C12N 5/16* (2006.01)
*A61K 38/17* (2006.01)
(Continued)

(52) U.S. Cl.
CPC .... *C07K 14/70535* (2013.01); *A61K 38/1774* (2013.01); *A61K 38/2013* (2013.01); *A61K 38/2086* (2013.01); *A61K 39/3955* (2013.01); *A61K 39/39558* (2013.01); *A61K 40/15* (2025.01); *A61K 40/31* (2025.01); *A61K 40/4203* (2025.01); *A61K 40/4204* (2025.01); *A61K 40/4205* (2025.01); *A61K 40/421* (2025.01); *A61K 40/4211* (2025.01); *A61K 40/4215* (2025.01); *A61K 40/4217* (2025.01); *A61K 40/4221* (2025.01); *A61K 40/4224* (2025.01); *A61K 40/4249* (2025.01); *A61K 40/4261* (2025.01); *A61K 40/46* (2025.01); *A61K 45/06* (2013.01); *A61P 35/00* (2018.01); *C07K 14/5443* (2013.01); *C07K 14/55* (2013.01); *C07K 14/70517* (2013.01); *C07K 14/70521* (2013.01); *C07K 16/2803* (2013.01); *C07K 16/2827* (2013.01); *C07K 16/2863* (2013.01); *C07K 16/2866* (2013.01); *C07K 16/2878* (2013.01); *C07K 16/32* (2013.01); *C12N 5/0646* (2013.01); *A61K 2039/505* (2013.01); *A61K 2239/22* (2023.05); *A61K 2239/31* (2023.05); *A61K 2239/38* (2023.05); *A61K 2239/48* (2023.05); *A61K 2239/49* (2023.05); *A61K 2239/55* (2023.05); *C07K 2317/53* (2013.01); *C07K 2317/622* (2013.01); *C07K 2317/76* (2013.01); *C07K 2319/02* (2013.01); *C07K 2319/03* (2013.01); *C07K 2319/30* (2013.01); *C07K 2319/33* (2013.01); *C12N 2510/00* (2013.01)

(58) Field of Classification Search
None
See application file for complete search history.

(56) References Cited

U.S. PATENT DOCUMENTS 7,098,008 B2    8/2006  Park et al.
7,618,817 B2 *  11/2009 Campbell .............. A61K 49/00
                                                    435/325
(Continued)

FOREIGN PATENT DOCUMENTS

CA    2 977 106 A1    9/2016
CA    3 097 904 A1    11/2019
(Continued)

OTHER PUBLICATIONS

Clemenceau. Journal of Immunology Research, 2015, Article ID 482089, pp. 1-13. (Year: 2015).*

(Continued)

*Primary Examiner* — Chun W Dahle
(74) *Attorney, Agent, or Firm* — Umberg Zipser LLP; Martin Fessenmaier; Priti Phukan

(57) ABSTRACT

Recombinant NK cells, and especially recombinant NK-92 cells express a chimeric antigen receptor (CAR) having an intracellular domain of FcεRIγ. Notably, CAR constructs with an intracellular domain of FcεRIγ had a substantially prolonged duration of expression and significantly extended cytotoxicity over time. The CAR may be expressed from RNA and DNA, preferably as a tricistronic construct that further encodes CD16 and a cytokine to confer autocrine growth support. Advantageously, such constructs also enable high levels of transfection and expression of the recombinant proteins and provide a convenient selection marker to facilitate rapid production of recombinant NK/NK-92 cells.

8 Claims, 63 Drawing Sheets
Specification includes a Sequence Listing.

(51) Int. Cl.

| | | |
|---|---|---|
| *A61K 38/20* | (2006.01) | |
| *A61K 39/395* | (2006.01) | |
| *A61K 40/15* | (2025.01) | |
| *A61K 40/31* | (2025.01) | |
| *A61K 40/42* | (2025.01) | |
| *A61K 40/46* | (2025.01) | |
| *A61K 45/06* | (2006.01) | |
| *A61P 35/00* | (2006.01) | |
| *C07K 14/54* | (2006.01) | |
| *C07K 14/55* | (2006.01) | |
| *C07K 14/705* | (2006.01) | |
| *C07K 14/735* | (2006.01) | |
| *C07K 16/28* | (2006.01) | |
| *C07K 16/32* | (2006.01) | |
| *C12N 5/0783* | (2010.01) | |
| *A61K 39/00* | (2006.01) | |
| *C07K 16/00* | (2006.01) | |

(56) References Cited

U.S. PATENT DOCUMENTS

| | | |
|---|---|---|
| 8,034,332 B2 | 10/2011 | Klingemann |
| 8,313,943 B2 | 11/2012 | Campbell |
| 9,150,636 B2 | 10/2015 | Campbell |
| 9,181,322 B2 | 11/2015 | Campbell |
| 10,023,648 B2 | 7/2018 | Hombach et al. |
| 10,138,462 B2 | 11/2018 | Klingemann |
| 10,174,095 B2 | 1/2019 | Brogdon et al. |
| 10,239,948 B2 | 3/2019 | Alexandre et al. |
| 10,765,701 B2 | 9/2020 | Klingemann et al. |
| 10,960,024 B2 | 3/2021 | Klingemann et al. |
| 11,058,723 B2 | 7/2021 | Klingemann et al. |
| 11,077,143 B2 | 8/2021 | Klingemann et al. |
| 11,129,850 B2 | 9/2021 | Klingemann et al. |
| 11,364,265 B1 | 6/2022 | Soon-Shiong et al. |
| 11,813,292 B2 | 11/2023 | Patrick et al. |
| 12,180,283 B2 | 12/2024 | Klingemann et al. |
| 2002/0068044 A1 | 6/2002 | Klingemann |
| 2008/0247990 A1 | 10/2008 | Campbell |
| 2013/0189268 A1 | 7/2013 | Du et al. |
| 2013/0280285 A1 | 10/2013 | Schonfeld et al. |
| 2014/0242701 A1 | 8/2014 | Shiku et al. |
| 2014/0274909 A1* | 9/2014 | Orentas .............. A61P 35/00 536/23.4 |
| 2017/0157176 A1 | 6/2017 | Wang et al. |
| 2018/0360881 A1 | 12/2018 | Rabizadeh et al. |
| 2019/0233797 A1 | 8/2019 | Navarro et al. |
| 2020/0123503 A1 | 4/2020 | Navarro et al. |
| 2020/0376033 A1 | 12/2020 | Klingemann et al. |
| 2021/0015870 A1 | 1/2021 | Wu et al. |
| 2021/0038645 A1 | 2/2021 | Soon-Shiong et al. |
| 2021/0145879 A1 | 5/2021 | Lee et al. |
| 2021/0169931 A1 | 6/2021 | Boissel et al. |
| 2021/0198342 A1 | 7/2021 | Boissel et al. |
| 2021/0230547 A1 | 7/2021 | Lee et al. |
| 2021/0260116 A1 | 8/2021 | Boissel et al. |
| 2021/0315934 A1 | 10/2021 | Klingemann et al. |
| 2021/0322477 A1 | 10/2021 | Klingemann et al. |
| 2021/0386785 A1 | 12/2021 | Klingemann et al. |
| 2022/0025329 A1 | 1/2022 | Lee et al. |

FOREIGN PATENT DOCUMENTS

| | | |
|---|---|---|
| CN | 105142677 A | 12/2015 |
| CN | 106536564 A | 3/2016 |
| CN | 106279438 A | 1/2017 |
| CN | 105384822 A | 3/2017 |
| CN | 107074969 A | 8/2017 |
| CN | 107337737 A | 11/2017 |
| CN | 107580628 A | 1/2018 |
| CN | 107708710 A | 2/2018 |
| CN | 112004829 A | 11/2020 |
| CN | 112534046 A | 3/2021 |
| EP | 3 797 157 A1 | 3/2021 |
| JP | 2017504601 A | 2/2017 |
| JP | 2021-525073 A | 9/2021 |
| KR | 10-2021-0003292 A | 1/2021 |
| WO | 98/49268 A1 | 11/1998 |
| WO | 99/24566 A1 | 5/1999 |
| WO | 00/20460 A1 | 4/2000 |
| WO | 2014/039523 A1 | 3/2014 |
| WO | 2014099671 A1 | 6/2014 |
| WO | 2014127261 A1 | 8/2014 |
| WO | 2015187528 A1 | 12/2015 |
| WO | 2016040441 A1 | 3/2016 |
| WO | 2016044605 A1 | 3/2016 |
| WO | 2016149254 A1 | 9/2016 |
| WO | 2016201304 A1 | 12/2016 |
| WO | 2016210447 A | 12/2016 |
| WO | 2017/100709 A1 | 6/2017 |
| WO | 2017112877 A1 | 6/2017 |
| WO | 2017/192440 A1 | 11/2017 |
| WO | 2018/064076 A1 | 4/2018 |
| WO | 2018064594 A2 | 4/2018 |
| WO | 2018/076391 A1 | 5/2018 |
| WO | 2019/177986 A1 | 9/2019 |
| WO | 2019226708 A1 | 11/2019 |
| WO | 2019/226708 A4 | 12/2019 |
| WO | 2021/154263 A1 | 8/2021 |

OTHER PUBLICATIONS

Eshhar. PNAS 1993, 90:720-724. (Year: 1993).*
Uherek. Blood, Aug. 2002, 100;4:1265-1273. (Year: 2002).*
Smith. Gynecol Oncol. Jul. 2014;134(1):181-189. doi: 10.1016/j.ygyno.2014.03.553. Epub Mar. 20, 2014. PMID: 24657487; PMCID: PMC4066406/ (Year: 2014).*
Notice of Allowance received for U.S. Appl. No. 17/341,098 dated Feb. 7, 2023, 96 pages.
Office Action received for Israel Patent Application Serial No. 278857 dated May 4, 2023, 12 pages. (Including English Translation).
Decision of Refusal received for Japanese Patent Application Serial No. 2020-565289 dated May 30, 2023, 6 pages. (Including English Translation).
Non-Final Office Action received for U.S. Appl. No. 17/341,098, dated Nov. 1, 2021, 32 Pages.
Koene et al., "FcYRIIIa-158V/F Polymorphism Influences the Binding of IgG by Natural Killer Cell FcyRIIIa, Independently of the FcYRIIIa-48L/R/H Phenotype", Blood, 1997, vol. 90, No. 3, pp. 1109-1114.
Sugita et al., "Relevance of FcYRIIIa-158V-F polymorphism to recurrence of adult periodontitis in Japanese patients", Clinical and Experimental Immunology, 1999, vol. 117, pp. 350-354.
Lee et al., "Chimeric Antigen Receptor-Modified Nk-92 Cells Targeting EGFR Super-Family Receptors", U.S. Appl. No. 17/489,607, filed Sep. 29, 2021, 83 Pages.
Klingemann et al., "Quadricistronic System Comprising A Homing Receptor And Chimeric Antigen Receptor For Stable Genetic Modification Of Cellular Immunotherapies", U.S. Appl. No. 17/446,024, filed Aug. 26, 2021, 123 pages.
Soon-Shiong et al., "Recombinant Erll-15 Nk Cells", U.S. Appl. No. 17/438,386, filed Sep. 10, 2021, 34 pages.
Klingemann et al., "Anti-B7-H4 Chimeric Antigen Receptor-Modified NK-92 Cells", U.S. Appl. No. 17/287,462, filed Apr. 21, 2021, 51 pages.
Office Action received for Israel Patent Application Serial No. 278857 dated Sep. 8, 2022, 10 pages. (Including English Translation).
Examination Report No. 1 received for Australian Patent Application Serial No. 2019272608 dated May 6, 2022, 4 pages.
Office Action received for Canadian Patent Application Serial No. 3,097,904 dated Sep. 12, 2022, 3 pages.
Notice of Reasons for Refusal received for Japanese Patent Application Serial No. 2020-565289 dated Sep. 30, 2022, 10 pages. (Including English Translation).

(56) References Cited

OTHER PUBLICATIONS

Office Action received for Canadian Patent Application Serial No. 3097904 dated Oct. 4, 2021, 3 pages.
Office Action received for Israel Patent Application Serial No. 278857 dated Feb. 24, 2022, 16 pages. (Including English Translation).
Gong et al., "Characterization of a human cell line (NK-92) with phenotypical and functional characteristics of activated natural killer cells", Leukemia, 1994, vol. 8, No. 4, pp. 652-658.
Haynes et al., "Redirecting Mouse CTL Against Colon Carcinoma: Superior Signaling Efficacy of Single-Chain Variable Domain Chimeras Containing TCR-ζ vs FcεRI-γ", The Journal of Immunology, 2001, vol. 166, pp. 182-187 (Cited from Specification).
Cartellieri et al., "Chimeric Antigen Receptor-Engineered T Cells for Immunotherapy of Cancer", Journal of Biomedicine and Biotechnology, 2010, No. 956304, pp. 1-13.
Hermanson et al., "Utilizing Chimeric Antigen Receptors to Direct Natural Killer Cell Activity", Frontiers in Immunology, 2015, vol. 6, No. 195, pp. 1-6.
Bollino et al., "Chimeric antigen receptor engineered natural killer and natural killer T cells for cancer immunotherapy", Transl Res, 2017, vol. 187, 21 pages.
Konstantinidis et al., "Targeting IL-2 to the endoplasmic reticulum confines autocrine growth stimulation to NK-92 cells", Experimental Hematology, 2005, vol. 33, pp. 159-164.
Bruhns et al., "Specificity and affinity of human Fcγ receptors and their polymorphic variants for human IgG subclasses", Blood, 2009, vol. 113, No. 16, pp. 3716-3725.
Jochems et al., "An NK cell line (haNK) expressing high levels of granzyme and engineered to express the high affinity CD16 allele", Oncotarget, 2016, vol. 7, No. 2, p. 86359-86373.
Garcia-Sanchez et al., "Cytosine deaminase adenoviral vector and 5-fluorocytosine selectively reduce breast cancer cells 1 million-fold when they contaminate hematopoietic cells: a potential purging method for autologous transplantation", Blood, 1998, vol. 92, No. 2, pp. 672-682.
Touati et al., "A suicide gene therapy combining the improvement of cyclophosphamide tumor cytotoxicity and the development of an anti-tumor immune response", Current Gene Therapy, 2014, vol. 14, pp. 236-246.
Di Stasi et al., "Inducible apoptosis as a safety switch for adoptive cell therapy", N Engl J Med., Nov. 3, 2011, vol. 365, No. 18, pp. 1673-1683.
Morgan Richard A, "Live and Let Die: A New Suicide Gene Therapy Moves to the Clinic", Molecular therapy, Jan. 2012, vol. 20, No. 1, pp. 11-13.
Smith et al., "Comparison of biosequences", Advances in Applied Mathematics, 1981, vol. 2, No. 4, pp. 482-489.
Altschul et al., "Gapped BLAST and PSI-BLAST: a new generation of protein database search programs", Nucleic Acids Research, 1997, vol. 25, No. 17, pp. 3389-3402.
Henikoff et al., "Amino acid substitution matrices from protein blocks", Proc. Natl. Acad., 1992, vol. 89, pp. 10915-10919.
Yazawa et al., "Current progress in suicide gene therapy for cancer", World J. Surg., 2002, vol. 26, pp. 783-789.
International Search Report and Written opinion received for PCT Application Serial No. PCT/US2019/033407 dated Sep. 18, 2019, 12 pages.
Zhang et al., "Chimeric Antigen Receptor-Engineered NK-92 Cells: An Off-the-Shelf Cellular Therapeutic for Targeted Elimination of Cancer Cells and Induction of Protective Antitumor Immunity", Frontiers in Immunology, 2017, vol. 8, No. 533, pp. 1-17.
Rodewald et al., "The high affinity Fc epsilon receptor gamma subunit (Fc epsilon RI gamma) facilitates T cell receptor expression and antigen/major histocompatibility complex-driven signaling in the absence of CD3 zeta and CD3 eta", The Journal of Biological Chemistry, 1991, vol. 266, No. 24, pp. 15974-1978.
International Preliminary Report on Patentability Chapter II received for PCT Application Serial No. PCT/US2019/033407 dated Nov. 23, 2020, 35 pages.

Examination Report No. 2 received for Australian Patent Application Serial No. 2019272608 dated Dec. 14, 2022, 4 pages.
Office Action received for Canadian Patent Application Serial No. 3097904 dated Feb. 1, 2023, 4 pages.
Notice of Allowance received for U.S. Appl. No. 17/056,385 dated Feb. 7, 2023, 96 pages.
Notice of Acceptance received for Australian Patent Application Serial No. 2019272608 dated Apr. 11, 2023, 3 pages.
Extended European Search Report received for EP Patent Application Serial No. 19807670.5 dated Feb. 10, 2022, 10 pages.
Clémenceau et al., "In Vitro and In Vivo Comparison of Lymphocytes Transduced with a Human CD16 or with a Chimeric Antigen Receptor Reveals Potential Off-Target Interactions due to the IgG2 CH2-CH3 CAR-Spacer", Hindawi, Journal of Immunology Research, vol. 2015, Article 482089, Jan. 1, 2015, pp. 1-13.
Examination Report received for Canadian Patent Application Serial No. 3,097,904 dated Jan. 11, 2024, 04 pages.
Notice of Acceptance received for Israel Application Serial No. 278857 dated Jan. 17, 2024, 06 pages (including English translation).
Office Action received for Israel Application Serial No. 278857 dated Sep. 4, 2023, 08 pages (including English translation).
Notice of Allowance received for Canadian Patent Application Serial No. 3,097,904 dated Sep. 14, 2023, 01 page.
Office Action received for Korean Patent Application Serial No. 10-2023-7043893 dated Jan. 22, 2024, 08 pages (including English translation).
Notice of Allowance received for Korean Patent Application Serial No. 10-2020-7037005 dated Sep. 20, 2023, 14 pages (including English translation).
Notice of Grounds for rejection received for KR Application No. 10-2024-7009822 dated May 9, 2024, 07 pages. (Including English Translation).
Second Office Action received for CN Application No. 201980034416.6 dated May 18, 2024, 13 pages. (Including English Translation).
Notice of Allowance received for CA Application No. 3097904 dated May 31, 2024, 01 page.
Communication Pursuant to Article 94(3) received for EP application serial No. 19807670.5 dated Oct. 21, 2024, 04 pages.
Notice of Grant received for CN application serial No. 201980034416.6 dated Oct. 28, 2024, 04 pages (including English Translation).
Notice of Final Rejection received for Korean Patent Application Serial No. 10-2020-7037005 dated Apr. 24, 2023, 9 pages. (Including English Translation).
Third Office Action received for CN Application No. 201980034416.6 dated Jul. 27, 2024, 18 pages (including English translation).
Office Action received for IL Application No. 311918 dated Oct. 10, 2024, 03 pages.
Communication pursuant to Article 94(3) EPC received for EP Application serial No. 19807670.5 dated Nov. 24, 2022, 04 page.
Communication pursuant to Article 94(3) EPC received for EP Application serial No. 19807670.5 dated Mar. 6, 2024, 06 pages.
Communication pursuant to Article 94(3) EPC received for EP Application serial No. 19807670.5 dated Aug. 3, 2023, 04 pages.
Exam Report No.1 received for Australia application No. 2023203306 dated Nov. 28, 2024, 04 pages.
Notice of Reasons for Refusal received for Japanese Patent Application Serial No. 2023-169963 dated Nov. 5, 2024, 10 pages. (Including English Translation).
Request for the Submission of an Opinion received for Korean Patent Application Serial No. 10-2020-7037005 dated Apr. 24, 2023, 09 pages. (Including English Translation).
Written Decision on Registration received for Korean Patent Application Serial No. 10-2023-7043893 dated Sep. 10, 2024, 07 pages. (Including English Translation).
Written Decision on Registration received for KR Application No. 10-2024-7009822 dated Dec. 23, 2024, 07 pages. (Including English Translation).
First Office Action received for CN Application No. 201980034416.6 dated Jul. 27, 2023, 12 pages (including English translation).

* cited by examiner

FC-EPSILON CAR

This application claims the benefit of priority to U.S. patent application with the Ser. No. 62/674,936, which was filed May 22, 2018.

SEQUENCE LISTING

The content of the ASCII text file of the sequence listing named 104077.0004PCT_ST25, which is 106 kb in size was created on May 21, 2019 and electronically submitted via EFS-Web along with the present application is incorporated by reference in its entirety.

FIELD OF THE INVENTION

The field of the invention is recombinant nucleic acids and cells containing same to generate genetically modified cells that express a chimeric antigen receptor (CAR), and particularly modified NK and NK-92 cells expressing a CAR having an Fc epsilon receptor gamma (FcεRIγ) signaling domain.

BACKGROUND OF THE INVENTION

Natural killer (NK) cells are cytotoxic lymphocytes that constitute a significant component of the innate immune system. In most cases, NK cells represent about 10-15% of circulating lymphocytes, and bind and kill targeted cells, including virus-infected cells and many malignant cells. NK cell killing is non-specific with regard to particular antigens and can occur without prior immune sensitization. Killing of targeted cells is typically mediated by cytolytic proteins, including perforin, granzyme, and granulysin.

Autologous NK cells have been used as therapeutic entities. To that end, NK cells are isolated from the peripheral blood lymphocyte fraction of whole blood, expanded in cell culture to obtain sufficient numbers of cells, and then re-infused into a subject. Autologous NK cells have shown in at least some cases moderate effectiveness in both ex vivo therapy and in vivo treatment. However, isolation and growth of autologous NK cell is time and cost intensive. Moreover, autologous NK cell therapy is further limited by the fact that not all NK cells are cytolytic.

At least some of these difficulties can be overcome by use of NK-92 cells, which are a cytolytic cancer cell line which was discovered in the blood of a subject suffering from a non-Hodgkins lymphoma and then immortalized in vitro (Gong et al., Leukemia 8:652-658 (1994)). While NK-92 cells are NK cell derivatives, NK-92 cells lack the major of inhibitory receptors that are otherwise displayed by normal NK cells, and retain the majority of the activating receptors. NK-92 cells do not, however, attack normal cells nor do they elicit an unacceptable immune rejection response in humans. Due to these desirable characteristics, NK-92 cells were characterized in detail and explored as therapeutic agent in the treatment of certain cancers as is described, for example, in WO 1998/049268 or US 2002/068044.

Phenotypic changes distinguishing a tumor cell from normal cells derived from the same tissue are often associated with one or more changes in the expression of specific gene products, including the loss of normal cell surface components or the gain of others (i.e., antigens not detectable in corresponding normal, non-cancerous tissue). The antigens which are expressed in neoplastic or tumor cells, but not in normal cells, or which are expressed in neoplastic cells at levels substantially above those found in normal cells, have been termed "tumor-specific antigens" or "tumor-associated antigens." Such tumor-specific antigens may serve as markers for tumor phenotype. Tumor-specific antigens include cancer/testis-specific antigen (e.g. MAGE, BAGE, GAGE, PRAME and NY-ESO-1), melanocyte differentiation antigens (e.g. tyrosinase, Melan-A/MART, gp100, TRP-1 and TRP-2), mutated or aberrantly expressed antigens (e.g. MUM-1, CDK4, beta-catenin, gp100-in4, p15 and N-acetylglucos-aminyltransferase V), and antigens that are expressed at higher levels in tumors (e.g., CD19 and CD20).

Tumor-specific antigens have been used as targets for cancer immunotherapies. One such therapy utilizes chimeric antigen receptors (CARs) expressed on the surface of immune cells, including T cells and NK cells, to improve cytotoxicity against cancer cells. CARs comprise a single-chain variable fragment (scFv) linked to at least one intracellular signaling domain. The scFv recognizes and binds an antigen on the target cell (e.g., a cancer cell) and triggers effector cell activation. The signaling domains contain immunoreceptor tyrosine-based activation domains (ITAMs) that are important for intracellular signaling by the receptor.

The first generation of CARs used in T-cells contained one cytoplasmic signaling domain. For example, one version of a first-generation CAR in T-cells included a signaling domain from the Fc epsilon receptor gamma (FcεRIγ) which contained one ITAM, while another version contained the signaling domain from CD3ζ which contained three ITAMs. In vivo and in vitro studies showed that the CD3ζ CAR T-cells were more efficient at tumor eradication than FcεRIγ CAR T-cells (e.g., Haynes, et al. 2001, *J. Immunology* 166:182-187; Cartellieri, et al. 2010, *J. Biomed and Biotech*, Vol. 2010, Article ID 956304). Additional studies then revealed that certain costimulatory signals were required for full activation and proliferation of such recombinant T-cells, and second and third generation CARs combined multiple signaling domains in to a single CAR to enhance efficacy of the recombinant CAR T-cells. Due to their less desirable philological effects in the tested T-cells, first generation CARs and the FcεRIγ signaling domains were largely discarded in favor of the new, more efficient CARs using CD3ζ in combination with one or more additional signaling domains (e.g., Hermanson and Kaufman 2015, *Frontiers in Immunol.*, Vol. 6, Article 195).

More recently, selected CARs have also been expressed in NK cells. For example, CAR-modified NK-92 cells have used first generation CARs with only a CD3ζ intracellular signaling domain. Several antigens have been targeted by these first generation CAR-NK cells, including CD19 and CD20 for B cell lymphoma, ErbB2 for breast, ovarian, and squamous cell carcinoma, GD2 for neuroblastoma, and CD138 for multiple myeloma. Second generation CAR-NK cells from the NK-92 line have also been created for several antigens, including EpCAM for multiple carcinomas HLA-A2 EBNA3 complex for Epstein-Barr virus, CS1 for multiple myeloma, and ErbB2 for HER2 positive epithelial cancers. The most common intracellular costimulatory domain used alongside CD3ζ in second generation NK-92 CARs is CD28. However, the potential effect of the CD28 domain is unclear since NK cells do not naturally express CD28. Additional second generation CARs have incorporated the 4-1BB intracellular signaling domain along with CD3ζ to improve NK cell persistence. Others compared functionality of different intracellular domains using an ErbB2 scFv fused with CD3ζ alone, CD28 and CD35, or 4-1BB and CD3ζ tested against breast cancer cells. They found that both of the second generation constructs improved killing compared to the first generation CARs and the CD28 and CD3ζ had 65% target lysis, the 4-1BB and CD33 lysed 62%, and CD3 alone killed 51% of targets. 4-1BB and CD28 intracellular domains were also compared in a recent study using anti-CD19 CARs expressed on NK-92 cells for B cell malignances. Still others found that CD3ζ/4-1BB constructs were less effective than CD3ζ/ CD28 in cell killing and cytokine production, highlighting differential effects of CD28 and 4-1BB costimulatory domains.

Third generation NK-92 CARs were constructed of an anti-CD5 scFv with CD3ζ, CD28, and 4-1BB intracellular signaling domains and demonstrated specific and potent anti-tumor activity against a variety of T-cell leukemia and lymphoma cell lines and primary tumor cells. Such cells were also able to inhibit disease progression in xenograft mouse models of T cell Acute lymphoblastic leukemia (ALL) cell lines as well as primary tumor cells (*Transl Res.* 2017 September; 187:32-43). In further examples, WO 2016/201304 and WO 2018/076391 teach use of third generation CD3ζ CARs expressed in NK cells and NK-92 cells.

Autologous NK cells and NK-92 cells require exogenous IL-2 as a survival factor and enhancer of cytotoxic potential. Unfortunately, systemic administration of IL-2 is often associated with significant undesirable side effects and toxicity. To overcome such issues, the cells can be cultivated and expanded in vitro prior to administration to a patient. While IL-2 will allow generation of sufficient quantities of NK cells or NK-92 cells, use of exogenous IL-2 in large scale production of NK cells is typically cost-prohibitive. The requirement for exogenous IL-2 was resolved by recombinant expression of IL-2 confined to the endoplasmic reticulum from a retroviral vector (see *Exp Hematol.* 2005 February; 33 (2): 159-64). Such approach eliminated the requirement for exogenous IL-2. However, retroviral transfection efficiency is often less than desirable and will be even more inefficient where multiple recombinant genes are to be expressed.

In addition, NK cells and particularly NK-92 cells are often difficult to genetically modify as evidenced by numerous failures to engineer NK-92 cells to express an Fc receptor. Such difficulties are further compounded where NK-92 cells are transfected with multiple recombinant genes or relatively large recombinant nucleic acid payload for heterologous expression. Additionally, NK-92 cells also exhibit a significant lack of predictability with respect to recombinant expression of exogenous proteins (e.g., CD16). On a functional level, most if not all CAR NK-92 cells require a relatively high effector to target cell ratio, likely due to relatively low expression of the CAR construct. Moreover, such CAR NK-92 cells will also experience a fast decline in cytotoxicity over time, thus rendering such cells clinically less attractive.

Therefore, even though numerous recombinant NK-92 cells are known in the art, all or almost all of them suffer from various difficulties. Consequently, there remains a need for CAR-expressing NK-92 cells that express a high-activity CAR in significant quantities with attendant persistent cytotoxicity, and that are easily cultivated in a simple and effective manner.

SUMMARY OF THE INVENTION

The inventors have discovered that NK-92 cells can be efficiently transfected with a recombinant nucleic acid to express an FcεRIγ-containing CAR. Unexpectedly, CARs with a FcεRIγ signaling domain significantly increased expression levels of the CAR and further conveyed extended cytotoxicity over time. Contemplated recombinant nucleic acids that encode a CAR are preferably in a tricistronic arrangement that also includes a sequence portion that encodes CD16 or CD16 variant, and/or IL-2 or an IL-2 variant. Advantageously, such recombinant nucleic acids not only provide an efficient manner of selecting transfected cells (as the IL-2 not only imparts autocrine growth stimulation but also acts as a selection marker for the co-expressed proteins), but also yield CAR NK cells with superior cytolytic activity (e.g., at a relatively low effector to target cell ratio as compared to other constructs) and high levels of expression of the CD16 and the FcεRIγ-containing CAR.

Therefore, in one aspect of the inventive subject matter, the inventors contemplate a genetically modified NK cell that recombinantly expresses a cytokine, CD16, and a membrane bound chimeric antigen receptor (CAR). The CAR will typically comprise in a single polypeptide chain (i) an extracellular binding domain, (ii) a hinge domain, (iii) a transmembrane domain, and (iv) a FcεRIγ signaling domain (e.g., having the amino acid sequence of SEQ ID NO:1).

In many embodiments, the NK cell is an NK-92 cell, and/or the recombinantly expressed cytokine is or comprises IL-2 or IL-15 (which may further include an endoplasmic retention sequence). In further embodiments, the CD16 may be a high-affinity CD16 variant (e.g., $CD16_{158V}$).

Preferably, but not necessarily, the extracellular binding domain will comprise a scFv that may specifically bind to a tumor-specific antigen (e.g., CD19, CD20, NKG2D ligands, CS1, GD2, CD138, EpCAM, HER-2, EBNA3C, GPA7, CD244, CA-125, MUC-1, ETA, MAGE, CEA, CD52, CD30, MUC5AC, c-Met, EGFR, FAP, WT-1, PSMA, NY-ESO1, CSPG-4, IGF1-R, Flt-3, CD276, CD123, PD-L1, BCMA, or CD33), a tumor associated antigen, or a patient- and tumor-specific antigen, or that may specifically bind to a virus-specific antigen (e.g., antigen of an HIV virus, an HPV virus, an RSV virus, an influenza virus, an ebolavirus, or an HCV virus).

In some embodiments, the cytokine, the CD16, and the CAR are expressed from a tricistronic recombinant nucleic acid, while in other embodiments the cytokine and/or the CD16 is expressed from a recombinant nucleic acid that is integrated into the genome of the NK cell.

Therefore, the inventors also contemplate a recombinant nucleic acid that includes a first sequence portion encoding a cytokine, a second sequence portion encoding a CD16, and a third sequence portion encoding a chimeric antigen receptor (CAR) that comprises in a single polypeptide chain an extracellular binding domain, a hinge domain, a transmembrane domain, and an FcεRIγ signaling domain. Most typically, the first, the second, and the third sequence portions are on the same nucleic acid.

While in some embodiments the nucleic acid is a tricistronic RNA, in other embodiments the nucleic acid is a tricistronic DNA.

Moreover, it is typically preferred that the cytokine is IL-2 or IL15 (which may or may not comprise an endoplasmic retention sequence), that the CD16 is a high-affinity CD16 variant having a 158V mutation, and/or that the extracellular binding domain comprises a scFv. As noted before, the extracellular binding domain may specifically bind to a tumor-specific antigen, a tumor associated antigen, or a patient- and tumor-specific antigen, or the extracellular binding domain may specifically bind to a virus-specific antigen.

In further contemplated aspects, the hinge domain and/or the transmembrane domain comprise a CD8 hinge domain and/or a CD28 transmembrane domain, while the FcεRIγ signaling domain may have a nucleic acid sequence of SEQ ID NO:2.

In still further aspects of the inventive subject matter, the inventors also contemplate a recombinant cell comprising the recombinant nucleic acid described above and herein. Where the nucleic acid is prepared and/or amplified, the recombinant cell may be a bacterial cell. On the other hand, where the recombinant nucleic acid is to be expressed, the cell will typically be an autologous NK cell or an NK cell (which may also be an NK-92 cell that is optionally genetically modified).

Consequently, the inventors also contemplate a method of treating cancer in a patient in need thereof. In such method, a therapeutically effective amount of any one of the genetically modified NK cells is administered to the patient, thereby treating the cancer. In addition, and where desired, contemplated methods may include a further step of administering at least one additional therapeutic entity selected from the group consisting of a viral cancer vaccine, a bacterial cancer vaccine, a yeast cancer vaccine, N-803, an antibody, a stem cell transplant, and a tumor targeted cytokine.

Among other cancers, contemplated cancers include leukemia, acute lymphocytic leukemia, acute myelocytic leukemia, chronic leukemias, chronic myelocytic (granulocytic) leukemia, chronic lymphocytic leukemia, polycythemia vera, lymphomas, Hodgkin's disease, non-Hodgkin's disease, multiple myeloma, Waldenstrom's macroglobulinemia, heavy chain disease, solid tumors including, but not limited to, sarcomas and carcinomas such as fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyo sarcoma, colon carcinoma, pancreatic cancer, breast cancer, ovarian cancer, prostate cancer, squamous cell carcinoma, basal cell carcinoma, adenocarcinoma, sweat gland carcinoma, sebaceous gland carcinoma, papillary carcinoma, papillary adenocarcinomas, cystadenocarcinoma, medullary carcinoma, bronchogenic carcinoma, renal cell carcinoma, hepatoma, bile duct carcinoma, choriocarcinoma, seminoma, embryonal carcinoma, Wilm's tumor, cervical cancer, testicular tumor, lung carcinoma, small cell lung carcinoma, bladder carcinoma, epithelial carcinoma, glioma, astrocytoma, medulloblastoma, craniopharyngioma, ependymoma, pinealoma, hemangioblastoma, acoustic neuroma, oligodendroglioma, menangioma, melanoma, neuroblastoma and retinoblastoma.

Likewise, the inventors also contemplate a method of treating a viral infection in a patient in need thereof. In such method, a therapeutically effective amount of any one of the genetically modified NK cells is administered to the patient, thereby treating the viral infection. Where desired or needed, an antiviral drug may also be administered.

Regardless of the type of treatment, it is generally contemplated that $1\times10^8$ to about $1\times10^{11}$ cells per m2 of body surface area of the patient are administered to the patient. Viewed from a different perspective, use of a genetically modified NK cell as presented herein is contemplated in the treatment of cancer or a viral infection.

Various objects, features, aspects and advantages of the inventive subject matter will become more apparent from the following detailed description of preferred embodiments along with the accompanying drawing figures in which like numerals represent like components.

DETAILED DESCRIPTION OF THE INVENTION

Figure 1:
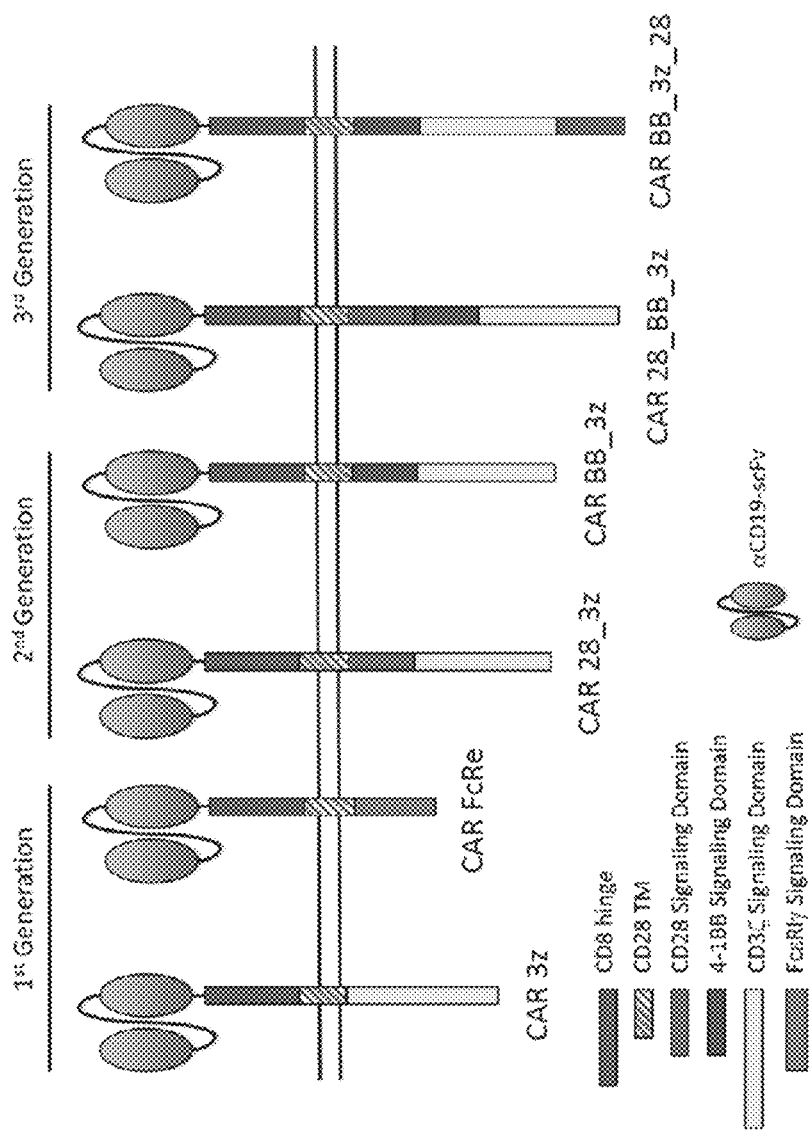
FIG. 1 is a schematic representation of exemplary CD19-CARs tested. All of the CD19-CAR variants contained an extracellular domain comprising an anti-CD19 scFv region (αCD19-scFv), a hinge region from CD8 (CD8 hinge), and a transmembrane domain from CD28 (CD28™). The intracellular domains of the CD19CARs were varied as indicated.

The inventors have unexpectedly discovered that CAR mediated cytotoxicity and CAR expression in recombinant NK cells (e.g. NK-92 cells) is substantially increased where the recombinant CAR includes an FcεRIγ signaling domain as is described in more detail below. The finding that a CAR with an FcεRIγ signaling domain has superior properties in NK cells is especially unexpected as such CARs in T cells have performed relatively poorly as compared to CARs that had a CD3ζ, a 4-1BB, or a CD28 signaling domain and optionally additional signaling domains as commonly found in second and third generation CARs.

Therefore, in some embodiments recombinant nucleic acids are contemplated that encode a CAR with an FcεRIγ signaling domain, preferably but not necessarily in a tricistronic arrangement that also includes a sequence portion that encodes CD16 or a CD16 variant, and/or IL-2 or an IL-2 variant. In still further advantageous aspects of the inventive subject matter, such recombinant nucleic acid will not only provide an efficient manner of selecting transfected cells (as the IL-2 not only imparts autocrine growth stimulation) but also acts as a selection marker for the co-expressed proteins.

Consequently, the inventive subject matter is directed to genetically modified NK cells, NK-92 cells, and derivatives thereof that express a chimeric antigen receptor (CAR) on the cell surface where the CAR preferably comprises an intracellular signaling domain from the Fc epsilon receptor gamma (FcεRIγ). For example, the cytoplasmic domain of FcεRIγ may have an amino acid sequence having at least 95% sequence identity to SEQ ID NO:1, or comprises, consists of, or essentially consists of an amino acid sequence having the sequence as noted in SEQ ID NO: 1. In some embodiments, the cytoplasmic domain of FcεRIγ is encoded by a nucleic acid having at least 95% sequence identity to SEQ ID NO:2. Contemplated recombinant cells may further express various other proteins, including one or more cytokines and CD16. As will be readily appreciated, the CAR and/or other proteins may be transiently expressed by the recombinant cell, or stably expressed.

In some embodiments, the CAR comprises a hinge region from CD8 and/or in some embodiments, the CAR comprises a transmembrane domain from CD28 having an amino acid sequence as in SEQ ID NO:6 (encoded by a nucleic acid as in SEQ ID NO:7). The full length amino acid sequence of CD28 is shown in SEQ ID NO:23. In further embodiments, the recombinant cell is genetically modified with a nucleic acid having a sequence of SEQ ID NO: 9 that encodes a hybrid protein having a sequence of SEQ ID NO:8 comprising a CD8 hinge region that is coupled to a CD28 transmembrane domain that is coupled to an FcεRIγ signaling domain. As will be appreciated, addition of a binding domain to the hinge region will form a functional CAR. For example, binding domain targets or specifically may bind a tumor-associated antigen, and suitable antigens include CD19, CD20, NKG2D ligands, CS1, GD2, CD138, EpCAM, HER-2, EBNA3C, GPA7, CD244, CA-125, MUC-1, ETA, MAGE, CEA, CD52, CD30, MUC5AC, c-Met, EGFR, FAP, WT-1, PSMA, NY-ESO1, CSPG-4, IGF1-R, Flt-3, CD276, CD123, PD-L1, BCMA, and CD33.

In some embodiments, the nucleic acid construct further comprises a (inducible) promoter that promotes transcription of the nucleic acid sequences. Preferably, but not necessarily, the nucleic acid construct is a multi-cistronic vector or RNA comprising one or more Internal Ribosome Entry Site (IRES) to allow for initiation of translation from an internal region of an mRNA transcribed from the nucleic acid sequences. Alternatively, or additionally, the nucleic acid construct comprises a sequence that encodes a 2A peptide, such as a T2A, P2A, E2A, or F2A peptide, in order to produce equimolar levels of polypeptides encoded by the same mRNA. In some embodiments, the nucleic acid construct further comprises a nucleic acid sequence that encodes an antigen binding protein (ABP). In some embodiments, the ABP is an scFv or a codon optimized scFv. In some embodiments, the ABP specifically binds an antigen expressed by a tumor cell. In some embodiments, the ABP is part of a chimeric antigen receptor (CAR). In further embodiments, the construct comprises a nucleic acid that encodes a cytokine, such IL-2 or IL-15, which may be targeted to the endoplasmic reticulum. In some embodiments, the NK-92 cell or cell line is also genetically modified to express CD16 on the cell surface. In one embodiment, the NK-92 cell or cell line is genetically modified to express a high affinity CD16 (F158V) on the cell surface.

With respect to suitable NK cells, it should be noted that all NK cells are deemed suitable for use herein and therefore include primary NK cells (preserved, expanded, and/or fresh cells), secondary NK cells that have been immortalized, autologous or heterologous NK cells (banked, preserved, fresh, etc.), and modified NK cells as described in more detail below. In some embodiments, it is preferred that the NK cells are NK-92 cells. The NK-92 cell line is a unique cell line that was discovered to proliferate in the presence of interleukin 2 (IL-2) (see e.g., Gong et al., Leukemia 8:652-658 (1994)). NK-92 cells are cancerous NK cells with broad anti-tumor cytotoxicity and predictable yield after expansion in suitable culture media. Advantageously, NK-92 cells have high cytolytic activity against a variety of cancers.

The original NK-92 cell line expressed the CD56bright, CD2, CD7, CD11a, CD28, CD45, and CD54 surface markers and did not display the CD1, CD3, CD4, CD5, CD8, CD10, CD14, CD16, CD19, CD20, CD23, and CD34 markers. Growth of such NK-92 cells in culture is dependent upon the presence of interleukin 2 (e.g., rIL-2), with a dose as low as 1 IU/mL being sufficient to maintain proliferation. IL-7 and IL-12 do not support long-term growth, nor have various other cytokines tested, including IL-1α, IL-6, tumor necrosis factor α, interferon α, and interferon γ. Compared to primary NK cells, NK-92 typically have a high cytotoxicity even at relatively low effector:target (E:T) ratios, e.g. 1:1. Representative NK-92 cells are deposited with the American Type Culture Collection (ATCC), designation CRL-2407.

Therefore, suitable NK cells may have one or more modified KIR that are mutated such as to reduce or abolish interaction with MHC class I molecules. Of course, it should be noted that one or more KIRs may also be deleted or expression may be suppressed (e.g., via miRNA, siRNA, etc.). Most typically, more than one KIR will be mutated, deleted, or silenced, and especially contemplated KIR include those with two or three domains, with short or long cytoplasmic tail. Viewed from a different perspective, modified, silenced, or deleted KIRs will include KIR2DL1, KIR2DL2, KIR2DL3, KIR2DL4, KIR2DL5A, KIR2DL5B, KIR2DS1, KIR2DS2, KIR2DS3, KIR2DS4, KIR2DS5, KIR3DL1, KIR3DL2, KIR3DL3, and KIR3DS1. Such modified cells may be prepared using protocols well known in the art. Alternatively, such cells may also be commercially obtained from NantKwest (see URL www.nantkwest.com) as aNK cells ('activated natural killer cells). Such cells may then be additionally genetically modified to a CAR as further described in more detail below.

In another aspect of the inventive subject matter, the genetically engineered NK cell may also be an NK-92 derivative that is modified to express the high-affinity Fcγ receptor (CD16). Sequences for high-affinity variants of the Fcγ receptor are well known in the art (see e.g., Blood 2009 113:3716-3725), and all manners of generating and expression are deemed suitable for use herein. Expression of such receptor is believed to allow specific targeting of tumor cells using antibodies that are specific to a patient's tumor cells (e.g., neoepitopes), a particular tumor type (e.g., her2neu, PSA, PSMA, etc.), or that are associated with cancer (e.g., CEA-CAM). Advantageously, such antibodies are commercially available and can be used in conjunction with the cells (e.g., bound to the Fcγ receptor). Alternatively, such cells may also be commercially obtained from NantKwest as haNK cells. Such cells may then be additionally genetically modified to a CAR as further described in more detail below.

Genetic modification of the NK cells contemplated herein can be performed in numerous manners, and all known manners are deemed suitable for use hereon. Moreover, it should be recognized that NK cells can be transfected with DNA or RNA, and the particular choice of transfection will at least in part depend on the type of desired recombinant cell and transfection efficiency. For example, where it is desired that NK cells are stably transfected, linearized DNA may be introduced into the cells for integration into the genome. On the other hand, where transient transfection is desired, circular DNA or linear RNA (e.g., mRNA with poly A+ tail) may be used.

For example, where the NK cell is an autologous NK cell or an NK-92 cell it is contemplated that the recombinant nucleic acid will include a segment that encodes a CAR that includes FcεRIγ signaling domain, and preferably also a segment that encodes a cytokine to provide autocrine growth stimulation (e.g., IL-2, IL-2 that is modified with an ER retention sequence, IL-15, or IL-15 that is modified with an ER retention sequence) and/or a segment that encodes a CD16 or high affinity CD16$^{158V}$. As will be readily appreciated, inclusion of a cytokine that provides autocrine growth stimulation will render the modified recombinant independent of exogenous cytokine addition, which will render large scale production of such cells economically feasible. Likewise, where the modified recombinant also expresses CD16 or a high affinity CD16$^{158V}$, such cells will have further enhanced ADCC characteristics and with that further improved targeted cytotoxicity.

Of course, it should be recognized that the recombinant nucleic acid that encodes that cytokine and/or the CD16 or high affinity CD16$^{158V}$ can be integrated in to the genome of the NK cell, or can be supplied as an extrachromosomal unit (which may be a linear or circular DNA, or a linear RNA, virally delivered or via chemical, mechanical, or electrical transfection). For example, recombinant NK-92 cells expressing IL-2ER and CD16$^{158V}$ are known as haNK cells (Oncotarget 2016 Dec. 27; 7 (52): 86359-86373) and can be transfected with a recombinant nucleic acid that includes a segment that encodes a CAR that includes FcεRIγ signaling domain. Once more, such recombinant nucleic acid may comprise further segments that may encode additional immunotherapeutic proteins, such as N-803, T×M-type compounds, IL-8 traps, TGF-β traps, etc. Likewise, NK-92 cells may already be transfected with a cDNA that encodes IL-2 (e.g., NK-92 MI, ATCC CRL-2408). Such cells can then be further transfected with a recombinant nucleic acid that includes a segment that encodes a CAR that includes FcεRIγ signaling domain along with a segment that encodes a CD16 or high affinity CD16$^{158V}$.

On the other hand, (autologous, fresh, cultivated, or previously frozen) NK cells or NK-92 cells may also be transfected with a recombinant nucleic acid that includes a segment that encodes a CAR with a FcεRIγ signaling domain, a segment that encodes a cytokine to provide autocrine growth stimulation (e.g., IL-2, IL-2 that is modified with an ER retention sequence, IL-15, or IL-15 that is modified with an ER retention sequence) and a segment that encodes a CD16 (SEQ ID NO:34) or high affinity CD16$^{158V}$ (SEQ ID NO:35, encoded by SEQ ID NO:36). Most typically, such recombinant nucleic acid will be arranged as a tricistronic construct. As noted before, such constructed can be an extrachromosomal circular plasmid, a linear DNA (which may be integrated into the genome of the NK cell), or a linear RNA. Such nucleic acids will typically be transfected into the cells in a manner well known in the art (e.g., electroporation, lipofection, ballistic gene transfer, etc.). Similarly, the nucleic acid may be delivered to the cell via a recombinant virus. Therefore, NK cells suitable for use herein include NK-92 cells (which may be transfected with a tricistronic construct encoding a CAR, a CD16 or variant thereof, and a cytokine or variant thereof), a genetically modified NK cell or NK-92 cell that expresses a CD16 or variant thereof or a cytokine or variant thereof (which may be transfected with nucleic acid encoding a CAR and a CD16 or variant thereof or a cytokine or variant thereof), and a genetically modified NK cell or NK-92 cell that expresses a CD16 or variant thereof and a cytokine or variant thereof (which may be transfected with a nucleic acid encoding a CAR).

In preferred embodiments, it should therefore be noted that the genetically modified NK cell (especially where the cell expresses a CAR and CD16 or variant thereof) will exhibit three distinct modes of cell killing: General cytotoxicity which is mediated by activating receptors (e.g., an NKG2D receptor), ADCC which is mediated by antibodies bound to a target cell, and CAR mediated cytotoxicity.

Consequently, it should be appreciated that the manner of transfection will at least in part depend on the type of nucleic acid employed. Therefore, viral transfection, chemical transfection, mechanical transfection methods are all deemed suitable for use herein. For example, in one embodiment, the vectors described herein are transient expression vectors. Exogenous transgenes introduced using such vectors are not integrated in the nuclear genome of the cell; therefore, in the absence of vector replication, the foreign transgenes will be degraded or diluted over time.

In another embodiment, the vectors described herein allow for stable transfection of cells. In one embodiment, the vector allows incorporation of the transgene(s) into the genome of the cell. Preferably, such vectors have a positive selection marker and suitable positive selection markers include any genes that allow the cell to grow under conditions that would kill a cell not expressing the gene. Non-limiting examples include antibiotic resistance, e.g. geneticin (Neo gene from Tn5).

Alternatively, or additionally, the vector is a plasmid vector. In one embodiment, the vector is a viral vector. As would be understood by one of skill in the art, any suitable vector can be used, and suitable vectors are well-known in the art.

In still other embodiments, the cells are transfected with mRNA encoding the protein of interest (e.g., the CAR). Transfection of mRNA results in transient expression of the protein. In one embodiment, transfection of mRNA into NK-92 cells is performed immediately prior to administration of the cells. In one embodiment, "immediately prior" to administration of the cells refers to between about 15 minutes and about 48 hours prior to administration. Preferably, mRNA transfection is performed about 5 hours to about 24 hours prior to administration. In at least some embodiments as described in more detail below, NK cell transfection with mRNA resulted in unexpectedly consistent and strong expression of the CAR at a high faction of transfected cells. Moreover, such transfected cells also exhibited a high specific cytotoxicity at comparably low effector to target cell ratios.

With respect to contemplated CARs it is noted that the NK or NK-92 cells will be genetically modified to express the CAR as a membrane bound protein exposing a portion of the CAR on the cell surface while maintaining the signaling domain in the intracellular space. Most typically, the CAR will include at least the following elements (in order): an extracellular binding domain, a hinge domain, a transmembrane domain, and an FcεRIγ signaling domain.

In preferred embodiments, the cytoplasmic domain of the CAR comprises or consists of a signaling domain of FcεRIγ. Notably, and as described in more detail below, the FcεRIγ signaling domain provide for substantially increased expression levels of the CAR as much as for significantly extended cytotoxicity over time. For example, the FcεRIγ signaling domain comprises or consists of or consists essentially of the amino acid sequence of SEQ ID NO:1. In some embodiments, the FcεRIγ cytoplasmic domain is the sole signaling domain. However, it should be appreciated that additional elements may also be included, such as other signaling domains (e.g., CD28 signaling domain, CD33 signaling domain, 4-1BB signaling domain, etc.). These additional signaling domains may be positioned downstream of the FcεRIγ cytoplasmic domain and/or upstream of the FcεRIγ cytoplasmic domain.

In some embodiments, the FcεRIγ signaling domain comprises or consists of or consists essentially of an amino acid sequence having at least about 85%, 90%, 95%, 96%, 97%, 98%, or 99% sequence homology to the amino acid sequence of SEQ ID NO:1.

In alternative embodiments, the cytoplasmic domain of the CAR may also comprise a signaling domain of CD3 zeta (CD3ζ). In one embodiment, the cytoplasmic domain of the CAR consists of a signaling domain of CD3 zeta. In one embodiment, the CD3 zeta signaling domain comprises or consists of or consists essentially of the amino acid sequence of SEQ ID NO: 15. In some embodiments, the CD3 zeta signaling domain comprises or consists of or consists essentially of an amino acid sequence having at least about 85%, 90%, 95%, 96%, 97%, 98%, or 99% sequence homology to the amino acid sequence of SEQ ID NO:15.

The CAR may comprise any suitable transmembrane domain. In one aspect, the CAR comprises a transmembrane domain of CD28. In one embodiment, the CD28 transmembrane domain comprises or consists of or consists essentially of the amino acid sequence of SEQ ID NO: 6 (encoded by nucleic acid with the SEQ ID NO:7). In one embodiment, the CD28 transmembrane domain comprises or consists of or consists essentially of an amino acid sequence having at least about 85%, 90%, 95%, 96%, 97%, 98%, or 99% sequence homology to the amino acid sequence of SEQ ID NO:6. In other embodiments, the transmembrane domain may also be a 4-1BB transmembrane domain.

The CAR may comprise any suitable hinge region. In one aspect, the CAR comprises a hinge region of CD8. In one embodiment, the CD8 hinge region comprises or consists of or consists essentially of the amino acid sequence of SEQ ID NO:3 or SEQ ID NO:4. In one embodiment, the CD8 hinge region comprises or consists of or consists essentially of an amino acid sequence having at least about 85%, 90%, 95%, 96%, 97%, 98%, or 99% sequence homology to the amino acid sequence of SEQ ID NO:3 or SEQ ID NO:4. Such region may be encoded by a nucleic acid having the sequence of SEQ ID NO:5.

Therefore, contemplated CARs will include a general structure of a desired antigen binding domain that is coupled to a hinge domain, which is coupled to a transmembrane domain, which is coupled to a signaling domain. Viewed from another perspective, contemplated CARs may have a desired binding domain that is then coupled to a hybrid protein that comprises, consists of, or essentially consists of a hinge domain, which is coupled to a transmembrane domain, which is coupled to a signaling domain. For example, such hybrid protein may have an amino acid sequence having at least about 85%, 90%, 95%, 96%, 97%, 98%, or 99% sequence homology to the amino acid sequence of SEQ ID NO:8 (encoded by nucleic acid sequence SEQ ID NO:9).

Most typically, but not necessarily, the extracellular binding domain of the CAR will be a scFv or other natural or synthetic binding portion that specifically binds an antigen of interest. Especially suitable binding portions include small antibody fragments with single, dual, or multiple target specificities, beta barrel domain binders, phage display fusion proteins, etc. Among other suitable extracellular binding domains, preferred domains will specifically bind to a tumor-specific antigen, a tumor associated antigen, or a patient- and tumor-specific antigen. Tumor-specific antigens include, without limitation, NKG2D ligands, CS1, GD2, CD138, EpCAM, EBNA3C, GPA7, CD244, CA-125, ETA, MAGE, CAGE, BAGE, HAGE, LAGE, PAGE, NY-SEO-1, GAGE, CEA, CD52, CD30, MUC5AC, c-Met, EGFR, FAP, WT-1, PSMA, NY-ESO1, AFP, CEA, CTAG1B, and CD33. Additional non-limiting tumor-associated antigens, and the malignancies associated therewith, can be found in Table 1. Still further tumor-specific antigens are described, by way of non-limiting example, in US2013/0189268; WO 1999024566 A1; U.S. Pat. No. 7,098,008; and WO 2000020460, each of which is incorporated herein by reference in its entirety. Likewise, other preferred domains will specifically bind to a (pathogenic) virus-specific antigen, such as an antigen of an HIV virus (e.g., gp120), an HPV virus, an RSV virus, an influenza virus, an ebolavirus, or an HCV virus.

TABLE 1

| Target antigen | Associated malignancy |
| --- | --- |
| α-Folate receptor | Ovarian cancer |
| CAIX | Renal cell carcinoma |
| CD19 | B-cell malignancies |
|  | CLL |
|  | B-ALL |
|  | ALL; ALL post-HSCT |
|  | Lymphoma; Refractory Follicular Lymphoma; B-NHL |
|  | Leukemia |
|  | B-cell malignancies; B-cell malignancies post-HSCT |
|  | B-lineage lymphoid malignancies post-UCBT |
|  | B-cell malignancies, CLL, B-NHL |
| CD19/CD20 | Lymphoblastic leukemia |
| CD20 | Lymphomas |
|  | B-cell malignancies |
|  | B-cell lymphomas |
|  | Mantle cell lymphoma |
|  | indolent B-NHL |
|  | Leukemia |
| CD22 | B-cell malignancies |
| CD30 | Lymphomas; Hodgkin lymphoma |
| CD33 | AML |
| CD44v7/8 | Cervical carcinoma |
| CD138 | Multiple myeloma |

TABLE 1-continued

| Target antigen | Associated malignancy |
| --- | --- |
| CD244 | Neuroblastoma |
| CEA | Breast cancer |
| | Colorectal cancer |
| CS1 | Multiple myeloma |
| EBNA3C | EBV positive T cells |
| EGP-2 | Multiple malignancies |
| EGP-40 | Colorectal cancer |
| EpCAM | Breast carcinoma |
| erb-B2 | Colorectal cancer |
| | Breast and others |
| | Prostate cancer |
| erb-B 2,3,4 | Breast and others |
| FBP | Ovarian cancer |
| Fetal acetylcholine receptor | Rhabdomyosarcoma |
| GD2 | Neuroblastoma |
| GD3 | Melanoma |
| GPA7 | Melanoma |
| Her2 | Breast carcinoma |
| | Ovarian cancer |
| | Tumors of epithelial origin |
| Her2/neu | Medulloblastoma |
| | Lung malignancy |
| | Advanced osteosarcoma |
| | Glioblastoma |
| IL-13R-a2 | Glioma |
| | Glioblastoma |
| | Medulloblastoma |
| KDR | Tumor neovasculature |
| k-light chain | B-cell malignancies |
| | (B-NHL, CLL) |
| LeY | Carcinomas |
| | Epithelial derived tumors |
| L1 cell adhesion molecule | Neuroblastoma |
| MAGE-A1 | Melanoma |
| Mesothelin | Various tumors |
| MUC1 | Breast, Ovary |
| NKG2D ligands | Various tumors |
| Oncofetal antigen (h5T4) | Various tumors |
| PSCA | Prostate carcinoma |
| PSMA | Prostate/tumor vasculature |
| TAA targeted by mAb IgE | Various tumors |
| TAG-72 | Adenocarcinomas |
| VEGF-R2 | Tumor neovasculature |

For example, the CAR may comprise an anti-CD19 extracellular domain. In one embodiment, the anti-CD19 extracellular domain comprises, consists of, or consists essentially of the amino acid sequence of SEQ ID NO: 11. In one embodiment, the anti-CD19 extracellular domain comprises or consists of or consists essentially of an amino acid sequence having at least about 85%, 90%, 95%, 96%, 97%, 98%, or 99% sequence homology to the amino acid sequence of SEQ ID NO:11.

Consequently, contemplated CARs will target antigens associated with a specific cancer type. For example, targeted cancers include leukemia (including acute leukemias (e.g., acute lymphocytic leukemia, acute myelocytic leukemia (including myeloblastic, promyelocytic, myelomonocytic, monocytic, and erythroleukemia)) and chronic leukemias (e.g., chronic myelocytic (granulocytic) leukemia and chronic lymphocytic leukemia)), polycythemia vera, lymphomas (e.g., Hodgkin's disease and non-Hodgkin's disease), multiple myeloma, Waldenstrom's macroglobulinemia, heavy chain disease, solid tumors including, but not limited to, sarcomas and carcinomas such as fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyo sarcoma, colon carcinoma, pancreatic cancer, breast cancer, ovarian cancer, prostate cancer, squamous cell carcinoma, basal cell carcinoma, adenocarcinoma, sweat gland carcinoma, sebaceous gland carcinoma, papillary carcinoma, papillary adenocarcinomas, cystadenocarcinoma, medullary carcinoma, bronchogenic carcinoma, renal cell carcinoma, hepatoma, bile duct carcinoma, choriocarcinoma, seminoma, embryonal carcinoma, Wilm's tumor, cervical cancer, testicular tumor, lung carcinoma, small cell lung carcinoma, bladder carcinoma, epithelial carcinoma, glioma, astrocytoma, medulloblastoma, craniopharyngioma, ependymoma, pinealoma, hemangioblastoma, acoustic neuroma, oligodendroglioma, menangioma, melanoma, neuroblastoma, and retinoblastoma.

Therefore, contemplated CARs will generally have a structure of an extracellular binding domain that is (directly) coupled to a hinge domain, which is (directly) coupled to a transmembrane domain, which is (directly) coupled to an FcεRIγ signaling domain. In still further contemplated aspects, contemplated CARs may also include one or more signaling domains in addition to or replacing the FcεRIγ signaling domain, and especially contemplated signaling domains include CD3ζ signaling domains, 4-1BB signaling domains, and CD28 signaling domains. For example, contemplated CARs may therefore include any binding domain (e.g., having SEQ ID NO:11) that is coupled to a hinge domain (e.g., CD8 hinge as in SEQ ID NO:3 or SEQ ID NO:4, encoded by SEQ ID NO:5), which is in turn coupled to a transmembrane domain (e.g., CD28™ as in SEQ ID NO:6, encoded by SEQ ID NO:7), which is coupled to a signaling domain (e.g., FcεRIγ signaling domain as in SEQ ID NO:1, encoded by SEQ ID NO: 1, or CD28 signaling domain as in SEQ ID NO:13, or 4-1BB signaling domain as in SEQ ID NO:14, or CD3ζ signaling domain as in SEQ ID NO:15)

With respect to the construction of contemplated CARs it should be recognized that CARs can be engineered in numerous manners as described, for example, in WO 2014/039523; US 2014/0242701; US 2014/0274909; US 2013/0280285 and WO 2014/099671, each of which is incorporated herein by reference in its entirety.

In still further contemplated aspects, and as noted above, NK cells may be further genetically modified to express one or more cytokines to so provide a selection marker where the cytokine and the CAR are encoded on the same recombinant nucleic acid, and/or to render the recombinant cells independent of exogenous IL-2. Therefore, in some aspects of the inventive subject matter, NK-92 cells are modified to express at least one cytokine. In particular, the at least one cytokine is IL-2, IL-12, IL-15, IL-18, IL-21, or a variant thereof. In preferred embodiments, the cytokine is IL-2 or a variant thereof and especially preferred variants include endoplasmic retention signals (e.g., human IL-2 as in SEQ ID NO:21, or with ER retention signal as in SEQ ID NO:22, SEQ ID NO:30, or SEQ ID NO:33). For example, the IL-2 gene is cloned and expressed with a signal sequence that directs the IL-2 to the endoplasmic reticulum. This permits expression of IL-2 at levels sufficient for autocrine activation, but without releasing IL-2 extracellularly (e.g., *Exp Hematol.* 2005 February; 33 (2): 159-64.) Alternatively, expression of a cytokine (and especially IL-15) may also be such that the cytokine will be expressed in sufficient quantities to provide an autocrine growth signal to the recombinant cells, but also to allow at least some of the expressed IL-15 to be released from the cell, which will so provide an immune stimulatory signal. For example, such expression may be achieved using a human IL-15 sequence that includes both the signal peptide and an endoplasmic retention sequence. An exemplary DNA and protein sequence for an endoplasmic retained IL-15 is shown in SEQ ID NO:49 and SEQ ID NO:50, respectively.

Where desired, contemplated cells may also express a suicide gene. The term "suicide gene" refers to a transgene that allows for the negative selection of cells expressing the suicide gene. A suicide gene is used as a safety system, allowing cells expressing the gene to be killed by introduction of a selective agent. This is desirable in case the recombinant gene causes a mutation leading to uncontrolled cell growth, or the cells themselves are capable of such growth. A number of suicide gene systems have been identified, including the herpes simplex virus thymidine kinase (TK) gene, the cytosine deaminase gene, the varicella-zoster virus thymidine kinase gene, the nitroreductase gene, the *Escherichia coli* gpt gene, and the *E. coli* Deo gene. Typically, the suicide gene encodes for a protein that has no ill effect on the cell but, in the presence of a specific compound, will kill the cell. Thus, the suicide gene is typically part of a system.

In one embodiment, the suicide gene is active in NK-92 cells. In one embodiment, the suicide gene is the thymidine kinase (TK) gene. The TK gene may be a wild-type or mutant TK gene (e.g., tk30, tk75, sr39tk). Cells expressing the TK protein can be killed using ganciclovir. In another embodiment, the suicide gene is cytosine deaminase, which is toxic to cells in the presence of 5-fluorocytosine. Garcia-Sanchez et al. "Cytosine deaminase adenoviral vector and 5-fluorocytosine selectively reduce breast cancer cells 1 million-fold when they contaminate hematopoietic cells: a potential purging method for autologous transplantation." *Blood.* 1998 Jul. 15; 92 (2): 672-82. In a further embodiment, the suicide gene is cytochrome P450, which is toxic in the presence of ifosfamide or cyclophosphamide. See, e.g. Touati et al. "A suicide gene therapy combining the improvement of cyclophosphamide tumor cytotoxicity and the development of an anti-tumor immune response." *Curr Gene Ther.* 2014; 14 (3): 236-46. In yet another embodiment, the suicide gene is iCasp9. Di Stasi, (2011) "Inducible apoptosis as a safety switch for adoptive cell therapy." *N Engl J Med* 365:1673-1683. See also Morgan, "Live and Let Die: A New Suicide Gene Therapy Moves to the Clinic" *Molecular Therapy* (2012); 20:11-13. iCasp9 induces apoptosis in the presence of a small molecule, AP1903. AP1903 is biologically inert small molecule, that has been shown in clinical studies to be well tolerated, and has been used in the context of adoptive cell therapy.

Of course, it should be noted that all of the recombinant proteins can be expressed from individual recombinant sequences. However, it is generally preferred that where multiple recombinant sequences are expressed (e.g., CAR, CD16, cytokine), coding regions may be arranged in a polycistronic unit with at least two or at least three coding regions encoding the recombinant proteins. For example, a tricistronic DNA or RNA construct (e.g., encoding a CAR with an FcεRIγ signaling domain, a $CD16^{158V}$, and $IL-2^{ER}$ or $IL15^{ER}$) may be transfected into an NK or NK-92 cell. Therefore, transgenes can be engineered into an expression vector by any mechanism known to those of skill in the art. Where multiple transgenes are to be inserted into a cell, transgenes may be engineered into the same expression vector or a different expression vector. In some embodiments, the cells are transfected with mRNA encoding the transgenic protein to be expressed. In some embodiments, the cells are transfected with DNA encoding the transgenic protein to be expressed. Transgenes, mRNA and DNA can be introduced into the NK-92 cells using any transfection method known in the art, including, by way of non-limiting example, infection, viral vectors, electroporation, lipofection, nucleofection, or "gene-gun."

As will be readily apparent, contemplated genetically modified cells can be used for treatment of various diseases, and especially of various cancers and viral infections where a diseased cell presents a disease-specific or disease-associated antigen. Consequently, the inventors contemplate methods of treating patients with modified NK or NK-92 cells as described herein. In one embodiment, the patient is suffering from cancer (e.g., a tumor) and the modified NK-92 cell or cell line expresses a CAR specific for an antigen expressed on the surface of a cell from the cancer or tumor. In one embodiment, the patient is suffering from a viral infection and the modified NK-92 cell or cell line expresses a CAR specific for an antigen expressed on the surface of a cell that has been infected by the virus. In one embodiment, the patient is suffering from a bacterial infection and the modified NK-92 cell or cell line expresses a CAR specific for an antigen expressed on the surface of a bacterial cell causing the infection.

Contemplated modified NK or NK-92 cells can be administered to an individual by absolute numbers of cells. For example, the individual can be administered from about 1000 cells/injection to up to about 10 billion cells/injection, such as at about, at least about, or at most about, $1 \times 10^8$, 1×10⁷, 5×10⁷, 1× 10⁶, 5× 10⁶, 1×10⁵, 5×10⁵, 1×10⁴, 5×10⁴, 1× 10³, 5× 10³ (and so forth) modified NK-92 cells per injection, or any ranges between any two of the numbers, end points inclusive. In other embodiments, modified NK-92 cells can be administered to an individual by relative numbers of cells, e.g., said individual can be administered about 1000 cells to up to about 10 billion cells per kilogram of the individual, such as at about, at least about, or at most about, 1×10⁸, 1×10⁷, 5×10⁷, 1×10⁶, 5×10⁶, 1×10⁵, 5×10⁵, 1×10⁴, 5×10⁴, 1×10³, 5×10³ (and so forth) modified NK-92 cells per kilogram of the individual, or any ranges between any two of the numbers, end points inclusive. In other embodiments, the total dose may calculated by m² of body surface area, including about 1×10¹¹, 1×10¹⁰, 1× 10⁹, 1×10⁸, 1×10⁷, per m2, or any ranges between any two of the numbers, end points inclusive. The average person is about 1.6 to about 1.8 m². In a preferred embodiment, between about 1 billion and about 3 billion NK-92 cells are administered to a patient.

The modified NK-92 cells, and optionally other anti-cancer or anti-viral agents can be administered once to a patient with cancer or infected with a virus or can be administered multiple times, e.g., once every 1, 2, 3, 4, 5, 6, 7, 8, 9, 10, 11, 12, 13, 14, 15, 16, 17, 18, 19, 20, 21, 22 or 23 hours, or once every 1, 2, 3, 4, 5, 6 or 7 days, or once every 1, 2, 3, 4, 5, 6, 7, 8, 9, 10 or more weeks during therapy, or any ranges between any two of the numbers, end points inclusive.

In one embodiment, where the modified NK-92 cells express a suicide gene, the patient is administered an agent to trigger modified NK-92 cell death. In one embodiment, the agent is administered at a time point after administration of the modified NK-92 cells that is sufficient for the NK-92 cells to kill target cells.

In one embodiment, the modified NK-92 cells are irradiated prior to administration to the patient. Irradiation of NK-92 cells is described, for example, in U.S. Pat. No. 8,034,332, which is incorporated herein by reference in its entirety. In one embodiment, modified NK-92 cells that have not been engineered to express a suicide gene are irradiated.

Furthermore, it should be appreciated that contemplated treatments will also include administration of other immune therapeutic entities, and especially preferred immune therapeutic entities include a viral cancer vaccine (e.g., adenoviral vector encoding cancer specific antigens), a bacterial cancer vaccine (e.g., non-pyrogenic E. coli expressing one or more cancer specific antigens), a yeast cancer vaccine, N-803 (also known as ALT-803, ALTOR Biosciences), an antibody (e.g., binding to a tumor associated antigen or patient specific tumor neoantigen), a stem cell transplant (e.g., allogeneic or autologous), and a tumor targeted cytokine (e.g., NHS-IL 12, IL-12 coupled to a tumor targeting antibody or fragment thereof).

EXAMPLES

The following examples are for illustrative purposes only and should not be interpreted as limitations of the claimed invention. There are a variety of alternative techniques and procedures available to those of skill in the art which would similarly permit one to successfully perform the intended invention.

Example 1: CAR mRNA Preparation

DNA sequences encoding each variant of CD19CAR schematically depicted in FIG. 1 were designed in silico, synthesized de novo, and subcloned into the mRNA expression vector, pXT7 (GeneArt, Life Technologies). Ten micrograms (ug) of plasmid were linearized by digestion with the SalI restriction enzyme (New England Biolabs) and purified using a QIAgen gel purification kit (QIAgen) according to manufacturer's instructions.

The linearized DNA was used as template for in vitro synthesis of mRNA using a T7 mMessage mMachine Ultra transcription kit (ThermoFisher Scientific, Waltham, MA) according to the manufacturer's instructions. This kit includes a polyadenylation extension step that increases the length of the poly A tail of the mRNA and thus enhances stability in vivo.

mRNA for six CD19CAR variants were prepared, with a green fluorescent protein (GFP) mRNA prepared as a negative control. All of the CD19CAR variants contained an extracellular domain comprising an anti-CD19 scFv region (αCD19-scFv) (SEQ ID NO:11), a hinge region from CD8 (SEQ ID NO:3 or NO: 4), and a transmembrane domain from CD28 (SEQ ID NO:6 encoded by SEQ ID NO:7) The intracellular domains of the CD19CARs were as follows and schematically shown in FIG. 1: CAR 3z contained a CD3ζ signaling domain; CAR FcεRe contained a FcεRIγ signaling domain (SEQ ID NO:1); CAR 28_3z contained a CD28 signaling domain fused to a CD3ζ signaling domain; CAR BB_3z contained a 4-1BB signaling domain fused to a CD3ζ signaling domain; CAR 28_BB_3z contained a CD28 signaling domain fused to a 4-1BB signaling domain fused to a CD3ζ signaling domain; CAR BB 3z 28 contained a 4-1BB signaling domain fused to a CD3 signaling domain fused to a CD28 signaling domain.

More particularly, the 1ˢᵗ generation CAR with CD3ζ signaling domain of FIG. 1 had a nucleic acid sequence of SEQ ID NO:16 (human). The 1ˢᵗ generation CAR with a FcεRIγ signaling domain nucleic had a nucleic acid sequence of SEQ ID NO: 12 and an amino acid sequence of SEQ ID NO:10. The 2ⁿᵈ generation CAR with CD28/CD3ζ signaling domain had a nucleic acid sequence of SEQ ID NO: 17 and the 2ⁿᵈ generation CAR with 4-1BB/CD3ζ signaling domain had a nucleic acid sequence of SEQ ID NO:18. The 3ʳᵈ generation CAR with CD28/4-1BB/CD3ζ signaling domain had a nucleic acid sequence of SEQ ID NO:19 and the 3ʳᵈ generation CAR with 4-1BB/CD3ζ/CD28signaling domain had a nucleic acid sequence of SEQ ID NO:20. A further 1ˢᵗ generation CAR with a FcεRIγ signaling domain nucleic had an amino acid sequence of SEQ ID NO:25.

Example 2: Electroporation of NK-92 Cells with CD19CAR mRNA

NK-92 cells were grown in X-Vivo10 medium (Lonza, Basel, Switzerland) supplemented with 5% Human AB Serum (Valley Biomedical, Winchester, VA) and 500 IU/mL IL-2 (Prospec, Rehovot, Israel). Cells were electroporated with mRNA using the Neon™ electroporation device (Life Technologies, Carlsbad, CA), following the manufacturer's parameters for NK-92 cells (1250 V, 10 ms, 3 pulses) and using 5 μg of mRNA per 10⁶ cells in a volume of 100 μl. Electroporated cells were maintained in medium (same as above) for 20 hours (h).

Figure 2A:
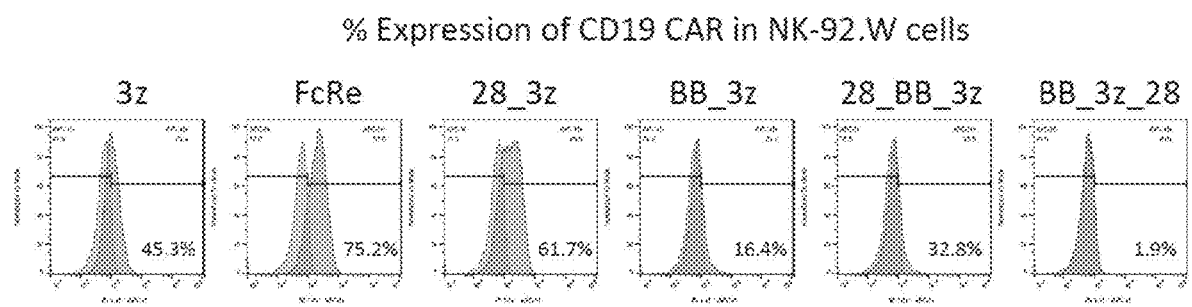
FIG. 2A are exemplary results for the percentage of NK-92 cells expressing the CD19-CAR of FIG. 1 after transfection with CD19-CAR mRNA as determined by flow cytometry with an anti-scFv antibody labeled with eF660.
Figure 2B:
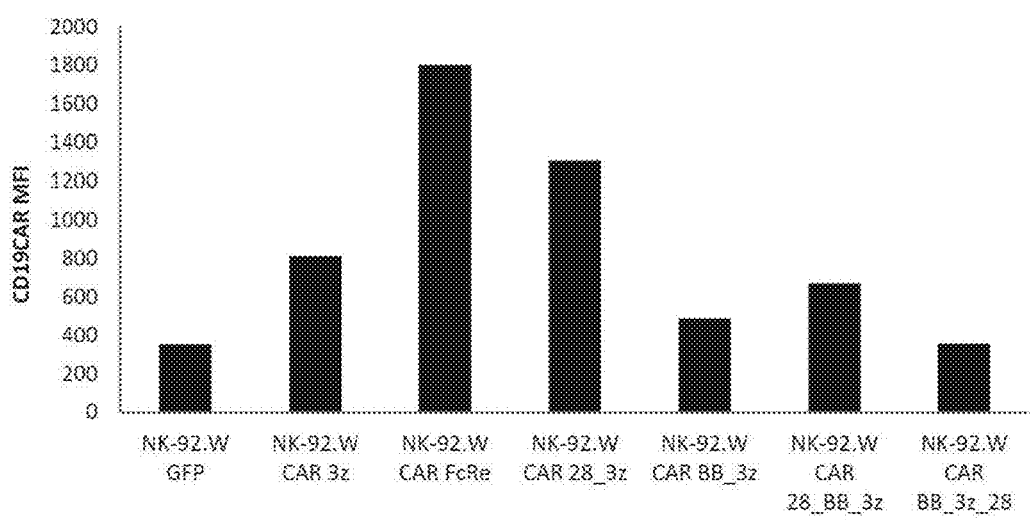
FIG. 2B are exemplary results for the median fluorescent intensity (MFI) minus background for CD19-CAR-expressing NK-92 cells labeled with an anti-scFv antibody labeled with eF660.

The CD19CAR expression on the NK-92 cell surface was determined by flow cytometry using anti-scFv antibody labeled with eF660 (eBioscience, San Diego, CA). FIG. 2A shows the % expression of the indicated CD19CAR in the NK-92 cell population. FIG. 2B shows the median fluorescence intensity (MFI, minus background) of cells electroporated with the indicated CD19CAR. As can be taken from FIGS. 2A and 2B, CAR FcRe unexpectedly had the highest percentage of cells (75.2%) expressing CD19CAR at the cell surface, as well as the highest MFI (quantity of expressed CAR on a recombinant cell), followed by 28_3z (61.7%).

Example 3: Cytotoxicity of NK-92 Cells Expressing CD19CAR Against Cancer Cell Lines The efficacy of CAR-expressing NK-92 cells to target cancer cells in vitro was tested 20 hours post-electroporation using a flow-based in vitro cytotoxicity assay. Effector cells (NK-92 expressing CD19CAR or GFP) were mixed with PKHGL67-labeled (Sigma-Aldrich, St. Louis, MO) target cells (K562; or SUPB15, B-ALL, CD19$^+$) at different effector to target ratios (5:1 to 0.3:1) in a 96-well plate and incubated 4 h at 37° C. Propidium Iodide (PI) (Sigma Aldrich, St. Louis, MO) was added to the cells and samples were analyzed within 2 h using an Attune flow cytometer (Life Technologies, Carlsbad, CA). The cytotoxicity was determined by the % of PI-positive cells within the PKH-positive target population.

Figure 3A:
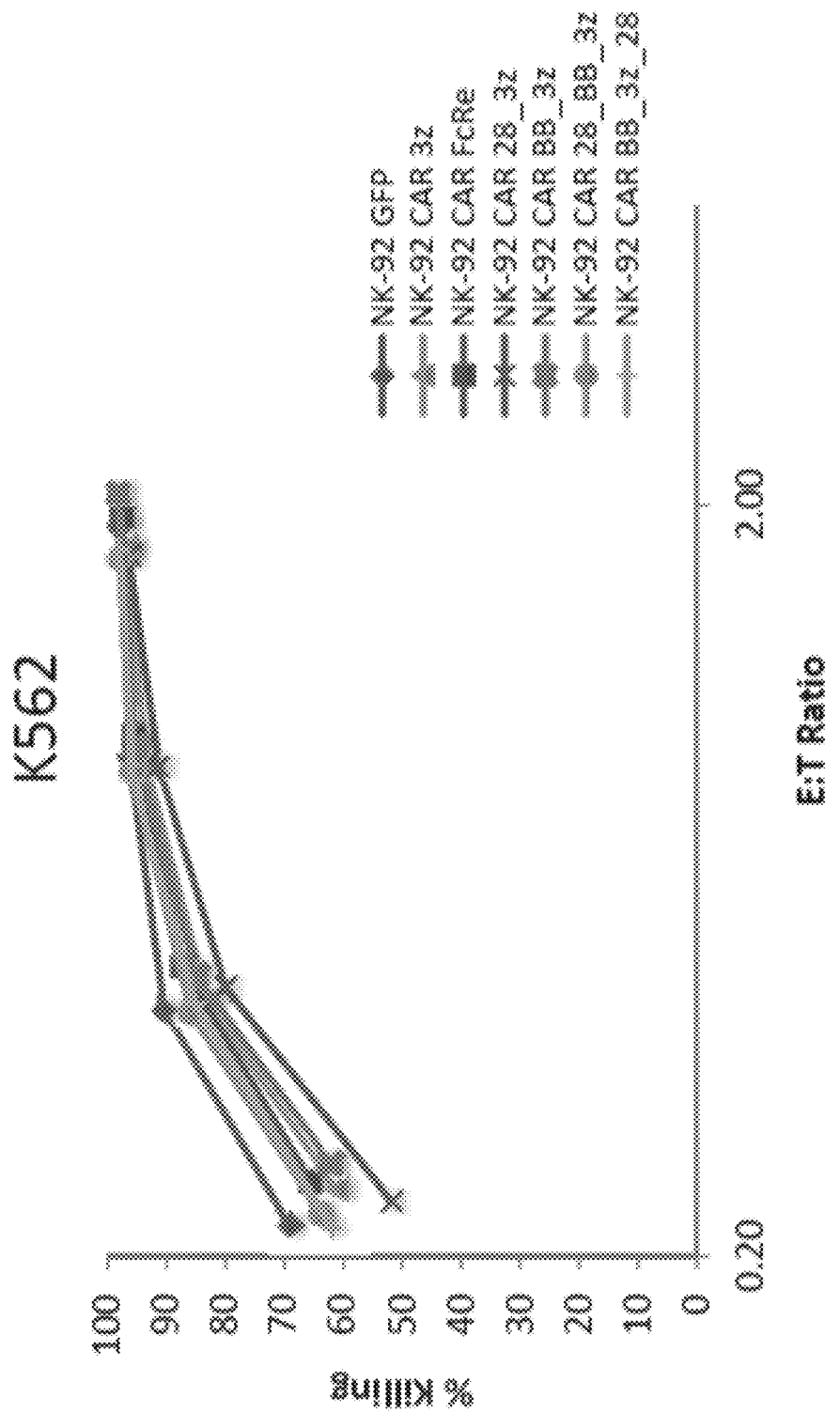
FIG. 3A shows exemplary results for the percentage of NK-92 cell-sensitive target cancer cells (K562) that were killed by NK-92 cells (effector) expressing the CD19CARs at effector:target ratios of from 5:1 to 0.3:1.
Figure 3B:
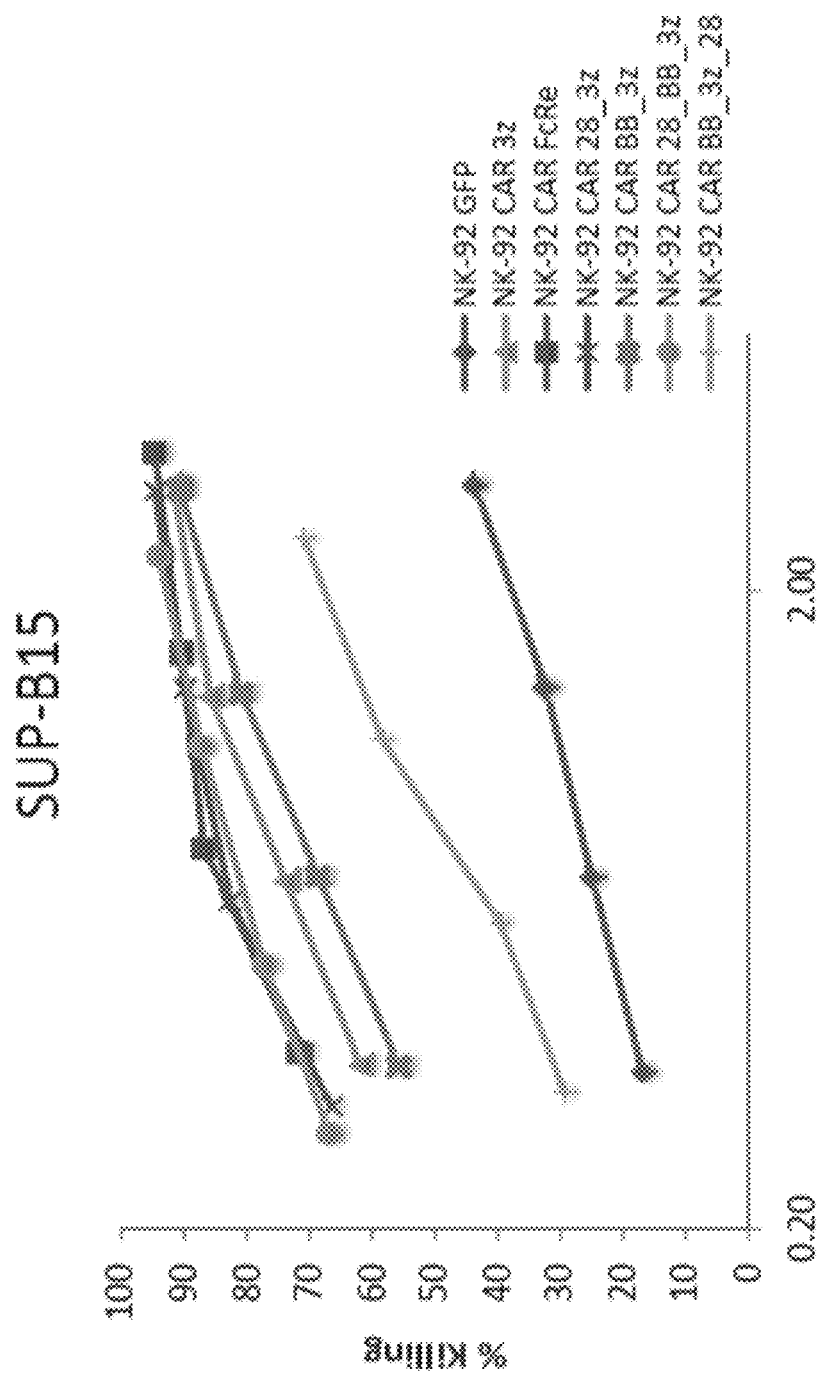
FIG. 3B shows exemplary results for the percentage of NK-92 cell-resistant, CD19-positive target cancer cells (SUP-B15) that were killed by NK-92 cells (effector) expressing the CD19CARs at effector:target ratios of from 5:1 to 0.3:1.

Exemplary results are provided in FIGS. 3A and 3B. NK-92 cells are effective at killing K562 cells regardless of CD19CAR expression as can be seen from FIG. 3A. Thus, it should be noted that recombinant cells will not lose cytotoxicity. In contrast, GFP-expressing NK-92 cells were inefficient at killing the cancer cell line SUP-B15. SUP-B15 is an acute lymphoblastic leukemia cell line that is CD19-positive and resistant to NK-92-mediated cytotoxicity. Expression of any CD19CAR tested provided increased cytotoxic activity against the SUP-B15 cell line compared to control (GFP-expressing NK-92 cells) as can be readily taken from FIG. 3B. Surprisingly, CARs with the FcεRIγ signaling domain exhibited cytotoxicity similar or even superior to the $2^{nd}$ and $3^{rd}$ generation CARs. Such finding is particularly unexpected as the FcεRIγ signaling domain was present only as a single unit and not combined with other signaling domains. Such arrangement, when used in CAR T-cells failed to provide desirable targeted cytotoxicity.

Figure 4:
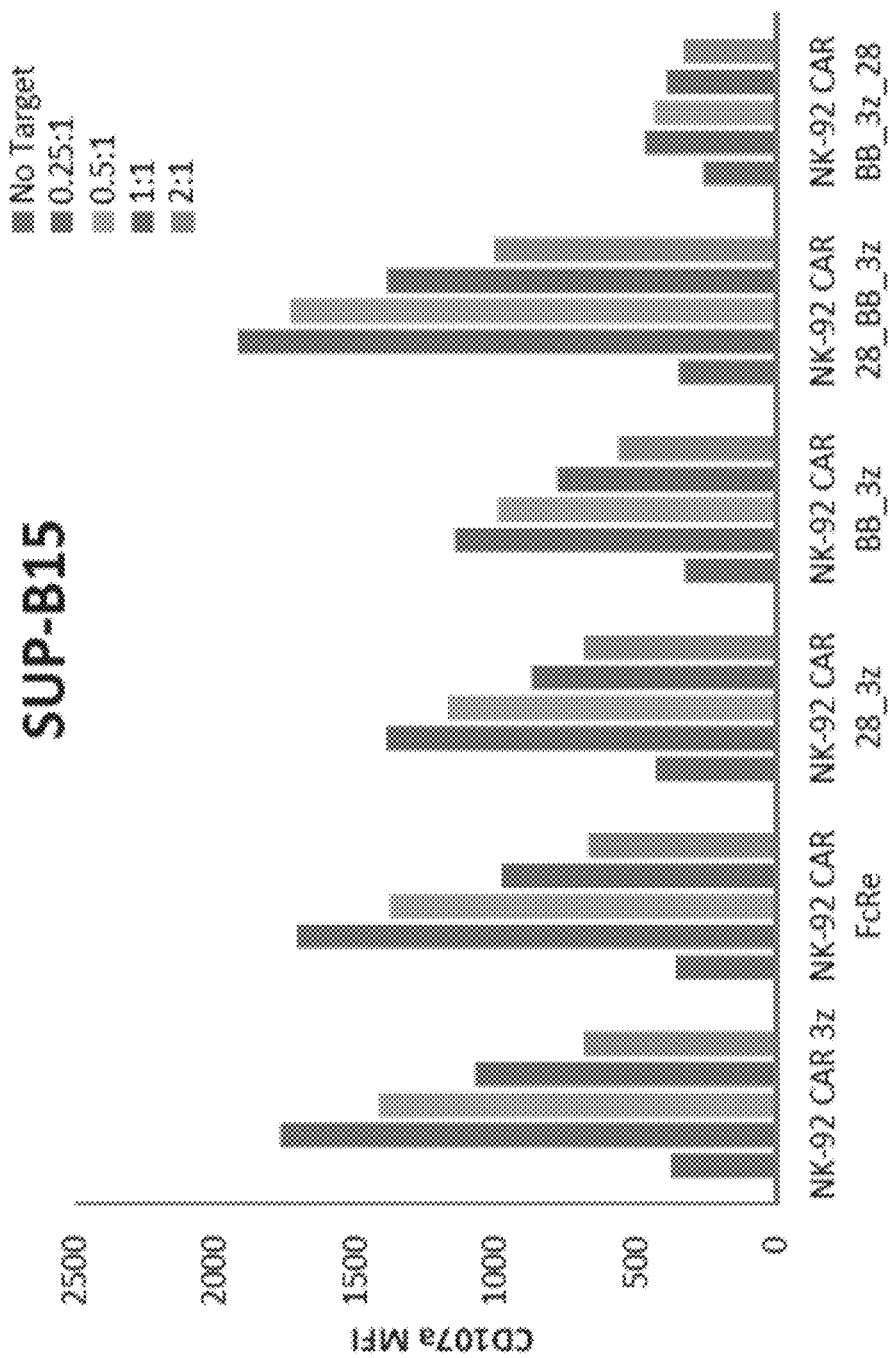
FIG. 4 shows exemplary results for the MFI of CD19-CAR-expressing NK-92 cells (effector) labeled with anti-CD107a antibody in a degranulation assay with SUP-B15 target cells at effector:target ratios of from 2:1 to 0.25:1.

Degranulation is a critical step required for the release of the lytic proteins (e.g., perforin and granzyme) from secretory granules in the NK-92 cells. Degranulation is initiated by recognition of a target cell by NK-92. To test degranulation in the constructs, effector cells (NK-92) were mixed with unlabeled target cells (SUP-B15) at different effector to target ratios (5:1 to 0.3:1) in a 96-well plate, and anti-CD107a (FITC-conjugated, BD Pharmingen, San Jose, CA) was added to each well. Plates were incubated at 37° C. in a CO2 incubator and after 1 h monensin (Golgi-stop) was added to the wells. The plates were incubated for another 3 h at 37° C. and the samples were analyzed by flow cytometry (Attune, Life technologies, Carlsbad, CA). Percentage degranulation was determined by subtracting the % CD107a positive in NK-92 cells alone to the % CD107a positive in the effector+target samples, and exemplary results are provided in FIG. 4.

Example 4. Surface Expression and Cytotoxicity of NK-92 Cells Expressing CD19CAR Against Cancer Cell Lines The inventors quantified expression levels for the various CAR constructs to investigate durability of expression over time. As can be seen from the results in FIG. 5, NK-92 cells transfected with the different CD19 CAR constructs expressed detectable levels of the respective CARs on the cell surface for up to 72 hours. Unexpectedly, and as can be readily seen from FIG. 5, the CAR constructs that comprised the Fc-epsilon cytoplasmic signaling domain had substantially higher durations of expression. Notably, it was also observed that addition of one or more signaling domains in addition to the FcεRIγ signaling domain (e.g., CD28 signaling domain in the example presented here) would not adversely affect the duration of expression. Indeed, in the CAR having the FcεRIγ signaling domain and the CD28 signaling domain duration of expression was even further increased over time, whereas CAR constructs with a CD3-zeta signaling domain had a dramatic reduction in expression at the 72 hour mark, and even before then.

Figure 5:
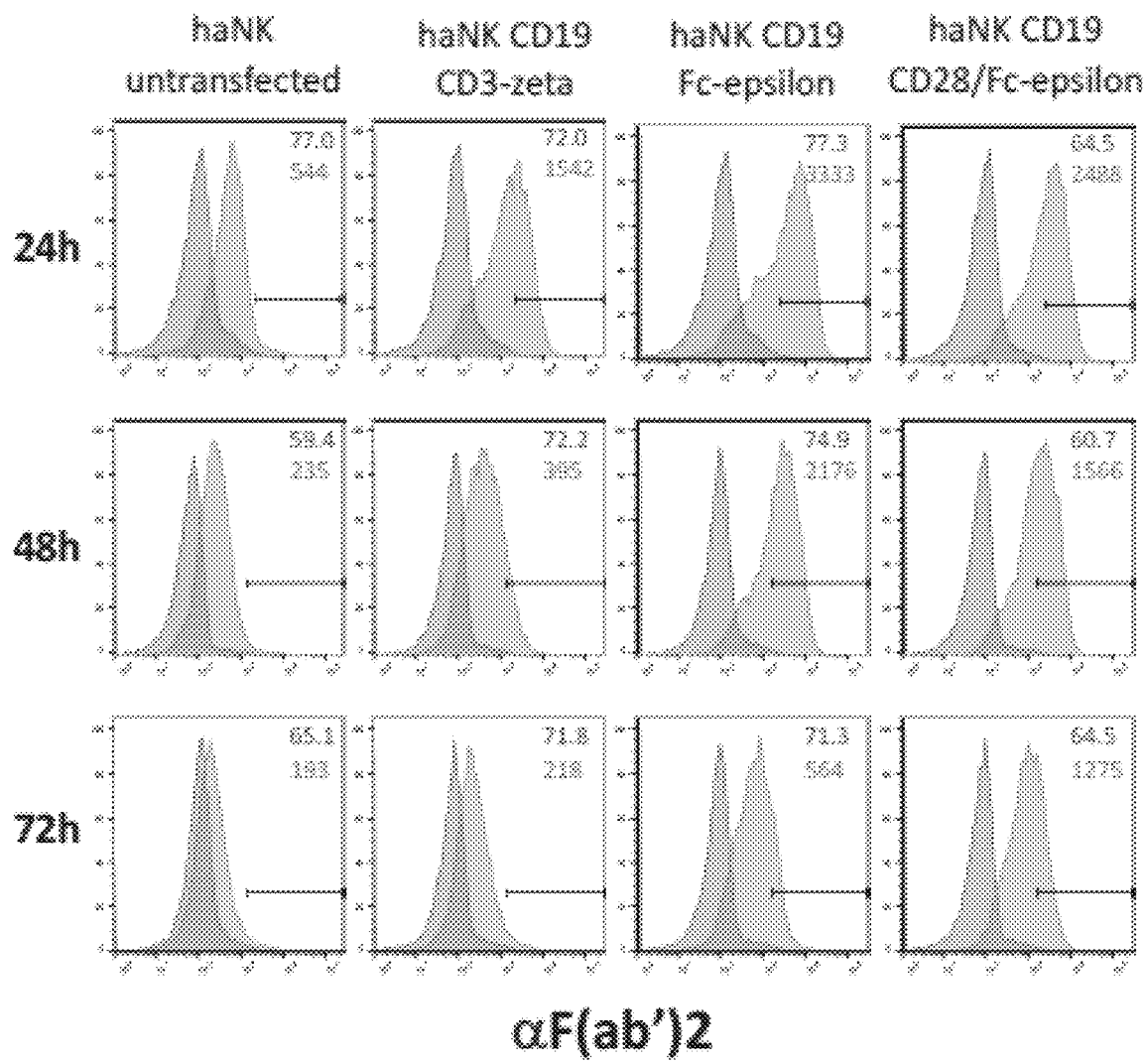
FIG. 5 shows exemplary results for surface expression of CD19 CAR on haNK cells transfected with CD19 CAR mRNA constructs at various time points. All CAR constructs tested show detectable expression for up to 72 h under the conditions used with CD19/CD28-Fc-epsilon CAR having the longest duration of expression.

Moreover, as can also be seen from the results in FIG. 5, the quantity of expression of CAR constructs having the FcεRIγ signaling domain was also initially significantly higher than corresponding constructs with a CD3-zeta signaling domain.

Figure 6:
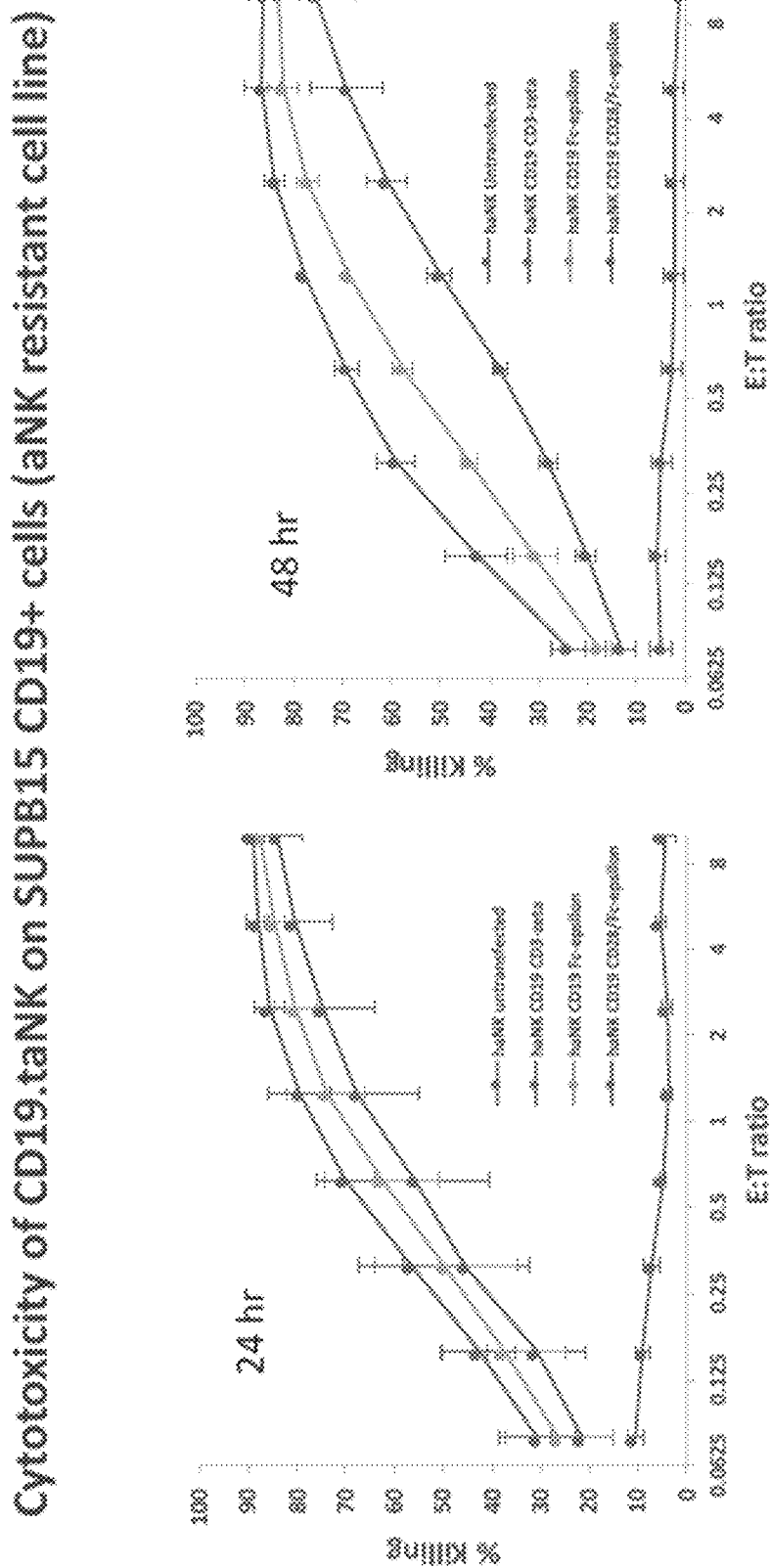
FIG. 6 shows exemplary results for cytotoxicity of CD19.taNK on SUPB15 CD19+ cells (an aNK resistant cell line). All CAR constructs tested show comparable (maximum) cytotoxic properties at 24 h. However, at 48 h, CD19/CD3-zeta shows a marked decrease in cytotoxic properties while Fc-epsilon based CARs show only minimal decrease 48 hours post-electroporation.

The inventors then set out to test whether the extended and stronger expression of the CAR constructs having the FcεRIγ signaling domain would also translate into a higher rate of cytotoxicity. Exemplary results for tests on SUPB15 CD19$^+$ cells at 24 hours and 48 hours are depicted in FIG. 6. As can be taken from the results, all CAR constructs tested showed somewhat comparable (maximum) cytotoxic properties at 24 hours. However, at 48 hours, CD19/CD3-zeta showed a marked decrease in cytotoxic properties. Remarkably, the Fc-epsilon based CARs showed only minimal decrease in cytotoxic activity 48 hours post-electroporation, which paralleled the extended expression results from FIG. 5. Thus, it should be recognized that the CAR constructs with an FcεRIγ signaling domain exhibited extended cytotoxicity, which is believed to be of substantial clinical benefit.

Advantageously, tricistronic mRNA constructs were able to produce substantial quantities of desired CARs with excellent functional activity. Such constructs are especially beneficial where the CAR expression should be transient. In contrast, the following examples for targeted CAR constructs and associated functional data were from linearized DNA vector constructs, which allowed transfected cells to integrate the linearized DNA into the genome and to so provide an avenue for non-transient expression of the specific CARs.

Example 5. Map of Tricistronic Expression Cassette

Figure 7:
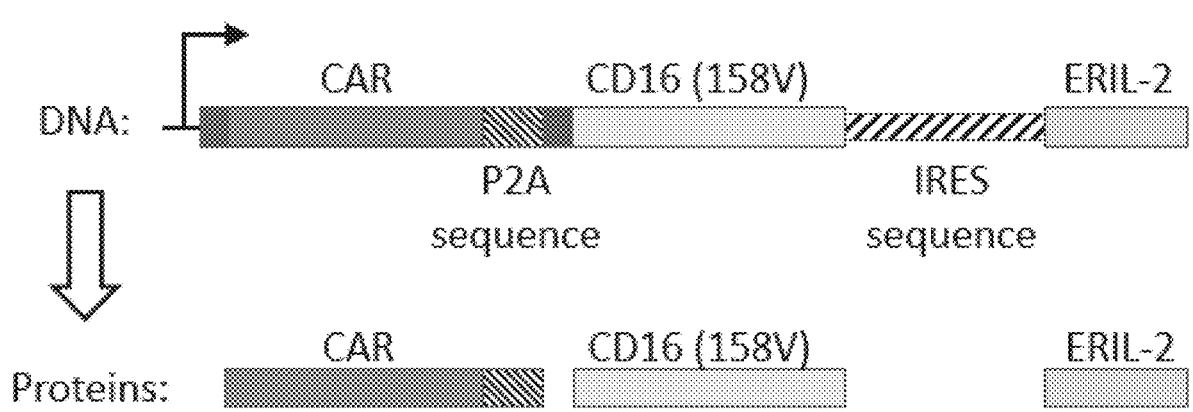
FIG. 7 is an exemplary schematic of a recombinant tricistronic DNA construct and corresponding protein products.
Figure 8:
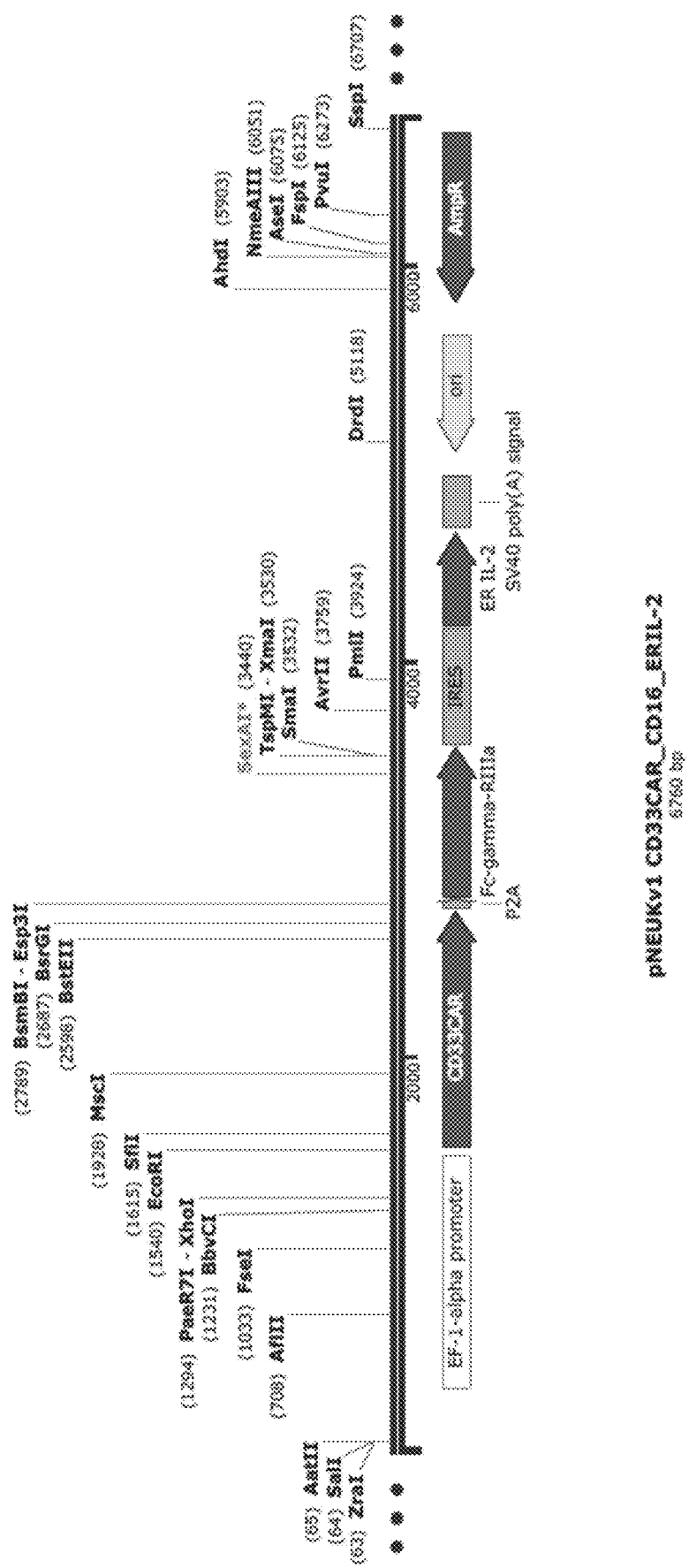
FIG. 8 shows an exemplary linearized version of the plasmid shown in FIG. 8.

FIG. 7 shows diagrammatically the DNA and protein products produced by a representative tricistronic expression cassette. FIG. 8 shows the linearized version of the plasmid with the expression cassette.

SEQ ID NO:28 is an exemplary nucleic acid sequence for part of the pNEUKv1_CD19CAR_CD16 (158V) ERIL-2 vector, which is a construct similar to FIG. 8. SEQ ID NO: 29 is an exemplary tricistronic protein (similar to FIG. 7) that represents a CD19CAR_P2A_CD16 (158V) protein. Similarly SEQ ID NO:31 is an exemplary nucleic acid sequence for the Codon-optimized CD33ScfV-P2A-CD16-IRES-erIL2 tricistronic sequence, while SEQ ID NO:32 shows a CD33 CAR-P2A-CD16 peptide.

Still further constructs made include SEQ ID NO:24 is an exemplary amino acid sequence for CD19K_Transmembrane and Signaling domain, while SEQ ID NO.: 26 is an exemplary nucleic acid sequence for 15AD23HC_1805843_CD19K_Eps (879-1319), and SEQ ID NO: 27 is an exemplary nucleic acid sequence for 15AD23HC_1805843_CD19K_Eps, which did not include a CD28 transmembrane domain.

Example 6. Cytotoxicity of NK-92 Cells Expressing CD33-CAR Against Cancer Cell Lines The following example is provided to demonstrate that cells that are resistant to specific lysis (cytotoxicity) by control (unmodified) NK-92 cells can be efficiently killed by NK-92 cells that express a CAR. In this example, the cells were THP-1 cells expressing CD33. NK-92 cell were modified to express a CAR with an extracellular binding domain specifically binds to CD33, and that an FcεRIγ signaling domain as shown in FIGS. 8 and 9.

Figure 9A:
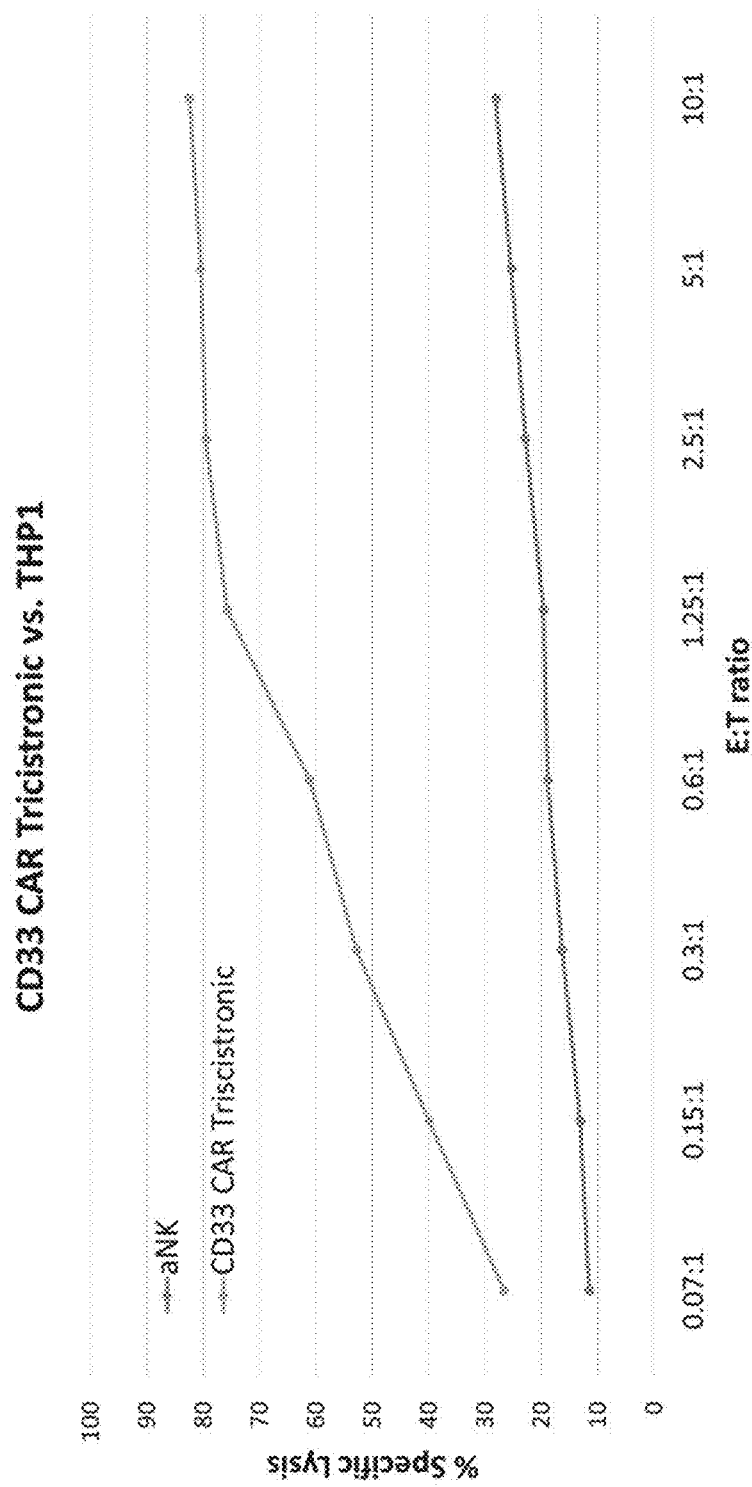
FIG. 9A shows exemplary results for in vitro data showing that CD33 positive (CD33+) THP-1 cells are relatively resistant to cytotoxicity (specific lysis) by control NK-92 (aNK) cells, whereas there is a high percentage of specific lysis when THP-1 cells are cultured with NK-92 cells that express a CAR that specifically binds CD33 (CD33-CAR/NK-92 cells).
Figure 9B:
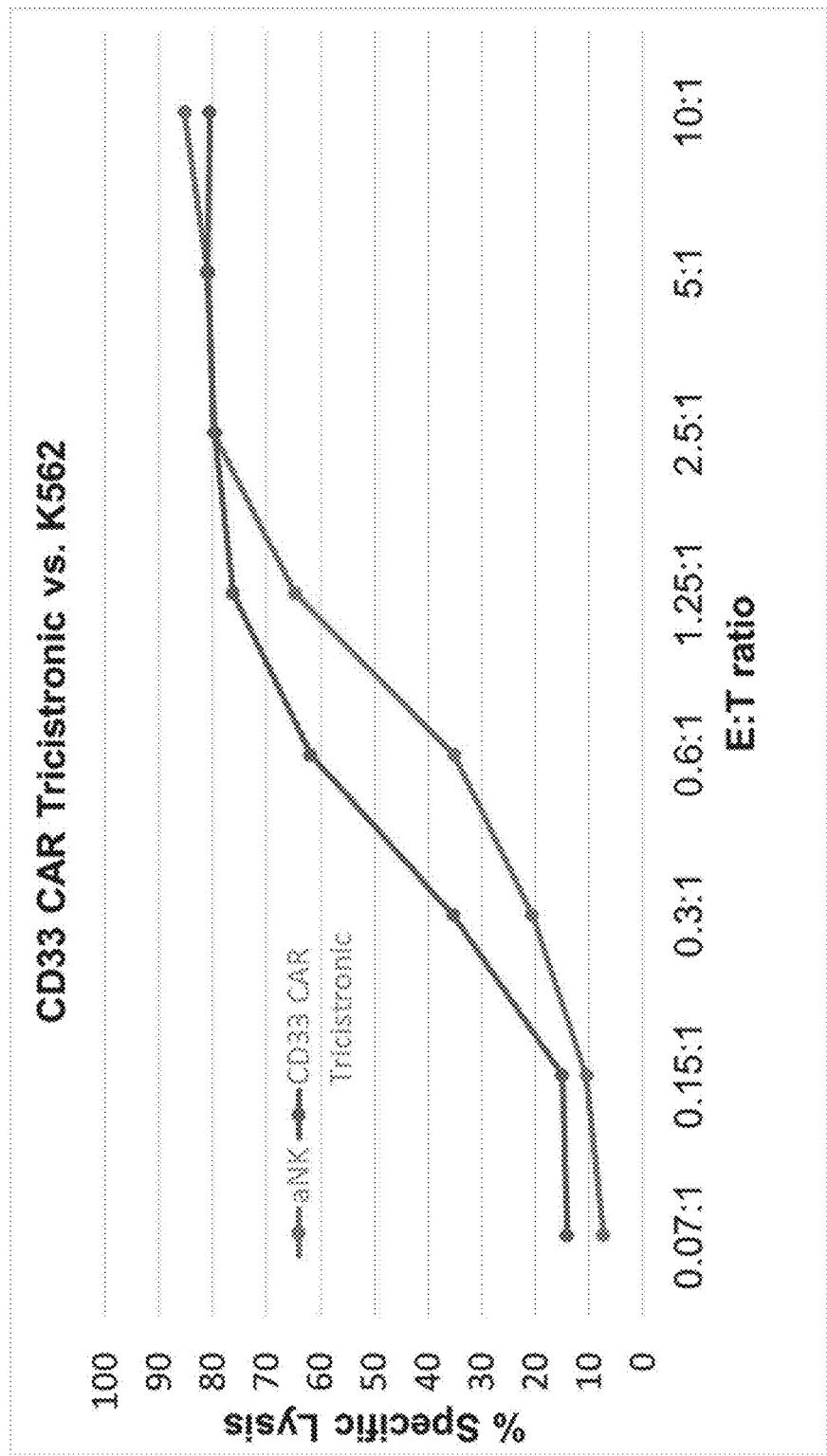
FIG. 9B shows exemplary results for in vitro data showing that K562 cells are killed by both control aNK cells and CD33-CAR/NK-92 cells.

FIG. 9A provides in vitro data showing that CD33 positive (CD33+) THP-1 cells are relatively resistant to cytotoxicity (specific lysis) by control NK-92 (aNK) cells, whereas there is a high percentage of specific lysis when THP-1 cells are cultured with NK-92 cells that express a CAR that specifically binds CD33 (CD33-CAR/NK-92 cells). Moreover, it should be noted that the modified NK-92 cells expressing the CAR exhibited killing at a relatively low effector:target ratio. FIG. 9B provides in vitro data showing that K562 cells are efficiently killed by both control aNK cells and CD33-CAR/NK-92 cells.

Example 7: HER2-CAR with FcεRIγ Signaling Domain

In this example, the inventors constructed a $1^{st}$ generation CARs with a FcεRIγ signaling domain that included an anti-HER2 scFv coupled to a CD8 hinge, that in turn was coupled to a CD28 transmembrane domain, which was coupled to a FcεRIγ signaling domain. The so constructed HER2-CAR had a nucleic acid sequence of SEQ ID NO:37.

Figure 10:
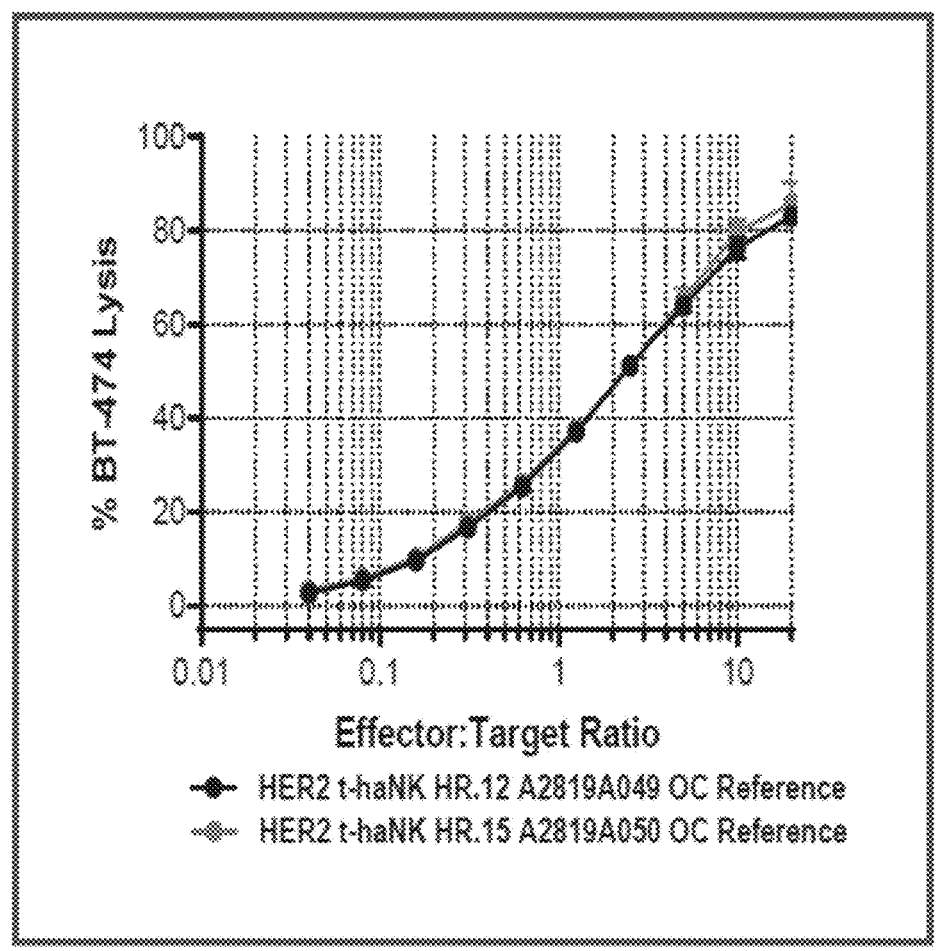
FIG. 10 shows exemplary results for cytotoxicity of HER2.CAR-t-haNK cells against BT-474 cells.

Functionality of the so constructed HER2.CAR-t-haNK cells was tested against BT-474 cells using a standard CalceinAM-based cytotoxicity assay and exemplary results are shown in FIG. 10. As can be readily seen from the data, the HER2.CAR-t-haNK cells expressing the CAR with the FcεRIγ signaling domain exhibited significant cytotoxicity against the BT-474 target cells.

Figure 36:
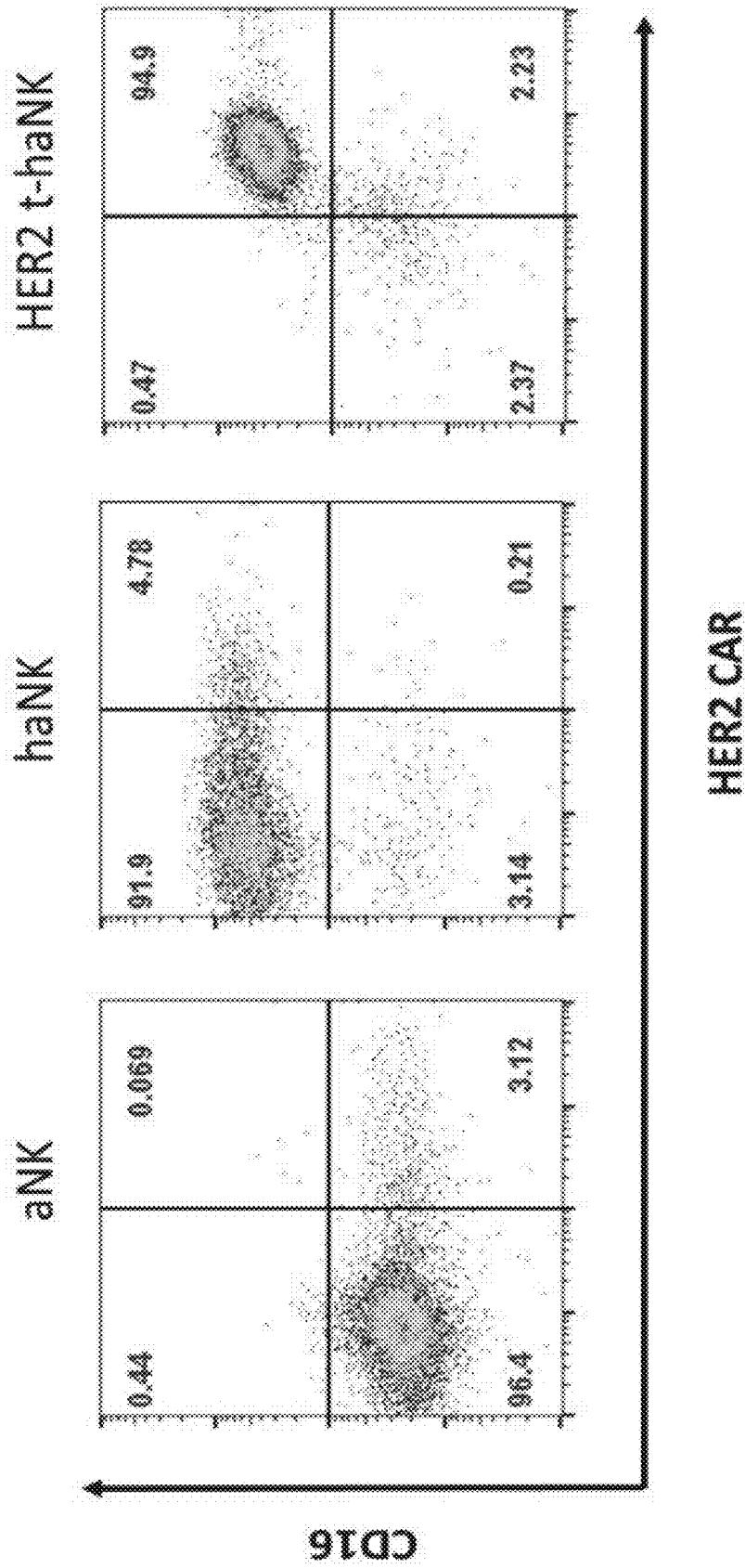
FIG. 36 shows exemplary results for expression of CD16 and HER2.CAR.
Figure 37:
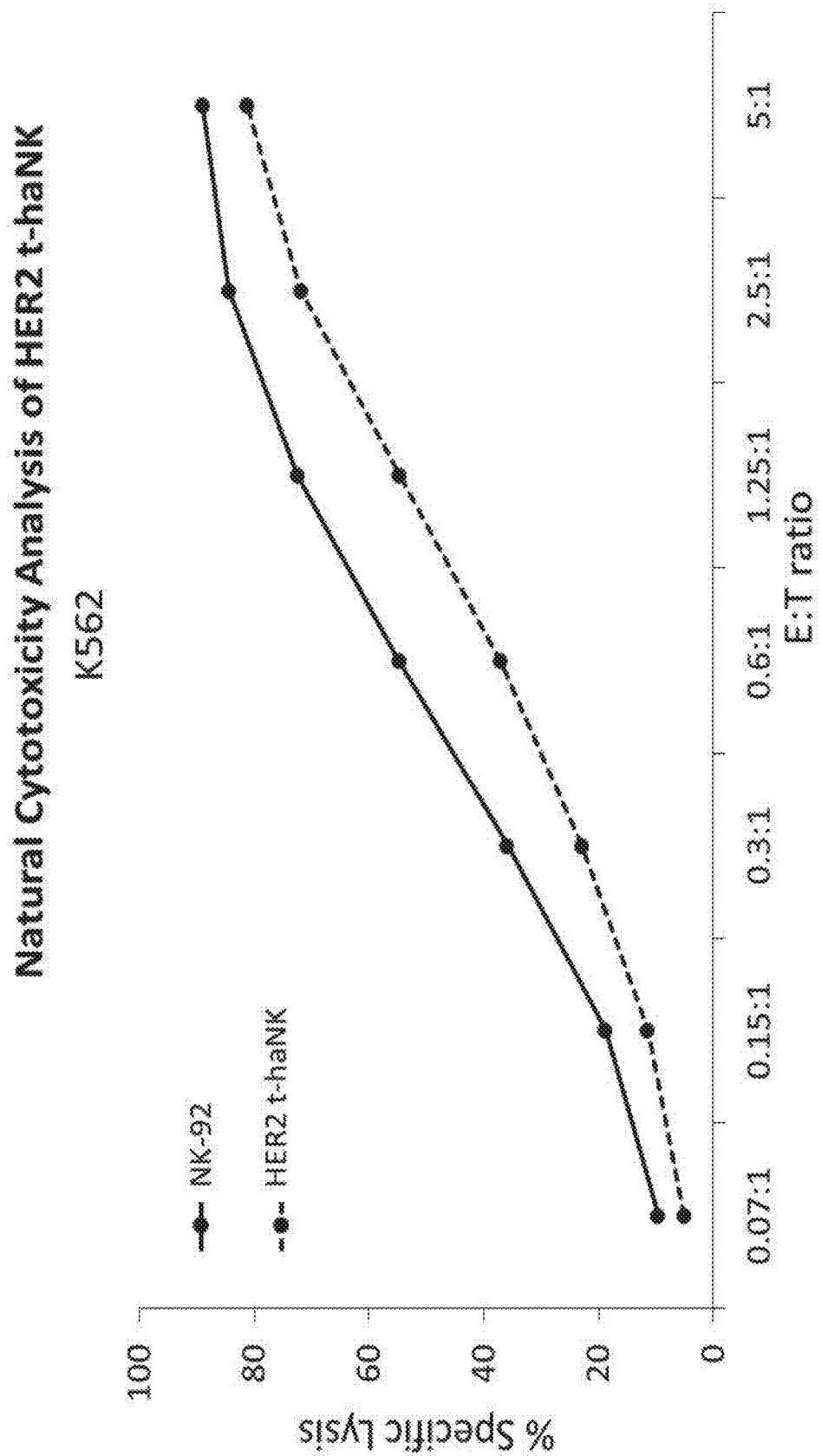
FIG. 37 shows exemplary results for natural cytotoxicity of HER2.CAR-t-haNK cells against K562 cells.
Figure 38:
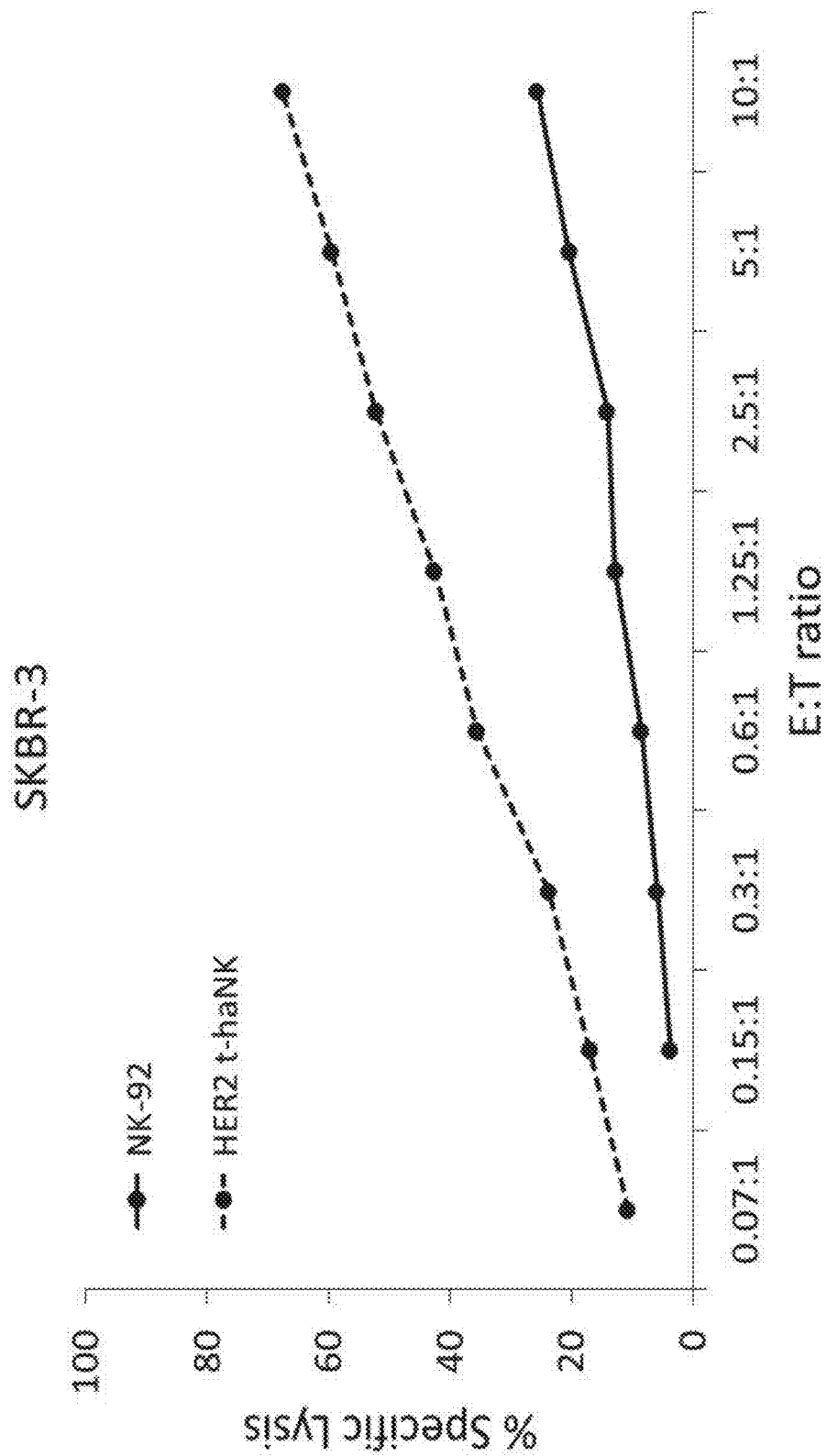
FIG. 38 shows exemplary results for CAR mediated cytotoxicity of HER2.CAR-t-haNK cells against SKBR-3 cells.
Figure 39:
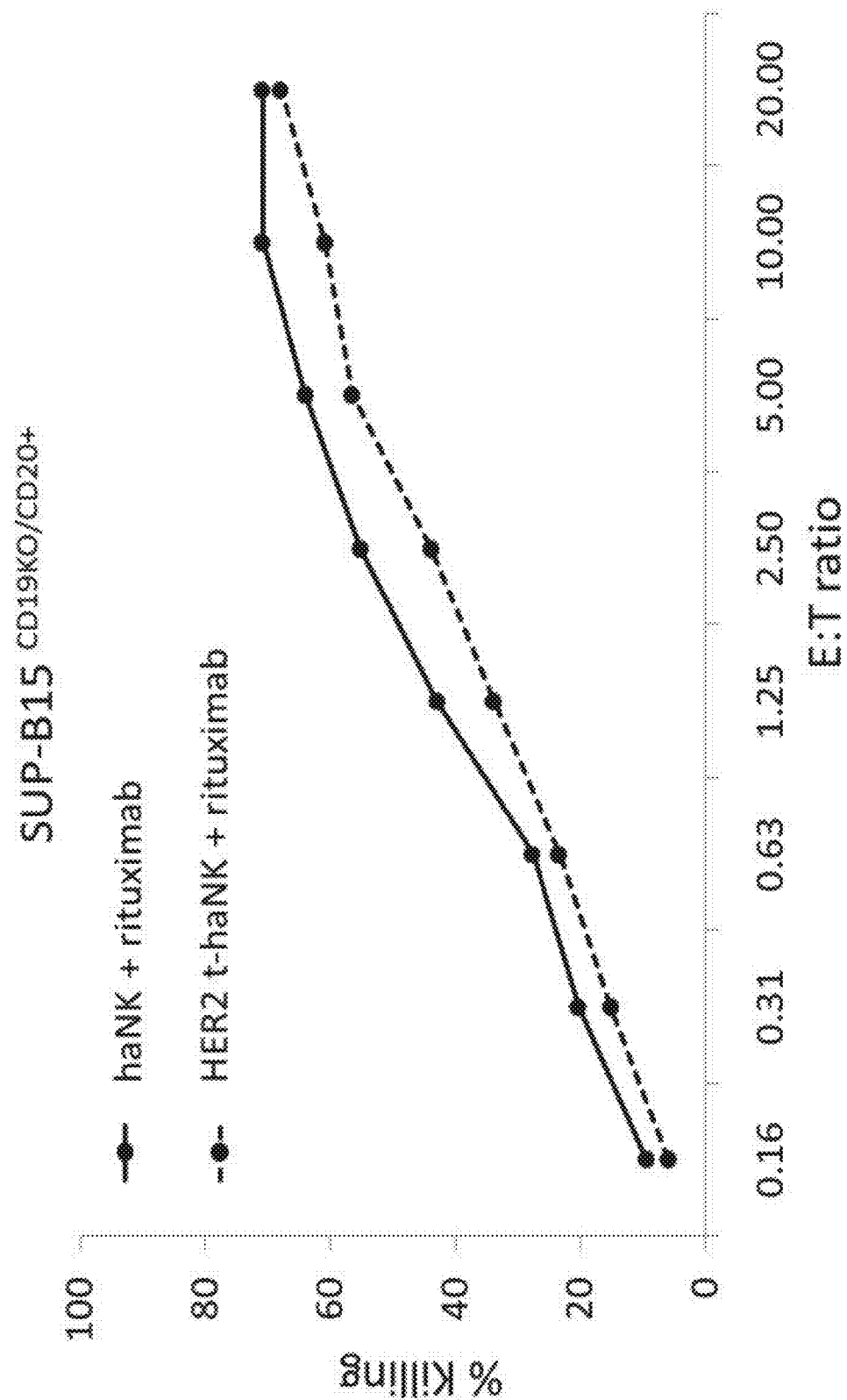
FIG. 39 shows exemplary results for ADCC of HER2.CAR-t-haNK cells.

In further experiments, the inventor demonstrated expression of the HER2.CAR in HER2.CAR-t-haNK cells as is illustrated in FIG. 36. Natural cytotoxicity of the HER2.CAR-t-haNK cells is shown in the results of FIG. 37, while results for CAR mediated cytotoxicity are shown in FIG. 38. Exemplary data for ADCC of HER2.CAR-t-haNK cells are shown in the graph of FIG. 39.

Example 8: CD30-CAR with FcεRIγ Signaling Domain

In this example, the inventors constructed a $1^{st}$ generation CARs with a FcεRIγ signaling domain that included an anti-CD30 scFv coupled to a CD8 hinge, that in turn was coupled to a CD28 transmembrane domain, which was coupled to a FcεRIγ signaling domain. The so constructed CD30-CAR had a nucleic acid sequence of SEQ ID NO:38.

Figure 46:
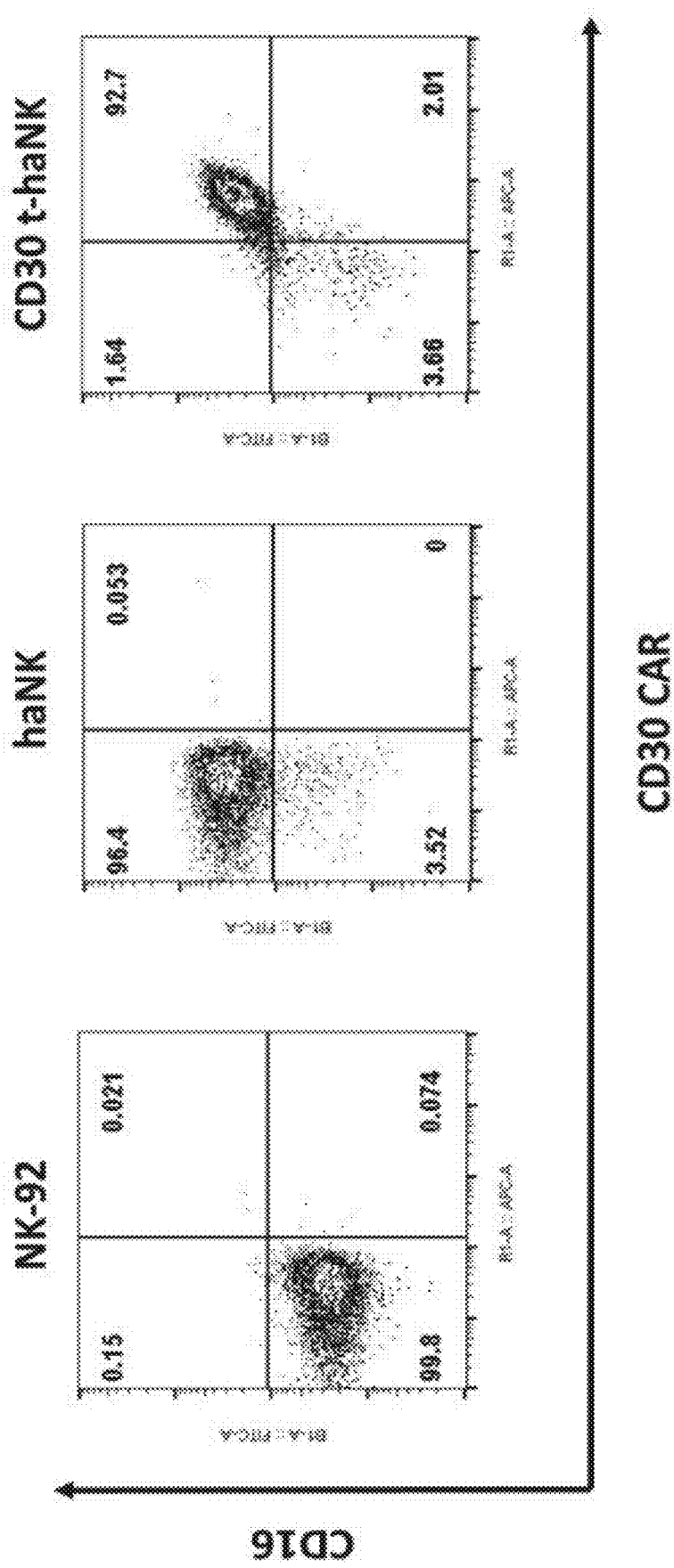
FIG. 46 shows exemplary results for expression of CD16 and CD30.CAR.
Figure 47:
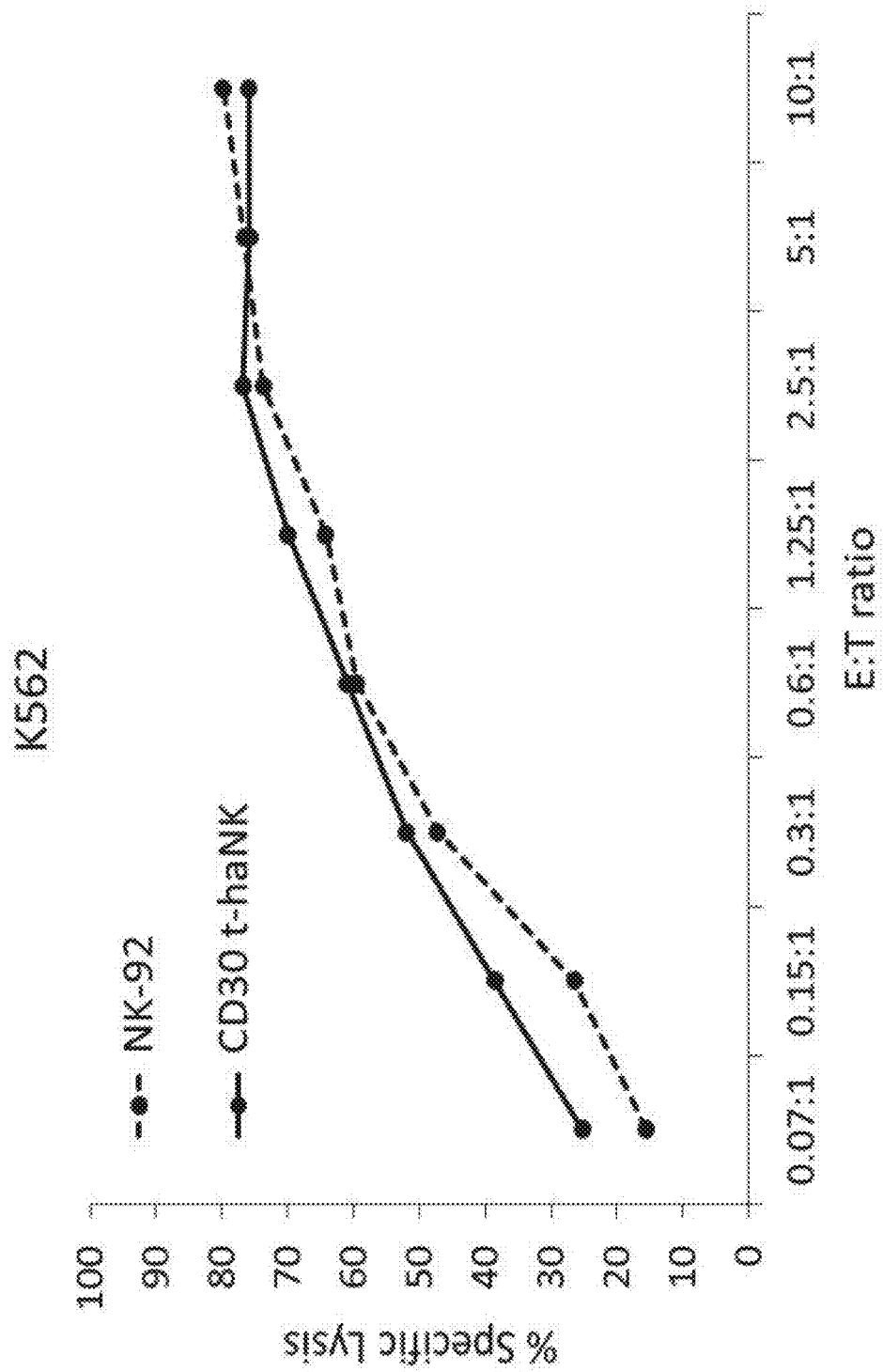
FIG. 47 shows exemplary results for natural cytotoxicity of CD30.CAR-t-haNK cells against K562 cells.
Figure 48:
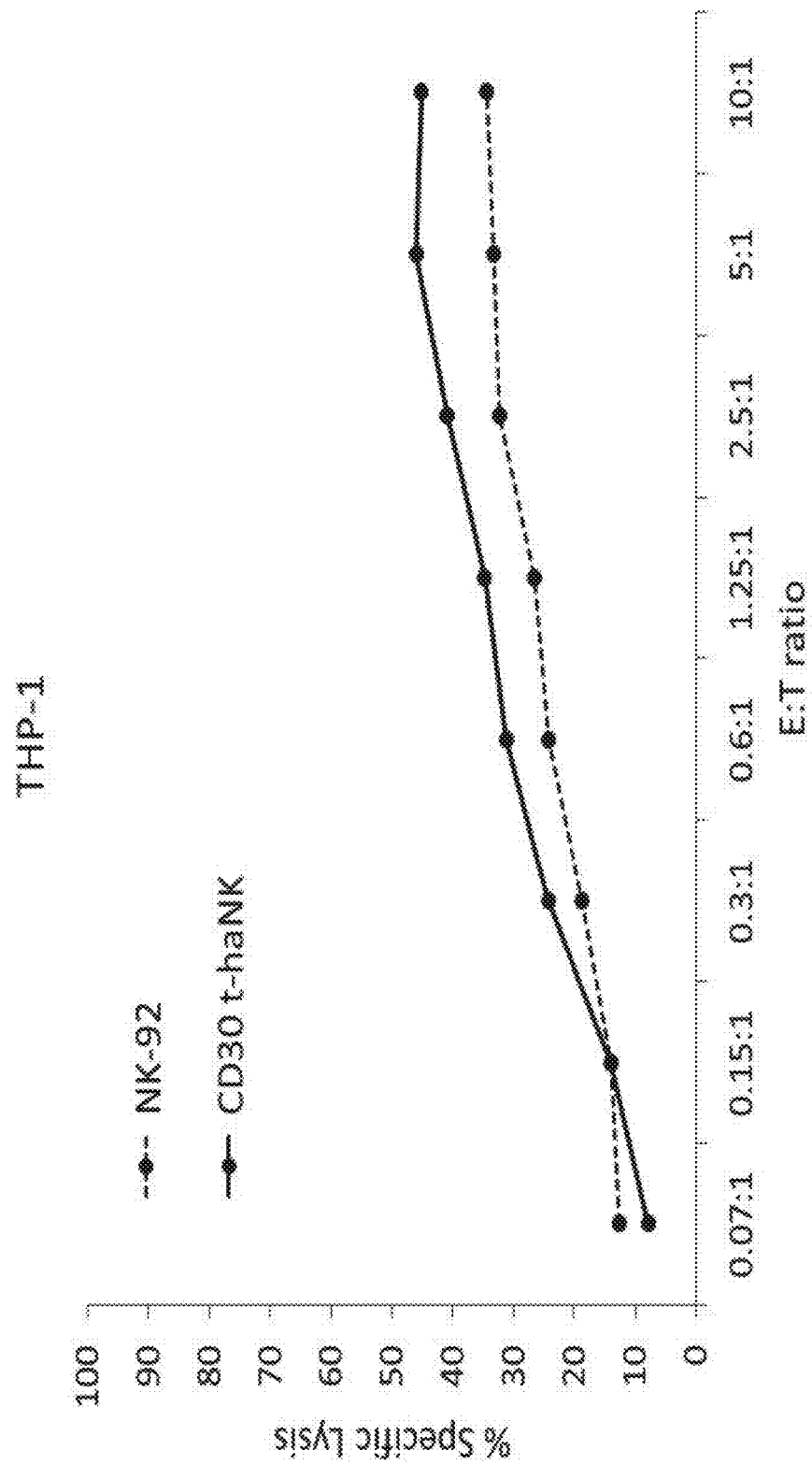
FIG. 48 shows exemplary results for CAR mediated cytotoxicity of CD30.CAR-t-haNK cells against THP-1 cells.
Figure 49:
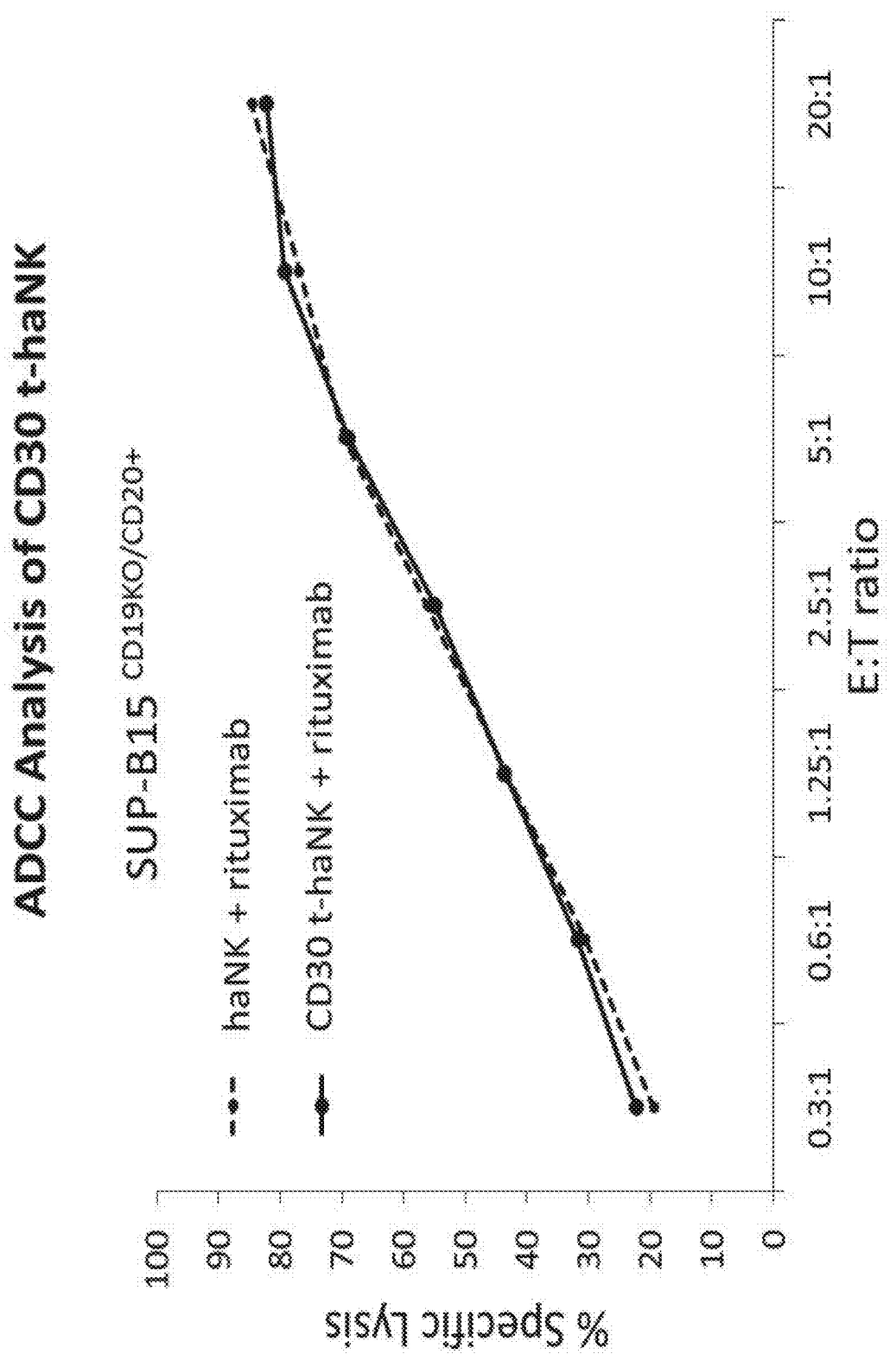
FIG. 49 shows exemplary results for ADCC of CD30.CAR-t-haNK cells.

Expression of the CD30-CAR is demonstrated in the results of FIG. 46, while the results for natural cytotoxicity of the recombinant cells are shown in FIG. 47. CAR mediated cytotoxicity was demonstrated in the results of FIG. 48, while exemplary results for ADCC are shown in the data of FIG. 49.

Example 9: EGFR-CAR with FcεRIγ Signaling Domain

In this example, the inventors constructed a $1^{st}$ generation CARs with a FcεRIγ signaling domain that included an anti-EGFR scFv coupled to a CD8 hinge, that in turn was coupled to a CD28 transmembrane domain, which was coupled to a FcεRIγ signaling domain. The so constructed EGFR-CAR had a nucleic acid sequence of SEQ ID NO:39.

Figure 14:
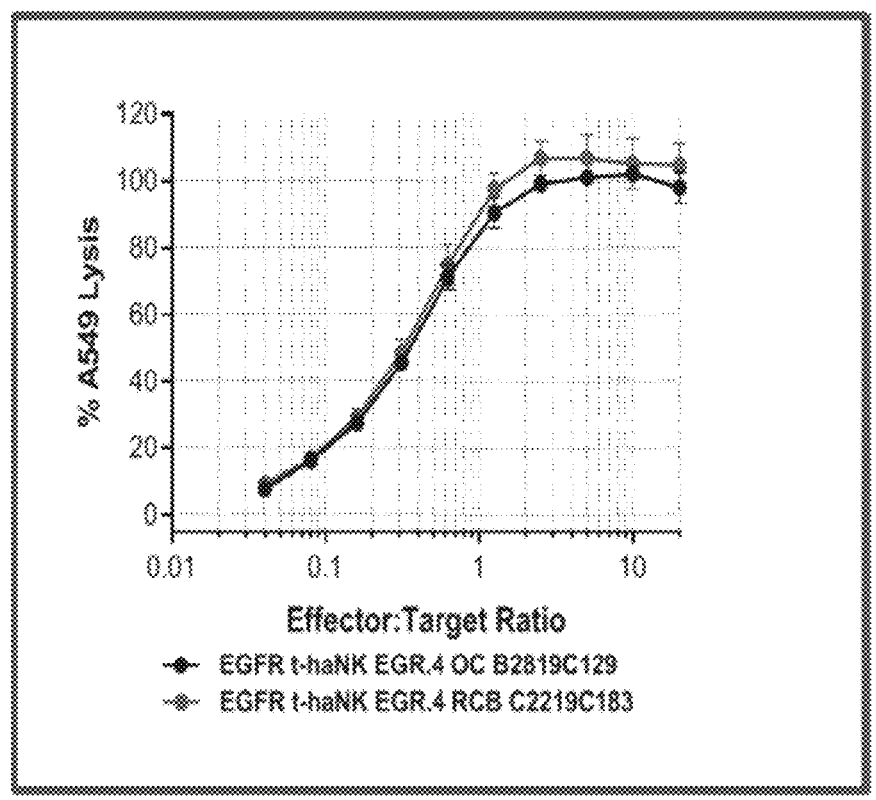
FIG. 14 shows exemplary results for cytotoxicity of EGFR.CAR-t-haNK cells against A-549 cells.
Figure 31:
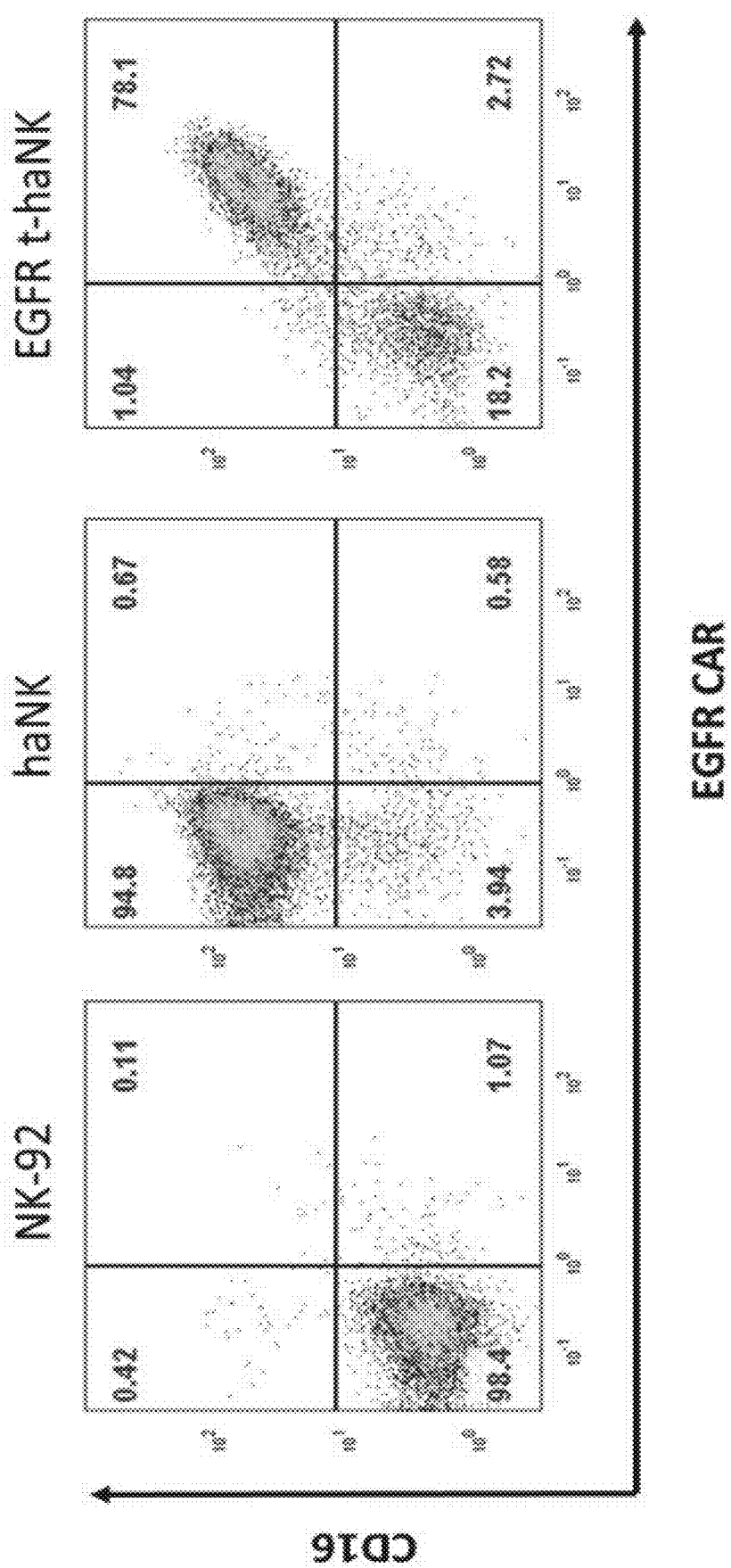
FIG. 31 shows exemplary results for expression of CD16 and EGFR.CAR.
Figure 32:
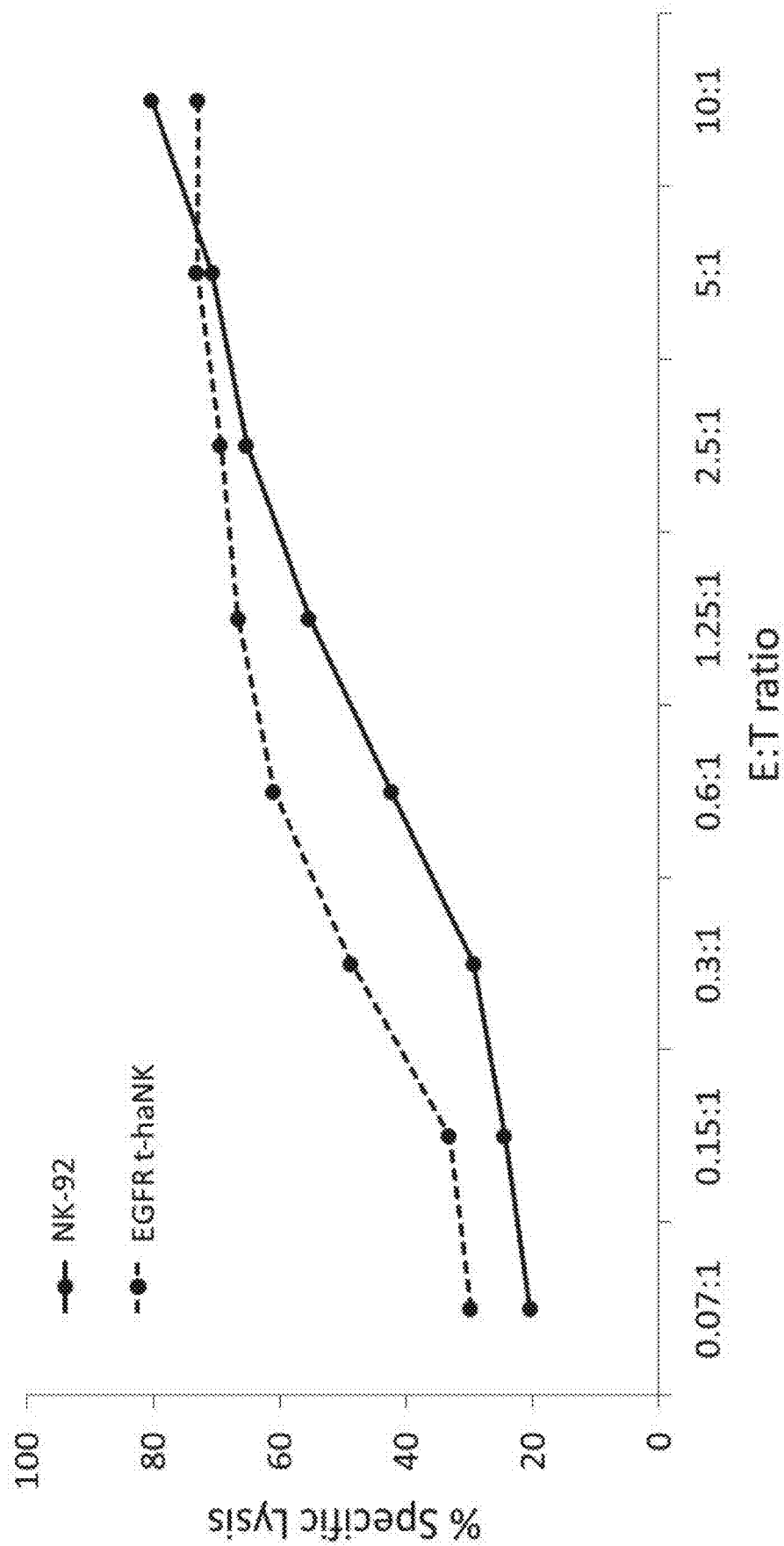
FIG. 32 shows exemplary results for natural cytotoxicity of EGFR.CAR-t-haNK cells against K562 cells.
Figure 33:
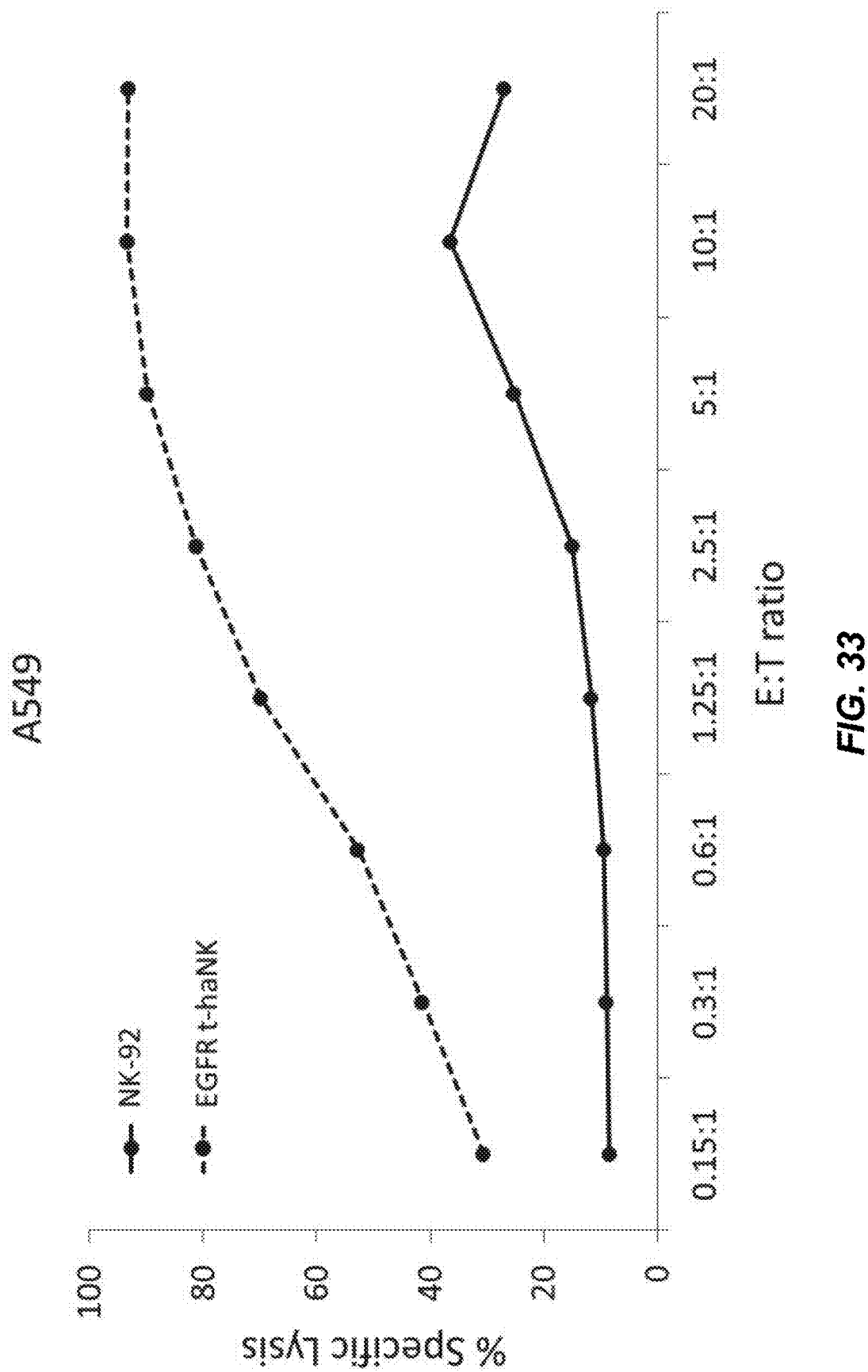
FIG. 33 shows exemplary results for CAR mediated cytotoxicity of EGFR.CAR-t-haNK cells against A549 cells.
Figure 34:
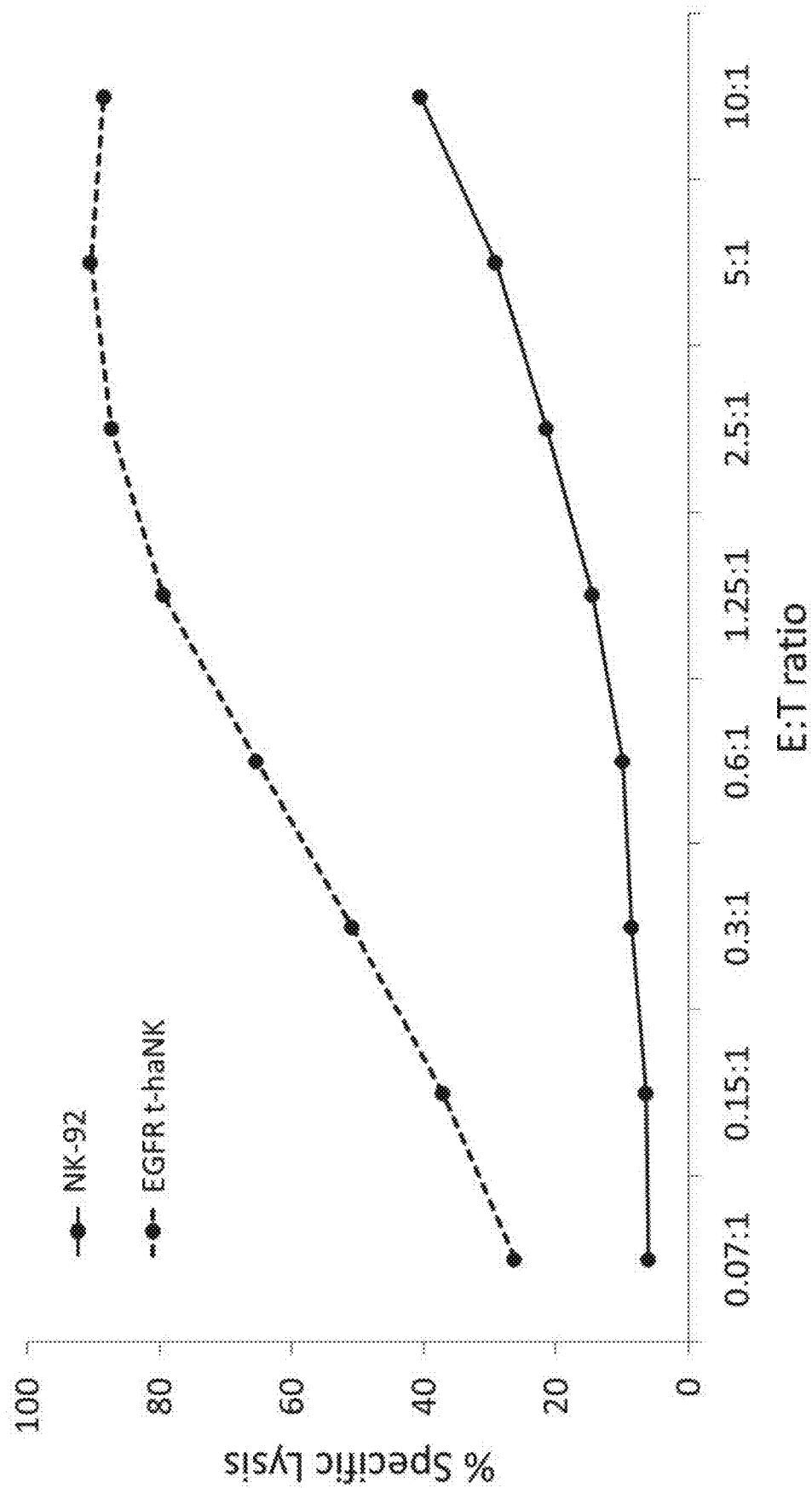
FIG. 34 shows exemplary results for CAR mediated cytotoxicity of EGFR.CAR-t-haNK cells against HCT116 cells.
Figure 35:
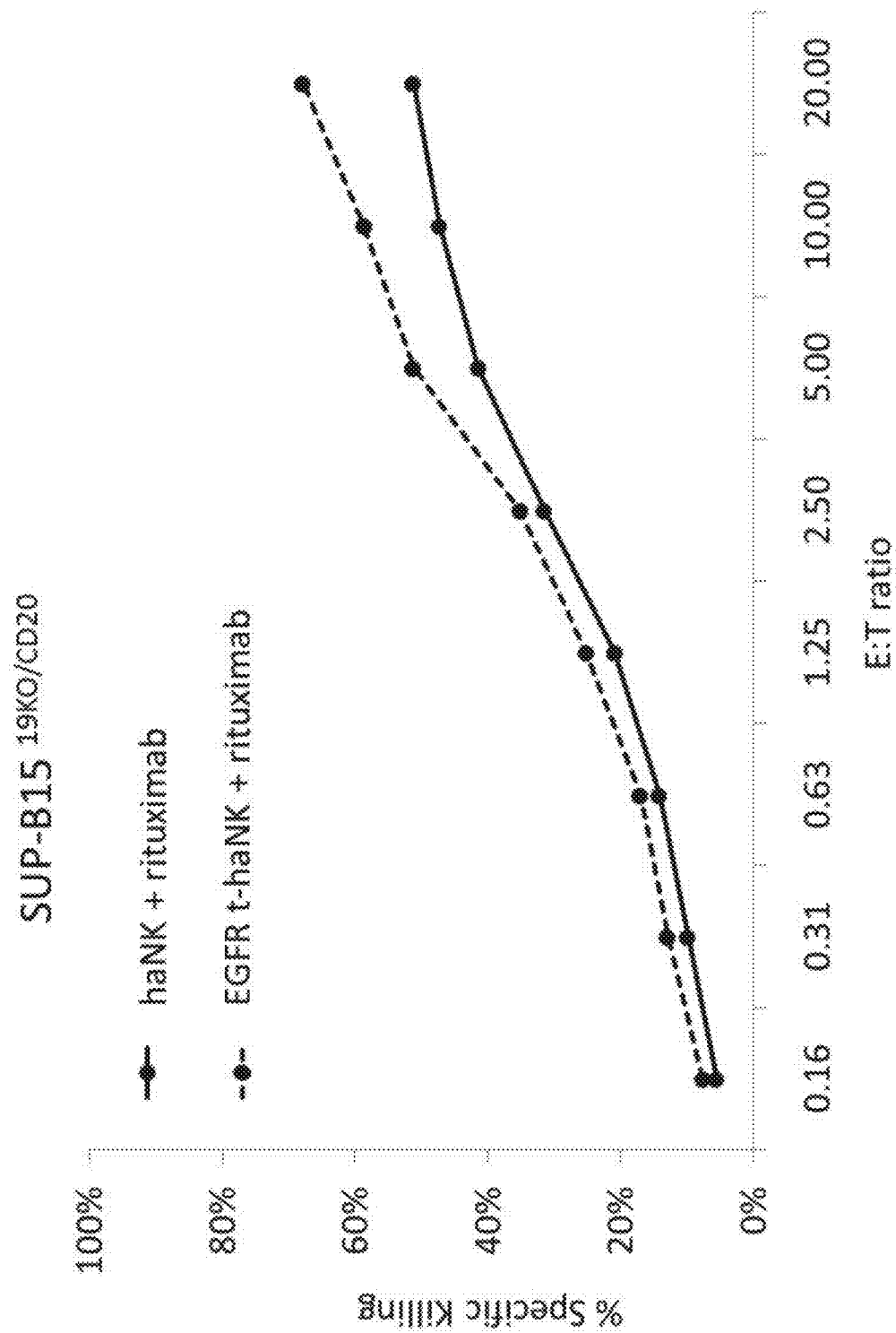
FIG. 35 shows exemplary results for ADCC of EGFR-.CAR-t-haNK cells.

Functionality of the so constructed EGFR.CAR-t-haNK cells was tested against A-549 cells using a standard cytotoxicity assay and exemplary results are shown in FIG. 14. As can be readily seen from the data, the EGFR.CAR-t-haNK cells expressing the CAR with the FcεRIγ signaling domain exhibited significant cytotoxicity against the A-549 target cells. Expression of the EGFR-CAR in the EGFR.CAR-t-haNK cells is shown in FIG. 31, while natural cytotoxicity results are shown in FIG. 32. Exemplary results for CAR mediated cytotoxicity of EGFR.CAR-t-haNK cells are shown in FIG. 33 and FIG. 34, while results for ADCC of EGFR.CAR-t-haNK cells are shown in FIG. 35.

Example 10: IGF1R-CAR with FcεRIγ Signaling Domain

Figure 61:
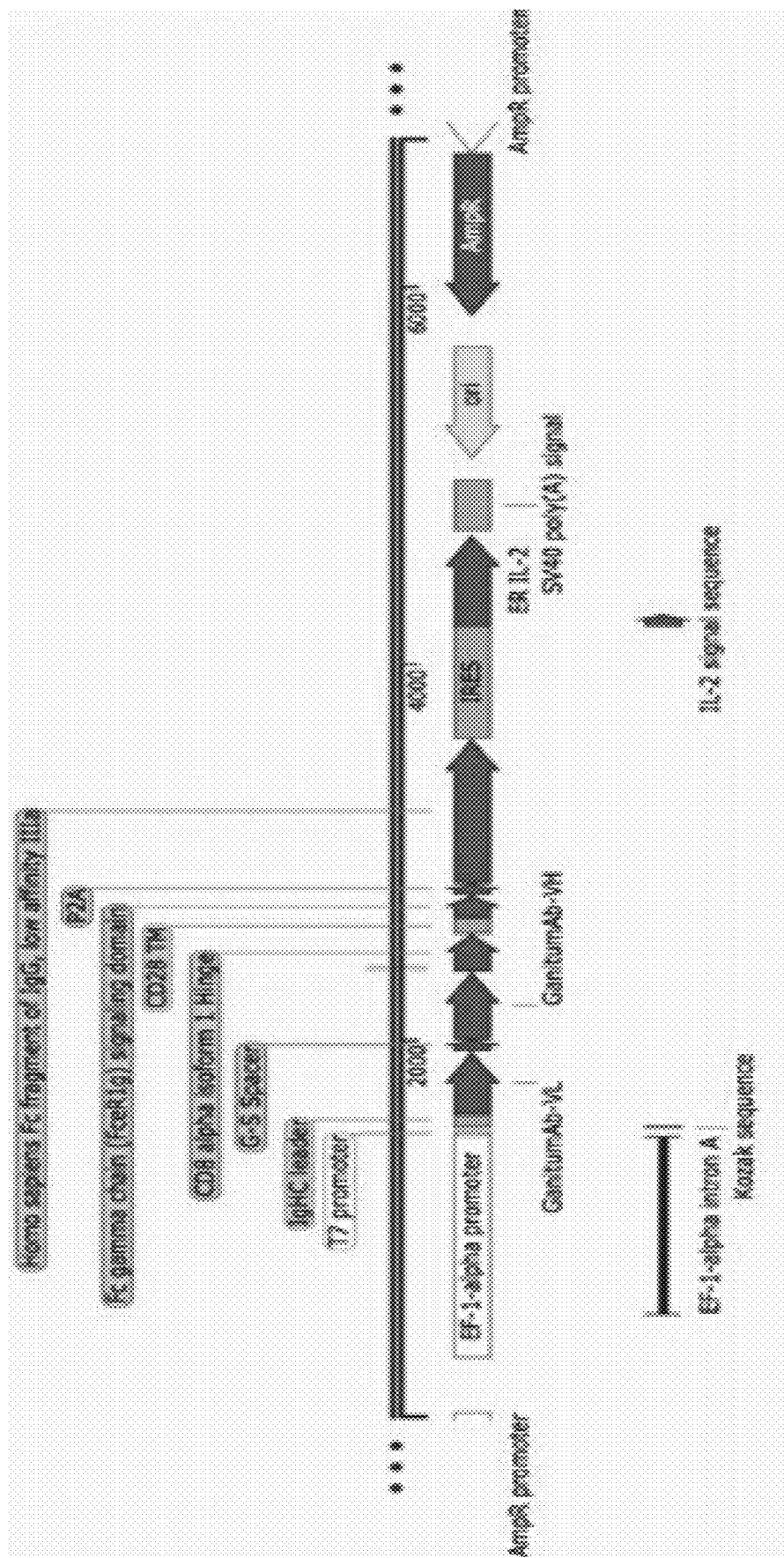
FIG. 61 depicts an exemplary tricistronic construct encoding IGF1R-CAR, CD16, and IL-$2^{ER}$.

In this example, the inventors constructed a $1^{st}$ generation CARs with a FcεRIγ signaling domain that included an anti-IGF1R scFv coupled to a CD8 hinge, that in turn was coupled to a CD28 transmembrane domain, which was coupled to a FcεRIγ signaling domain. The so constructed IGF1R-CAR had a nucleic acid sequence of SEQ ID NO:40, and a tricistronic construct encoding IGF1R-CAR, CD16, and IL-2ER had a nucleic acid sequence of SEQ ID NO:53, which is also schematically illustrated in FIG. 61.

Figure 18:
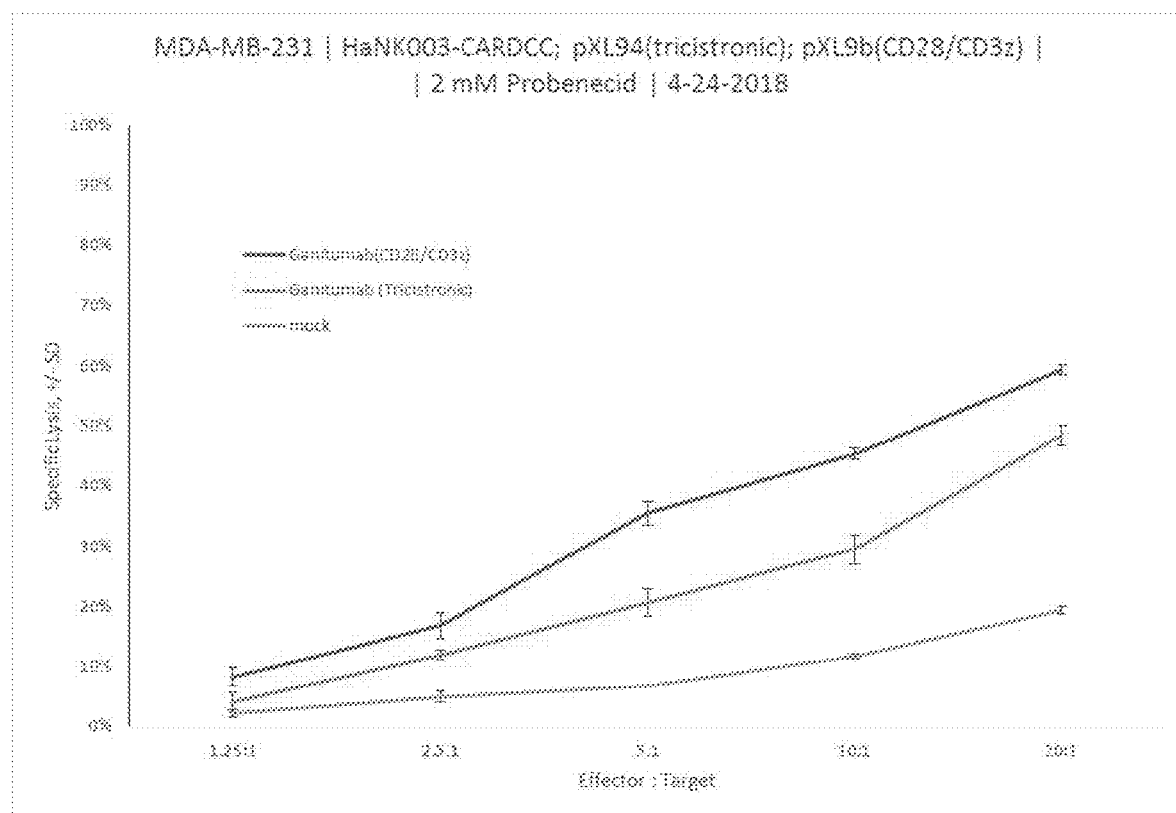
FIG. 18 shows exemplary results for cytotoxicity of IGF1R.CAR-t-haNK cells against MDA-MB-231 cells.

Functionality of the so constructed IGF1R.CAR-t-haNK cells was tested against MDA-MB-231 cells using a standard cytotoxicity assay in comparison with a $2^{nd}$ generation CAR (CD28/CD3z) and exemplary results are shown in FIG. 18. As can be readily seen from the data, the IGF1R.CAR-t-haNK cells expressing the CAR with the FcεRIγ signaling domain exhibited significant and target specific cytotoxicity against the MDA-MB-231 target cells, which was comparable with the cytotoxicity of the $2^{nd}$ generation CAR.

Example 11: CD123-CAR with FcεRIγ Signaling Domain

Figure 44:
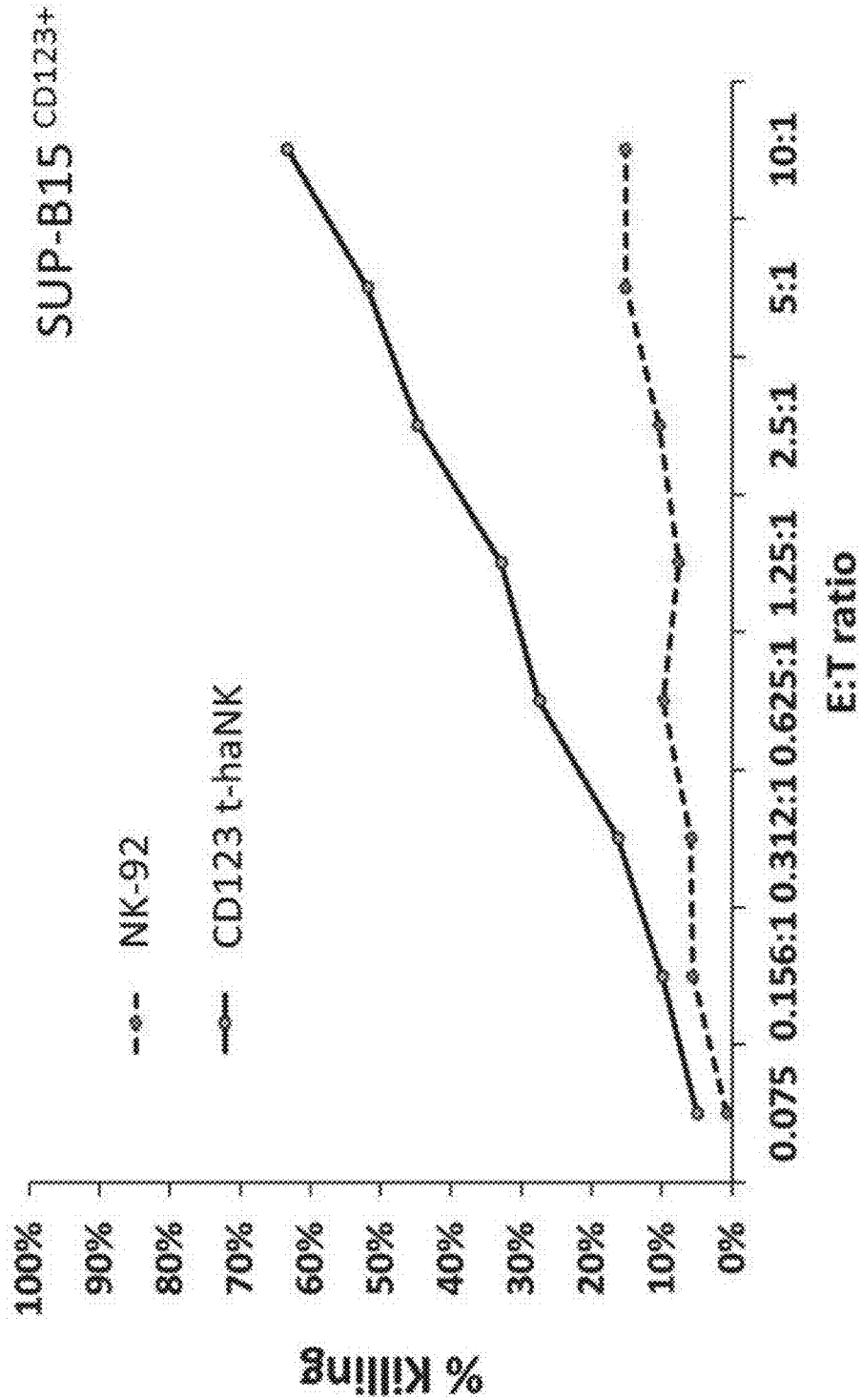
FIG. 44 shows exemplary results for CAR mediated cytotoxicity of CD123.CAR-t-haNK cells.
Figure 45:
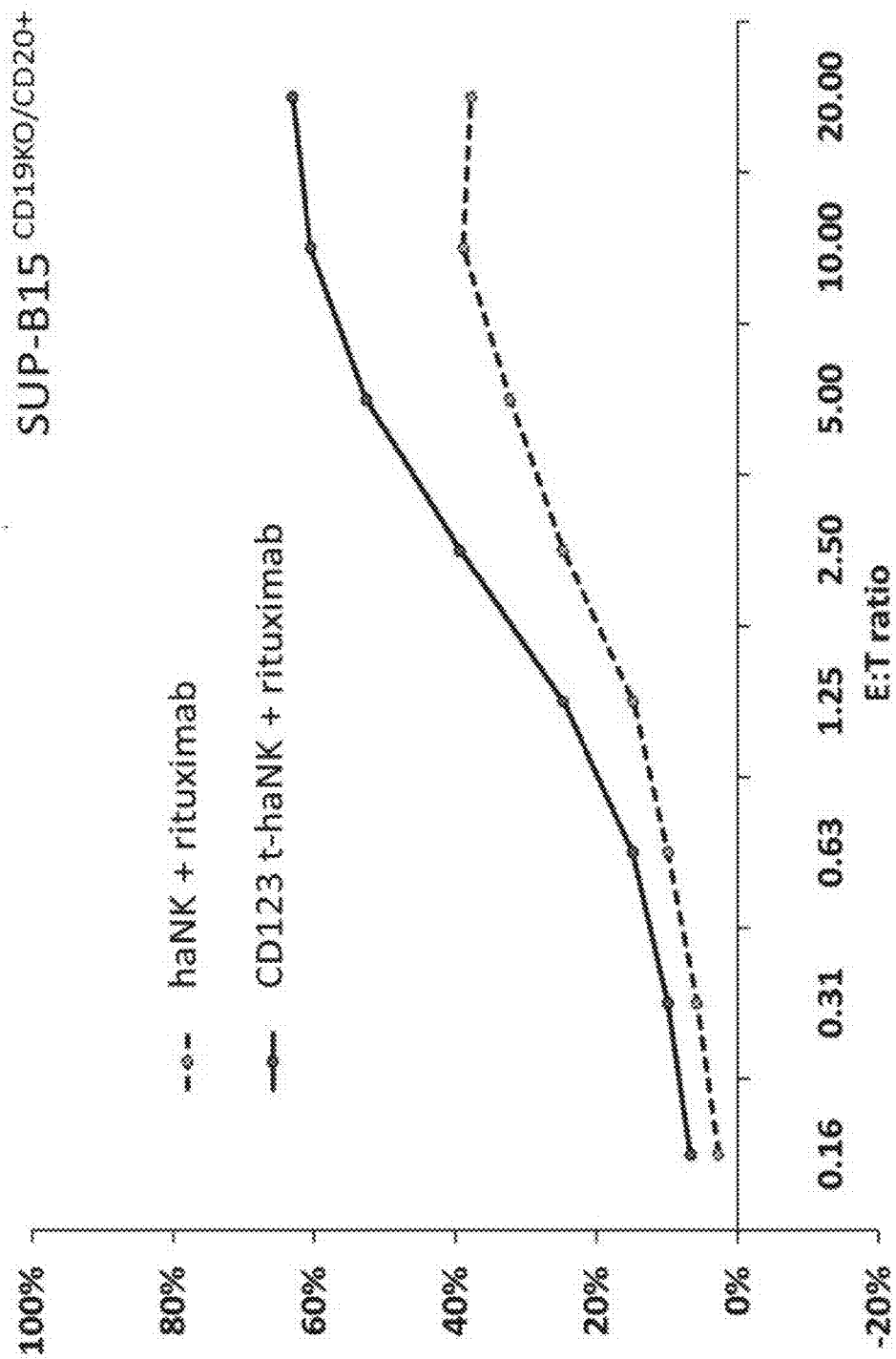
FIG. 45 shows exemplary results for ADCC of CD123.CAR-t-haNK cells.

In this example, the inventors constructed a $1^{st}$ generation CARs with a FcεRIγ signaling domain that included an anti-CD123 scFv coupled to a CD8 hinge, that in turn was coupled to a CD28 transmembrane domain, which was coupled to a FcεRIγ signaling domain. The so constructed CD123-CAR had a nucleic acid sequence of SEQ ID NO:41. Data for the CAR mediated cytotoxicity of the CD123-CAR expressing recombinant NK cells is shown in FIG. 44, and FIG. 45 shows exemplary data for ADCC of CD123-CAR expressing recombinant NK cells.

Example 12: PD-L1-CAR with FcεRIγ Signaling Domain

In this example, the inventors constructed a $1^{st}$ generation CARs with a FcεRIγ signaling domain that included an anti-PD-L1 scFv coupled to a CD8 hinge, that in turn was coupled to a CD28 transmembrane domain, which was coupled to a FcɛRIγ signaling domain. The so constructed PD-L1-CAR had a nucleic acid sequence of SEQ ID NO:42.

Figure 12:
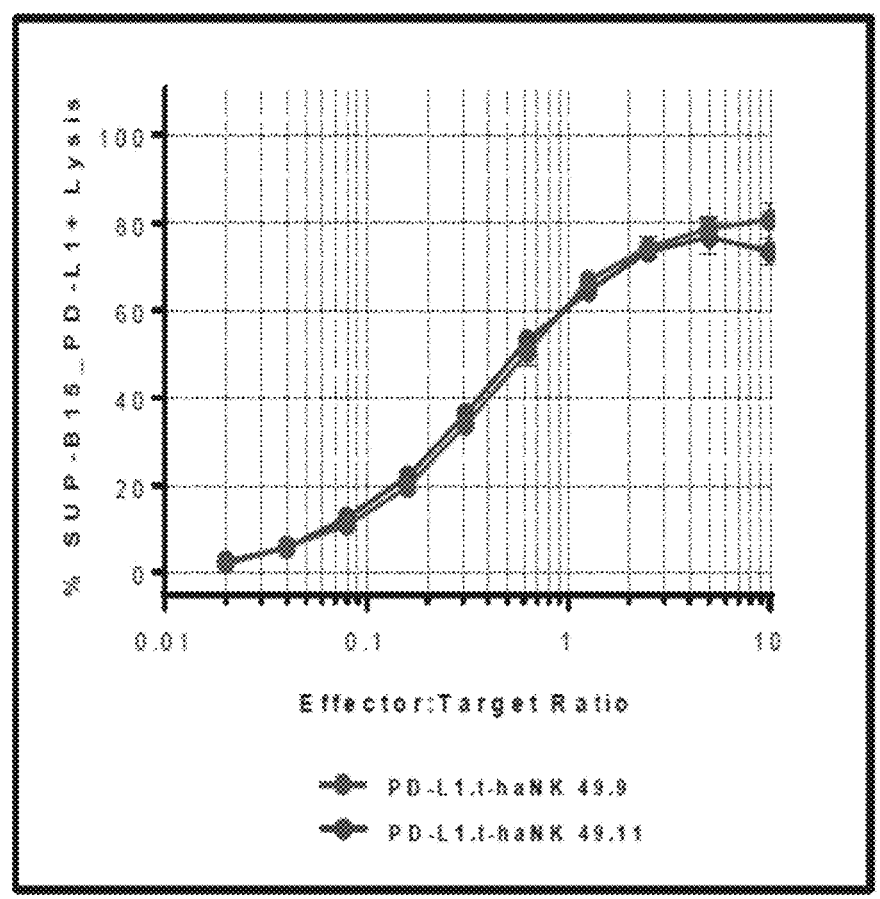
FIG. 12 shows exemplary results for cytotoxicity of PD-L1.CAR-t-haNK cells against SUP-B15.PD-L1$^+$ cells.

Functionality of the so constructed PD-L1.CAR-t-haNK cells was tested against SUP-B15.PD-L1$^+$ cells using a standard cytotoxicity assay and exemplary results are shown in FIG. 12. As can be readily seen from the data, the PD-L1.CAR-t-haNK cells expressing the CAR with the FcɛRIγ signaling domain exhibited significant cytotoxicity against the SUP-B15.PD-L1$^+$ target cells.

Figure 13:
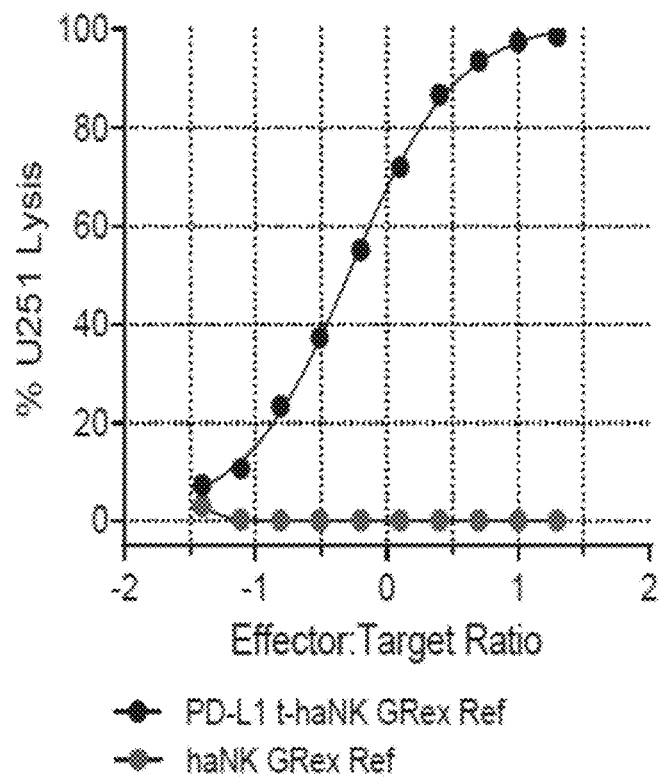
FIG. 13 shows exemplary results for cytotoxicity of PD-L1.CAR-t-haNK cells against U251 cells.

Functionality of the so constructed PD-L1.CAR-t-haNK cells was also tested against U251 cells using a standard cytotoxicity assay and exemplary results are shown in FIG. 13 along with non-transfected haNK cells. As can be readily seen from the data, the PD-L1.CAR-t-haNK cells expressing the CAR with the FcɛRIγ signaling domain exhibited target specific and significant cytotoxicity against the U251 target cells, whereas the haNK control cells had substantially no cytotoxicity against the same U251 cells.

Figure 19:
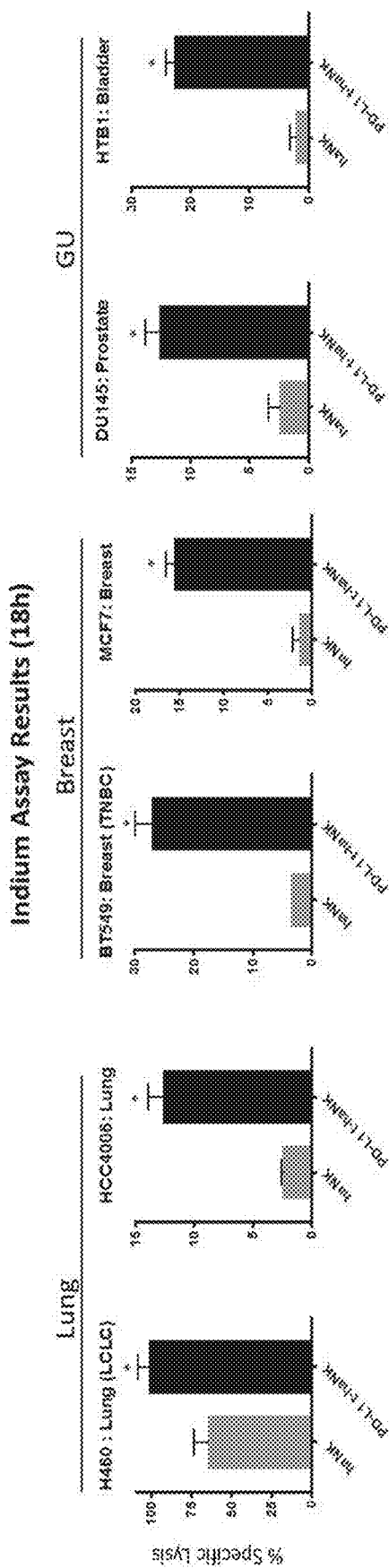
FIG. 19 shows exemplary results for cytotoxicity of PD-L1.CAR-t-haNK cells against a variety of cancer cells.

In still further experiments on target cell specificity with respect to PD-L1, the inventors tested several PD-L1 positive tumor cell lines using the PD-L1.CAR-t-haNK cells along with haNK cells as control for general cytotoxicity. As can be readily seen from FIG. 19, the PD-L1.CAR-t-haNK cells had superior cytotoxicity across a wide variety of tumor cells (lung, breast, genitourinary tumor cells, and additionally, head and neck small cell cancer, chordoma). Notably, the PD-L1.CAR-t-haNK cells required less than 4 hours for the majority (>85%) of cell killing whereas the control haNK cells required more than 12 hours.

Figure 20:
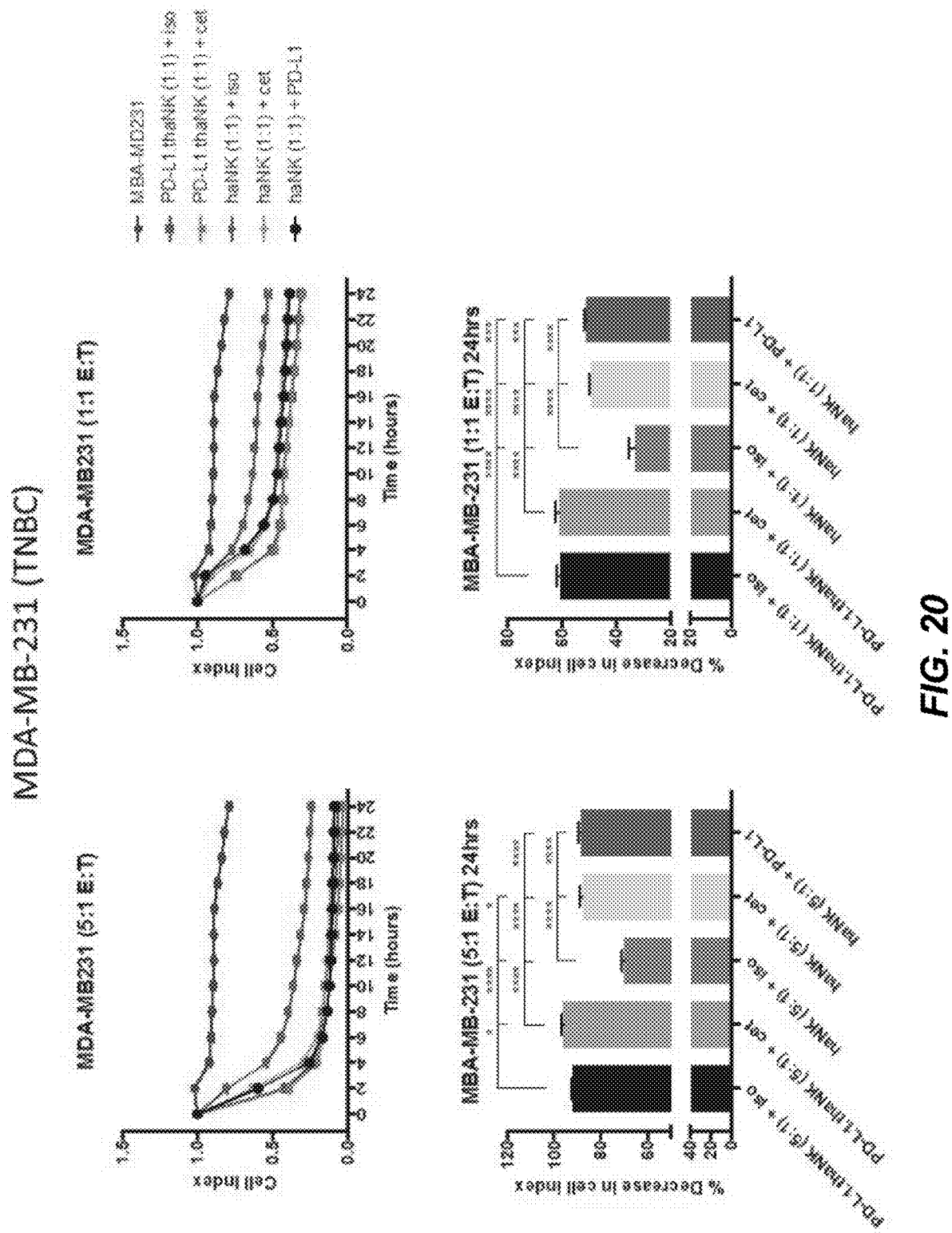
FIG. 20 shows exemplary comparative results for cytotoxicity of PD-L1.CAR-t-haNK cells against MDA-MB-231 cells.

FIG. 20 further illustrates cytotoxicity of the PD-L1.CAR-t-haNK cells against MDA-MB-231 cells as compared to various other control cells (haNK cells as indicated). As can be taken from the data, at a 5:1 E:T ratio, MDA-MB-231 lysis by PD-L1.thaNK was improved by cetuximab, and haNK activity was improved by the addition of cetuximab and a-PD-L1. Plain PD-L1.thank had improved cytotoxic activity compared to haNK and haNK+ cetuximab, and plain PD-L1. thank killing was comparable to that of haNK+PD-L1 antibody but PD-L1.thank+cetuximab outperformed haNK+cetuximab and haNK+PD-L1. At a 1:1 E:T ratio, PD-L1.thaNK activity was the same with or without cetuximab, and PD-L1.thaNK significantly outperformed intrinsic and ADCC-mediated killing by hank. haNK activity was improved by the addition of cetuximab and a-PD-L1.

Figure 40:
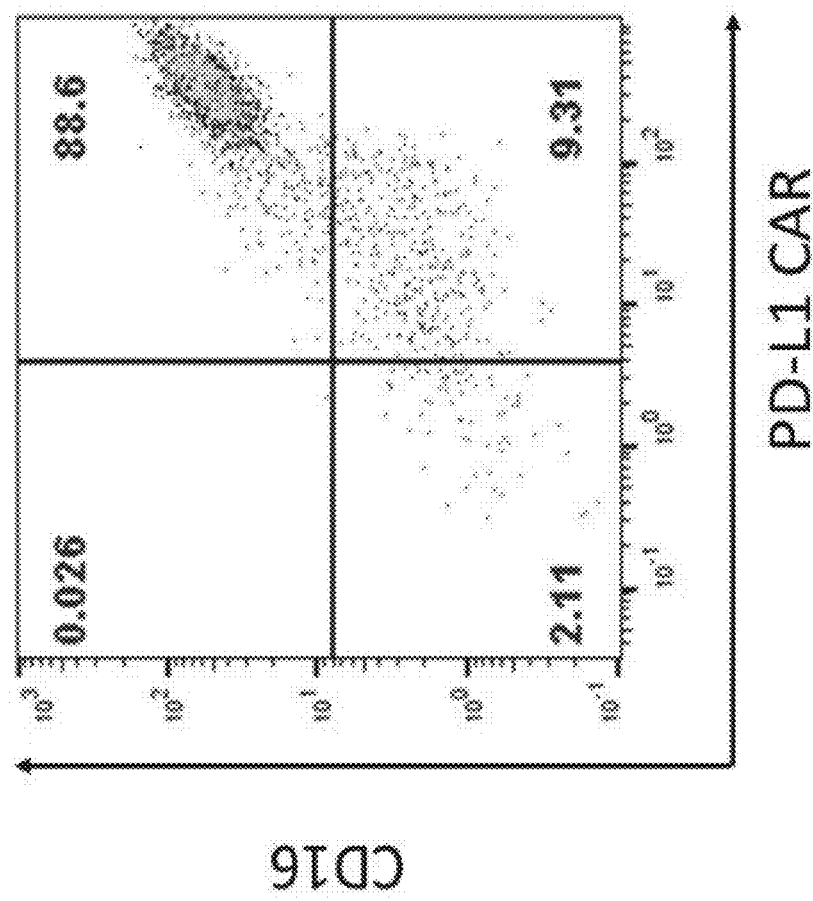
FIG. 40 shows exemplary results expression of CD16 and PD-L1.CAR.
Figure 41:
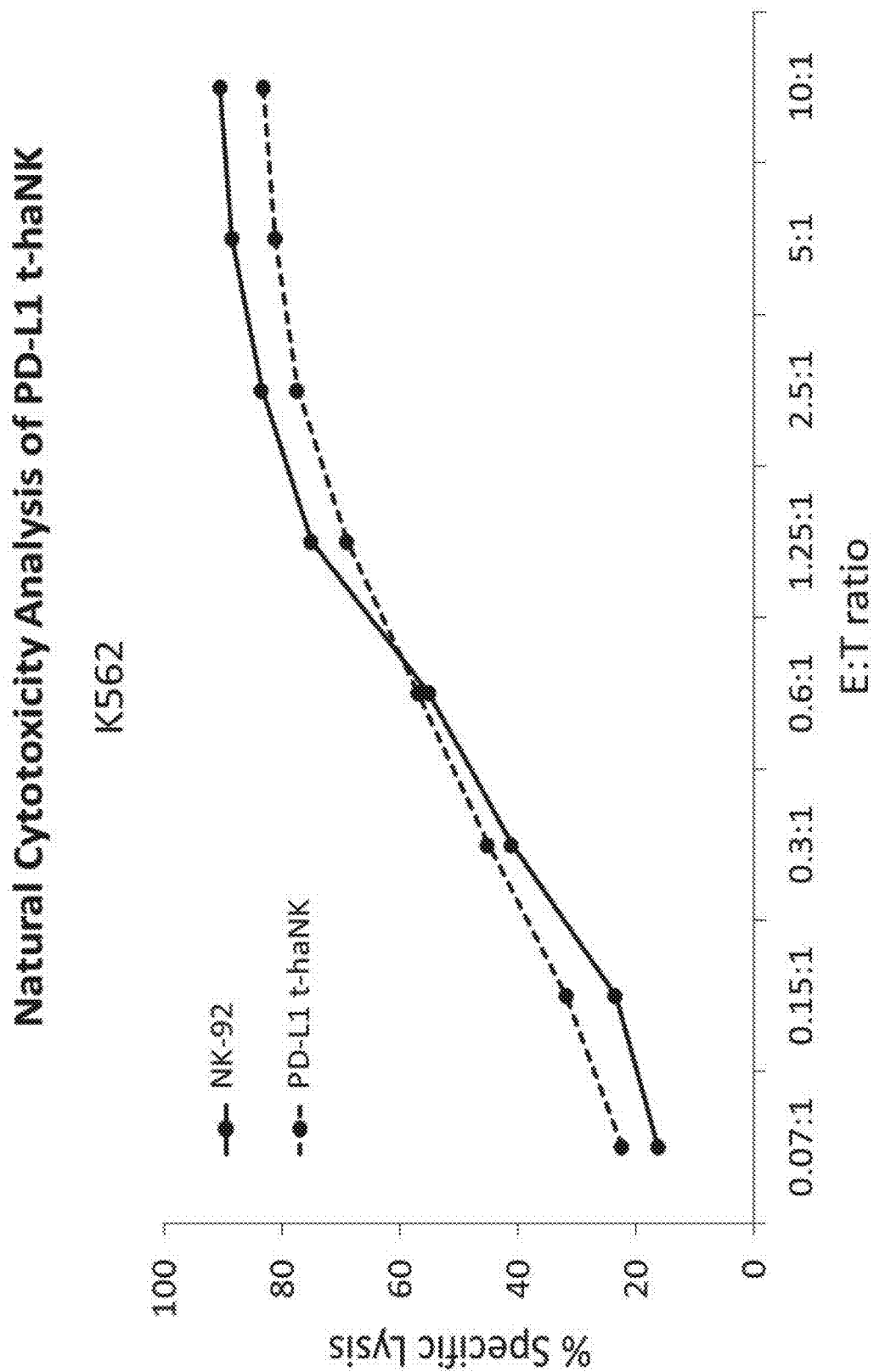
FIG. 41 shows exemplary results for natural cytotoxicity of PD-L1.CAR-t-haNK cells against K562 cells.
Figure 42:
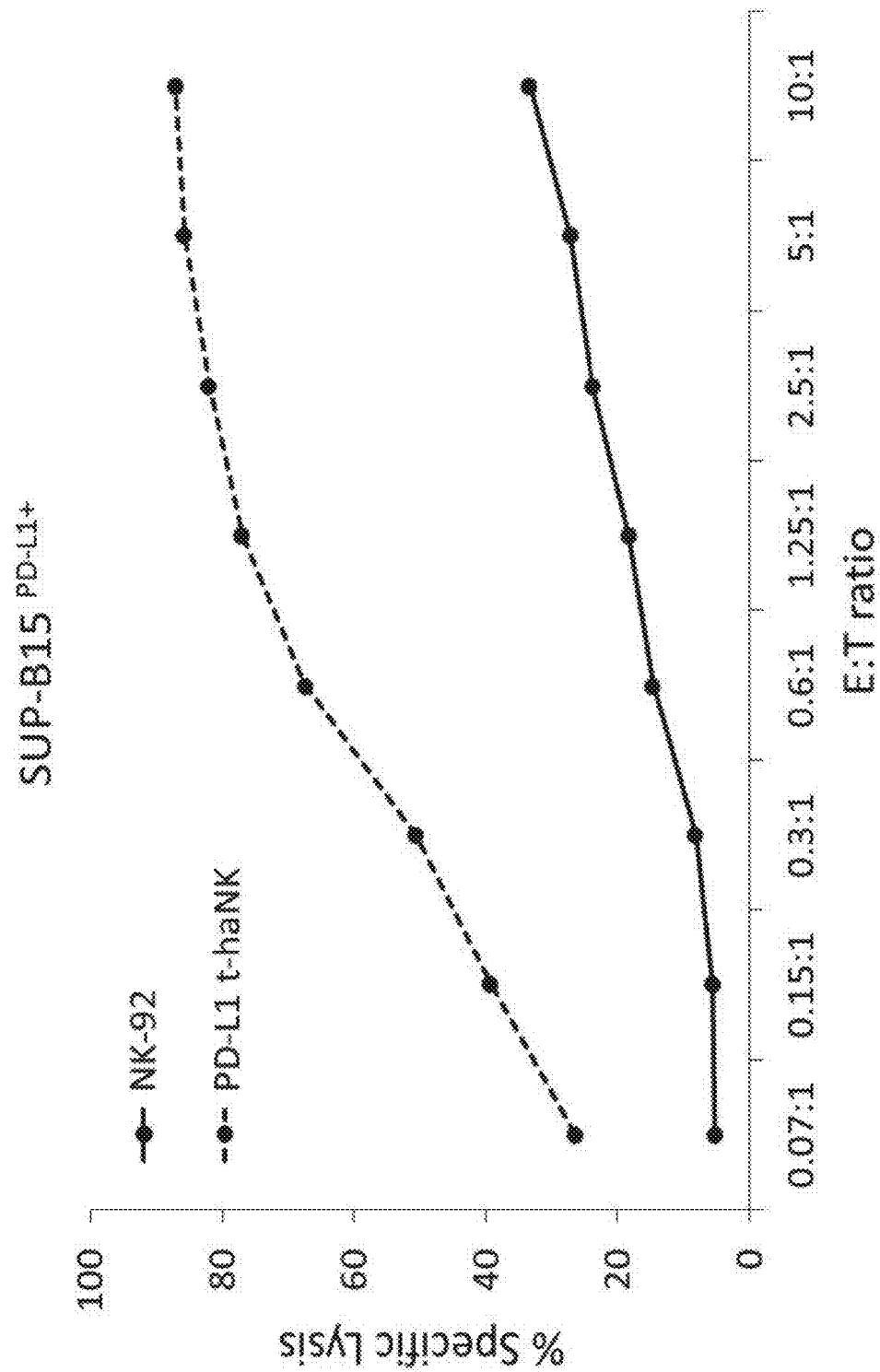
FIG. 42 shows exemplary results for CAR mediated cytotoxicity of PD-L1.CAR-t-haNK cells.
Figure 43:
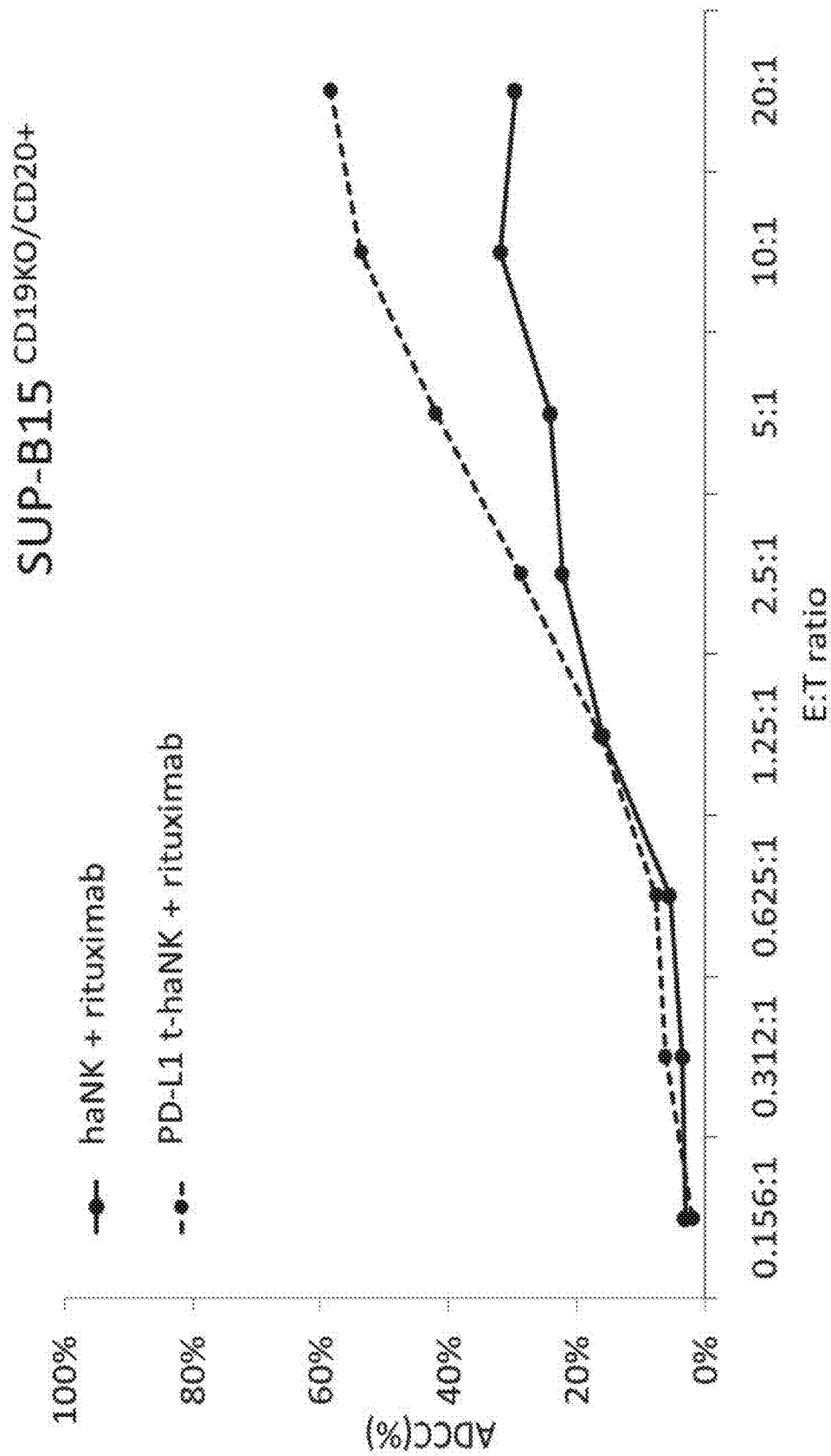
FIG. 43 shows exemplary results for ADCC of PD-L1.CAR-t-haNK cells.

In further experiments, the inventors demonstrated expression of the PD-L1.CAR in PD-L1.CAR-t-haNK cells as is illustrated in FIG. 40. Natural cytotoxicity of the PD-L1.CAR-t-haNK cells is shown in the results of FIG. 41, while results for CAR mediated cytotoxicity are shown in FIG. 42. Exemplary data for ADCC of PD-L1.CAR-t-haNK cells are shown in the graph of FIG. 43.

Example 13: CD33-CAR with FcɛRIγ Signaling Domain

In this example, the inventors constructed a 1$^{st}$ generation CARs with a FcɛRIγ signaling domain that included an anti-HER2 scFv coupled to a CD8 hinge, that in turn was coupled to a CD28 transmembrane domain, which was coupled to a FcɛRIγ signaling domain. The so constructed CD33-CAR had a nucleic acid sequence of SEQ ID NO:43.

Figure 11:
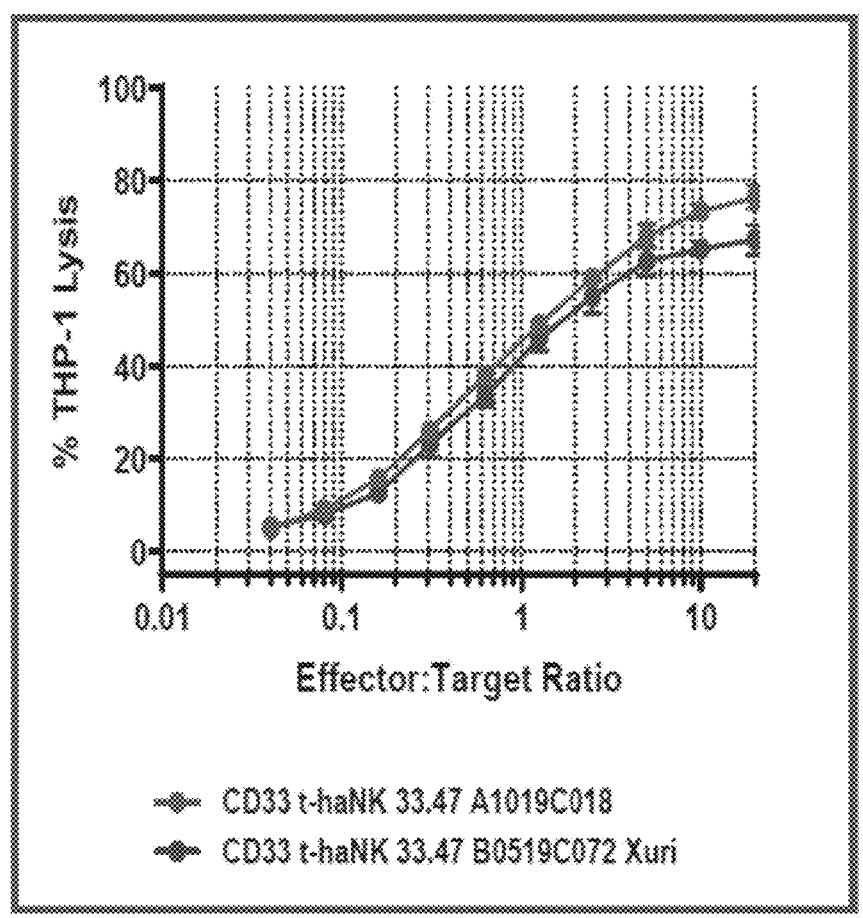
FIG. 11 shows exemplary results for cytotoxicity of CD33.CAR-t-haNK cells against THP-1 cells.
Figure 27:
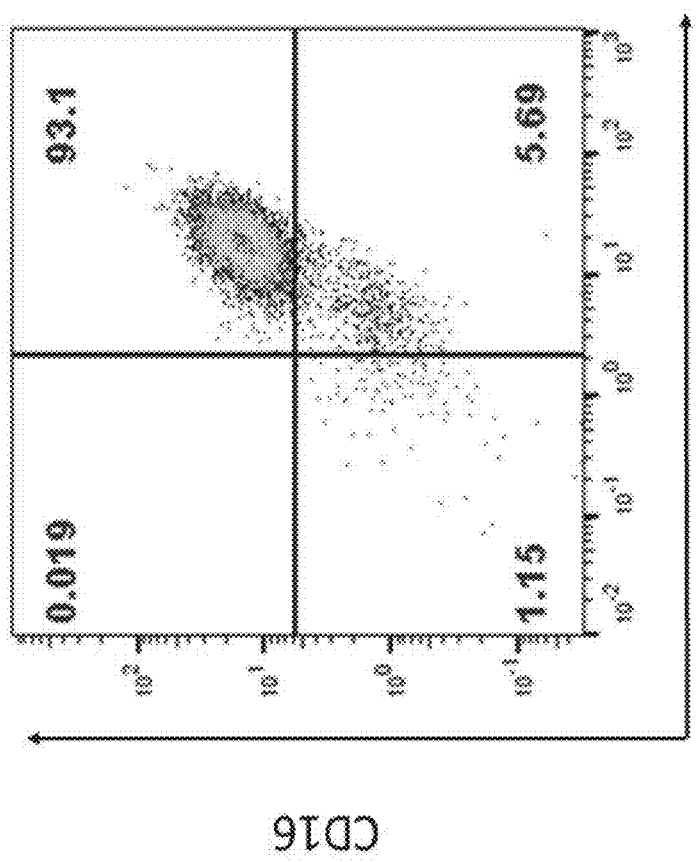
FIG. 27 shows exemplary results for expression of CD16 and CD33.CAR.
Figure 28:
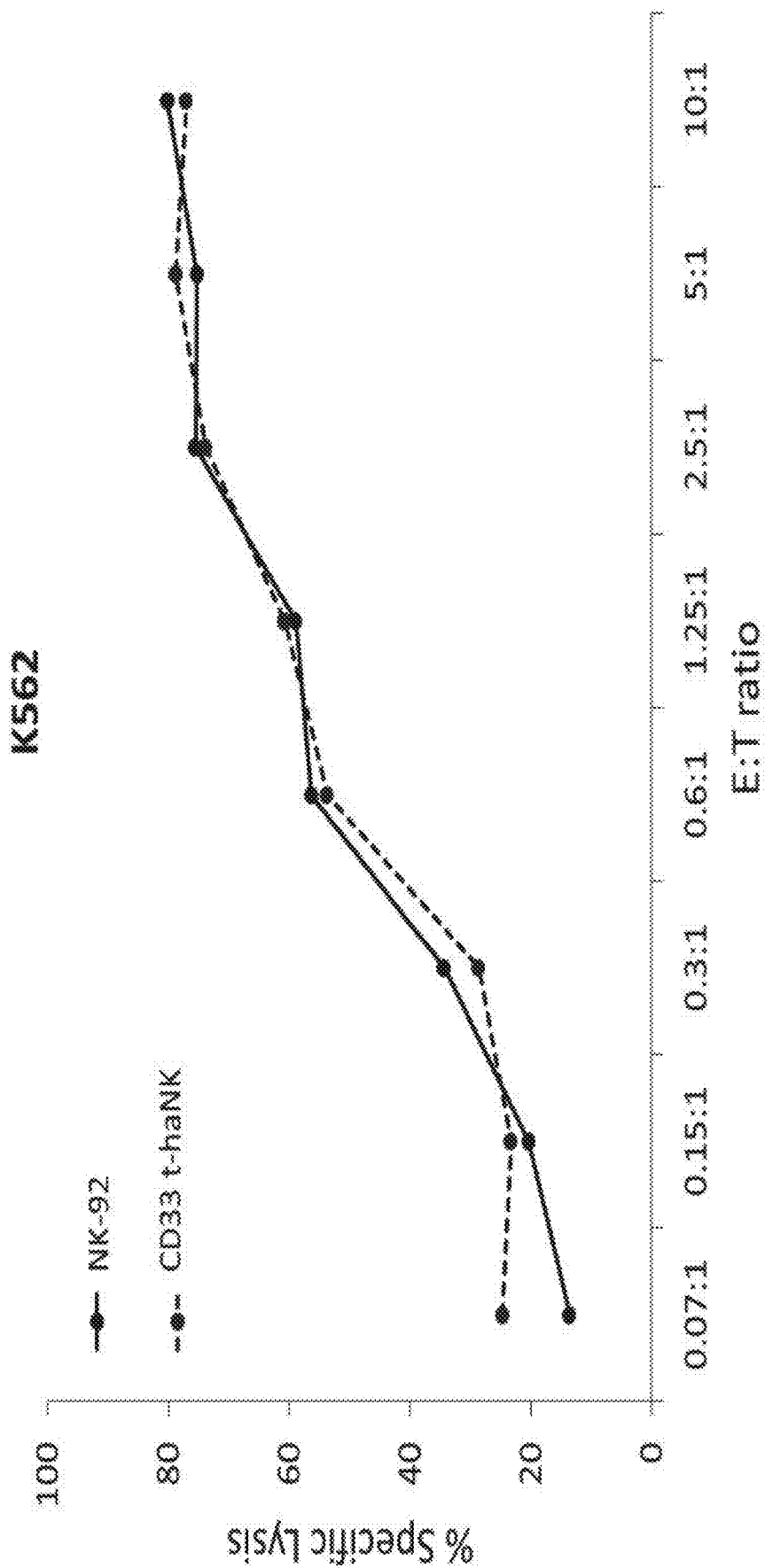
FIG. 28 shows exemplary results for natural cytotoxicity of CD33.CAR-t-haNK cells against K562 cells.
Figure 29:
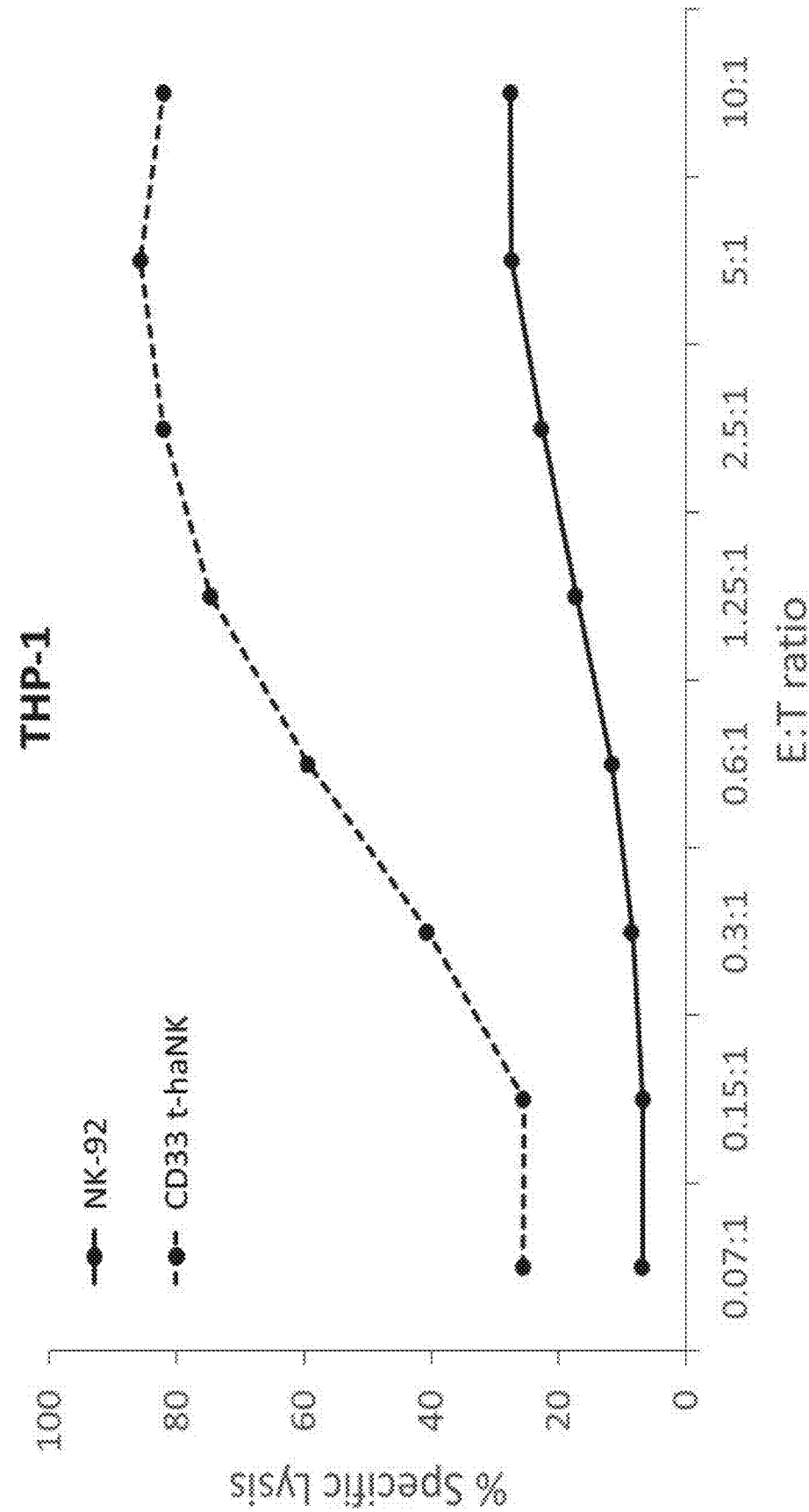
FIG. 29 shows exemplary results for CAR mediated cytotoxicity of CD33.CAR-t-haNK cells against THP-1 cells.
Figure 30:
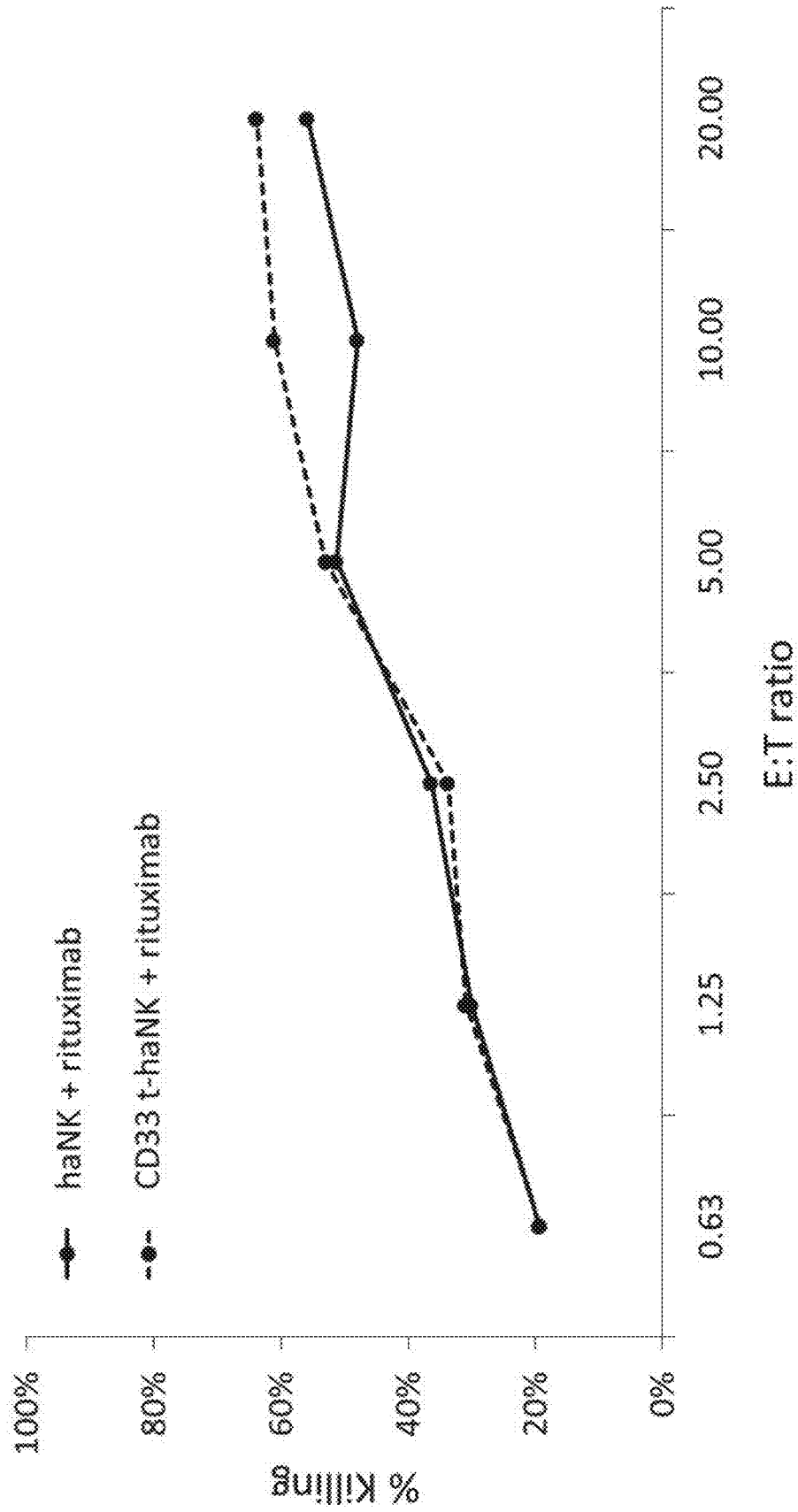
FIG. 30 shows exemplary results for ADCC of CD33.CAR-t-haNK cells.

Functionality of the so constructed CD33.CAR-t-haNK cells was tested against THP-1 cells using a standard cytotoxicity assay and exemplary results are shown in FIG. 11. As can be readily seen from the data, the CD33.CAR-t-haNK cells expressing the CAR with the FcɛRIγ signaling domain exhibited significant cytotoxicity against the THP-1 target cells. Further data depicting strong expression of the CD33CAR in NK-92 cells are presented in FIG. 27. Natural cytotoxicity of the CD33.CAR-t-haNK cells against K562 cells is shown in FIG. 28, and FIG. 29 depicts results for CAR mediated cytotoxicity against THP-1 cells. FIG. 30 shows further results for ADCC of CD33.CAR-t-haNK cells against SUP-B15 CD19$^{KO}$/CD20$^+$ with rituximab.

Example 14: Gp120-CAR with FcɛRIγ Signaling Domain

In this example, the inventors constructed a 1$^{st}$ generation CARs with a FcɛRIγ signaling domain that included an anti-gp120 scFv coupled to a CD8 hinge, that in turn was coupled to a CD28 transmembrane domain, which was coupled to a FcɛRIγ signaling domain. The so constructed gp 120-CAR had a nucleic acid sequence of SEQ ID NO:44.

Figure 53:
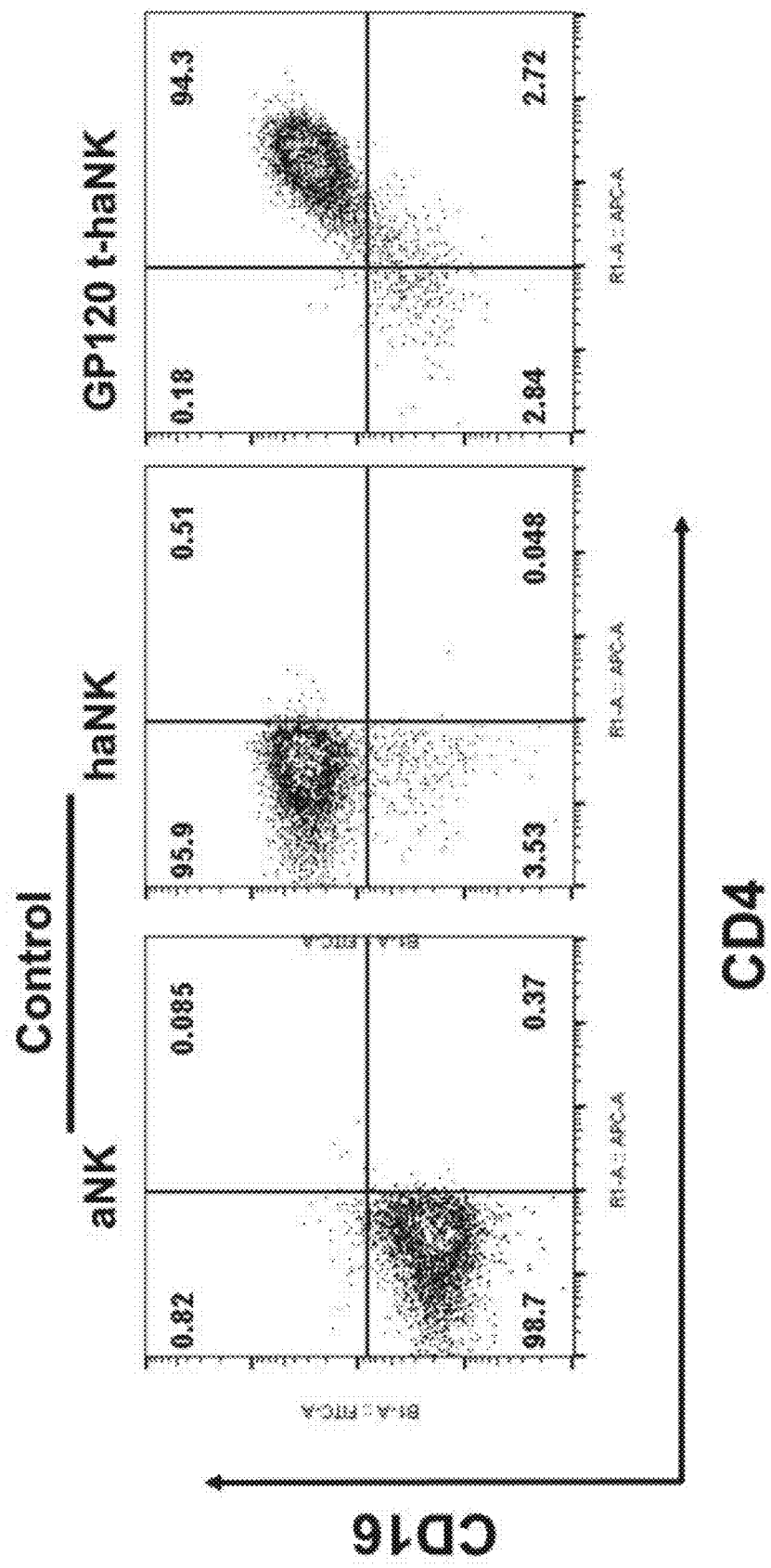
FIG. 53 shows exemplary results for expression of CD16 and gp120.CAR.
Figure 54:
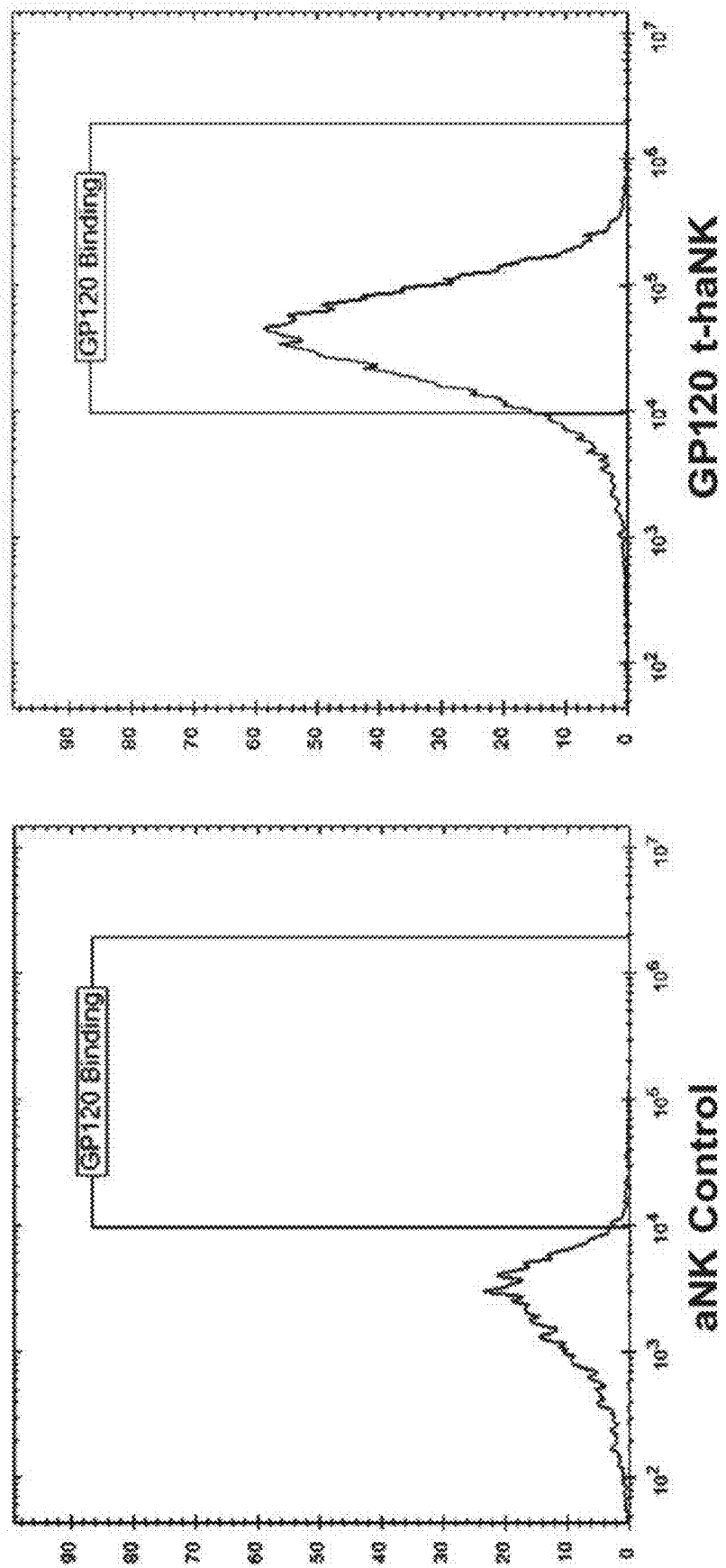
FIG. 54 shows exemplary results for GP120 binding of gp120.CAR-t-haNK cells.
Figure 55:
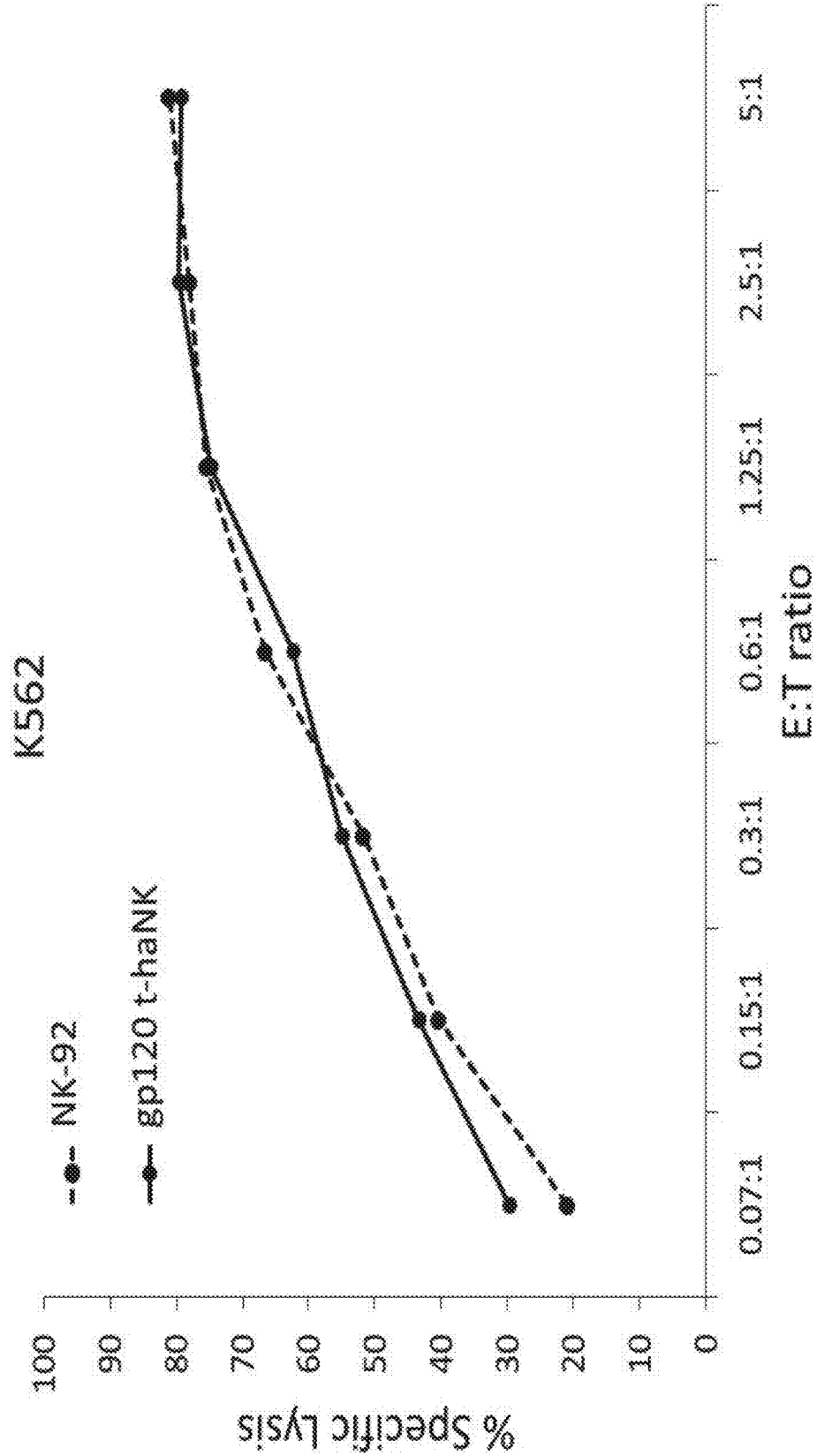
FIG. 55 shows exemplary results for natural cytotoxicity of gp120.CAR-t-haNK cells against K562 cells.
Figure 56:
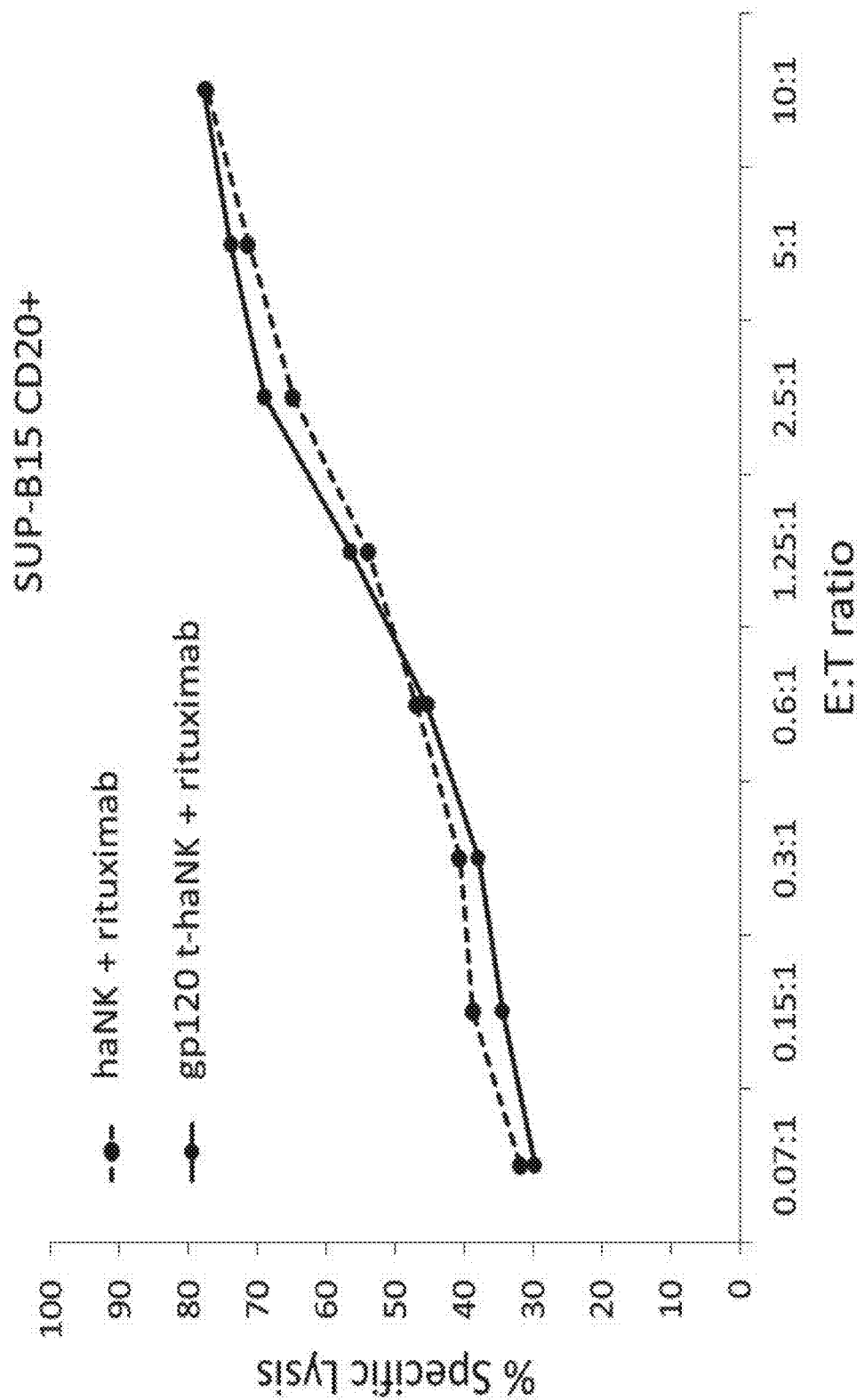
FIG. 56 shows exemplary results for ADCC of gp120.CAR-t-haNK cells.

The inventors further demonstrated that so generated cells expressed significant quantities of CD16 and gp120CAR as can be seen from FIG. 53. Binding of GP120 to the gp120CAR was shown as demonstrated in FIG. 54 versus non-recombinant aNK cells as negative control. Natural cytotoxicity of the so generated cells is shown in FIG. 55, while corresponding ADCC data are shown in FIG. 56.

Example 15: B7-H4-CAR with FcɛRIγ Signaling Domain

In this example, the inventors constructed a 1$^{st}$ generation CARs with a FcɛRIγ signaling domain that included an anti-B7-H4 scFv coupled to a CD8 hinge, that in turn was coupled to a CD28 transmembrane domain, which was coupled to a FcɛRIγ signaling domain. The so constructed B7-H4-CAR had a nucleic acid sequence of SEQ ID NO:45.

Example 16: BCMA-CAR with FcɛRIγ Signaling Domain

In this example, the inventors constructed a 1$^{st}$ generation CARs with a FcɛRIγ signaling domain that included an anti-BCMA scFv coupled to a CD8 hinge, that in turn was coupled to a CD28 transmembrane domain, which was coupled to a FcɛRIγ signaling domain. The so constructed BCMA-CAR had a nucleic acid sequence of SEQ ID NO:46.

Figure 50:
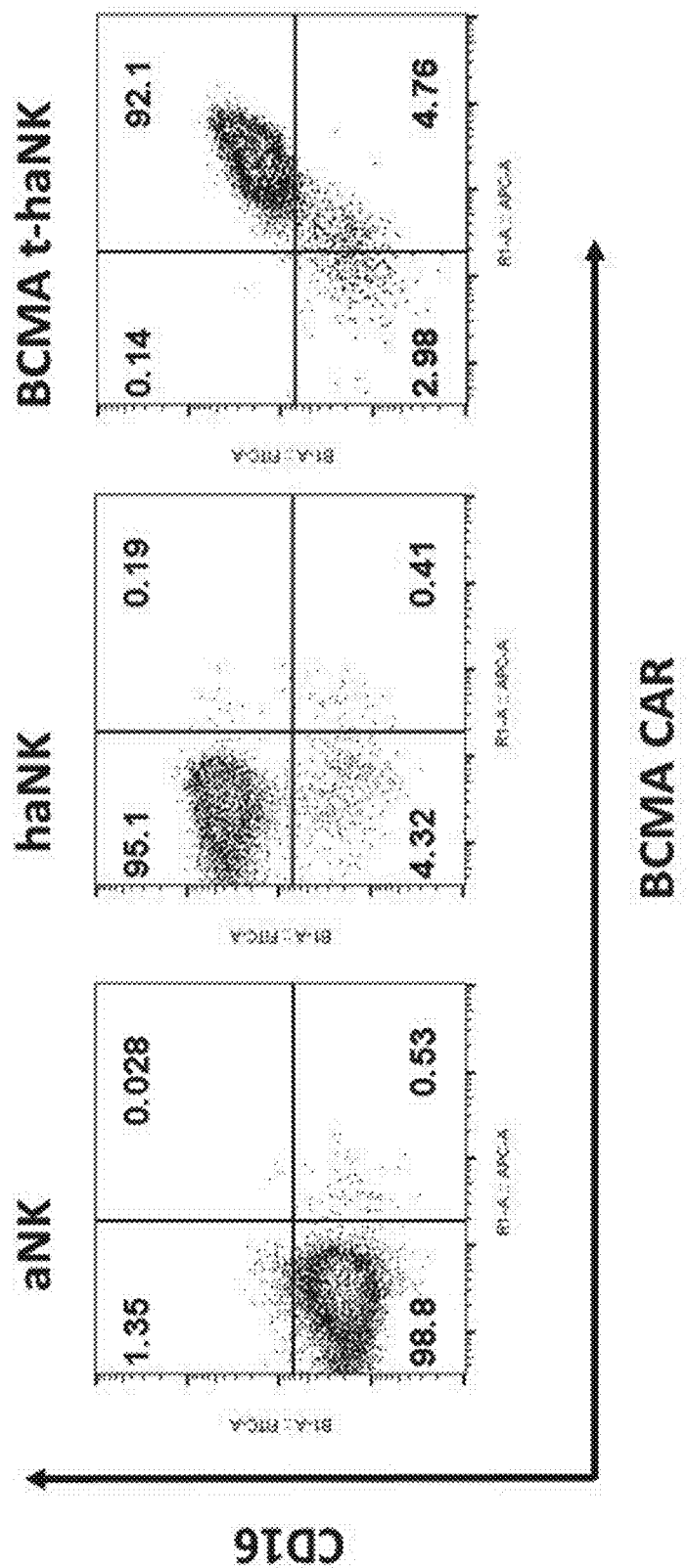
FIG. 50 shows exemplary results for CD16 and BCMA.CAR expression.
Figure 51:
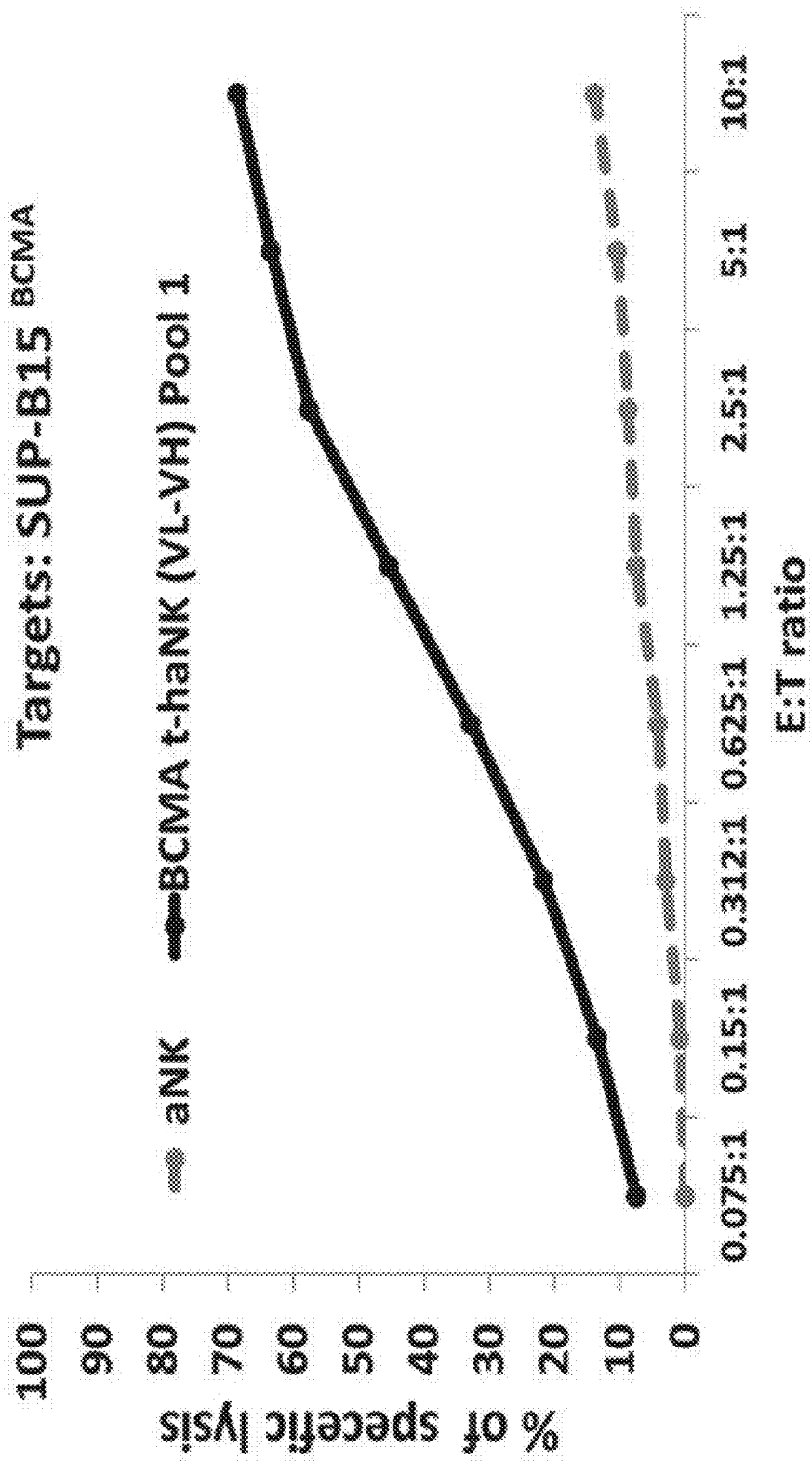
FIG. 51 shows exemplary results for CAR mediated cytotoxicity of BCMA.CAR-t-haNK cells.
Figure 52:
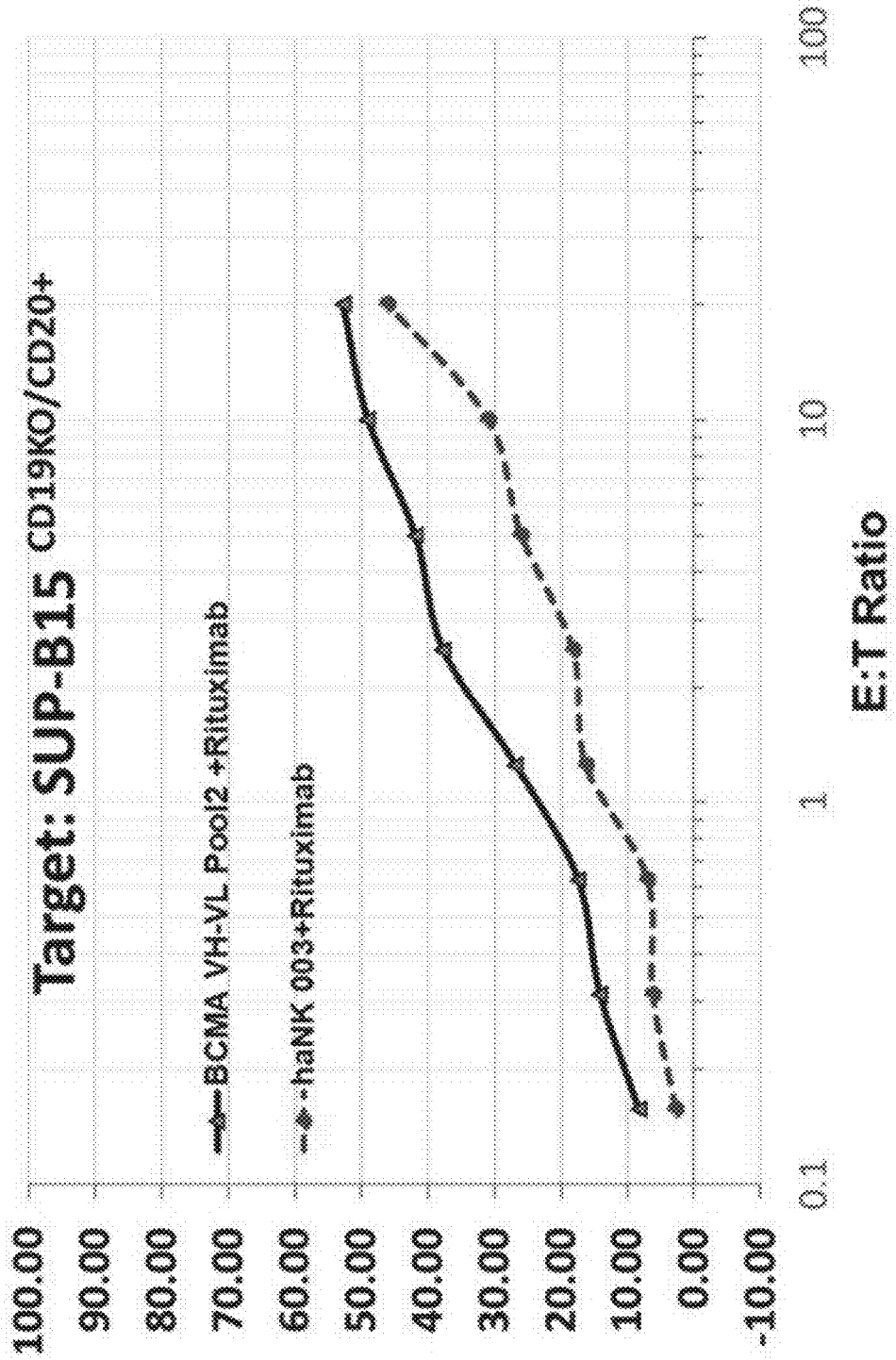
FIG. 52 shows exemplary results for ADCC of BCMA.CAR-t-haNK cells.

BCMA expression was confirmed as is shown in the exemplary results of FIG. 50, and CAR mediated cytotoxicity was demonstrated against target cells as is shown in FIG. 51. Similarly, as can be seen from the results in FIG. 52, recombinant cells had significant ADCC using rituximab as antibody against the target cells.

Example 17: GD2-CAR with FcɛRIγ Signaling Domain

In this example, the inventors constructed a 1$^{st}$ generation CARs with a FcɛRIγ signaling domain that included an anti-GD2 scFv coupled to a CD8 hinge, that in turn was coupled to a CD28 transmembrane domain, which was coupled to a FcɛRIγ signaling domain. The so constructed GD2-CAR had a nucleic acid sequence of SEQ ID NO:47.

Example 18: FAP-CAR with FcɛRIγ Signaling Domain

Figure 57:
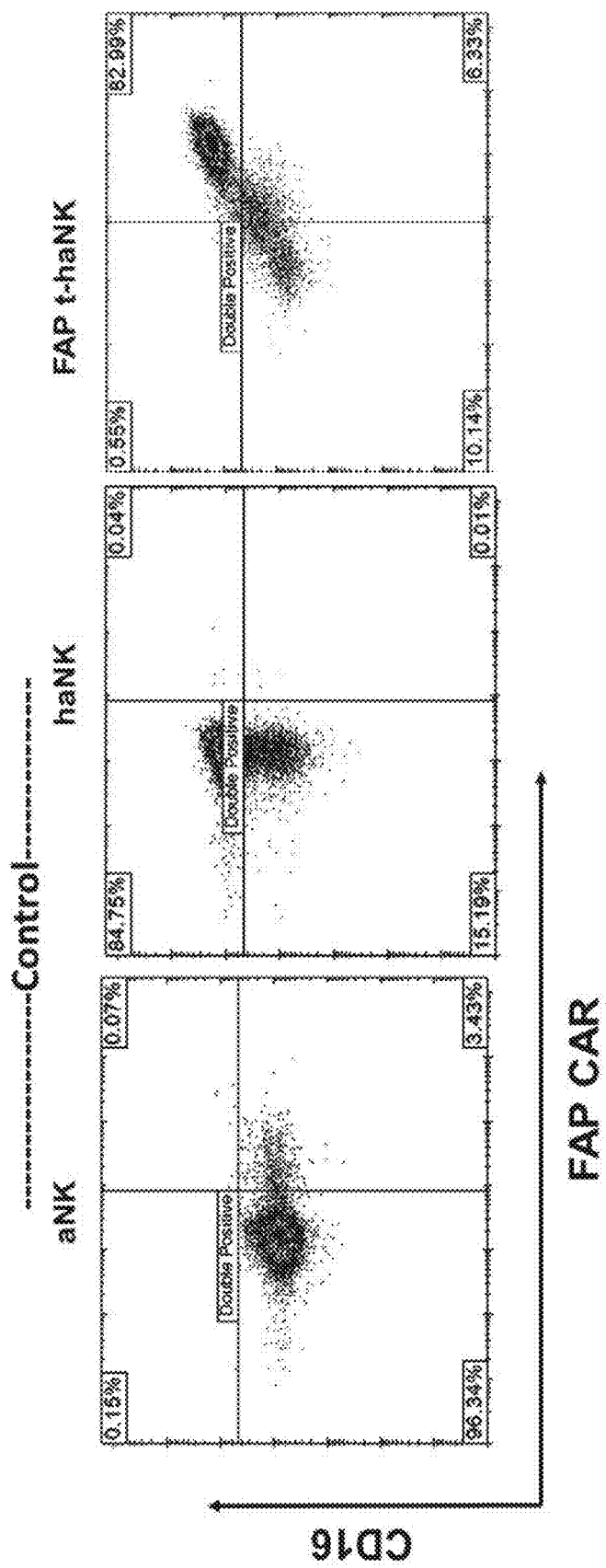
FIG. 57 shows exemplary results for CD16 and FAP.CAR expression.
Figure 58:
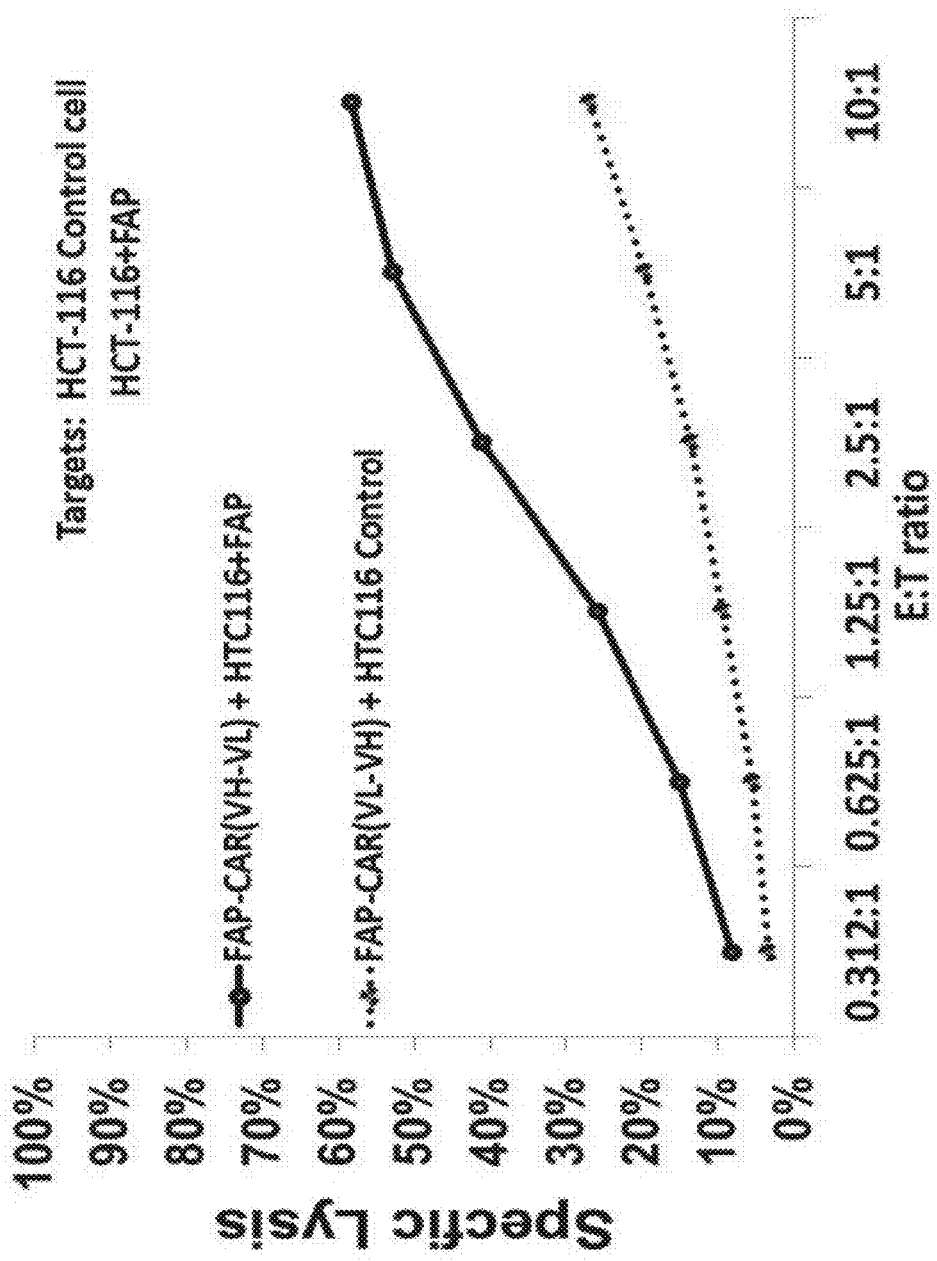
FIG. 58 shows exemplary results for CAR mediated cytotoxicity of FAP.CAR-t-haNK cells.

In this example, the inventors constructed a 1$^{st}$ generation CARs with a FcɛRIγ signaling domain that included an anti-FAP scFv coupled to a CD8 hinge, that in turn was coupled to a CD28 transmembrane domain, which was coupled to a FcεRIγ signaling domain. The so constructed FAP-CAR had a nucleic acid sequence of SEQ ID NO:48. Expression of the FAP-CAR is shown in the data of FIG. 57, and FAP.CAR cytotoxicity is demonstrated on target cells in the results of FIG. 58.

Example 19: CSPG-4-CAR with FcεRIγ Signaling Domain

Figure 59:
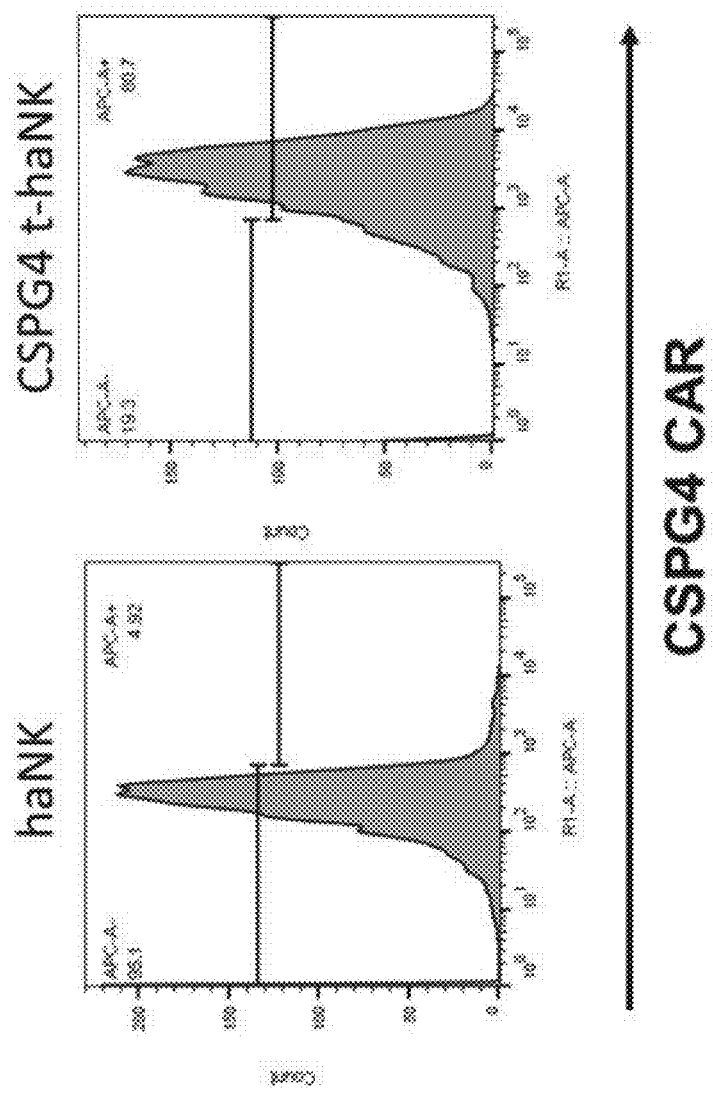
FIG. 59 shows exemplary results for CSPG4 expression in CSPG4.CAR-t-haNK cells.
Figure 60:
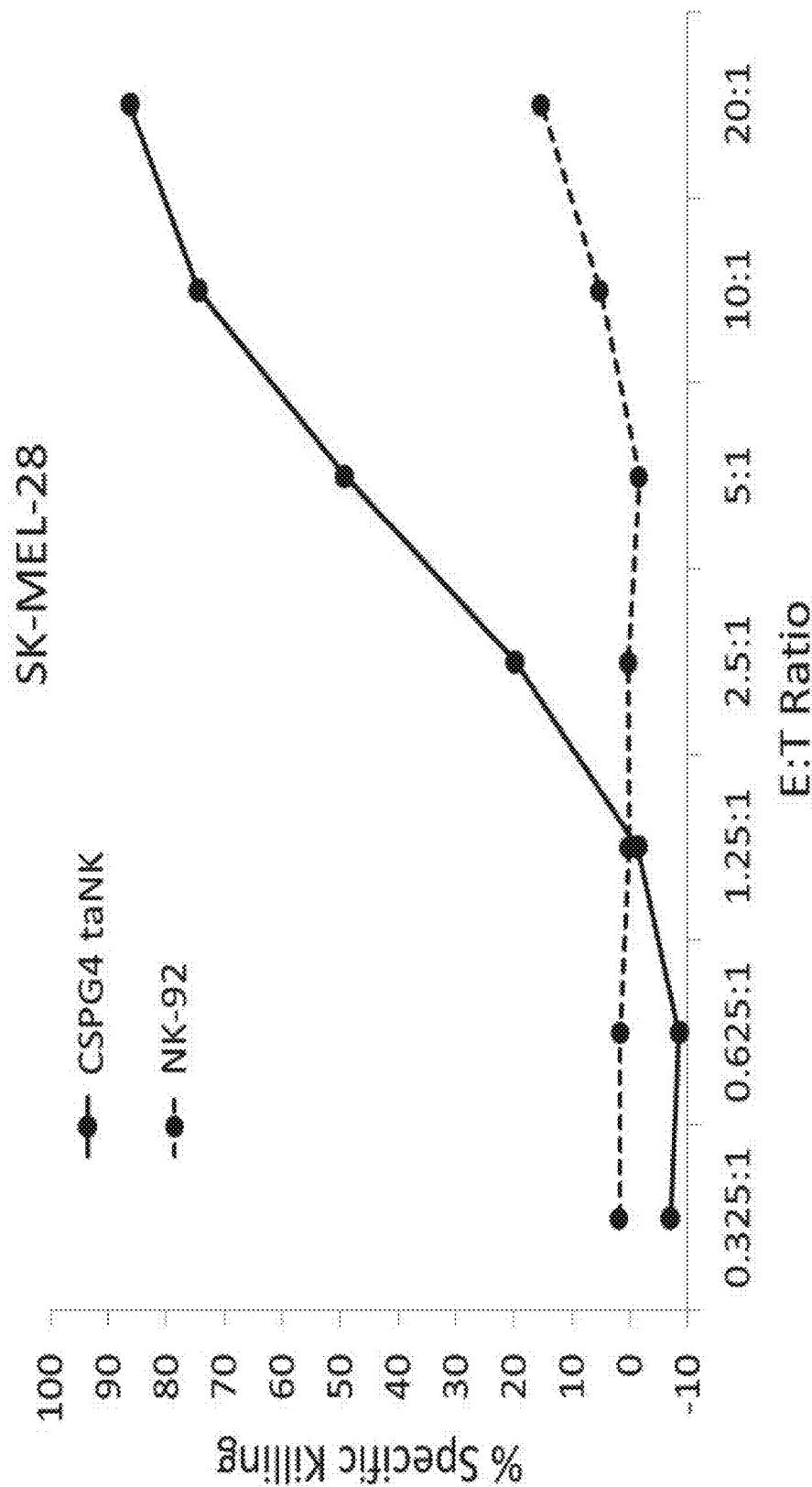
FIG. 60 shows exemplary results for CAR mediated cytotoxicity of CSPG4.CAR-t-haNK cells against SK-MEL-28 cells.

In this example, the inventors constructed a 1$^{st}$ generation CARs with a FcεRIγ signaling domain that included an anti-CSPG-4 scFv coupled to a CD8 hinge, that in turn was coupled to a CD28 transmembrane domain, which was coupled to a FcεRIγ signaling domain. The so constructed CSPG-4-CAR had a nucleic acid sequence of SEQ ID NO:52. Expression of the CSPG-4-CAR was confirmed with FACS analysis and exemplary results are shown in FIG. 59. Thusly constructed cells also exhibited significant cytotoxicity as is shown in the exemplary data of FIG. 60.

Example 20: CD20-CAR with FcεRIγ Signaling Domain

In this example, the inventors constructed a 1$^{st}$ generation CARs with a FcεRIγ signaling domain that included an anti-CD20 scFv coupled to a CD8 hinge, that in turn was coupled to a CD28 transmembrane domain, which was coupled to a FcεRIγ signaling domain. The so constructed CD20-CAR had a nucleic acid sequence of SEQ ID NO:51.

Figure 25:
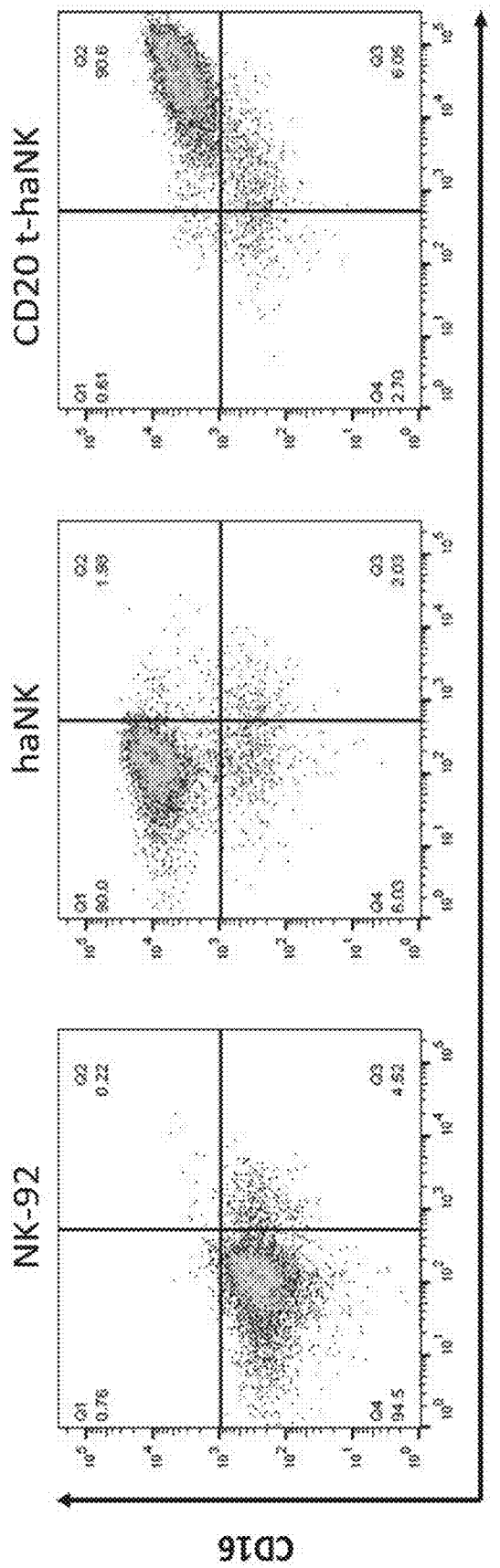
FIG. 25 shows exemplary comparative results for expression of CD16 and CD20.CAR.
Figure 26:
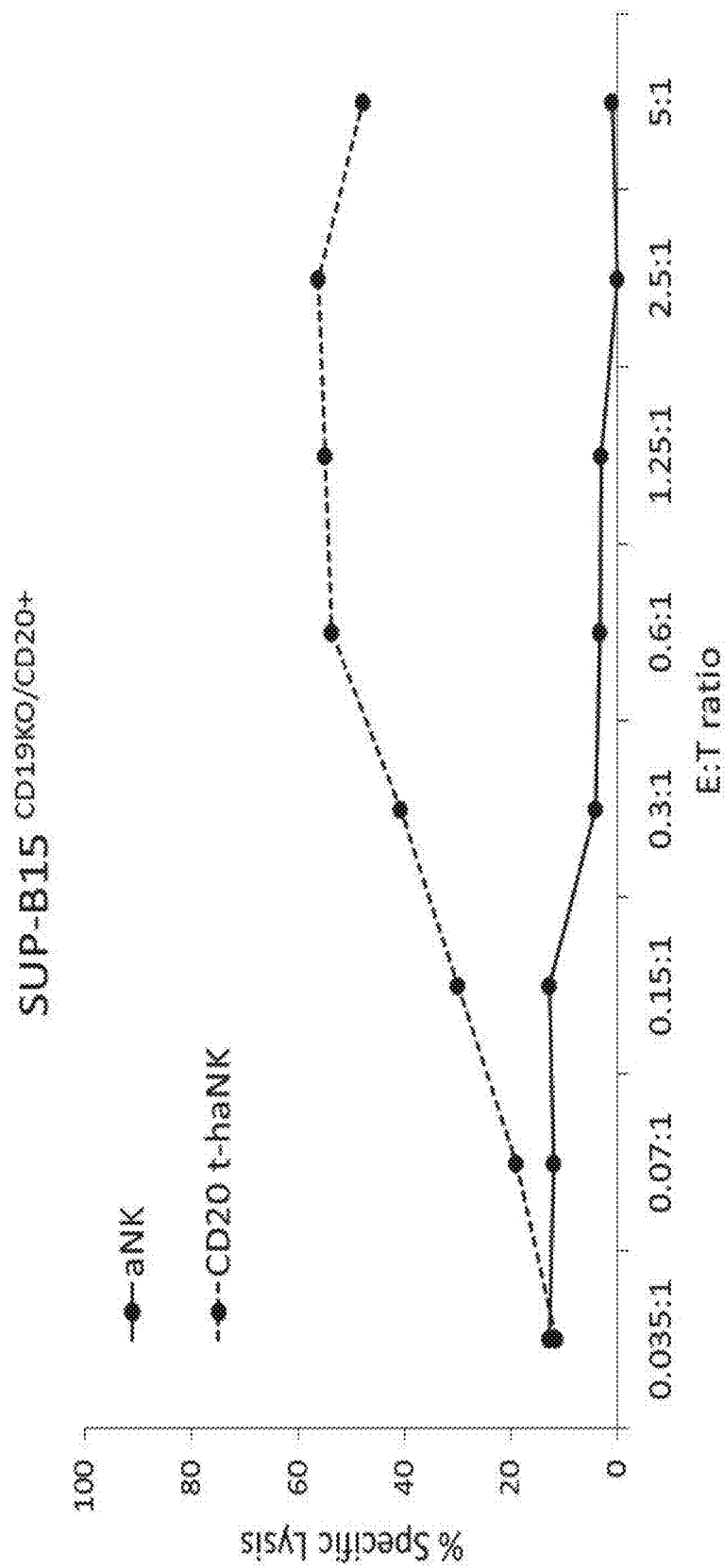
FIG. 26 shows exemplary results for natural cytotoxicity of CD20.CAR-t-haNK cells.

Expression of the CD20 CAR in NK-92 cells is shown in the results of FIG. 25. As can be readily seen, CD20.CAR is expressed strongly in the vast majority of recombinant cells (along with CD16 from the linearized DNA as noted above). FIG. 26 depicts exemplary results for cytotoxicity of the CD20.CAR NK cells against CD20$^+$ target cells.

Example 21: CD19-CAR with FcεRIγ Signaling Domain

In this example, the inventors used the 1$^{st}$ generation CARs as described above having a FcεRIγ signaling domain that included an anti-CD19 scFv coupled to a CD8 hinge, that in turn was coupled to a CD28 transmembrane domain, which was coupled to a FcεRIγ signaling domain and transfected NK-92cells with linearized DNA for functional testing.

Figure 15:
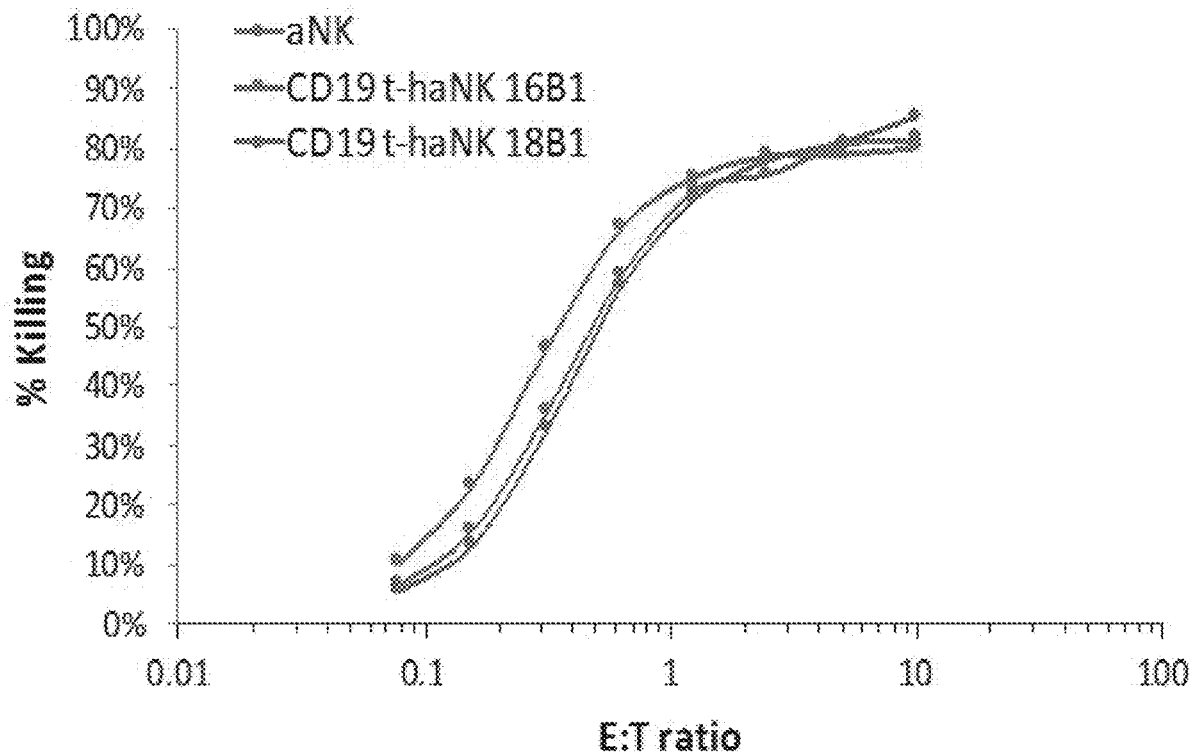
FIG. 15 shows exemplary results for cytotoxicity of CD19.CAR-t-haNK cells against K562 cells.
Figure 16:
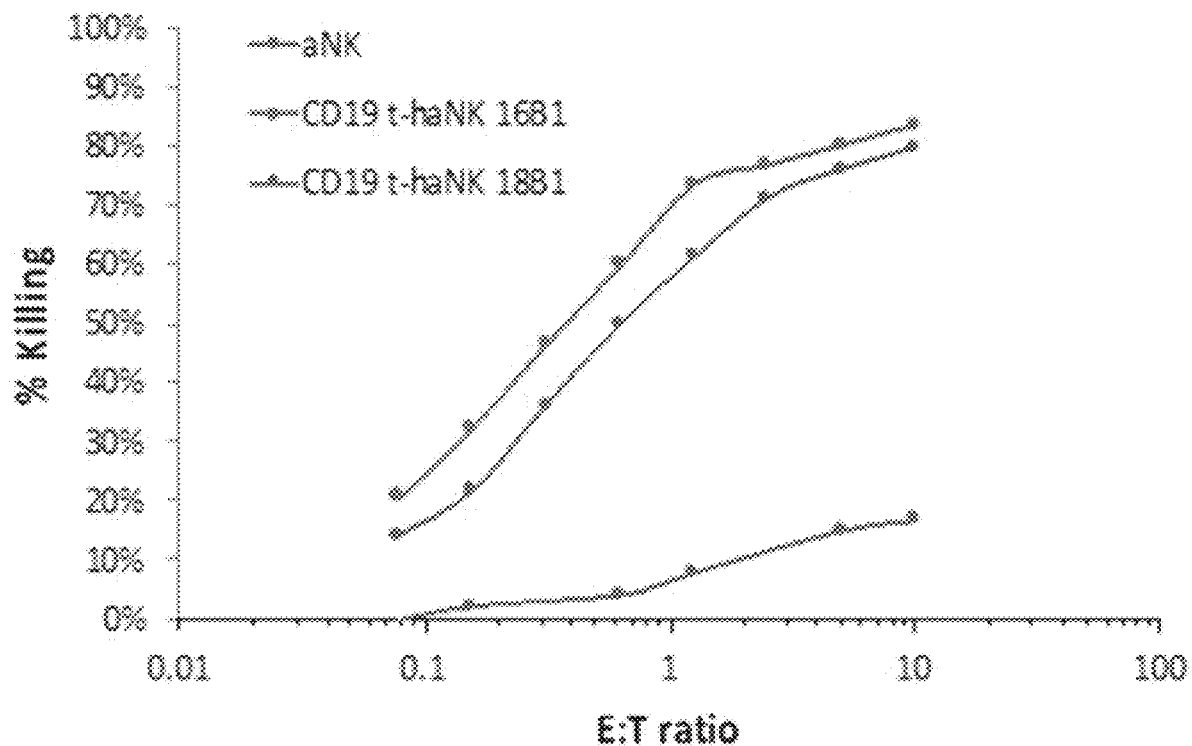
FIG. 16 shows exemplary results for cytotoxicity of CD19.CAR-t-haNK cells against SUP-B15 cells.
Figure 17:
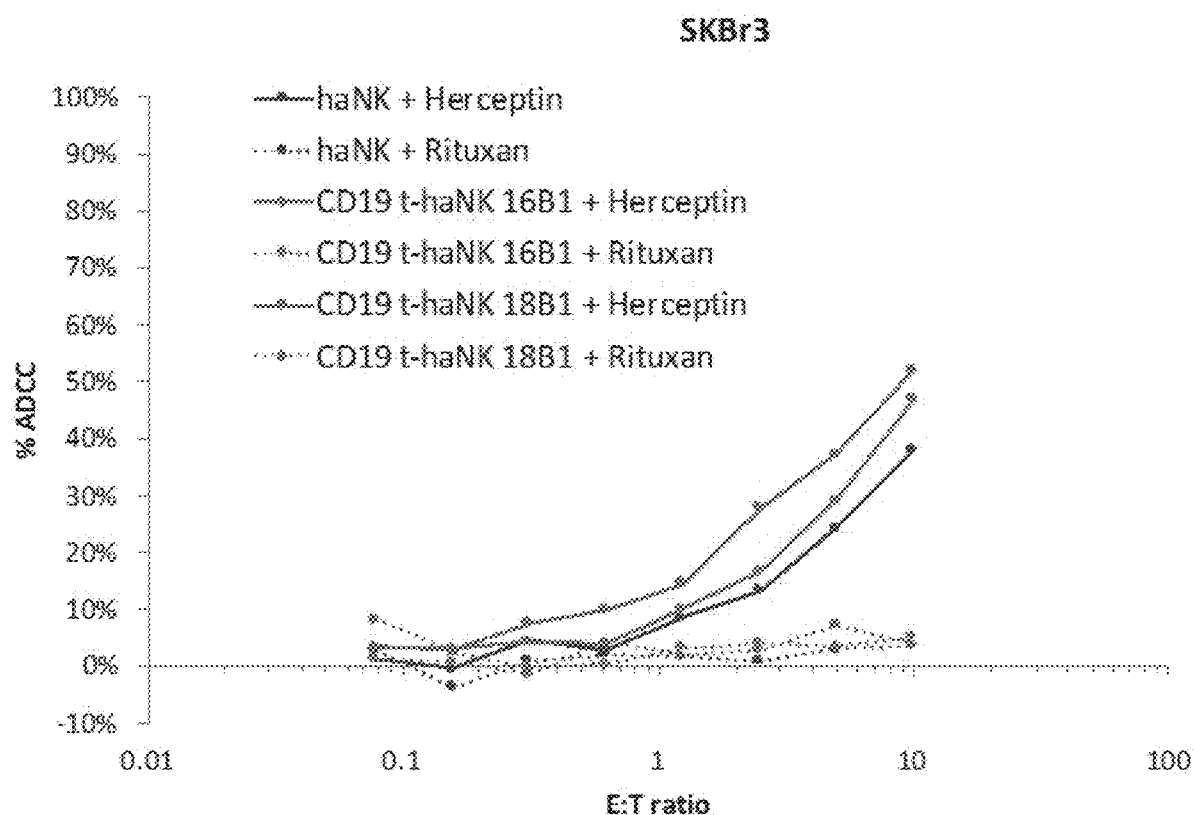
FIG. 17 shows exemplary results for ADCC of CD19.CAR-t-haNK cells against SKBr3 cells.

Functionality of the so constructed CD19.CAR-t-haNK cells was tested against K562 cells for determination of general cytotoxicity using a standard cytotoxicity assay and exemplary results are shown in FIG. 15. As can be readily seen, the CD19.CAR-t-haNK cells expressing the CAR with the FcεRIγ signaling domain exhibited significant cytotoxicity against the K562 target cells. In a further set of experiments, target specific cytotoxicity was determined using SUP-B15 cells in comparison with aNK cells as control, and exemplary results are shown in FIG. 16. Once more, CD19.CAR-t-haNK cells expressing the CAR with the FcεRIγ signaling domain exhibited significant and target specific cytotoxicity. In yet another set of experiments, target specific ADCC was determined using SKBr3 cells using Herceptin and Rituxan as antibodies, and exemplary results are shown in FIG. 17. Again, CD19.CAR-t-haNK cells expressing the CAR with the FcεRIγ signaling domain exhibited significant antibody and target specific ADCC.

Figure 21:
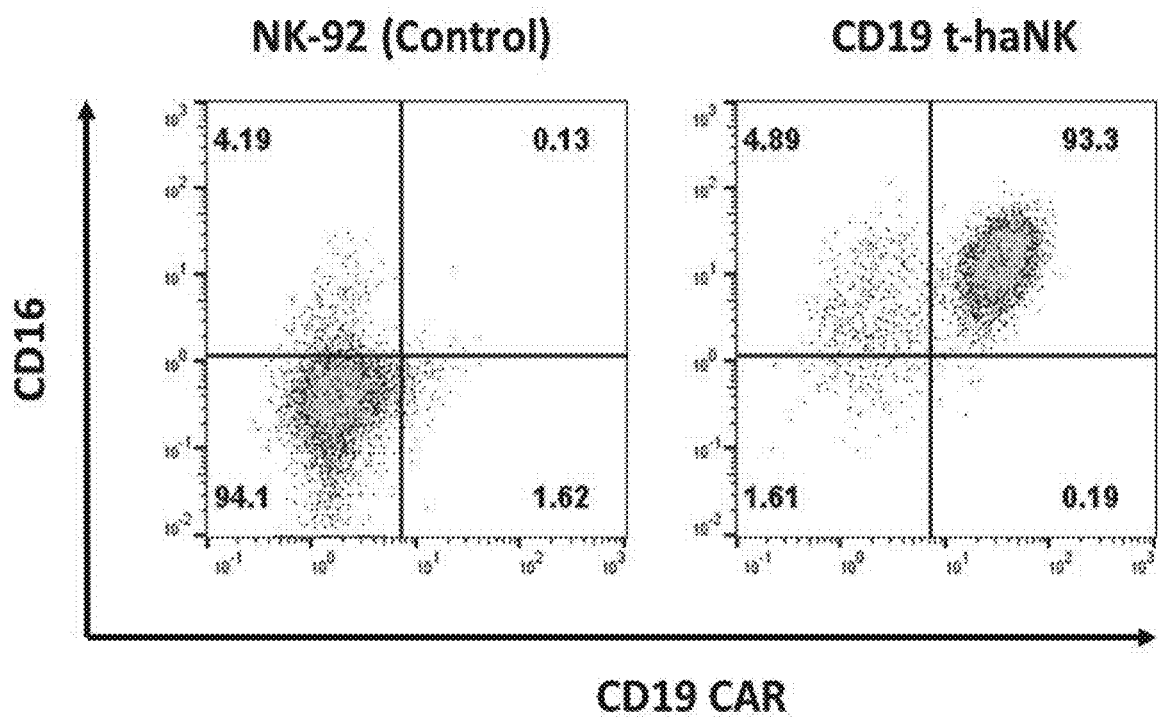
FIG. 21 shows exemplary results expression of CD16 and CD19.CAR.
Figure 22:
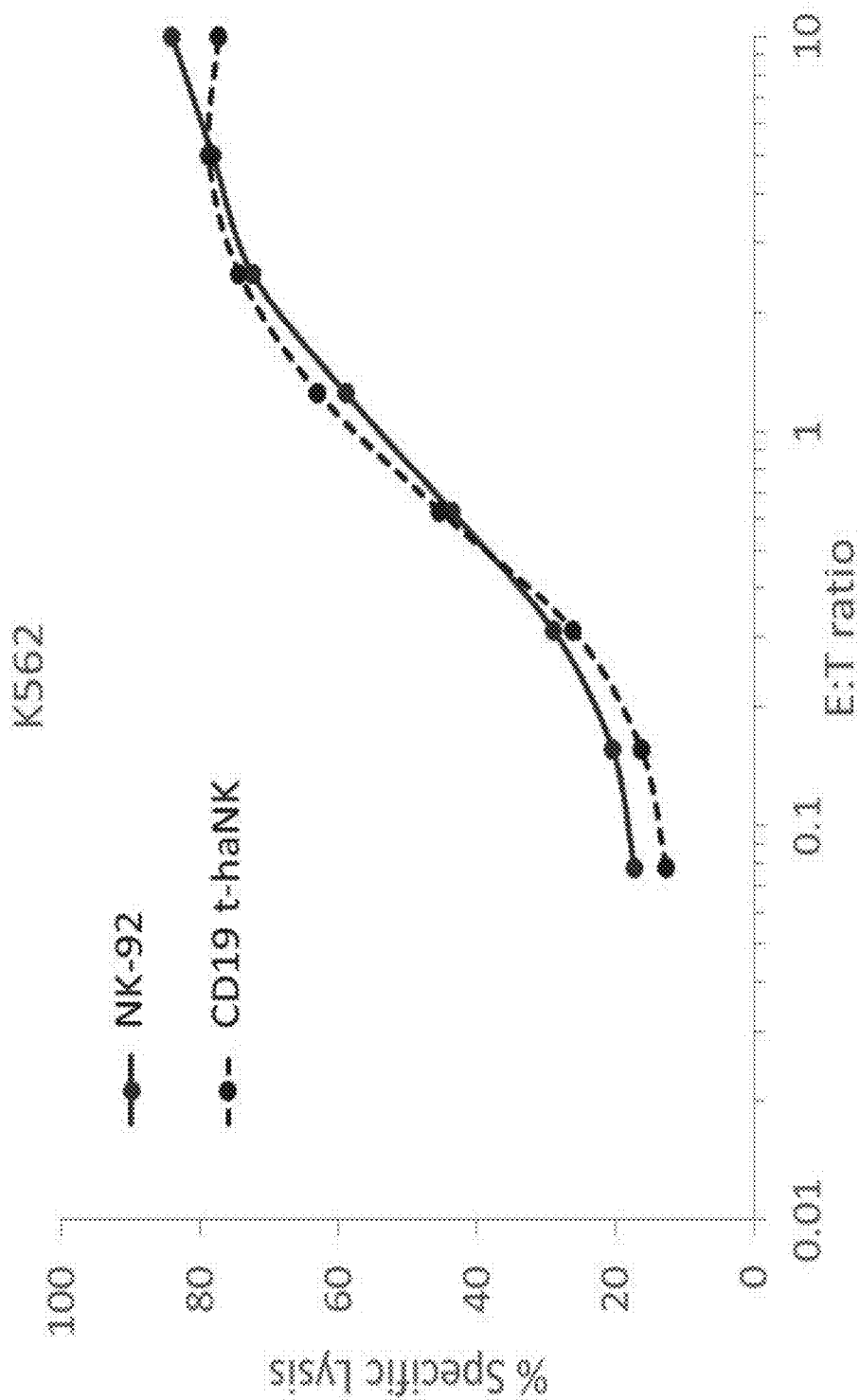
FIG. 22 shows exemplary results for natural cytotoxicity of CD19.CAR-t-haNK cells against K562 cells.
Figure 23:
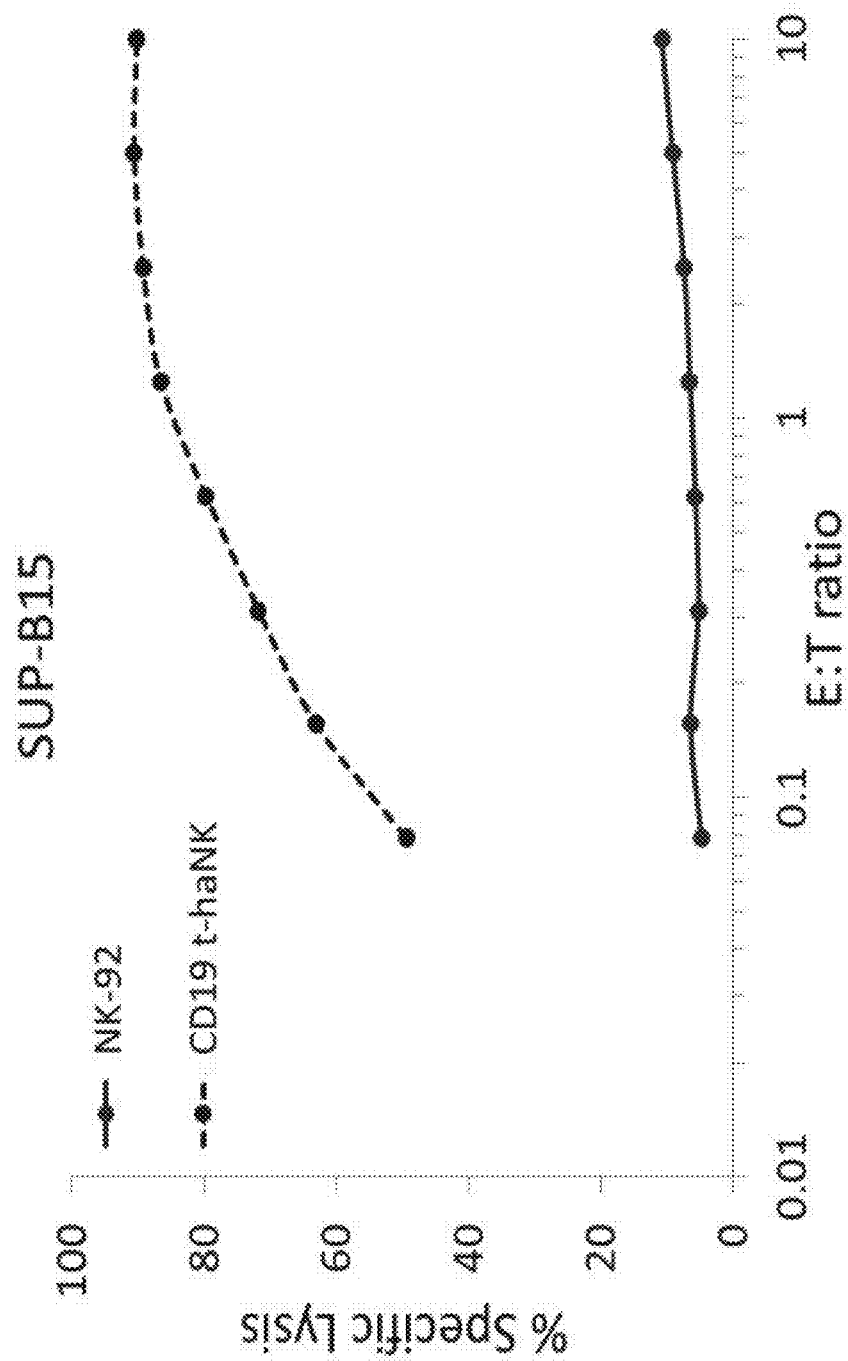
FIG. 23 shows exemplary results for CAR mediated cytotoxicity of CD19.CAR-t-haNK cells against SUP-B15 cells.
Figure 24:
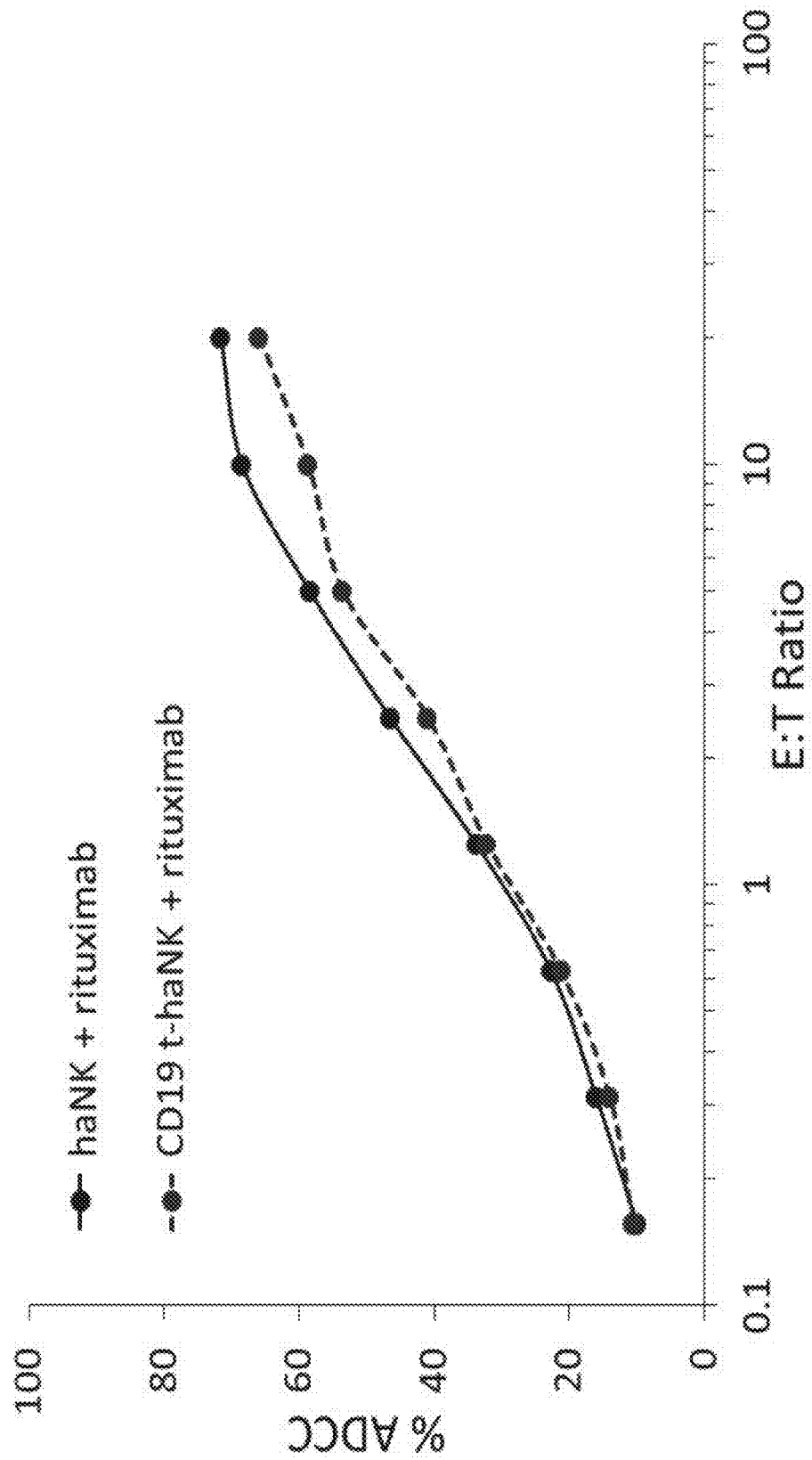
FIG. 24 shows exemplary results for ADCC of CD19.CAR-t-haNK cells.

FIG. 21 exemplarily illustrates CD19.CAR expression from linearized DNA that included a segment encodingCD16 and IL-2$^{ER}$ in NK-92 cells versus control. As can be seen form FIG. 25, the expression was very strong across the vast majority of cells. Additional results for natural cytotoxicity of CD19.CAR t-haNK cells against K562 cells and targeted cytotoxicity against SUP-B15 cells are depicted in FIG. 22 and FIG. 23. Exemplary further results for ADCC of CD19.CAR t-haNK cells against SUP-B15CD19$^{KO}$/CD20$^+$ cells are shown in FIG. 24.

Example 22: Anti-Tumor Activity of PD-L1-Targeting t-haNK Cells in Human Xenograft Models in NSG Mice MDA-MB-231 and HCC827 were used as validated xenograft models that are PDL1 positive, and efficacy of PDL1 t-haNK cells in varied formulations, dosing levels, and dosing routes (IV and IT) was evaluated.

Animals: Animal type: NSG mice (JAX), females, 9-10 weeks old; Number of animals for MDA-MB-231 model: 24 (fresh cells), and for HCC827 model: 24 (fresh cells)+6 (cryopreserved cells). Tumor model used the following cell line: MDA-MB-231 (human breast adenocarcinoma) and HCC827 (human lung adenocarcinoma), Route of inoculation was subcutaneous on both flanks, and average tumor burden upon treatment initiation was for MDA-MB-231 about 100 mm3 and for HCC827 about 75-80 mm3.

Treatment articles: Anti-PD-L1 t-haNK, freshly prepared, irradiated, at a concentration: 5E7 cells/mL or 2E7 cells/mL; Vehicle control was X-VIVO™ 10 medium; Method of administration was IV and IT as noted. Dosage for IV NK dosing was 1E7 cells/dose in 200 μL (Freshly prepared cells), 4E6 cells/dose in 200 μL (Cryopreserved cells); for IT NK dosing (fresh cells only) dose was 2.5E6 cells/tumor/dose in 50 μL. Dosing frequency was Twice a week (M/Th or T/F) for 4 consecutive weeks, and first day of dosing was defined as Day 1.

Study design for MDA-MB-231 is in Table 3 below (This study was ended on Day 27, when some animals in Groups A, C and D had reached combined tumor volume of >2000 mm3)

TABLE 2

| Group | N | Tumor model | Treatment | Fresh or Frozen | NK Cell Dose | NK dosing route | Treatment Regimen | Dosing Volume |
|---|---|---|---|---|---|---|---|---|
| A | 6 | MDA-MB-231 SC, bilateral 1 × 10$^6$ | Vehicle | / | / | IV | BIW × 4 weeks | 200 μL |
| B | 6 | | PD-L1 t-haNK | Fresh | 1E7 | IV | BIW × 4 weeks | 200 μL |
| C | 6 | | Vehicle | / | / | IT | BIW × 4 weeks | 50 μL |

TABLE 2-continued

| Group | N | Tumor model | Treatment | Fresh or Frozen | NK Cell Dose | NK dosing route | Treatment Regimen | Dosing Volume |
|---|---|---|---|---|---|---|---|---|
| D | 6 | | PD-L1 t-haNK | Fresh | 2.5E6 | IT | BIW × 4 weeks | 50 μL |

Study design for HCC827 is in Table 4 below (This study was ended on Day 29, when surviving animals were re-purposed and transferred to another study).

TABLE 3

| Group | N | Tumor model | Treatment | Fresh or Frozen | NK Cell Dose | NK dosing route | Treatment Regimen | Dosing Volume |
|---|---|---|---|---|---|---|---|---|
| A | 6 | HCC827 SC, bilateral 1 × 10⁶ | Vehicle | / | / | IV | BIW × 4 weeks | 200 μL |
| B | 6 | | PD-L1 t-haNK | Fresh | 1E7 | IV | BIW × 4 weeks | 200 μL |
| C | 6 | | Vehicle | / | / | IT | BIW × 4 weeks | 50 μL |
| D | 6 | | PD-L1 t-haNK | Fresh | 2.5E6 | IT | BIW × 4 weeks | 50 μL |
| Pilot | 6 | | PD-L1 t-haNK | Frozen | 4E6 | IV | BIW × 4 weeks | 200 μL |

Results: Freshly prepared PD-L1 t-haNK cells (1E7 cells/dose) led to marked and long-lasting tumor growth inhibition in both MDA-MB-231 and HCC827 models MDA-MB-231: tumor stasis: TGI on Day 16: 84% (peak); TGI on Day 26: 79% (last measurement).

HCC827: tumor regression: TGI on Day 16: 120% (peak); TGI on Day 29: 84% (study end).

Cryopreserved PDL1 t-haNK cells (4E6 cells/dose) also showed statistically significant efficacy in suppressing tumor growth compared to X-VIVO™ 10 media: TGI on Day 26: 60% (peak), and TGI on Day 29: 40% (study end).

Freshly prepared PDL1 t-haNK cells (1E7 cells/dose) also led to significant reduction of metastatic disease burden in the MDA-MB-231 model as shown in Table 5 below.

TABLE 4

| Group | Mouse | Macroscopic lesions found in: | Overall Summary |
|---|---|---|---|
| A (vehicle) | 1 | Liver, lungs | 100% animals developed metastases in multiple organs |
| | 2 | Ax LNs, liver, lungs | |
| | 3 | Ax LN (left), liver, lungs | |
| | 4 | Liver, lungs | |
| | 5 | Ax LNs, spleen, liver, lungs | |
| | 6 | Ax LNs, liver, lungs | |
| B (PD-L1 t-haNK) | 1 | None | 50% developed metastasis; all single-organ findings |
| | 2 | Lungs | |
| | 3 | Ax LNs | |
| | 4 | None | |
| | 5 | Ax LN (left) | |
| | 6 | None | |

The number of visible nodules in liver was in vehicle: 29±9, in the PD-L1 t-haNK group: 0 (P=0.0116 by unpaired 2-tailed t test).

Based on the experiments performed, IV dosing of freshly prepared PD-L1 t-haNK cells at the dosing level of 1E7 cells/dose, twice a week for 4 weeks, showed marked anti-tumor efficacy in both of the subcutaneous xenograft models tested: The treatment resulted in tumor stasis in MDA-MB-231 tumor-bearing mice, with a peak TGI of 84% on Day 16 and an end-of-study TGI of 79% ($P<0.0001$ for both time points by 2-way ANOVA followed by multiple comparison by Tukey test), and tumor regression in the HCC827 model, with a peak TGI of 120% on Day 16 and an end-of-study TGI of 84% ($P<0.0001$). IV dosing of cryopreserved PD-L1 t-haNK cells at the dosing level of 4E6 cells/dose, twice a week for 4 weeks, also showed significant therapeutic efficacy in the HCC827 tumor model, reaching a peak TGI of 60% ($P<0.0001$), and an end-of-study TGI of 40% ($P<0.01$). IT dosing of freshly prepared PD-L1 t-haNK cells at the dosing level of 2.5E6 cells/dose/tumor, twice a week for 4 weeks, effectively suppressed the growth of HCC827 tumors, resulting in a peak TGI of 70% on Day 20 and an end-of-study TGI of 49% ($P<0.001$).

Significant adverse reactions were observed for animals that received IV administrations of freshly prepared PD-L1 t-haNK cells (1E7 cells/dose). In contrast to freshly prepared PD-L1 t-haNK cells, cryopreserved cells (dosed at a lower level of 4E6 cells/dose) proved to be safe to the animals after IV administrations. PD-L1 t-haNK cells demonstrated remarkable efficacy in the two subcutaneous tumor models. Cryopreserved cells dosed at the lower 4E6 cells/dose level, also showed significant efficacy in suppressing tumor growth, and proved to be safe for the animals.

Of course, it should be recognized that for all nucleic acid sequences provided herein the corresponding encoded proteins are also expressly contemplated herein. Likewise, for all amino acid sequences, corresponding nucleic acids sequences are also contemplated herein (with any codon usage).

All patent applications, publications, references, and sequence accession numbers cited in the present specification are hereby incorporated by reference in their entirety.

Unless defined otherwise, all technical and scientific terms used herein have the same meaning as commonly understood by one of ordinary skill in the art to which this invention belongs.

In this specification and in the claims that follow, reference will be made to a number of terms that shall be defined to have the following meanings:

The terminology used herein is for the purpose of describing particular embodiments only and is not intended to be limiting of the invention. As used herein, the singular forms "a", "an" and "the" are intended to include the plural forms as well, unless the context clearly indicates otherwise.

It is understood that all numerical values described herein (e.g., pH, temperature, time, concentration, amounts, and molecular weight, including ranges) include normal variation in measurements encountered by one of ordinary skill in the art. Thus, numerical values described herein include variation of +/−0.1 to 10%, for example, +/−0.1%, 0.5%, 1%, 2%, 3%, 4%, 5%, 6%, 7%, 8%, 9%, or 10%. It is to be understood, although not always explicitly stated, that all numerical designations may be preceded by the term "about." Thus, the term about includes variation of +/−0.1 to 10%, for example, +/−0.1%, 0.5%, 1%, 2%, 3%, 4%, 5%, 6%, 7%, 8%, 9%, or 10% of the numerical value. It is also to be understood, although not always explicitly stated, that the reagents described herein are merely exemplary and that equivalents of such are known in the art.

As will be understood by one skilled in the art, for any and all purposes, particularly in terms of providing a written description, all ranges disclosed herein include the end points of the range, and include all values between the end points of the range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

It is also to be understood, although not always explicitly stated, that the reagents described herein are merely exemplary and that equivalents of such are known in the art.

"Optional" or "optionally" means that the subsequently described event or circumstance can or cannot occur, and that the description includes instances where the event or circumstance occurs and instances where it does not.

The term "comprising" is intended to mean that the compositions and methods include the recited elements, but not excluding others. "Consisting essentially of," when used to define compositions and methods, shall mean excluding other elements of any essential significance to the combination. For example, a composition consisting essentially of the elements as defined herein would not exclude other elements that do not materially affect the basic and novel characteristic(s) of the claimed invention. "Consisting of" shall mean excluding more than trace amount of other ingredients and substantial method steps recited. Embodiments defined by each of these transition terms are within the scope of this disclosure.

As used herein, "immunotherapy" refers to the use of NK-92 cells, modified or unmodified, naturally occurring or modified NK cell or T-cell, whether alone or in combination, and which are capable of inducing cytotoxicity when contacting a target cell.

As used herein, "natural killer (NK) cells" are cells of the immune system that kill target cells in the absence of a specific antigenic stimulus, and without restriction according to major histocompatibility complex (MHC) class. Target cells may be tumor cells or cells harboring a virus. NK cells are characterized by the presence of CD56 and the absence of CD3 surface markers.

The term "endogenous NK cells" is used to refer to NK cells derived from a donor (or the patient), as distinguished from the NK-92 cell line. Endogenous NK cells are generally heterogeneous populations of cells within which NK cells have been enriched. Endogenous NK cells may be intended for autologous or allogeneic treatment of a patient.

The term "NK-92" refers to natural killer cells derived from the highly potent unique cell line described in Gong et al. (1994), rights to which are owned by NantKwest (hereafter, "NK-92™ cells"). The immortal NK cell line was originally obtained from a patient having non-Hodgkin's lymphoma. Unless indicated otherwise, the term "NK-92™" is intended to refer to the original NK-92 cell lines as well as NK-92 cell lines that have been modified (e.g., by introduction of exogenous genes). NK-92™ cells and exemplary and non-limiting modifications thereof are described in U.S. Pat. Nos. 7,618,817; 8,034,332; 8,313,943; 9,181,322; 9,150,636; and published U.S. application Ser. No. 10/008,955, all of which are incorporated herein by reference in their entireties, and include wild type NK-92™, NK-92™-CD16, NK-92™-CD16-γ, NK-92™-CD16-ζ, NK-92™-CD16 (F176V), NK-92™MI, and NK-92™CI. NK-92 cells are known to persons of ordinary skill in the art, to whom such cells are readily available from NantKwest, Inc.

The term "aNK" refers to an unmodified natural killer cells derived from the highly potent unique cell line described in Gong et al. (1994), rights to which are owned by NantKwest (hereafter, "aNK™ cells"). The term "haNK" refers to natural killer cells derived from the highly potent unique cell line described in Gong et al. (1994), rights to which are owned by NantKwest, modified to express CD16 on the cell surface (hereafter, "CD16+ NK-92™ cells" or "haNK® cells"). In some embodiments, the CD16+ NK-92™ cells comprise a high affinity CD16 receptor on the cell surface. The term "taNK" refers to natural killer cells derived from the highly potent unique cell line described in Gong et al. (1994), rights to which are owned by NantKwest, modified to express a chimeric antigen receptor (hereafter, "CAR-modified NK-92™ cells" or "taNK® cells"). The term "t-haNK" refers to natural killer cells derived from the highly potent unique cell line described in Gong et al. (1994), rights to which are owned by NantkWest, modified to express CD 16 on the cell surface and to express a chimeric antigen receptor (hereafter, "CAR-modified CD16+ NK-92™ cells" or "t-haNK™ cells"). In some embodiments, the t-haNK™ cells express a high affinity CD16 receptor on the cell surface.

A "modified NK-92 cell" refers to an NK-92 cell that expresses an exogenous gene or protein, such as an Fc receptor, a CAR, a cytokine (such as IL-2 or IL-15), and/or a suicide gene. In some embodiments, the modified NK-92 cell comprises a vector that encodes for a transgene, such as an Fc receptor, a CAR, a cytokine (such as IL-2 or IL-15), and/or a suicide gene. In one embodiment, the modified NK-92 cell expresses at least one transgenic protein.

As used herein, "non-irradiated NK-92 cells" are NK-92 cells that have not been irradiated. Irradiation renders the cells incapable of growth and proliferation. It is envisioned that the NK-92 cells will be irradiated at the treatment facility or some other point prior to treatment of a patient, since the time between irradiation and infusion should be no longer than four hours in order to preserve optimal activity. Alternatively, NK-92 cells may be prevented from proliferating by another mechanism.

As used herein, "inactivation" of the NK-92 cells renders them incapable of growth. Inactivation may also relate to the death of the NK-92 cells. It is envisioned that the NK-92 cells may be inactivated after they have effectively purged an ex vivo sample of cells related to a pathology in a therapeutic application, or after they have resided within the body of a mammal a sufficient period of time to effectively kill many or all target cells residing within the body. Inactivation may be induced, by way of non-limiting example, by administering an inactivating agent to which the NK-92 cells are sensitive.

As used herein, the terms "cytotoxic" and "cytolytic," when used to describe the activity of effector cells such as NK-92 cells, are intended to be synonymous. In general, cytotoxic activity relates to killing of target cells by any of a variety of biological, biochemical, or biophysical mechanisms. Cytolysis refers more specifically to activity in which the effector lyses the plasma membrane of the target cell, thereby destroying its physical integrity. This results in the killing of the target cell. Without wishing to be bound by theory, it is believed that the cytotoxic effect of NK-92 cells is due to cytolysis.

The term "kill" with respect to a cell/cell population is directed to include any type of manipulation that will lead to the death of that cell/cell population.

The term "Fc receptor" refers to a protein found on the surface of certain cells (e.g., natural killer cells) that contribute to the protective functions of the immune cells by binding to part of an antibody known as the Fc region. Binding of the Fc region of an antibody to the Fc receptor (FcR) of a cell stimulates phagocytic or cytotoxic activity of a cell via antibody-mediated phagocytosis or antibody-dependent cell-mediated cytotoxicity (ADCC). FcRs are classified based on the type of antibody they recognize. For example, Fc-gamma receptors (FCγR) bind to the IgG class of antibodies. FCγRIII-A (also called CD16; SEQ ID NO:34) is a low affinity Fc receptor bind to IgG antibodies and activate ADCC. FCγRIII-A are typically found on NK cells. NK-92 cells do not express FCγRIII-A. Fc-epsilon receptors (FcεR) bind to the Fc region of IgE antibodies.

The term "chimeric antigen receptor" (CAR), as used herein, refers to an extracellular antigen-binding domain that is fused to an intracellular signaling domain. CARs can be expressed in T cells or NK cells to increase cytotoxicity. In general, the extracellular antigen-binding domain is a scFv that is specific for an antigen found on a cell of interest. A CAR-expressing NK-92 cell is targeted to cells expressing certain antigens on the cell surface, based on the specificity of the scFv domain. The scFv domain can be engineered to recognize any antigen, including tumor-specific antigens and virus-specific antigens. For example, CD19CAR recognizes CD19, a cell surface marker expressed by some cancers.

The term "tumor-specific antigen" as used herein refers to antigens that are present on a cancer or neoplastic cell but not detectable on a normal cell derived from the same tissue or lineage as the cancer cell. Tumor-specific antigens, as used herein, also refers to tumor-associated antigens, that is, antigens that are expressed at a higher level on a cancer cell as compared to a normal cell derived from the same tissue or lineage as the cancer cell.

The term "virus-specific antigen" as used herein refers to antigens that are present on a virus-infected cell but not detectable on a normal cell derived from the same tissue or lineage as the virus-infected cell. In one embodiment, a virus-specific antigen is a viral protein expressed on the surface of an infected cell.

The terms "polynucleotide", "nucleic acid" and "oligonucleotide" are used interchangeably and refer to a polymeric form of nucleotides of any length, either deoxyribonucleotides or ribonucleotides or analogs thereof. Polynucleotides can have any three-dimensional structure and may perform any function, known or unknown. The following are non-limiting examples of polynucleotides: a gene or gene fragment (for example, a probe, primer, EST or SAGE tag), exons, introns, messenger RNA (mRNA), transfer RNA, ribosomal RNA, ribozymes, cDNA, recombinant polynucleotides, branched polynucleotides, plasmids, vectors, isolated DNA of any sequence, isolated RNA of any sequence, nucleic acid probes and primers. A polynucleotide can comprise modified nucleotides, such as methylated nucleotides and nucleotide analogs. If present, modifications to the nucleotide structure can be imparted before or after assembly of the polynucleotide. The sequence of nucleotides can be interrupted by non-nucleotide components. A polynucleotide can be further modified after polymerization, such as by conjugation with a labeling component. The term also refers to both double- and single-stranded molecules. Unless otherwise specified or required, any embodiment of this invention that is a polynucleotide encompasses both the double-stranded form and each of two complementary single-stranded forms known or predicted to make up the double-stranded form.

A polynucleotide is composed of a specific sequence of four nucleotide bases: adenine (A); cytosine (C); guanine (G); thymine (T); and uracil (U) for thymine when the polynucleotide is RNA. Thus, the term "polynucleotide sequence" is the alphabetical representation of a polynucleotide molecule.

"Homology" or "identity" or "similarity" refers to sequence similarity between two peptides or between two nucleic acid molecules. Homology can be determined by comparing a position in each sequence which may be aligned for purposes of comparison. When a position in the compared sequence is occupied by the same base or amino acid, then the molecules are homologous at that position. A degree of homology between sequences is a function of the number of matching or homologous positions shared by the sequences.

As used herein, "percent identity" refers to sequence identity between two peptides or between two nucleic acid molecules. Percent identity can be determined by comparing a position in each sequence which may be aligned for purposes of comparison. When a position in the compared sequence is occupied by the same base or amino acid, then the molecules are identical at that position. Homologous nucleotide sequences include those sequences coding for naturally occurring allelic variants and mutations of the nucleotide sequences set forth herein. Homologous nucleotide sequences include nucleotide sequences encoding for a protein of a mammalian species other than humans. Homologous amino acid sequences include those amino acid sequences which contain conservative amino acid substitutions and which polypeptides have the same binding and/or activity. In some embodiments, a homologous amino acid sequence has no more than 15, nor more than 10, nor more than 5 or no more than 3 conservative amino acid substitutions. In some embodiments, a nucleotide or amino acid sequence has at least 60%, at least 65%, at least 70%, at least 80%, or at least 85% or greater percent identity to a sequence described herein. In some embodiments, a nucleotide or amino acid sequence has at least 90%, 91%, 92%, 93%, 94%, 95%, 96%, 97%, 98% or 99% identity to a sequence described herein. Percent identity can be determined by, for example, the Gap program (Wisconsin Sequence Analysis Package, Version 8 for UNIX, Genetics Computer Group, University Research Park, Madison Wis.), using default settings, which uses the algorithm of Smith and Waterman (Adv. Appl. Math., 1981, 2, 482-489). Algorithms suitable for determining percent sequence identity include the BLAST and BLAST 2.0 algorithms, which are described in Altschul et al. (Nuc. Acids Res. 25:3389-402, 1977), and Altschul et al. (J. Mol. Biol. 215:403-10, 1990), respectively. Software for performing BLAST analyses is publicly available through the National Center for Biotechnology Information (see the internet at ncbi.nlm.nih.gov). The BLAST algorithm parameters W, T, and X determine the sensitivity and speed of the alignment. The BLASTN program (for nucleotide sequences) uses as defaults a wordlength (W) of 11, an expectation (E) or 10, M=5, N=−4 and a comparison of both strands. For amino acid sequences, the BLASTP program uses as defaults a wordlength of 3, and expectation (E) of 10, and the BLOSUM62 scoring matrix (see Henikoff and Henikoff, Proc. Natl. Acad. Sci. USA 89:10915, 1989) alignments (B) of 50, expectation (E) of 10, M=5, N=−4.

In some embodiments, a nucleic acid sequence is codon optimized for expression in a particular species, for example, a mouse sequence can be codon optimized for expression in humans (expression of the protein encoded by the codon-optimized nucleic acid sequence). Thus, in some embodiments, a codon-optimized nucleic acid sequence has at least 60%, at least 65%, at least 70%, at least 80%, or at least 85% or greater percent identity to a nucleic acid sequence described herein. In some embodiments, a codon-optimized nucleic acid sequence acid sequence has at least 90%, 91%, 92%, 93%, 94%, 95%, 96%, 97%, 98% or 99% identity to a sequence described herein.

The term "express" refers to the production of a gene product (e.g., a protein). The term "transient" when referring to expression means a polynucleotide is not incorporated into the genome of the cell. The term "stable" when referring to expression means a polynucleotide is incorporated into the genome of the cell, or a positive selection marker (i.e., an exogenous gene expressed by the cell that confers a benefit under certain growth conditions) is utilized to maintain expression of the transgene.

The term "cytokine" or "cytokines" refers to the general class of biological molecules which affect cells of the immune system. Exemplary cytokines include but are not limited to interferons and interleukins (IL)—in particular IL-2, IL-12, IL-15, IL-18 and IL-21. In preferred embodiments, the cytokine is IL-2.

As used herein, the term "vector" refers to a non-chromosomal nucleic acid comprising an intact replicon such that the vector may be replicated when placed within a permissive cell, for example by a process of transformation. A vector may replicate in one cell type, such as bacteria, but have limited or no ability to replicate in another cell, such as mammalian cells. Vectors may be viral or non-viral. Exemplary non-viral vectors for delivering nucleic acid include naked DNA; DNA complexed with cationic lipids, alone or in combination with cationic polymers; anionic and cationic liposomes; DNA-protein complexes and particles comprising DNA condensed with cationic polymers such as heterogeneous polylysine, defined-length oligopeptides, and polyethylene imine, in some cases contained in liposomes; and the use of ternary complexes comprising a virus and polylysine-DNA. In one embodiment, the vector is a viral vector, e.g. adenovirus. Viral vectors are well known in the art.

As used herein, the term "targeted," when referring to protein expression, is intended to include, but is not limited to, directing proteins or polypeptides to appropriate destinations in the cell or outside of it. The targeting is typically achieved through signal peptides or targeting peptides, which are a stretch of amino acid residues in a polypeptide chain. These signal peptides can be located anywhere within a polypeptide sequence, but are often located on the N-terminus. Polypeptides can also be engineered to have a signal peptide on the C-terminus. Signal peptides can direct a polypeptide for extracellular section, location to plasma membrane, golgi, endosomes, endoplasmic reticulum, and other cellular compartments. For example, polypeptides with a particular amino acid sequence on their C-terminus (e.g., KDEL) are retained in the ER lumen or transported back the ER lumen.

As used herein, the term "target," when referring to targeting of a tumor, refers to the ability of NK-92 cells to recognize and kill a tumor cell (i.e., target cell). The term "targeted" in this context refers, for example, to the ability of a CAR expressed by the NK-92 cell to recognize and bind to a cell surface antigen expressed by the tumor.

As used herein, the term "transfect" refers to the insertion of nucleic acid into a cell. Transfection may be performed using any means that allows the nucleic acid to enter the cell. DNA and/or mRNA may be transfected into a cell. Preferably, a transfected cell expresses the gene product (i.e., protein) encoded by the nucleic acid.

The term "suicide gene" refers to a transgene that allows for the negative selection of cells expressing that transgene. A suicide gene is used as a safety system, allowing the cells expressing the gene to be killed by introduction of a selective agent. A number of suicide gene systems have been identified, including the herpes simplex virus thymidine kinase (TK) gene, the cytosine deaminase gene, the varicella-zoster virus thymidine kinase gene, the nitroreductase gene, the *Escherichia coli* gpt gene, and the *E. coli* Deo gene (see also, for example, Yazawa K, Fisher W E, Brunicardi F C: Current progress in suicide gene therapy for cancer. World J. Surg. 2002 July; 26 (7): 783-9). In one embodiment, the suicide gene is the thymidine kinase (TK) gene. The TK gene may be a wild-type or mutant TK gene (e.g., tk30, tk75, sr39tk). Cells expressing the TK protein can be killed using ganciclovir.

What is claimed is:

1. A genetically modified NK cell, comprising:
   a cytokine;
   a CD16; and
   a membrane bound chimeric antigen receptor (CAR) that comprises a FcεRIγ signaling domain having the amino acid sequence of SEQ ID NO:1; and
   wherein the CAR is
   a CD19-CAR having the amino acids 1-407 of SEQ ID NO:29,
   a PD-L1-CAR encoded by a nucleic acid sequence of SEQ ID NO:42, or
   a B7-H4-CAR encoded by a nucleic acid sequence of SEQ ID NO:45.

2. The genetically modified NK cell of claim 1, wherein the NK cell is an NK-92 cell.

3. The genetically modified NK cell of claim 1, wherein the cytokine is IL-2.

4. The genetically modified NK cell of claim 1, wherein the cytokine comprises an endoplasmic retention sequence.

5. The genetically modified NK cell of claim 1, wherein the CD16 is a high-affinity CD16 variant having the amino acid sequence of SEQ ID NO: 35 and having a 158V mutation.

6. The genetically modified NK cell of claim 1, wherein the genetically modified NK cell comprises a tricistronic nucleic acid sequence comprising a sequence encoding the cytokine, a sequence encoding the CD16, and a sequence encoding the CAR.

7. The genetically modified NK cell of claim 6, wherein the tricistronic nucleic acid sequence is integrated into the genome of the NK cell.

8. The genetically modified NK cell of claim 1, wherein the cytokine is IL-15.

* * * * *

SEQUENCE LISTING

<160> NUMBER OF SEQ ID NOS: 53

<210> SEQ ID NO 1
<211> LENGTH: 41
<212> TYPE: PRT
<213> ORGANISM: Artificial Sequence

```
<220> FEATURE:
<223> OTHER INFORMATION: FceRIgamma intracellular

<400> SEQUENCE: 1

Leu Lys Ile Gln Val Arg Lys Ala Ala Ile Thr Ser Tyr Glu Lys Ser
1               5                   10                  15

Asp Gly Val Tyr Thr Gly Leu Ser Thr Arg Asn Gln Glu Thr Tyr Glu
            20                  25                  30

Thr Leu Lys His Glu Lys Pro Pro Gln
        35                  40

<210> SEQ ID NO 2
<211> LENGTH: 123
<212> TYPE: DNA
<213> ORGANISM: Artificial Sequence
<220> FEATURE:
<223> OTHER INFORMATION: FceR1gamma for the Intracellular Signaling
      Domain

<400> SEQUENCE: 2
ctgaagatcc aggtccgaaa ggccgccatc accagctacg agaagtctga tggcgtgtac      60
accggcctga gcaccagaaa ccaggaaacc tacgagacac tgaagcacga agcccccc       120 cag                                                                   123

<210> SEQ ID NO 3
<211> LENGTH: 54
<212> TYPE: PRT
<213> ORGANISM: Artificial Sequence
<220> FEATURE:
<223> OTHER INFORMATION: CD8 Hinge

<400> SEQUENCE: 3

Phe Val Pro Val Phe Leu Pro Ala Lys Pro Thr Thr Thr Pro Ala Pro
1               5                   10                  15

Arg Pro Pro Thr Pro Ala Pro Thr Ile Ala Ser Gln Pro Leu Ser Leu
            20                  25                  30

Arg Pro Glu Ala Cys Arg Pro Ala Ala Gly Gly Ala Val His Thr Arg
        35                  40                  45

Gly Leu Asp Phe Ala Cys
    50

<210> SEQ ID NO 4
<211> LENGTH: 65
<212> TYPE: PRT
<213> ORGANISM: Artificial Sequence
<220> FEATURE:
<223> OTHER INFORMATION: CD8 Hinge

<400> SEQUENCE: 4

Ala Leu Ser Asn Ser Ile Met Tyr Phe Ser His Phe Val Pro Val Phe
1               5                   10                  15

Leu Pro Ala Lys Pro Thr Thr Thr Pro Ala Pro Arg Pro Pro Thr Pro
            20                  25                  30

Ala Pro Thr Ile Ala Ser Gln Pro Leu Ser Leu Arg Pro Glu Ala Cys
        35                  40                  45

Arg Pro Ala Ala Gly Gly Ala Val His Thr Arg Gly Leu Asp Phe Ala
    50                  55                  60

Cys
65
```

<210> SEQ ID NO 5
<211> LENGTH: 195
<212> TYPE: DNA
<213> ORGANISM: Artificial Sequence
<220> FEATURE:
<223> OTHER INFORMATION: CD8a Hinge DNA

<400> SEQUENCE: 5

```
gcgctgagca acagcatcat gtacttcagc cacttcgtgc ctgtgttcct gcctgccaag      60
cctacaacaa caccagcccc tagacctcca acccctgccc ctacaattgc ctctcagcct     120
ctgtctctga ggcccgaagc ttgtagacct gctgctggcg gagctgtgca caccagagga     180
ctggatttcg cctgc                                                      195
```

<210> SEQ ID NO 6
<211> LENGTH: 28
<212> TYPE: PRT
<213> ORGANISM: Artificial Sequence
<220> FEATURE:
<223> OTHER INFORMATION: CD28 Transmembrane

<400> SEQUENCE: 6

Phe Trp Val Leu Val Val Val Gly Gly Val Leu Ala Cys Tyr Ser Leu
1               5                   10                  15

Leu Val Thr Val Ala Phe Ile Ile Phe Trp Val Arg
            20                  25

<210> SEQ ID NO 7
<211> LENGTH: 84
<212> TYPE: DNA
<213> ORGANISM: Artificial Sequence
<220> FEATURE:
<223> OTHER INFORMATION: CD28 for the Transmembrane DNA

<400> SEQUENCE: 7

```
ttttgggtgc tggtggtcgt gggcggagtg ctggcttgtt attctctgct ggtcaccgtg      60
gccttcatca tcttttgggt ccga                                             84
```

<210> SEQ ID NO 8
<211> LENGTH: 134
<212> TYPE: PRT
<213> ORGANISM: Artificial Sequence
<220> FEATURE:
<223> OTHER INFORMATION: CD8 hinge region, CD28 transmembrane, and
    FceRIgamma signaling domain

<400> SEQUENCE: 8

Ala Leu Ser Asn Ser Ile Met Tyr Phe Ser His Phe Val Pro Val Phe
1               5                   10                  15

Leu Pro Ala Lys Pro Thr Thr Thr Pro Ala Pro Arg Pro Pro Thr Pro
            20                  25                  30

Ala Pro Thr Ile Ala Ser Gln Pro Leu Ser Leu Arg Pro Glu Ala Cys
        35                  40                  45

Arg Pro Ala Ala Gly Gly Ala Val His Thr Arg Gly Leu Asp Phe Ala
    50                  55                  60

Cys Phe Trp Val Leu Val Val Val Gly Gly Val Leu Ala Cys Tyr Ser
65                  70                  75                  80

Leu Leu Val Thr Val Ala Phe Ile Ile Phe Trp Val Arg Leu Lys Ile
                85                  90                  95

Gln Val Arg Lys Ala Ala Ile Thr Ser Tyr Glu Lys Ser Asp Gly Val
            100                 105                 110

Tyr Thr Gly Leu Ser Thr Arg Asn Gln Glu Thr Tyr Glu Thr Leu Lys
            115                 120                 125

His Glu Lys Pro Pro Gln
    130

<210> SEQ ID NO 9
<211> LENGTH: 402
<212> TYPE: DNA
<213> ORGANISM: Artificial Sequence
<220> FEATURE:
<223> OTHER INFORMATION: CD8 hinge, CD28 transmembrane, and FceRIgamma
      signaling domain DNA

<400> SEQUENCE: 9
gcgctgagca acagcatcat gtacttcagc cacttcgtgc ctgtgttcct gcctgccaag      60
cctacaacaa caccagcccc tagacctcca acccctgccc ctacaattgc ctctcagcct    120
ctgtctctga ggcccgaagc ttgtagacct gctgctggcg agctgtgca ccagagga      180
ctggatttcg cctgcttttg ggtgctggtg gtcgtgggcg gagtgctggc ttgttattct    240
ctgctggtca ccgtggcctt catcatcttt tgggtccgac tgaagatcca ggtccgaaag    300
gccgccatca ccagctacga gaagtctgat ggcgtgtaca ccggcctgag caccagaaac    360
caggaaaccct acgagacact gaagcacgag aagccccccc ag                      402

<210> SEQ ID NO 10
<211> LENGTH: 398
<212> TYPE: PRT
<213> ORGANISM: Artificial Sequence
<220> FEATURE:
<223> OTHER INFORMATION: CD19CAR_ FceRIgamma

<400> SEQUENCE: 10

Met Asp Trp Ile Trp Arg Ile Leu Phe Leu Val Gly Ala Ala Thr Gly
1               5                  10                  15

Ala His Ser Ala Gln Pro Ala Asp Ile Gln Met Thr Gln Thr Thr Ser
            20                  25                  30

Ser Leu Ser Ala Ser Leu Gly Asp Arg Val Thr Ile Ser Cys Arg Ala
        35                  40                  45

Ser Gln Asp Ile Ser Lys Tyr Leu Asn Trp Tyr Gln Gln Lys Pro Asp
    50                  55                  60

Gly Thr Val Lys Leu Leu Ile Tyr His Thr Ser Arg Leu His Ser Gly
65                  70                  75                  80

Val Pro Ser Arg Phe Ser Gly Ser Gly Ser Gly Thr Asp Tyr Ser Leu
                85                  90                  95

Thr Ile Ser Asn Leu Glu Gln Glu Asp Ile Ala Thr Tyr Phe Cys Gln
            100                 105                 110

Gln Gly Asn Thr Leu Pro Tyr Thr Phe Gly Gly Gly Thr Lys Leu Glu
        115                 120                 125

Leu Lys Arg Gly Gly Gly Gly Ser Gly Gly Gly Gly Ser Gly Gly Gly
    130                 135                 140

Gly Ser Gly Gly Gly Gly Ser Glu Val Gln Leu Gln Gln Ser Gly Pro
145                 150                 155                 160

Gly Leu Val Ala Pro Ser Gln Ser Leu Ser Val Thr Cys Thr Val Ser
                165                 170                 175

Gly Val Ser Leu Pro Asp Tyr Gly Val Ser Trp Ile Arg Gln Pro Pro
            180                 185                 190

Arg Lys Gly Leu Glu Trp Leu Gly Val Ile Trp Gly Ser Glu Thr Thr
        195                 200                 205

```
Tyr Tyr Asn Ser Ala Leu Lys Ser Arg Leu Thr Ile Ile Lys Asp Asn
            210                 215                 220

Ser Lys Ser Gln Val Phe Leu Lys Met Asn Ser Leu Gln Thr Asp Asp
225                 230                 235                 240

Thr Ala Ile Tyr Tyr Cys Ala Lys His Tyr Tyr Gly Gly Ser Tyr
                245                 250                 255

Ala Met Asp Tyr Trp Gly Gln Gly Thr Thr Val Thr Val Ser Ser Ala
            260                 265                 270

Ala Ala Leu Phe Val Pro Val Phe Leu Pro Ala Lys Pro Thr Thr Thr
                275                 280                 285

Pro Ala Pro Arg Pro Pro Thr Pro Ala Pro Thr Ile Ala Ser Gln Pro
            290                 295                 300

Leu Ser Leu Arg Pro Glu Ala Cys Arg Pro Ala Ala Gly Gly Ala Val
305                 310                 315                 320

His Thr Arg Gly Leu Asp Phe Ala Cys Phe Trp Val Leu Val Val Val
                325                 330                 335

Gly Gly Val Leu Ala Cys Tyr Ser Leu Leu Val Thr Val Ala Phe Ile
                340                 345                 350

Ile Phe Trp Val Arg Leu Lys Ile Gln Val Arg Lys Ala Ala Ile Thr
                355                 360                 365

Ser Tyr Glu Lys Ser Asp Gly Val Tyr Thr Gly Leu Ser Thr Arg Asn
370                 375                 380

Gln Glu Thr Tyr Glu Thr Leu Lys His Glu Lys Pro Pro Gln
385                 390                 395

<210> SEQ ID NO 11
<211> LENGTH: 255
<212> TYPE: PRT
<213> ORGANISM: Artificial Sequence
<220> FEATURE:
<223> OTHER INFORMATION: Anti-CD19 scFv

<400> SEQUENCE: 11

Ala Gln Pro Ala Asp Ile Gln Met Thr Gln Thr Thr Ser Ser Leu Ser
1               5                   10                  15

Ala Ser Leu Gly Asp Arg Val Thr Ile Ser Cys Arg Ala Ser Gln Asp
            20                  25                  30

Ile Ser Lys Tyr Leu Asn Trp Tyr Gln Gln Lys Pro Asp Gly Thr Val
        35                  40                  45

Lys Leu Leu Ile Tyr His Thr Ser Arg Leu His Ser Gly Val Pro Ser
50                  55                  60

Arg Phe Ser Gly Ser Gly Ser Gly Thr Asp Tyr Ser Leu Thr Ile Ser
65                  70                  75                  80

Asn Leu Glu Gln Glu Asp Ile Ala Thr Tyr Phe Cys Gln Gln Gly Asn
                85                  90                  95

Thr Leu Pro Tyr Thr Phe Gly Gly Gly Thr Lys Leu Glu Leu Lys Arg
            100                 105                 110

Gly Gly Gly Gly Ser Gly Gly Gly Gly Ser Gly Gly Gly Gly Ser Gly
        115                 120                 125

Gly Gly Gly Ser Glu Val Gln Leu Gln Gln Ser Gly Pro Gly Leu Val
    130                 135                 140

Ala Pro Ser Gln Ser Leu Ser Val Thr Cys Thr Val Ser Gly Val Ser
145                 150                 155                 160

Leu Pro Asp Tyr Gly Val Ser Trp Ile Arg Gln Pro Pro Arg Lys Gly
                165                 170                 175
```

```
Leu Glu Trp Leu Gly Val Ile Trp Gly Ser Glu Thr Thr Tyr Tyr Asn
            180                 185                 190

Ser Ala Leu Lys Ser Arg Leu Thr Ile Ile Lys Asp Asn Ser Lys Ser
        195                 200                 205

Gln Val Phe Leu Lys Met Asn Ser Leu Gln Thr Asp Asp Thr Ala Ile
    210                 215                 220

Tyr Tyr Cys Ala Lys His Tyr Tyr Gly Gly Ser Tyr Ala Met Asp
225             230                 235                 240

Tyr Trp Gly Gln Gly Thr Val Thr Val Ser Ser Ala Ala Ala
                245                 250                 255

<210> SEQ ID NO 12
<211> LENGTH: 1197
<212> TYPE: DNA
<213> ORGANISM: Artificial Sequence
<220> FEATURE:
<223> OTHER INFORMATION: CD19CAR_ FceRIgamma DNA

<400> SEQUENCE: 12
```

| | | |
|---|---|---|
| atggactgga tctggcggat tctgtttctc gtgggagctg ccacaggcgc tcattctgct | 60 |
| cagcctgccg atatccagat gacccagaca acaagcagcc tgagcgcctc tctgggcgat | 120 |
| agagtgacaa tcagctgcag agccagccag gacatcagca agtacctgaa ctggtatcag | 180 |
| cagaaacccg acggcaccgt gaagctgctg atctaccaca caagcagact gcacagcggc | 240 |
| gtgccaagca gattttctgg cagcggcagc ggcaccgatt acagcctgac catcagcaac | 300 |
| ctggaacagg aagatatcgc tacctacttc tgtcagcagg caacaccct gccttacacc | 360 |
| tttggcggcg gaacaaagct ggaactgaaa agaggcggcg gaggaagcgg aggcggagga | 420 |
| tctgggggcg gaggctctgg cggaggggga tctgaagtgc agctgcagca gtctggacct | 480 |
| ggactggtgg ctccttctca gtccctgtct gtgacctgta cagtgtctgg cgtgtccctg | 540 |
| cctgattacg gcgtgtcctg gatcagacag cctcccagaa aaggcctgga atggctggga | 600 |
| gtgatctggg gcagcgagac aacctactac aacagcgccc tgaagtcccg gctgaccatc | 660 |
| atcaaggaca cagcaagag ccaggtgttc ctgaagatga cagcctgca gaccgacgac | 720 |
| accgccatct actactgcgc caagcactac tactacggcg gcagctacgc catggattat | 780 |
| tggggccagg gcaccaccgt gacagtgtca tctgctgctg ctctgttcgt gcctgtgttc | 840 |
| ctgcctgcca agcctacaac aacaccagcc cctagacctc aacccctgc ccctacaatt | 900 |
| gcctctcagc ctctgtctct gaggcccgaa gcttgtagac tgctgctgg cggagctgtg | 960 |
| cacaccagag gactggattt cgcctgcttt tgggtgctgg tggtcgtggg cggagtgctg | 1020 |
| gcttgttatt ctctgctggt caccgtggcc ttcatcatct tttgggtccg actgaagatc | 1080 |
| caggtccgaa aggccgccat caccagctac gagaagtctg atggcgtgta caccggcctg | 1140 |
| agcaccagaa accaggaaac ctacgagaca ctgaagcacg agaagccccc ccagtaa     | 1197 |

<210> SEQ ID NO 13
<211> LENGTH: 41
<212> TYPE: PRT
<213> ORGANISM: Artificial Sequence
<220> FEATURE:
<223> OTHER INFORMATION: CD28 signaling domain

<400> SEQUENCE: 13

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
        35                  40

<210> SEQ ID NO 14
<211> LENGTH: 42
<212> TYPE: PRT
<213> ORGANISM: Artificial Sequence
<220> FEATURE:
<223> OTHER INFORMATION: 4-1BB signaling domain

<400> SEQUENCE: 14

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40

<210> SEQ ID NO 15
<211> LENGTH: 113
<212> TYPE: PRT
<213> ORGANISM: Artificial Sequence
<220> FEATURE:
<223> OTHER INFORMATION: CD3 zeta signaling domain

<400> SEQUENCE: 15

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Gln Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
            100                 105                 110

Arg

<210> SEQ ID NO 16
<211> LENGTH: 1410
<212> TYPE: DNA
<213> ORGANISM: Artificial Sequence
<220> FEATURE:
<223> OTHER INFORMATION: CD19CAR_CD3z

<400> SEQUENCE: 16
atggactgga tctggcggat cctgtttctc gtgggagctg ccacaggcgc tcattctgct    60
cagcctgccg atatccagat gacccagaca caagcagcc tgagcgcctc tctgggcgat   120
agagtgacaa tcagctgcag agccagccag gacatcagca gtacctgaa ctggtatcag   180 cagaaacccg acggcaccgt gaagctgctg atctaccaca caagcagact gcacagcggc   240
gtgccaagca gattttctgg cagcggcagc ggcaccgatt acagcctgac catcagcaac   300
ctggaacagg aagatatcgc tacctacttc tgtcagcaag caacaccct gccttacacc   360

```
tttggcggcg gaacaaagct ggaactgaaa agaggcggcg gaggaagcgg aggcggagga      420 tctggggcg gaggctctgg cggaggggga tctgaagtgc agctgcagca gtctggacct      480
ggactggtgg ctccttctca gtccctgtct gtgacctgta cagtgtctgg cgtgtccctg      540
cctgattacg gcgtgtcctg gatcagacag cctcccagaa aaggcctgga atggctggga      600
gtgatctggg gcagcgagac aacctactac aacagcgccc tgaagtcccg gctgaccatc      660
atcaaggaca acagcaagag ccaggtgttc ctgaagatga acagcctgca gaccgacgac      720
accgccatct actactgcgc caagcactac tactacggcg gcagctacgc catggattat      780
tggggccagg gcaccaccgt gacagtgtca tctgctgctg ctctgttcgt gcctgtgttc      840
ctgcctgcca agcctacaac aacaccagcc ctagacctc caaccctgc ccctacaatt       900 gcctctcagc ctctgtctct gaggcccgaa gcttgtagac ctgctgctgg cggagctgtg      960
cacaccagag gactggattt cgcctgcttt tgggtgctgg tggtcgtggg cggagtgctg     1020
gcttgttatt ctctgctggt caccgtggcc ttcatcatct tttgggtccg agtgaagttc     1080
agcagatccg ccgatgcccc tgcttaccag cagggccaga atcagctgta caacgagctg     1140
aacctgggca gacgggaaga gtacgacgtg ctggataaga aagaggcag agatcccgag      1200 atgggcggca agccccagag aagaaagaat ccccaggaag gcctgtataa cgaactgcag     1260
aaagacaaga tggccgaggc ctacagcgag atcggcatga agggcgagag aagaagaggc     1320
aagggccacg atggactgta ccagggactg agcacagcca ccaaggatac ctacgatgcc     1380
ctgcacatgc aggccctgcc tccaagataa                                     1410
```

<210> SEQ ID NO 17
<211> LENGTH: 1533
<212> TYPE: DNA
<213> ORGANISM: Artificial Sequence
<220> FEATURE:
<223> OTHER INFORMATION: CD19CAR_CD28/CD3z

<400> SEQUENCE: 17

```
atggactgga tctggcggat cctgtttctc gtgggagctg ccacaggcgc tcattctgct       60
cagcctgccg atatccagat gacccagaca acaagcagcc tgagcgcctc tctgggcgat      120
agagtgacaa tcagctgcag agccagccag gacatcagca gtacctgaa ctggtatcag       180 cagaaacccg acggcaccgt gaagctgctg atctaccaca caagcagact gcacagcggc      240
gtgccaagca gattttctgg cagcggcagc ggcaccgatt acagcctgac catcagcaac      300
ctggaacagg aagatatcgc tacctacttc tgtcagcagg gcaacaccct gccttacacc      360
tttggcggcg aacaaagct ggaactgaaa agaggcggcg gaggaagcgg aggcggagga      420 tctggggcg gaggctctgg cggaggggga tctgaagtgc agctgcagca gtctggacct      480
ggactggtgg ctccttctca gtccctgtct gtgacctgta cagtgtctgg cgtgtccctg      540
cctgattacg gcgtgtcctg gatcagacag cctcccagaa aaggcctgga atggctggga      600
gtgatctggg gcagcgagac aacctactac aacagcgccc tgaagtcccg gctgaccatc      660
atcaaggaca acagcaagag ccaggtgttc ctgaagatga acagcctgca gaccgacgac      720
accgccatct actactgcgc caagcactac tactacggcg gcagctacgc catggattat      780
tggggccagg gcaccaccgt gacagtgtca tctgctgctg ctctgttcgt gcctgtgttc      840
ctgcctgcca agcctacaac aacaccagcc ctagacctc caaccctgc ccctacaatt       900 gcctctcagc ctctgtctct gaggcccgaa gcttgtagac ctgctgctgg cggagctgtg      960
```

```
cacaccagag gactggattt cgcctgcttt tgggtgctgg tggtcgtggg cggagtgctg   1020
gcttgttatt ctctgctggt caccgtggcc ttcatcatct tttgggtccg aagcaagcgg   1080
agcaggctgc tgcacagcga ctacatgaac atgacccta gaaggcctgg ccccaccaga    1140
aagcactatc agccttacgc ccctcccaga gacttcgccg cctacagatc cagagtgaag   1200
ttcagcagat ctgccgacgc ccctgcttac cagcagggcc agaatcagct gtacaacgag   1260
ctgaacctgg gcagacggga agagtacgac gtgctggata agagaagagg cagagatccc   1320
gagatgggcg gcaagcccca gagaagaaag aatccccagg aaggcctgta taacgaactg   1380
cagaaagaca gatggccga ggcctacagc gagatcggca tgaagggcga gagaagaaga    1440
ggcaagggcc acgatggact gtaccaggga ctgagcacag ccaccaagga tacctacgat   1500
gccctgcaca tgcaggccct gcctccaaga taa                                1533
```

<210> SEQ ID NO 18
<211> LENGTH: 1536
<212> TYPE: DNA
<213> ORGANISM: Artificial Sequence
<220> FEATURE:
<223> OTHER INFORMATION: CD19CAR_4-1BB/CD3z

<400> SEQUENCE: 18

```
atggactgga tctggcgat cctgtttctc gtgggagctg ccacaggcgc tcattctgct     60
cagcctgccg atatccagat gacccagaca acaagcagcc tgagcgcctc tctgggcgat   120
agagtgacaa tcagctgcag agccagccag gacatcagca gtacctgaa ctggtatcag    180 cagaaacccg acggcaccgt gaagctgctg atctaccaca caagcagact gcacagcggc   240
gtgccaagca gatttttctgg cagcggcagc ggcaccgatt acagcctgac catcagcaac   300
ctggaacagg aagatatcgc tacctactc tgtcagcagg gcaacaccct gccttacacc    360
tttggcggcg gaacaaagct ggaactgaaa agaggcggcg gaggaagcgg aggcggagga   420 tctggggggcg gaggctctgg cggaggggga tctgaagtgc agctgcagca gtctggacct   480
ggactggtgg ctccttctca gtccctgtct gtgacctgta cagtgtctgg cgtgtccctg   540
cctgattacg gcgtgtcctg gatcagacag cctcccagaa aggcctgga atggctggga   600 gtgatctggg gcagcgagac aacctactac aacagcgccc tgaagtcccg gctgaccatc   660
atcaaggaca cagcaagag ccaggtgttc ctgaagatga acagcctgca gaccgacgac   720
accgccatct actactgcgc caagcactac tactacggcg gcagctacgc catggattat   780
tggggccagg gcaccaccgt gacagtgtca tctgctgctg ctctgttcgt gcctgtgttc   840
ctgcctgcca agcctacaac aacaccagcc ctagacctc aaccctgc cctacaatt       900 gcctctcagc tctgtctct gaggcccgaa gcttgtagac ctgctgctgg cggagctgtg   960
cacaccagag gactggattt cgcctgcttt tgggtgctgg tggtcgtggg cggagtgctg   1020
gcttgttatt ctctgctggt caccgtggcc ttcatcatct tttgggtcaa gcggggcaga   1080
aagaagctgc tgtacatctt caagcagccc ttcatgaggc ccgtgcagac cacacaggaa   1140
gaggacggct gcagctgtag attccctgag gaagaagaag gcggctgcga gctgagagtg   1200
aagtttagca gatctgccga cgcccctgcc taccagcagg gacagaatca gctgtacaac   1260
gagctgaacc tgggcagacg ggaagagtac gacgtgctgg ataagagaag gcagagat    1320 cccgagatgg gcggcaagcc ccagagaaga aagaatcccc aggaaggcct gtataacgaa   1380
ctgcagaaac acaagatggc cgaggcctac agcgagatcg gcatgaaggg cgagagaaga   1440
agaggcaagg gccacgatgg actgtaccag ggactgagca cagccaccaa ggatacctac   1500
```

```
gatgccctgc acatgcaggc cctgcctcca agataa                            1536
```

<210> SEQ ID NO 19
<211> LENGTH: 1659
<212> TYPE: DNA
<213> ORGANISM: Artificial Sequence
<220> FEATURE:
<223> OTHER INFORMATION: CD19CAR_CD28/4-1BB/CD3z

<400> SEQUENCE: 19

```
atggactgga tctggcggat cctgtttctc gtgggagctg ccacaggcgc tcattctgct     60
cagcctgccg atatccagat gacccagaca acaagcagcc tgagcgcctc tctgggcgat    120
agagtgacaa tcagctgcag agccagccag gacatcagca gtacctgaa ctggtatcag    180
cagaaacccg acggcaccgt gaagctgctg atctaccaca aagcagact gcacagcggc    240
gtgccaagca gattttctgg cagcggcagc ggcaccgatt acagcctgac catcagcaac    300
ctggaacagg aagatatcgc tacctacttc tgtcagcagg gcaacaccct gccttacacc    360
tttggcggcg gaacaaagct ggaactgaaa agaggcggcg gaggaagcgg aggcggagga    420
tctggggcg gaggctctgg cggagggga tctgaagtgc agctgcagca gtctggacct    480
ggactggtgg ctccttctca gtccctgtct gtgacctgta cagtgtctgg cgtgtccctg    540
cctgattacg gcgtgtcctg gatcagacag cctcccagaa aggcctgga atggctggga    600
gtgatctggg gcagcgagac aacctactac aacagcgccc tgaagtcccg gctgaccatc    660
atcaaggaca cagcaagag ccaggtgttc ctgaagatga cagcctgca gaccgacgac    720
accgccatct actactgcgc caagcactac tactacggcg gcagctacgc catggattat    780
tggggccagg gcaccaccgt gacagtgtca tctgctgctg ctctgttcgt gcctgtgttc    840
ctgcctgcca gcctacaac aacaccagcc ctagacctc aaccctgc cctacaatt    900
gcctctcagc ctctgtctct gaggcccgaa gcttgtagac ctgctgctgg cggagctgtg    960
cacaccagag gactggattt cgcctgcttt tgggtgctgg tggtcgtggg cggagtgctg   1020
gcttgttatt ctctgctggt caccgtggcc ttcatcatct tttggtccg aagcaagcgg   1080
agcaggctgc tgcacagcga ctacatgaac atgaccccta aaggcctgg ccccaccaga   1140
aagcactatc agccttacgc ccctcccaga gacttcgccg cctatagatc caagcggggc   1200
agaaagaagc tgctgtacat cttcaagcag cccttcatga ggcccgtgca gaccacacag   1260
gaagaggacg gctgcagctg tagattccct gaggaagaag aaggcggctg cgagctgaga   1320
gtgaagttta gcagatctgc cgacgcccct gcctaccagc agggacagaa tcagctgtac   1380
aacgagctga acctgggcag acgggaagag tacgacgtgc tggataagag aagaggcaga   1440
gatcccgaga tgggcggcaa gccccagaga agaaagaatc cccaggaagg cctgtataac   1500
gaactgcaga aagacaagat ggccgaggcc tacagcgaga tcggcatgaa gggcgagaga   1560
agaagaggca agggccacga tggactgtac cagggactga gcacagccac caaggatacc   1620
tacgatgccc tgcacatgca ggccctgcct ccaagataa                           1659
```

<210> SEQ ID NO 20
<211> LENGTH: 1659
<212> TYPE: DNA
<213> ORGANISM: Artificial Sequence
<220> FEATURE:
<223> OTHER INFORMATION: CD19CAR_4-1BB/CD3z/CD28

<400> SEQUENCE: 20

```
atggactgga tctggcggat cctgtttctc gtgggagctg ccacaggcgc tcattctgct    60
cagcctgccg atatccagat gacccagaca caagcagcc tgagcgcctc tctgggcgat   120
agagtgacaa tcagctgcag agccagccag gacatcagca agtacctgaa ctggtatcag   180
cagaaacccg acggcaccgt gaagctgctg atctaccaca caagcagact gcacagcggc   240
gtgccaagca gattttctgg cagcggcagc ggcaccgatt acagcctgac catcagcaac   300
ctggaacagg aagatatcgc tacctacttc tgtcagcagg caacacccct gccttacacc   360
tttggcggcg gaacaaagct ggaactgaaa agaggcggcg gaggaagcgg aggcggagga   420
tctgggggcg gaggctctgg cggaggggga tctgaagtgc agctgcagca gtctggacct   480
ggactggtgg ctccttctca gtccctgtct gtgacctgta cagtgtctgg cgtgtccctg   540
cctgattacg gcgtgtcctg gatcagacag cctcccagaa aaggcctgga atggctggga   600
gtgatctggg gcagcgagac aacctactac aacagcgccc tgaagtcccg gctgaccatc   660
atcaaggaca cagcaagag ccaggtgttc ctgaagatga cagcctgca gaccgacgac   720 accgccatct actactgcgc caagcactac tactacggcg gcagctacgc catggattat   780
tggggccagg gcaccaccgt gacagtgtca tctgctgctg ctctgttcgt gcctgtgttc   840
ctgcctgcca agcctacaac aacaccagcc ctagacctc aacccctgc ccctacaatt   900 gcctctcagc ctctgtctct gaggcccgaa gcttgtagac ctgctgctgg cggagctgtg   960
cacaccagag actggatttt cgcctgcttt tgggtgctgg tggtcgtggg cggagtgctg  1020
gcttgttatt ctctgctggt caccgtggcc ttcatcatct tttgggtcaa gcggggcaga  1080
aagaagctgc tgtacatctt caagcagccc ttcatgaggc ccgtgcagac cacacaggaa  1140
gaggacggct gcagctgtag attccctgag gaagaagaag gcggctgcga gctgagagtg  1200
aagtttagca gatctgccga cgcccctgcc taccagcagg gacagaatca gctgtacaac  1260
gagctgaacc tgggcagacg ggaagagtac gacgtgctgg ataagagaag aggcagagat  1320
cccgagatgg gcggcaagcc ccagagaaga aagaatcccc aggaaggcct gtataacgaa  1380
ctgcagaaag acaagatggc cgaggcctac agcgagatcg gcatgaaggg cgagagaaga  1440
agaggcaagg ccacgatgg actgtaccag ggactgagca cagccaccaa ggataccctac  1500 gatgccctgc acatgcaggc cctgcctcca agaagaagca agagatctag actgctgcac  1560
agcgactaca tgaacatgac ccctagaagg cctggcccca ccagaaagca ctatcagcct  1620 tacgccccctc ccagagactt cgccgcctac agatcttga                        1659
```

<210> SEQ ID NO 21  
<211> LENGTH: 153  
<212> TYPE: PRT  
<213> ORGANISM: Artificial Sequence  
<220> FEATURE:  
<223> OTHER INFORMATION: Wild-Type IL-2

<400> SEQUENCE: 21

```
Met Tyr Arg Met Gln Leu Leu Ser Cys Ile Ala Leu Ser Leu Ala Leu
1               5                   10                  15

Val Thr Asn Ser Ala Pro Thr Ser Ser Ser Thr Lys Lys Thr Gln Leu
            20                  25                  30

Gln Leu Glu His Leu Leu Leu Asp Leu Gln Met Ile Leu Asn Gly Ile
        35                  40                  45

Asn Asn Tyr Lys Asn Pro Lys Leu Thr Arg Met Leu Thr Phe Lys Phe
    50                  55                  60

Tyr Met Pro Lys Lys Ala Thr Glu Leu Lys His Leu Gln Cys Leu Glu
```

```
                65                  70                  75                  80
Glu Glu Leu Lys Pro Leu Glu Glu Val Leu Asn Leu Ala Gln Ser Lys
                    85                  90                  95
Asn Phe His Leu Arg Pro Arg Asp Leu Ile Ser Asn Ile Asn Val Ile
                100                 105                 110
Val Leu Glu Leu Lys Gly Ser Glu Thr Thr Phe Met Cys Glu Tyr Ala
                115                 120                 125
Asp Glu Thr Ala Thr Ile Val Glu Phe Leu Asn Arg Trp Ile Thr Phe
            130                 135                 140
Cys Gln Ser Ile Ile Ser Thr Leu Thr
145                 150

<210> SEQ ID NO 22
<211> LENGTH: 160
<212> TYPE: PRT
<213> ORGANISM: Artificial Sequence
<220> FEATURE:
<223> OTHER INFORMATION: IL-2-ER

<400> SEQUENCE: 22

Met Tyr Arg Met Gln Leu Leu Ser Cys Ile Ala Leu Ser Leu Ala Leu
1               5                   10                  15
Val Thr Asn Ser Ala Pro Thr Ser Ser Ser Thr Lys Lys Thr Gln Leu
                20                  25                  30
Gln Leu Glu His Leu Leu Leu Asp Leu Gln Met Ile Leu Asn Gly Ile
            35                  40                  45
Asn Asn Tyr Lys Asn Pro Lys Leu Thr Arg Met Leu Thr Phe Lys Phe
        50                  55                  60
Tyr Met Pro Lys Lys Ala Thr Glu Leu Lys His Leu Gln Cys Leu Glu
65                  70                  75                  80
Glu Glu Leu Lys Pro Leu Glu Glu Val Leu Asn Leu Ala Gln Ser Lys
                    85                  90                  95
Asn Phe His Leu Arg Pro Arg Asp Leu Ile Ser Asn Ile Asn Val Ile
                100                 105                 110
Val Leu Glu Leu Lys Gly Ser Glu Thr Thr Phe Met Cys Glu Tyr Ala
                115                 120                 125
Asp Glu Thr Ala Thr Ile Val Glu Phe Leu Asn Arg Trp Ile Thr Phe
            130                 135                 140
Cys Gln Ser Ile Ile Ser Thr Leu Thr Gly Ser Lys Asp Glu Leu
145                 150                 155                 160

<210> SEQ ID NO 23
<211> LENGTH: 220
<212> TYPE: PRT
<213> ORGANISM: Artificial Sequence
<220> FEATURE:
<223> OTHER INFORMATION: NP_006130.1 CD28 Human

<400> SEQUENCE: 23

Met Leu Arg Leu Leu Leu Ala Leu Asn Leu Phe Pro Ser Ile Gln Val
1               5                   10                  15
Thr Gly Asn Lys Ile Leu Val Lys Gln Ser Pro Met Leu Val Ala Tyr
                20                  25                  30
Asp Asn Ala Val Asn Leu Ser Cys Lys Tyr Ser Tyr Asn Leu Phe Ser
            35                  40                  45
Arg Glu Phe Arg Ala Ser Leu His Lys Gly Leu Asp Ser Ala Val Glu
        50                  55                  60
```

Val Cys Val Val Tyr Gly Asn Tyr Ser Gln Gln Leu Gln Val Tyr Ser
 65                  70                  75                  80

Lys Thr Gly Phe Asn Cys Asp Gly Lys Leu Gly Asn Glu Ser Val Thr
             85                  90                  95

Phe Tyr Leu Gln Asn Leu Tyr Val Asn Gln Thr Asp Ile Tyr Phe Cys
            100                 105                 110

Lys Ile Glu Val Met Tyr Pro Pro Pro Tyr Leu Asp Asn Glu Lys Ser
            115                 120                 125

Asn Gly Thr Ile Ile His Val Lys Gly Lys His Leu Cys Pro Ser Pro
        130                 135                 140

Leu Phe Pro Gly Pro Ser Lys Pro Phe Trp Val Leu Val Val Val Gly
145                 150                 155                 160

Gly Val Leu Ala Cys Tyr Ser Leu Leu Val Thr Val Ala Phe Ile Ile
                165                 170                 175

Phe Trp Val Arg Ser Lys Arg Ser Arg Leu Leu His Ser Asp Tyr Met
                180                 185                 190

Asn Met Thr Pro Arg Arg Pro Gly Pro Thr Arg Lys His Tyr Gln Pro
            195                 200                 205

Tyr Ala Pro Pro Arg Asp Phe Ala Ala Tyr Arg Ser
    210                 215                 220

<210> SEQ ID NO 24
<211> LENGTH: 135
<212> TYPE: PRT
<213> ORGANISM: Artificial Sequence
<220> FEATURE:
<223> OTHER INFORMATION: CD19K_ Transmembrane and Signaling domain

<400> SEQUENCE: 24

Ala Ala Val Leu Glu Leu Leu Ser Asn Ser Ile Met Tyr Phe Ser His
1               5                   10                  15

Phe Val Pro Val Phe Leu Pro Ala Lys Pro Thr Thr Thr Pro Ala Pro
                20                  25                  30

Arg Pro Pro Thr Pro Ala Pro Thr Ile Ala Ser Gln Pro Leu Ser Leu
            35                  40                  45

Arg Pro Glu Ala Cys Arg Pro Ala Ala Gly Gly Ala Val His Thr Arg
        50                  55                  60

Gly Leu Asp Leu Leu Asp Pro Lys Leu Cys Tyr Leu Leu Asp Gly Ile
65                  70                  75                  80

Leu Phe Ile Tyr Gly Val Ile Leu Thr Ala Leu Phe Leu Arg Leu Lys
                85                  90                  95

Ile Gln Val Arg Lys Ala Ala Ile Thr Ser Tyr Glu Lys Ser Asp Gly
            100                 105                 110

Val Tyr Thr Gly Leu Ser Thr Arg Asn Gln Glu Thr Tyr Glu Thr Leu
        115                 120                 125

Lys His Glu Lys Pro Pro Gln
    130                 135

<210> SEQ ID NO 25
<211> LENGTH: 398
<212> TYPE: PRT
<213> ORGANISM: Artificial Sequence
<220> FEATURE:
<223> OTHER INFORMATION: CD19CAR FceRIgamma protein

<400> SEQUENCE: 25

Met Asp Trp Ile Trp Arg Ile Leu Phe Leu Val Gly Ala Ala Thr Gly
1               5                   10                  15

Ala His Ser Ala Gln Pro Ala Asp Ile Gln Met Thr Gln Thr Thr Ser
            20                  25                  30

Ser Leu Ser Ala Ser Leu Gly Asp Arg Val Thr Ile Ser Cys Arg Ala
        35                  40                  45

Ser Gln Asp Ile Ser Lys Tyr Leu Asn Trp Tyr Gln Gln Lys Pro Asp
    50                  55                  60

Gly Thr Val Lys Leu Leu Ile Tyr His Thr Ser Arg Leu His Ser Gly
65                  70                  75                  80

Val Pro Ser Arg Phe Ser Gly Ser Gly Ser Gly Thr Asp Tyr Ser Leu
                85                  90                  95

Thr Ile Ser Asn Leu Glu Gln Glu Asp Ile Ala Thr Tyr Phe Cys Gln
            100                 105                 110

Gln Gly Asn Thr Leu Pro Tyr Thr Phe Gly Gly Gly Thr Lys Leu Glu
        115                 120                 125

Leu Lys Arg Gly Gly Gly Gly Ser Gly Gly Gly Gly Ser Gly Gly Gly
    130                 135                 140

Gly Ser Gly Gly Gly Gly Ser Glu Val Gln Leu Gln Gln Ser Gly Pro
145                 150                 155                 160

Gly Leu Val Ala Pro Ser Gln Ser Leu Ser Val Thr Cys Thr Val Ser
                165                 170                 175

Gly Val Ser Leu Pro Asp Tyr Gly Val Ser Trp Ile Arg Gln Pro Pro
            180                 185                 190

Arg Lys Gly Leu Glu Trp Leu Gly Val Ile Trp Gly Ser Glu Thr Thr
        195                 200                 205

Tyr Tyr Asn Ser Ala Leu Lys Ser Arg Leu Thr Ile Ile Lys Asp Asn
    210                 215                 220

Ser Lys Ser Gln Val Phe Leu Lys Met Asn Ser Leu Gln Thr Asp Asp
225                 230                 235                 240

Thr Ala Ile Tyr Tyr Cys Ala Lys His Tyr Tyr Tyr Gly Gly Ser Tyr
                245                 250                 255

Ala Met Asp Tyr Trp Gly Gln Gly Thr Thr Val Thr Val Ser Ser Ala
            260                 265                 270

Ala Ala Leu Phe Val Pro Val Phe Leu Pro Ala Lys Pro Thr Thr Thr
        275                 280                 285

Pro Ala Pro Arg Pro Pro Thr Pro Ala Pro Thr Ile Ala Ser Gln Pro
290                 295                 300

Leu Ser Leu Arg Pro Glu Ala Cys Arg Pro Ala Ala Gly Gly Ala Val
305                 310                 315                 320

His Thr Arg Gly Leu Asp Phe Ala Cys Phe Trp Val Leu Val Val Val
                325                 330                 335

Gly Gly Val Leu Ala Cys Tyr Ser Leu Leu Val Thr Val Ala Phe Ile
            340                 345                 350

Ile Phe Trp Val Arg Leu Lys Ile Gln Val Arg Lys Ala Ala Ile Thr
        355                 360                 365

Ser Tyr Glu Lys Ser Asp Gly Val Tyr Thr Gly Leu Ser Thr Arg Asn
    370                 375                 380

Gln Glu Thr Tyr Glu Thr Leu Lys His Glu Lys Pro Pro Gln
385                 390                 395

<210> SEQ ID NO 26
<211> LENGTH: 441
<212> TYPE: DNA
<213> ORGANISM: Artificial Sequence
<220> FEATURE:

<223> OTHER INFORMATION: 15AD23HC_1805843_CD19K_Eps (879 - 1319)

<400> SEQUENCE: 26

| | | |
|---|---|---|
| tggggccaag ggaccacggt caccgtctcc tcggccgcgg ttctagagct cttgagcaac | 60 |
| tccatcatgt acttcagcca cttcgtgccg gtcttcctgc cagcgaagcc caccacgacg | 120 |
| ccagcgccgc gaccaccaac accggcgccc accatcgcgt cgcagcccct gtccctgcgc | 180 |
| ccagaggcgt gccggccagc ggcgggggc gcagtgcaca cgaggggct ggacctgctg | 240 |
| gatcccaaac tctgctacct gctggatgga atcctcttca tctatggtgt cattctcact | 300 |
| gccttgttcc tgagactgaa gatccaagtg cgaaaggcag ctataaccag ctatgagaaa | 360 |
| tcagatggtg tttacacggg cctgagcacc aggaaccagg agacttacga gactctgaag | 420 |
| catgagaaac caccacagta a | 441 |

<210> SEQ ID NO 27
<211> LENGTH: 4278
<212> TYPE: DNA
<213> ORGANISM: Artificial Sequence
<220> FEATURE:
<223> OTHER INFORMATION: 15AD23HC_1805843_CD19K_Eps

<400> SEQUENCE: 27

| | | |
|---|---|---|
| taatacgact cactataggg agacaagctt gcttgttctt tttgcagaag ctcagaataa | 60 |
| acgctcaact ttggcagatc ggtaccgaat tcgccaccat ggactggatc tggcgcatcc | 120 |
| tcttcctcgt cggcgctgct accggcgctc attcggccca gccggccgac atccagatga | 180 |
| cacagactac atcctccctg tctgcctctc tgggagacag agtcaccatc agttgcaggg | 240 |
| caagtcagga cattagtaaa tatttaaatt ggtatcagca aaaaccagat ggaactgtta | 300 |
| aactcctgat ctaccataca tcaagattac actcaggagt cccatcaagg ttcagtggca | 360 |
| gtgggtctgg aacagattat tctctcacca ttagcaacct ggagcaagaa gatattgcca | 420 |
| cttacttttg ccaacagggt aatacgcttc cgtacacgtt cggaggggg accaagctgg | 480 |
| agctgaaacg tggtggtggt ggttctggtg gtggtggttc tggcggcggc ggctccggtg | 540 |
| gtggtggatc cgaggtgcag ctgcagcagt ctggacctgg cctggtggcg ccctcacaga | 600 |
| gcctgtccgt cacatgcact gtctcagggg tctcattacc cgactatggt gtaagctgga | 660 |
| ttcgccagcc tccacgaaag ggtctggagt ggctgggagt aatatgggt agtgaaacca | 720 |
| catactataa ttcagctctc aaatccagac tgaccatcat caaggacaac tccaagagcc | 780 |
| aagttttctt aaaaatgaac agtctgcaaa ctgatgacac agccatttac tactgtgcca | 840 |
| acattatta ctacggtggt agctatgcta tggactactg gggccaaggg accacggtca | 900 |
| ccgtctcctc ggccgcggtt ctagagctct gagcaactc catcatgtac ttcagccact | 960 |
| tcgtgccggt cttcctgcca gcgaagccca ccacgacgcc agcgccgcga ccaccaacac | 1020 |
| cggcgcccac catcgcgtcg cagcccctgt ccctgcgccc agaggcgtgc cggcagcgg | 1080 |
| cgggggcgc agtgcacacg aggggctgg acctgctgga tcccaaactc tgctacctgc | 1140 |
| tggatggaat cctcttcatc tatggtgtca ttctcactgc cttgttcctg agactgaaga | 1200 |
| tccaagtgcg aaaggcagct ataaccagct atgagaaatc agatggtgtt tacacgggcc | 1260 |
| tgagcaccag gaaccaggag acttacgaga ctctgaagca tgagaaacca ccacagtaac | 1320 |
| agccagggca tttctccctc gagagatctg atatcactag tgactgacta ggatctggtt | 1380 |
| accactaaac cagcctcaag aacacccgaa tggagtctct aagctacata ataccaactt | 1440 |
| acactttaca aaatgttgtc ccccaaaatg tagccattcg tatctgctcc taataaaaag | 1500 |

```
aaagtttctt cacattctaa aaaaaaaaaa aaaaaaaaaa aaaaaaaaaa acccccccccc    1560 cccccccct gcaggtcgac tctagaggat ccccgggtac cgagctcgaa ttagtattct      1620
atagtgtcac ctaaatccaa ttcactggcc gtcgttttac aacgtcgtga ctgggaaaac    1680
cctggcgtta cccaacttaa tcgccttgca gcacatcccc ctttcgccag ctggcgtaat    1740
agcgaagagg cccgcaccga tcgcccttcc caacagttgc gcagcctgaa tggcgaatgg    1800
cgcctgatgc ggtattttct ccttacgcat ctgtgcggta tttcacaccg catatggtgc    1860
actctcagta caatctgctc tgatgccgca tagttaagcc agccccgaca cccgccaaca    1920
cccgctgacg cgccctgacg ggcttgtctg ctcccggcat ccgcttacag acaagctgtg    1980
accgtctccg ggagctgcat gtgtcagagg ttttcaccgt catcaccgaa acgcgcgaga    2040
cgaaagggcc tcgtgatacg cctatttta taggttaatg tcatgataat aatggtttct    2100
tagacgtcag gtggcacttt tcggggaaat gtgcgcggaa cccctatttg tttatttttc    2160
taaatacatt caaatatgta tccgctcatg agacaataac cctgataaat gcttcaataa    2220
tattgaaaaa ggaagagtat gagtattcaa catttccgtg tcgcccttat ccctttttt    2280 gcggcatttt gccttcctgt ttttgctcac ccagaaacgc tggtgaaagt aaaagatgct    2340
gaagatcagt tgggtgcacg agtgggttac atcgaactgg atctcaacag cggtaagatc    2400
cttgagagtt ttcgccccga agaacgtttt ccaatgatga gcacttttaa agttctgcta    2460
tgtggcgcgg tattatcccg tattgacgcc gggcaagagc aactcggtcg ccgcatacac    2520
tattctcaga atgacttggt tgagtactca ccagtcacag aaaagcatct tacgatggc    2580 atgacagtaa gagaattatg cagtgctgcc ataaccatga gtgataacac tgcggccaac    2640
ttacttctga caacgatcgg aggaccgaag gagctaaccg cttttttgca acatgggg    2700 gatcatgtaa ctcgccttga tcgttgggaa ccggagctga atgaagccat accaaacgac    2760
gagcgtgaca ccacgatgcc tgtagcaatg gcaacaacgt tgcgcaaact attaactggc    2820
gaactactta ctctagcttc ccggcaacaa ttaatagact ggatggaggc ggataaagtt    2880
gcaggaccac ttctgcgctc ggcccttccg gctggctggt ttattgctga taaatctgga    2940
gccggtgagc gtgggtctcg cggtatcatt gcagcactgg ggccagatgg taagccctcc    3000
cgtatcgtag ttatctacac gacggggagt caggcaacta tggatgaacg aaatagacag    3060
atcgctgaga taggtgcctc actgattaag cattggtaac tgtcagacca agtttactca    3120
tatatacttt agattgattt aaaacttcat ttttaattta aaaggatcta ggtgaagatc    3180 cttttttgata atctcatgac caaaatccct taacgtgagt tttcgttcca ctgagcgtca    3240
gaccccgtag aaaagatcaa aggatcttct tgagatcctt ttttctgcg cgtaatctgc    3300 tgcttgcaaa caaaaaaacc accgctacca gcggtggttt gtttgccgga tcaagagcta    3360
ccaactcttt ttccgaaggt aactggcttc agcagagcgc agataccaaa tactgttctt    3420
ctagtgtagc cgtagttagg ccaccacttc aagaactctg tagcaccgcc tacatacctc    3480
gctctgctaa tcctgttacc agtggctgct gccagtggcg ataagtcgtg tcttaccggg    3540
ttggactcaa gacgatagtt accggataag gcgcagcggt cgggctgaac ggggggttcg    3600
tgcacacagc ccagcttgga gcgaacgacc tacaccgaac tgagatacct acagcgtgag    3660
ctatgagaaa gcgccacgct tcccgaaggg agaaaggcgg acaggtatcc ggtaagcggc    3720
agggtcggaa caggagagcg cacgagggag cttccagggg gaaacgcctg gtatctttat    3780
agtcctgtcg ggtttcgcca cctctgactt gagcgtcgat ttttgtgatg ctcgtcaggg    3840
```

| | |
|---|---|
| gggcggagcc tatggaaaaa cgccagcaac gcggccttt tacggttcct ggcctttgc | 3900 |
| tggccttttg ctcacatgtt ctttcctgcg ttatccctg attctgtgga taaccgtatt | 3960 |
| accgcctttg agtgagctga taccgctcgc cgcagccgaa cgaccgagcg cagcgagtca | 4020 |
| gtgagcgagg aagcggaaga gcgcccaata cgcaaaccgc ctctccccgc gcgttggccg | 4080 |
| attcattaat gcagctggca cgacaggttt cccgactgga aagcgggcag tgagcgcaac | 4140 |
| gcaattaatg tgagttagct cactcattag gcacccagg ctttacactt tatgcttccg | 4200 |
| gctcgtatgt tgtgtggaat tgtgagcgga taacaatttc acacaggaaa cagctatgac | 4260 |
| catgattacg ccaagctc | 4278 |

<210> SEQ ID NO 28
<211> LENGTH: 3136
<212> TYPE: DNA
<213> ORGANISM: Artificial Sequence
<220> FEATURE:
<223> OTHER INFORMATION: pNEUKv1_CD19CAR_CD16(158V)_ERIL-2 vector

<400> SEQUENCE: 28

| | |
|---|---|
| atggactgga tctggcgat tctgtttctc gtgggagctg ccacaggcgc tcattctgct | 60 |
| cagcctgccg atatccagat gacccagaca acaagcagcc tgagcgcctc tctgggcgat | 120 |
| agagtgacaa tcagctgcag agccagccag gacatcagca gtacctgaa ctggtatcag | 180 |
| cagaaacccg acggcaccgt gaagctgctg atctaccaca caagcagact gcacagcggc | 240 |
| gtgccaagca gattttctgg cagcggcagc ggcaccgatt acagcctgac catcagcaac | 300 |
| ctggaacagg aagatatcgc tacctacttc tgtcagcagg gcaacaccct gccttacacc | 360 |
| tttggcggcg gaacaaagct ggaactgaaa agaggcggcg gaggaagcgg aggcggagga | 420 |
| tctgggggcg gaggctctgg cggagggga tctgaagtgc agctgcagca gtctggacct | 480 |
| ggactggtgg ctccttctca gtccctgtct gtgacctgta cagtgtctgg cgtgtccctg | 540 |
| cctgattacg gcgtgtcctg gatcagacag cctcccagaa aaggcctgga atggctggga | 600 |
| gtgatctggg gcagcgagac aacctactac aacagcgccc tgaagtcccg gctgaccatc | 660 |
| atcaaggaca cagcaagag ccaggtgttc ctgaagatga acagcctgca gaccgacgac | 720 |
| accgccatct actactgcgc caagcactac tactacggcg gcagctacgc catggattat | 780 |
| tggggccagg gcaccaccgt gacagtgtca tctgcggccg cgctgagcaa cagcatcatg | 840 |
| tacttcagcc acttcgtgcc tgtgttcctg cctgccaagc ctacaacaac accagcccct | 900 |
| agacctccaa cccctgcccc tacaattgcc ctctcagcctc tgtctctgag gcccgaagct | 960 |
| tgtagacctg ctgctggcgg agctgtgcac accagaggac tggatttcgc ctgcttttgg | 1020 |
| gtgctggtgg tcgtgggcgg agtgctggct tgttattctc tgctggtcac cgtggccttc | 1080 |
| atcatctttt gggtccgact gaagatccag gtccgaaagg ccgccatcac cagctacgag | 1140 |
| aagtctgatg gcgtgtacac cggcctgagc accagaaacc aggaaaccta cgagacactg | 1200 |
| aagcacgaga agccccccca gggatctgga gctactaact tcagcctgct gaagcaggct | 1260 |
| ggagacgtgg aggagaaccc tggacctatg tggcagctgc tgctgcctac agctctcctg | 1320 |
| ctgctggtgt ccgccggcat gagaaccgag gatctgccta aggccgtggt gttcctggaa | 1380 |
| ccccagtggt acagagtgct ggaaaaggac agcgtgaccc tgaagtgcca gggcgcctac | 1440 |
| agccccgagg acaatagcac ccagtggttc cacaacgaga gcctgatcag cagccaggcc | 1500 |
| agcagctact tcatcgacgc cgccaccgtg gacgacagcg gcgagtatag atgccagacc | 1560 |
| aacctgagca ccctgagcga ccccgtgcag ctggaagtgc acatcggatg gctgctgctg | 1620 |

```
caggcccca gatgggtgtt caaagaagag gacccatcc acctgagatg ccactcttgg    1680
aagaacaccg ccctgcacaa agtgacctac ctgcagaacg gcaagggcag aaagtacttc    1740
caccacaaca gcgacttcta catccccaag gccaccctga aggactccgg ctcctacttc    1800
tgcagaggcc tcgtgggcag caagaacgtg tccagcgaga cagtgaacat caccatcacc    1860
cagggcctgg ccgtgtctac catcagcagc ttttttccac ccggctacca ggtgtccttc    1920
tgcctcgtga tggtgctgct gttcgccgtg acaccggcc tgtacttcag cgtgaaaaca    1980
aacatcagaa gcagcacccg ggactggaag gaccacaagt caagtggcg aaggacccc    2040 caggacaagt gaaattccgc ccctctcccc ccccccctc tccctcccc ccccctaacg    2100 ttactggccg aagccgcttg aataaggcc ggtgtgcgtt tgtctatatg ttatttcca    2160 ccatattgcc gtcttttggc aatgtgaggg cccggaaacc tggccctgtc ttcttgacga    2220
gcattcctag gggtctttcc cctctcgcca aggaatgca aggtctgttg aatgtcgtga    2280
aggaagcagt tcctctggaa gcttcttgaa gacaaacaac gtctgtagcg acccttgca    2340 ggcagcggaa ccccccacct ggcgacaggt gcctctgcgg ccaaaagcca cgtgtataag    2400
atacacctgc aaaggcggca accccccagt gccacgttgt gagttggata gttgtggaaa    2460
gagtcaaatg gctctcctca agcgtattca acaaggggct gaaggatgcc cagaaggtac    2520
cccattgtat gggatctgat ctggggcctc ggtgcacatg ctttacatgt gtttagtcga    2580
ggttaaaaaa acgtctaggc ccccgaacc acggggacgt ggttttcctt tgaaaaacac    2640
gataaccgcc accatgtacc ggatgcagct gctgagctgt atcgccctgt ctctggccct    2700
cgtgaccaac agcgccccta ccagcagcag caccaagaaa acccagctgc agctggaaca    2760
tctgctgctg gacctgcaga tgatcctgaa cggcatcaac aactacaaga ccccaagct    2820 gacccggatg ctgaccttca gttctacat gcccaagaag gccaccgaac tgaaacatct    2880
gcagtgcctg gaagaggaac tgaagcccct ggaagaagtg ctgaacctgg cccagagcaa    2940
gaacttccac ctgaggccca gggacctgat cagcaacatc aacgtgatcg tgctggaact    3000
gaaaggcagc gagacaacct tcatgtgcga gtacgccgac gagacagcta ccatcgtgga    3060
atttctgaac cggtggatca ccttctgcca gagcatcatc agcaccctga ccggctccga    3120
gaaggacgag ctgtga                                                      3136
```

<210> SEQ ID NO 29
<211> LENGTH: 683
<212> TYPE: PRT
<213> ORGANISM: Artificial Sequence
<220> FEATURE:
<223> OTHER INFORMATION: CD19CAR_P2A_CD16(158V) protein

<400> SEQUENCE: 29

```
Met Asp Trp Ile Trp Arg Ile Leu Phe Leu Val Gly Ala Ala Thr Gly
1               5                   10                  15

Ala His Ser Ala Gln Pro Ala Asp Ile Gln Met Thr Gln Thr Thr Ser
            20                  25                  30

Ser Leu Ser Ala Ser Leu Gly Asp Arg Val Thr Ile Ser Cys Arg Ala
        35                  40                  45

Ser Gln Asp Ile Ser Lys Tyr Leu Asn Trp Tyr Gln Gln Lys Pro Asp
    50                  55                  60

Gly Thr Val Lys Leu Leu Ile Tyr His Thr Ser Arg Leu His Ser Gly
65                  70                  75                  80

Val Pro Ser Arg Phe Ser Gly Ser Gly Ser Gly Thr Asp Tyr Ser Leu
```

```
                 85                  90                  95
Thr Ile Ser Asn Leu Glu Gln Glu Asp Ile Ala Thr Tyr Phe Cys Gln
                100                 105                 110

Gln Gly Asn Thr Leu Pro Tyr Thr Phe Gly Gly Gly Thr Lys Leu Glu
                115                 120                 125

Leu Lys Arg Gly Gly Gly Gly Ser Gly Gly Gly Gly Ser Gly Gly Gly
                130                 135                 140

Gly Ser Gly Gly Gly Gly Ser Glu Val Gln Leu Gln Gln Ser Gly Pro
145                 150                 155                 160

Gly Leu Val Ala Pro Ser Gln Ser Leu Ser Val Thr Cys Thr Val Ser
                165                 170                 175

Gly Val Ser Leu Pro Asp Tyr Gly Val Ser Trp Ile Arg Gln Pro Pro
                180                 185                 190

Arg Lys Gly Leu Glu Trp Leu Gly Val Ile Trp Gly Ser Glu Thr Thr
                195                 200                 205

Tyr Tyr Asn Ser Ala Leu Lys Ser Arg Leu Thr Ile Ile Lys Asp Asn
                210                 215                 220

Ser Lys Ser Gln Val Phe Leu Lys Met Asn Ser Leu Gln Thr Asp Asp
225                 230                 235                 240

Thr Ala Ile Tyr Tyr Cys Ala Lys His Tyr Tyr Gly Gly Ser Tyr
                245                 250                 255

Ala Met Asp Tyr Trp Gly Gln Gly Thr Thr Val Thr Val Ser Ser Ala
                260                 265                 270

Ala Ala Leu Ser Asn Ser Ile Met Tyr Phe Ser His Phe Val Pro Val
                275                 280                 285

Phe Leu Pro Ala Lys Pro Thr Thr Thr Pro Ala Pro Arg Pro Pro Thr
290                 295                 300

Pro Ala Pro Thr Ile Ala Ser Gln Pro Leu Ser Leu Arg Pro Glu Ala
305                 310                 315                 320

Cys Arg Pro Ala Ala Gly Gly Ala Val His Thr Arg Gly Leu Asp Phe
                325                 330                 335

Ala Cys Phe Trp Val Leu Val Val Val Gly Gly Val Leu Ala Cys Tyr
                340                 345                 350

Ser Leu Leu Val Thr Val Ala Phe Ile Ile Phe Trp Val Arg Leu Lys
                355                 360                 365

Ile Gln Val Arg Lys Ala Ala Ile Thr Ser Tyr Glu Lys Ser Asp Gly
                370                 375                 380

Val Tyr Thr Gly Leu Ser Thr Arg Asn Gln Glu Thr Tyr Glu Thr Leu
385                 390                 395                 400

Lys His Glu Lys Pro Pro Gln Gly Ser Gly Ala Thr Asn Phe Ser Leu
                405                 410                 415

Leu Lys Gln Ala Gly Asp Val Glu Glu Asn Pro Gly Pro Met Trp Gln
                420                 425                 430

Leu Leu Leu Pro Thr Ala Leu Leu Leu Leu Val Ser Ala Gly Met Arg
                435                 440                 445

Thr Glu Asp Leu Pro Lys Ala Val Val Phe Leu Glu Pro Gln Trp Tyr
                450                 455                 460

Arg Val Leu Glu Lys Asp Ser Val Thr Leu Lys Cys Gln Gly Ala Tyr
465                 470                 475                 480

Ser Pro Glu Asp Asn Ser Thr Gln Trp Phe His Asn Glu Ser Leu Ile
                485                 490                 495

Ser Ser Gln Ala Ser Ser Tyr Phe Ile Asp Ala Ala Thr Val Asp Asp
                500                 505                 510
```

```
Ser Gly Glu Tyr Arg Cys Gln Thr Asn Leu Ser Thr Leu Ser Asp Pro
        515                 520                 525

Val Gln Leu Glu Val His Ile Gly Trp Leu Leu Gln Ala Pro Arg
    530                 535                 540

Trp Val Phe Lys Glu Glu Asp Pro Ile His Leu Arg Cys His Ser Trp
545                 550                 555                 560

Lys Asn Thr Ala Leu His Lys Val Thr Tyr Leu Gln Asn Gly Lys Gly
                565                 570                 575

Arg Lys Tyr Phe His His Asn Ser Asp Phe Tyr Ile Pro Lys Ala Thr
            580                 585                 590

Leu Lys Asp Ser Gly Ser Tyr Phe Cys Arg Gly Leu Val Gly Ser Lys
        595                 600                 605

Asn Val Ser Ser Glu Thr Val Asn Ile Thr Ile Thr Gln Gly Leu Ala
    610                 615                 620

Val Ser Thr Ile Ser Ser Phe Phe Pro Pro Gly Tyr Gln Val Ser Phe
625                 630                 635                 640

Cys Leu Val Met Val Leu Leu Phe Ala Val Asp Thr Gly Leu Tyr Phe
                645                 650                 655

Ser Val Lys Thr Asn Ile Arg Ser Ser Thr Arg Asp Trp Lys Asp His
            660                 665                 670

Lys Phe Lys Trp Arg Lys Asp Pro Gln Asp Lys
        675                 680
```

<210> SEQ ID NO 30
<211> LENGTH: 160
<212> TYPE: PRT
<213> ORGANISM: Artificial Sequence
<220> FEATURE:
<223> OTHER INFORMATION: ERIL-2 protein

<400> SEQUENCE: 30

```
Met Tyr Arg Met Gln Leu Leu Ser Cys Ile Ala Leu Ser Leu Ala Leu
1               5                   10                  15

Val Thr Asn Ser Ala Pro Thr Ser Ser Ser Thr Lys Lys Thr Gln Leu
                20                  25                  30

Gln Leu Glu His Leu Leu Leu Asp Leu Gln Met Ile Leu Asn Gly Ile
            35                  40                  45

Asn Asn Tyr Lys Asn Pro Lys Leu Thr Arg Met Leu Thr Phe Lys Phe
        50                  55                  60

Tyr Met Pro Lys Lys Ala Thr Glu Leu Lys His Leu Gln Cys Leu Glu
65                  70                  75                  80

Glu Glu Leu Lys Pro Leu Glu Glu Val Leu Asn Leu Ala Gln Ser Lys
                85                  90                  95

Asn Phe His Leu Arg Pro Arg Asp Leu Ile Ser Asn Ile Asn Val Ile
            100                 105                 110

Val Leu Glu Leu Lys Gly Ser Glu Thr Thr Phe Met Cys Glu Tyr Ala
        115                 120                 125

Asp Glu Thr Ala Thr Ile Val Glu Phe Leu Asn Arg Trp Ile Thr Phe
    130                 135                 140

Cys Gln Ser Ile Ile Ser Thr Leu Thr Gly Ser Glu Lys Asp Glu Leu
145                 150                 155                 160
```

<210> SEQ ID NO 31
<211> LENGTH: 3126
<212> TYPE: DNA
<213> ORGANISM: Artificial Sequence
<220> FEATURE:
<223> OTHER INFORMATION: Codon-optimized CD33ScfV-P2A-CD16-IRES-erIL2

<400> SEQUENCE: 31

```
atggactgga tctggcgcat cctcttcctc gtcggcgctg ctaccggcgc tcattcggcc      60
cagccggccg acattcaaat gactcagtcc ccttccagct tgtcagcctc agtaggggac     120
cgggtcacga tcacctgtcg agcgtctgag tcagtggata actacgggat ttctttcatg     180
aactggttcc agcagaagcc cggcaaagct cctaagctcc ttatatatgc agcctcaaat     240
caggggagcg gtgttcctag tcgcttcagt ggaagcggta gcggtacgga ctttacgttg     300
acgataagta gccttcagcc agatgacttt gccacttatt attgtcagca gtctaaggaa     360
gttccttgga cgtttggcca aggaacgaag gtcgaaatca aggggggagg gggctcagga     420
ggggcggca gtggtggtgg aggctctcaa gtccaactcg tacagtctgg cgcggaggtt     480
aaaaagccgg gaagctccgt gaaagtatcc tgtaaggcaa gcggatacac ctttaccgat     540
tataacatgc actgggttag gcaggcgccc ggccaaggtc tggaatggat cggttatatt     600
tatccataca cggtggtac cggctataat cagaagttta agagtaaggc tactattaca     660
gcggatgagt caaccaatac tgcatacatg gagctctcct cactcaggag cgaagatacc     720
gcagtgtatt actgtgcccg agggagacca gccatggact actgggtca gggtaccctt     780
gtgacagtat ctagcgcggc cgcgctgagc aacagcatca gtacttcag ccacttcgtg     840
cctgtgttcc tgcctgccaa gcctacaaca caccagccc tagacctcc aaccccctgcc     900
cctacaattg cctctcagcc tctgtctctg aggcccgaag cttgtagacc tgctgctggc     960
ggagctgtgc acaccagagg actggatttc gcctgctttt gggtgctggt ggtcgtgggc    1020
ggagtgctgg cttgttattc tctgctggtc accgtggcct tcatcatctt tggtccga    1080
ctgaagatcc aggtccgaaa ggccgccatc accagctacg agaagtctga tggcgtgtac    1140
accggcctga gcaccagaaa ccaggaaacc tacgagacac tgaagcacga aagccccc    1200
cagggaagcg gagctactaa cttcagcctg ctgaagcagg ctggagacgt ggaggagaac    1260
cctggaccta tgtggcagct gctgctgcct cagctctcc tgctgctggt tccgccggc    1320
atgagaaccg aggatctgcc taaggccgtg gtgttcctgg aacccagtg gtacagagtg    1380
ctggaaaagg acagcgtgac cctgaagtgc caggggcgcct acagccccga ggacaatagc    1440
acccagtggt tccacaacga gagcctgatc agcagccagg ccagcagcta cttcatcgac    1500
gccgccaccg tggacgacag cggcgagtat agatgccaga ccaacctgag caccctgagc    1560
gaccccgtgc agctggaagt gcacatcgga tggctgctgc tgcaggcccc cagatgggtg    1620
ttcaaagaag aggaccccat ccacctgaga tgccactctt ggaagaacac cgccctgcac    1680
aaagtgacct acctgcagaa cggcaagggc agaaagtact ccaccacaa cagcgacttc    1740
tacatcccca aggccaccct gaaggactcc ggctcctact tctgcagagg cctcgtgggc    1800
agcaagaacg tgtccagcga gacagtgaac atcaccatca cccagggcct ggccgtgtct    1860
accatcagca gcttttttccc acccggctac caggtgtcct tctgcctcgt gatggtgctg    1920
ctgttcgccg tggacaccgg cctgtacttc agcgtgaaaa caaacatcag aagcagcacc    1980
cgggactgga aggaccacaa gttcaagtgg cggaaggacc cccaggacaa gtgaaattcc    2040
gcccctctcc cccccccccc tctccctccc cccccctaa cgttactggc cgaagccgct    2100
tggaataagg ccggtgtgcg tttgtctata tgttatttc caccatattg ccgtcttttg    2160
gcaatgtgag ggcccggaaa cctggccctg tcttcttgac gagcattcct aggggtcttt    2220
```

```
cccctctcgc caaaggaatg caaggtctgt tgaatgtcgt gaaggaagca gttcctctgg    2280
aagcttcttg aagacaaaca acgtctgtag cgacccttttg caggcagcgg aaccccccac   2340
ctggcgacag gtgcctctgc ggccaaaagc cacgtgtata agatacacct gcaaaggcgg    2400
cacaaccccca gtgccacgtt gtgagttgga tagttgtgga aagagtcaaa tggctctcct    2460
caagcgtatt caacaagggg ctgaaggatg cccagaaggt accccattgt atgggatctg    2520
atctggggcc tcggtgcaca tgctttacat gtgtttagtc gaggttaaaa aaacgtctag     2580
gcccccccgaa ccacggggac gtggttttcc tttgaaaaac acgataaccg ccaccatgta   2640
ccggatgcag ctgctgagct gtatcgccct gtctctggcc ctcgtgacca acagcgcccc    2700
taccagcagc agcaccaaga aacccagct gcagctggaa catctgctgc tggacctgca     2760
gatgatcctg aacggcatca acaactacaa gaaccccaag ctgacccgga tgctgacctt    2820
caagttctac atgcccaaga aggccaccga actgaaacat ctgcagtgcc tggaagagga   2880
actgaagccc ctggaagaag tgctgaacct ggcccagagc aagaacttcc acctgaggcc    2940
cagggacctg atcagcaaca tcaacgtgat cgtgctggaa ctgaaaggca gcgagacaac    3000
cttcatgtgc gagtacgccg acgagacagc taccatcgtg gaatttctga accggtggat    3060
caccttctgc cagagcatca tcagcaccct gaccggctcc gagaaggacg agctgtgagc    3120
ggccgc                                                               3126
```

<210> SEQ ID NO 32
<211> LENGTH: 677
<212> TYPE: PRT
<213> ORGANISM: Artificial Sequence
<220> FEATURE:
<223> OTHER INFORMATION: CD33 CAR-P2A-CD16 peptide

<400> SEQUENCE: 32

Met Asp Trp Ile Trp Arg Ile Leu Phe Leu Val Gly Ala Ala Thr Gly
1               5                   10                  15

Ala His Ser Ala Gln Pro Ala Asp Ile Gln Met Thr Gln Ser Pro Ser
            20                  25                  30

Ser Leu Ser Ala Ser Val Gly Asp Arg Val Thr Ile Thr Cys Arg Ala
        35                  40                  45

Ser Glu Ser Val Asp Asn Tyr Gly Ile Ser Phe Met Asn Trp Phe Gln
    50                  55                  60

Gln Lys Pro Gly Lys Ala Pro Lys Leu Leu Ile Tyr Ala Ala Ser Asn
65                  70                  75                  80

Gln Gly Ser Gly Val Pro Ser Arg Phe Ser Gly Ser Gly Ser Gly Thr
                85                  90                  95

Asp Phe Thr Leu Thr Ile Ser Ser Leu Gln Pro Asp Asp Phe Ala Thr
            100                 105                 110

Tyr Tyr Cys Gln Gln Ser Lys Glu Val Pro Trp Thr Phe Gly Gln Gly
        115                 120                 125

Thr Lys Val Glu Ile Lys Gly Gly Gly Ser Gly Gly Gly Gly Ser
    130                 135                 140

Gly Gly Gly Gly Ser Gln Val Gln Leu Val Gln Ser Gly Ala Glu Val
145                 150                 155                 160

Lys Lys Pro Gly Ser Ser Val Lys Val Ser Cys Lys Ala Ser Gly Tyr
                165                 170                 175

Thr Phe Thr Asp Tyr Asn Met His Trp Val Arg Gln Ala Pro Gly Gln
            180                 185                 190

Gly Leu Glu Trp Ile Gly Tyr Ile Tyr Pro Tyr Asn Gly Gly Thr Gly

```
                195                 200                 205
Tyr Asn Gln Lys Phe Lys Ser Lys Ala Thr Ile Thr Ala Asp Glu Ser
    210                 215                 220

Thr Asn Thr Ala Tyr Met Glu Leu Ser Ser Leu Arg Ser Glu Asp Thr
225                 230                 235                 240

Ala Val Tyr Tyr Cys Ala Arg Gly Arg Pro Ala Met Asp Tyr Trp Gly
                245                 250                 255

Gln Gly Thr Leu Val Thr Val Ser Ser Ala Ala Leu Ser Asn Ser
            260                 265                 270

Ile Met Tyr Phe Ser His Phe Val Pro Val Phe Leu Pro Ala Lys Pro
        275                 280                 285

Thr Thr Thr Pro Ala Pro Arg Pro Pro Thr Pro Ala Pro Thr Ile Ala
290                 295                 300

Ser Gln Pro Leu Ser Leu Arg Pro Glu Ala Cys Arg Pro Ala Ala Gly
305                 310                 315                 320

Gly Ala Val His Thr Arg Gly Leu Asp Phe Ala Cys Phe Trp Val Leu
                325                 330                 335

Val Val Val Gly Gly Val Leu Ala Cys Tyr Ser Leu Leu Val Thr Val
            340                 345                 350

Ala Phe Ile Ile Phe Trp Val Arg Leu Lys Ile Gln Val Arg Lys Ala
        355                 360                 365

Ala Ile Thr Ser Tyr Glu Lys Ser Asp Gly Val Tyr Thr Gly Leu Ser
        370                 375                 380

Thr Arg Asn Gln Glu Thr Tyr Glu Thr Leu Lys His Glu Lys Pro Pro
385                 390                 395                 400

Gln Gly Ser Gly Ala Thr Asn Phe Ser Leu Leu Lys Gln Ala Gly Asp
                405                 410                 415

Val Glu Glu Asn Pro Gly Pro Met Trp Gln Leu Leu Leu Pro Thr Ala
            420                 425                 430

Leu Leu Leu Leu Val Ser Ala Gly Met Arg Thr Glu Asp Leu Pro Lys
        435                 440                 445

Ala Val Val Phe Leu Glu Pro Gln Trp Tyr Arg Val Leu Glu Lys Asp
        450                 455                 460

Ser Val Thr Leu Lys Cys Gln Gly Ala Tyr Ser Pro Glu Asp Asn Ser
465                 470                 475                 480

Thr Gln Trp Phe His Asn Glu Ser Leu Ile Ser Ser Gln Ala Ser Ser
                485                 490                 495

Tyr Phe Ile Asp Ala Ala Thr Val Asp Asp Ser Gly Glu Tyr Arg Cys
            500                 505                 510

Gln Thr Asn Leu Ser Thr Leu Ser Asp Pro Val Gln Leu Glu Val His
        515                 520                 525

Ile Gly Trp Leu Leu Leu Gln Ala Pro Arg Trp Val Phe Lys Glu Glu
        530                 535                 540

Asp Pro Ile His Leu Arg Cys His Ser Trp Lys Asn Thr Ala Leu His
545                 550                 555                 560

Lys Val Thr Tyr Leu Gln Asn Gly Lys Gly Arg Lys Tyr Phe His His
                565                 570                 575

Asn Ser Asp Phe Tyr Ile Pro Lys Ala Thr Leu Lys Asp Ser Gly Ser
            580                 585                 590

Tyr Phe Cys Arg Gly Leu Val Gly Ser Lys Asn Val Ser Ser Glu Thr
        595                 600                 605

Val Asn Ile Thr Ile Thr Gln Gly Leu Ala Val Ser Thr Ile Ser Ser
610                 615                 620
```

```
Phe Phe Pro Pro Gly Tyr Gln Val Ser Phe Cys Leu Val Met Val Leu
625                 630                 635                 640

Leu Phe Ala Val Asp Thr Gly Leu Tyr Phe Ser Val Lys Thr Asn Ile
            645                 650                 655

Arg Ser Ser Thr Arg Asp Trp Lys Asp His Lys Phe Lys Trp Arg Lys
        660                 665                 670

Asp Pro Gln Asp Lys
        675
```

<210> SEQ ID NO 33
<211> LENGTH: 192
<212> TYPE: PRT
<213> ORGANISM: Artificial Sequence
<220> FEATURE:
<223> OTHER INFORMATION: erIL2

<400> SEQUENCE: 33

```
Met Leu Tyr Met Cys Leu Val Glu Val Lys Lys Thr Ser Arg Pro Pro
1               5                   10                  15

Glu Pro Arg Gly Arg Gly Phe Pro Leu Lys Asn Thr Ile Thr Ala Thr
            20                  25                  30

Met Tyr Arg Met Gln Leu Leu Ser Cys Ile Ala Leu Ser Leu Ala Leu
        35                  40                  45

Val Thr Asn Ser Ala Pro Thr Ser Ser Ser Thr Lys Lys Thr Gln Leu
50                  55                  60

Gln Leu Glu His Leu Leu Leu Asp Leu Gln Met Ile Leu Asn Gly Ile
65                  70                  75                  80

Asn Asn Tyr Lys Asn Pro Lys Leu Thr Arg Met Leu Thr Phe Lys Phe
                85                  90                  95

Tyr Met Pro Lys Lys Ala Thr Glu Leu Lys His Leu Gln Cys Leu Glu
            100                 105                 110

Glu Glu Leu Lys Pro Leu Glu Glu Val Leu Asn Leu Ala Gln Ser Lys
        115                 120                 125

Asn Phe His Leu Arg Pro Arg Asp Leu Ile Ser Asn Ile Asn Val Ile
130                 135                 140

Val Leu Glu Leu Lys Gly Ser Glu Thr Thr Phe Met Cys Glu Tyr Ala
145                 150                 155                 160

Asp Glu Thr Ala Thr Ile Val Glu Phe Leu Asn Arg Trp Ile Thr Phe
                165                 170                 175

Cys Gln Ser Ile Ile Ser Thr Leu Thr Gly Ser Glu Lys Asp Glu Leu
            180                 185                 190
```

<210> SEQ ID NO 34
<211> LENGTH: 254
<212> TYPE: PRT
<213> ORGANISM: Artificial Sequence
<220> FEATURE:
<223> OTHER INFORMATION: sp 8637 G3A_HUMAN Low affinity IgG gamma
      FcR III-A

<400> SEQUENCE: 34

```
Met Trp Gln Leu Leu Leu Pro Thr Ala Leu Leu Leu Leu Val Ser Ala
1               5                   10                  15

Gly Met Arg Thr Glu Asp Leu Pro Lys Ala Val Val Phe Leu Glu Pro
            20                  25                  30

Gln Trp Tyr Arg Val Leu Glu Lys Asp Ser Val Thr Leu Lys Cys Gln
        35                  40                  45
```

```
Gly Ala Tyr Ser Pro Glu Asp Asn Ser Thr Gln Trp Phe His Asn Glu
            50                  55                  60

Ser Leu Ile Ser Ser Gln Ala Ser Ser Tyr Phe Ile Asp Ala Ala Thr
 65                  70                  75                  80

Val Asp Asp Ser Gly Glu Tyr Arg Cys Gln Thr Asn Leu Ser Thr Leu
                    85                  90                  95

Ser Asp Pro Val Gln Leu Glu Val His Ile Gly Trp Leu Leu Leu Gln
                100                 105                 110

Ala Pro Arg Trp Val Phe Lys Glu Glu Asp Pro Ile His Leu Arg Cys
                115                 120                 125

His Ser Trp Lys Asn Thr Ala Leu His Lys Val Thr Tyr Leu Gln Asn
            130                 135                 140

Gly Lys Gly Arg Lys Tyr Phe His His Asn Ser Asp Phe Tyr Ile Pro
145                 150                 155                 160

Lys Ala Thr Leu Lys Asp Ser Gly Ser Tyr Phe Cys Arg Gly Leu Phe
                165                 170                 175

Gly Ser Lys Asn Val Ser Ser Glu Thr Val Asn Ile Thr Ile Thr Gln
                180                 185                 190

Gly Leu Ala Val Ser Thr Ile Ser Ser Phe Phe Pro Pro Gly Tyr Gln
                195                 200                 205

Val Ser Phe Cys Leu Val Met Val Leu Leu Phe Ala Val Asp Thr Gly
                210                 215                 220

Leu Tyr Phe Ser Val Lys Thr Asn Ile Arg Ser Ser Thr Arg Asp Trp
225                 230                 235                 240

Lys Asp His Lys Phe Lys Trp Arg Lys Asp Pro Gln Asp Lys
                245                 250

<210> SEQ ID NO 35
<211> LENGTH: 254
<212> TYPE: PRT
<213> ORGANISM: Artificial Sequence
<220> FEATURE:
<223> OTHER INFORMATION: High Affinity Variant Immunoglobulin Gamma
      FcRIII-A

<400> SEQUENCE: 35

Met Trp Gln Leu Leu Leu Pro Thr Ala Leu Leu Leu Leu Val Ser Ala
 1               5                  10                  15

Gly Met Arg Thr Glu Asp Leu Pro Lys Ala Val Val Phe Leu Glu Pro
                20                  25                  30

Gln Trp Tyr Arg Val Leu Glu Lys Asp Ser Val Thr Leu Lys Cys Gln
            35                  40                  45

Gly Ala Tyr Ser Pro Glu Asp Asn Ser Thr Gln Trp Phe His Asn Glu
            50                  55                  60

Ser Leu Ile Ser Ser Gln Ala Ser Ser Tyr Phe Ile Asp Ala Ala Thr
 65                  70                  75                  80

Val Asp Asp Ser Gly Glu Tyr Arg Cys Gln Thr Asn Leu Ser Thr Leu
                    85                  90                  95

Ser Asp Pro Val Gln Leu Glu Val His Ile Gly Trp Leu Leu Leu Gln
                100                 105                 110

Ala Pro Arg Trp Val Phe Lys Glu Glu Asp Pro Ile His Leu Arg Cys
                115                 120                 125

His Ser Trp Lys Asn Thr Ala Leu His Lys Val Thr Tyr Leu Gln Asn
            130                 135                 140

Gly Lys Gly Arg Lys Tyr Phe His His Asn Ser Asp Phe Tyr Ile Pro
145                 150                 155                 160
```

```
Lys Ala Thr Leu Lys Asp Ser Gly Ser Tyr Phe Cys Arg Gly Leu Val
                165                 170                 175

Gly Ser Lys Asn Val Ser Ser Glu Thr Val Asn Ile Thr Ile Thr Gln
            180                 185                 190

Gly Leu Ala Val Ser Thr Ile Ser Ser Phe Phe Pro Pro Gly Tyr Gln
        195                 200                 205

Val Ser Phe Cys Leu Val Met Val Leu Leu Phe Ala Val Asp Thr Gly
    210                 215                 220

Leu Tyr Phe Ser Val Lys Thr Asn Ile Arg Ser Ser Thr Arg Asp Trp
225                 230                 235                 240

Lys Asp His Lys Phe Lys Trp Arg Lys Asp Pro Gln Asp Lys
                245                 250
```

<210> SEQ ID NO 36
<211> LENGTH: 765
<212> TYPE: DNA
<213> ORGANISM: Artificial Sequence
<220> FEATURE:
<223> OTHER INFORMATION: High Affinity Variant Ig Gamma Fc Region
      Receptor III-A DNA

<400> SEQUENCE: 36

| | |
|---|---|
| atgtggcagc tgctgctgcc tacagctctc ctgctgctgg tgtccgccgg catgagaacc | 60 |
| gaggatctgc ctaaggccgt ggtgttcctg aacccccagt ggtacagagt gctggaaaag | 120 |
| gacagcgtga ccctgaagtg ccagggcgcc tacagccccg aggacaatag cacccagtgg | 180 |
| ttccacaacg agagcctgat cagcagccag gccagcagct acttcatcga cgccgccacc | 240 |
| gtggacgaca gcggcgagta tagatgccag accaacctga gcaccctgag cgaccccgtg | 300 |
| cagctggaag tgcacatcgg atggctgctg ctgcaggccc ccagatgggt gttcaaagaa | 360 |
| gaggacccca tccacctgag atgccactct tggaagaaca ccgccctgca caaagtgacc | 420 |
| tacctgcaga acggcaaggg cagaaagtac ttccaccaca cagcgactt ctacatcccc | 480 |
| aaggccaccc tgaaggactc cggctcctac ttctgcagag gcctcgtggg cagcaagaac | 540 |
| gtgtccagcg agacagtgaa catcaccatc acccagggcc tggccgtgtc taccatcagc | 600 |
| agcttttttcc cacccggcta ccaggtgtcc ttctgcctcg tgatggtgct gctgttcgcc | 660 |
| gtggacaccg gcctgtactt cagcgtgaaa acaaacatca gaagcagcac ccgggactgg | 720 |
| aaggaccaca gttcaagtg gcggaaggac ccccaggaca gtga | 765 |

<210> SEQ ID NO 37
<211> LENGTH: 1233
<212> TYPE: DNA
<213> ORGANISM: Artificial Sequence
<220> FEATURE:
<223> OTHER INFORMATION: artificial sequence

<400> SEQUENCE: 37

| | |
|---|---|
| atggactgga tctggcggat tctgtttctc gtgggagctg ccacaggcgc tcattctgct | 60 |
| cagcctgccg acatccagat gacccagagc cccagcagcc tgagcgccag cgtgggcgac | 120 |
| agagtgacca tcacctgcag agccagccag gacgtgaaca ccgccgtggc ctggtaccag | 180 |
| cagaagcccg gcaaggcccc caagctgctg atctacagcg ccagcttcct gtacagcggc | 240 |
| gtgcccagca gattcagcgg cagcagaagc ggcaccgact tcaccctgac catcagcagc | 300 |
| ctgcagcccg aggacttcgc cacctactac tgccagcagc actacaccac ccccccccacc | 360 |
| ttcggccagg gcaccaaggt ggagatcaag tcctcagggg gcgggggaag tggtgggggc | 420 |

```
ggcagcggcg aggggggctc aggaggaggc ggatcaggcg gatcagaggt gcagctggtg      480
gagagcggcg gcggcctggt gcagcccggc ggcagcctga gactgagctg cgccgccagc      540
ggcttcaaca tcaaggacac ctacatccac tgggtgagac aggcccccgg caagggcctg      600
gagtgggtgg ccagaatcta ccccaccaac ggctacacca gatacgccga cagcgtgaag      660
ggcagattca ccatcagcgc cgacaccagc aagaacaccg cctacctgca gatgaacagc      720
ctgagagccg aggacaccgc cgtgtactac tgcagcagat ggggcggcga cggcttctac      780
gccatggact actggggcca gggcaccctg gtgaccgtga gcagcgcggc cgcgctgagc      840
aacagcatca tgtacttcag ccacttcgtg cctgtgttcc tgcctgccaa gcctacaaca      900
acaccagccc ctagacctcc aaccctgccc ctacaattg cctctcagcc tctgtctctg       960
aggcccgaag cttgtagacc tgctgctggc ggagctgtgc acaccagagg actggatttc     1020
gcctgctttt gggtgctggt ggtcgtgggc ggagtgctgg cttgttattc tctgctggtc     1080
accgtggcct tcatcatctt tgggtccga ctgaagatcc aggtccgaaa ggccgccatc      1140
accagctacg agaagtctga tggcgtgtac accggcctga gcaccagaaa ccaggaaacc     1200
tacgagacac tgaagcacga gagcccccc cag                                    1233

<210> SEQ ID NO 38
<211> LENGTH: 1230
<212> TYPE: DNA
<213> ORGANISM: Artificial Sequence
<220> FEATURE:
<223> OTHER INFORMATION: artificial sequence

<400> SEQUENCE: 38
atggactgga tctggcggat tctgtttctc gtgggagctg ccacaggcgc tcattctgct       60
cagcctgccg atatccaaat gactcaatct cctagttcac tgtcagcctc tgttggtgat      120
cgcgtgacca ttacctgcca agctagccag gatattagca actacttgaa ctggtatcag      180
cagaagcctg gcaaagcccc aaagctgttg atctacgatg taagtaactt ggaaactggc      240
gtcccaagcc gcttctctgg atctggttca ggcaccgact tcactttcac tatcagcagc      300
ctgcagcctg aagatatcgc aacctactat tgccagcagg ttgctaatgt tcctctgact      360
ttcggccaag gcaccaaggt ggagatcaag ggcggcggag gaagcggagg cggaggatct      420 ggggcggag gctctggcgg aggggatct gaagttcagc ttgtagaatc tggaggtgga       480
ttggttcaac ctggtggctc tcttcgcctg agttgtgcag cctctggttt tactttctct      540
agttactgga tgcattgggt tcgtcaggct cctgggaaag gctggaatg gtttcagct       600 attagttgga gtggagatag tacttactac gcagacagtg tgaaaggtcg cttcaccatc      660
agccgtgata attctaagaa cactttgtac ctgcaaatga actccttgcg cgcagaagac      720
acggctgtgt actattgtgc ccgtgatcgc tctgcgactt ggtattatct ggggcttggt      780
ttcgatgtat ggggacaagg taccctggta acgtttccta cgcggccgc gctgagcaac      840 agcatcatgt acttcagcca cttcgtgcct gtgttcctgc ctgccaagcc tacaacaaca      900 ccagcccta gacctccaac ccctgcccct acaattgcct ctcagcctct gtctctgagg      960
cccgaagctt gtagacctgc tgctggcgga gctgtgcaca ccagaggact ggatttcgcc     1020
tgcttttggg tgctggtggt cgtgggcgga gtgctggctt gttattctct gctggtcacc     1080
gtggccttca tcatctttgg ggtccgactg aagatccagg tccgaaaggc cgccatcacc     1140
agctacgaga agtctgatgg cgtgtacacc ggcctgagca ccagaaacca ggaaacctac     1200
```
gagacactga agcacgagaa gccccccag          1230

<210> SEQ ID NO 39
<211> LENGTH: 1215
<212> TYPE: DNA
<213> ORGANISM: Artificial Sequence
<220> FEATURE:
<223> OTHER INFORMATION: artificial sequence

<400> SEQUENCE: 39

| | | |
|---|---|---|
| atggactgga tctggcggat tctgtttctc gtgggagctg ccacaggcgc tcattctgct | 60 |
| cagcctgccg atattcttct tactcaatct cccgttattt tgtcagtatc cccaggtgag | 120 |
| cgagtcagct tctcttgtcg agcgtcacaa tccattggca ccaacataca ttggtaccaa | 180 |
| cagcgcacca acgggtctcc ccggctcttg attaagtacg catcagaaag tatttctggg | 240 |
| atcccagta ggttctcagg gagcgggagt ggcactgact ttaccctgtc cataaacagc | 300 |
| gttgagtctg aggacatcgc ggactactat tgtcagcaga caacaattg gccgaccacg | 360 |
| tttggtgcgg gaacaaaact tgaactcaaa ggcggcggag aagcggagg cggaggatct | 420 |
| gggggcggag gctctggcgg agggggatct caggtgcagc tcaaacagtc aggacctggc | 480 |
| ctcgttcagc caagccaatc actgagtata acgtgcacgg tgagcggctt tagcctgaca | 540 |
| aactatggtg tccactgggt ccgccaatct cctggaaaag gcttggagtg gctcggtgtt | 600 |
| atctggtccg gtggtaacac agactacaac acgccattca ccgtcgcct tagtattaac | 660 |
| aaggacaact ccaagtctca ggttttcttt aaaatgaact ctctgcagtc taatgatacc | 720 |
| gcaatttact actgtgcgag ggcactcacg tactatgact atgagttcgc gtattggggc | 780 |
| caagggactc tcgttactgt ctcagcggcg gccgcgctga gcaacagcat catgtacttc | 840 |
| agccacttcg tgcctgtgtt cctgcctgcc aagcctacaa caacaccagc ccctagacct | 900 |
| ccaaccctg cccctacaat tgcctctcag cctctgtctc tgaggcccga agcttgtaga | 960 |
| cctgctgctg gcggagctgt gcacaccaga ggactggatt tcgcctgctt ttgggtgctg | 1020 |
| gtggtcgtgg gcggagtgct ggcttgttat tctctgctgg tcaccgtggc cttcatcatc | 1080 |
| ttttgggtcc gactgaagat ccaggtccga aaggccgcca tcaccagcta cgagaagtct | 1140 |
| gatggcgtgt acaccggcct gagcaccaga aaccaggaaa cctacgagac actgaagcac | 1200 |
| gagaagcccc cccag | 1215 |

<210> SEQ ID NO 40
<211> LENGTH: 1230
<212> TYPE: DNA
<213> ORGANISM: Artificial Sequence
<220> FEATURE:
<223> OTHER INFORMATION: artificial sequence

<400> SEQUENCE: 40

| | | |
|---|---|---|
| atggactgga tctggcggat tctgtttctc gtgggagctg ccacaggcgc tcattctgct | 60 |
| cagcctgccg atgttgtaat gacgcagtca ccctgtcac tcccggtcac acccggagaa | 120 |
| ccagcgtcaa ttagctgccg atctagccaa agtttgcttc attccaatgg ttacaattat | 180 |
| ctcgactggt acttgcagaa acccggccaa tcccctcagc tgctcatcta ccttgggtct | 240 |
| aatagggcat ctggggttcc cgataggttc tctggctccg ggagcggcac cgactttacg | 300 |
| ttgaaaatct ctagggttga ggcggaagac gtaggcgttt actattgcat gcaggggacc | 360 |
| cactggccgc tgaccttcgg ccagggcacc aaggttgaaa taaaaggcgg cggaggaagc | 420 |
| ggaggcggag gatctggggg cggaggctct ggcggagggg gatctcaggt acagctccag | 480 |

```
gaatcaggac ccggtttggt taagccctcc gggacccttt ccctcacgtg tgcagtctca    540
ggtgggtcaa ttagttcttc caattggtgg tcttgggtgc ggcaaccacc tggtaaaggt    600
ctcgagtgga tagggaaat ttatcatagt ggctccacca attataaccc ctcactcaag     660
tccagggtta cgatatctgt ggacaaaagt aaaaaccaat tctccctcaa acttagtagt    720
gtaacagcgg cagacaccgc ggtgtactac tgcgcacggt ggacaggccg aactgatgcc    780
tttgacattt ggggacaggg aactatggtg actgtgtcat ccgcggccgc gctgagcaac    840
agcatcatgt acttcagcca cttcgtgcct gtgttcctgc ctgccaagcc tacaacaaca    900
ccagccccta gacctccaac ccctgcccct acaattgcct ctcagcctct gtctctgagg    960
cccgaagctt gtagacctgc tgctggcgga gctgtgcaca ccagaggact ggatttcgcc    1020
tgcttttggg tgctggtggt cgtgggcgga gtgctggctt gttattctct gctggtcacc    1080
gtggccttca tcatcttttg ggtccgactg aagatccagg tccgaaaggc cgccatcacc    1140
agctacgaga agtctgatgg cgtgtacacc ggcctgagca ccagaaacca ggaaacctac    1200
gagacactga agcacgagaa gccccccag                                      1230

<210> SEQ ID NO 41
<211> LENGTH: 1203
<212> TYPE: DNA
<213> ORGANISM: Artificial Sequence
<220> FEATURE:
<223> OTHER INFORMATION: artificial sequence

<400> SEQUENCE: 41
atggactgga tctggcgcat cctcttcctc gtcggcgctg ctaccggcgc tcattcggcc    60
cagccggccg acattcaaat gactcagtcc ccttccagct tgtcagcctc agtaggggac    120
cgggtcacga tcacctgtcg agcgtctgag tcagtggata actacgggat ttctttcatg    180
aactggttcc agcagaagcc cggcaaagct cctaagctcc ttatatatgc agcctcaaat    240
caggggagcg gtgttcctag tcgcttcagt ggaagcggta gcggtacgga ctttacgttg    300
acgataagta gccttcagcc agatgacttt gccacttatt attgtcagca gtctaaggaa    360
gttccttgga cgtttggcca aggaacgaag gtcgaaatca aaggggagg ggctcagga    420 gggggcggca gtggtggtgg aggctctcaa gtccaactcg tacagtctgg cgcggaggtt    480
aaaaagccgg gaagctccgt gaaagtatcc tgtaaggcaa gcggatacac ctttaccgat    540
tataacatgc actgggttag gcaggcgccc ggccaaggtc tggaatggat cggttatatt    600
tatccataca acgtggtac cggctataat cagaagttta agagtaaggc tactattaca     660
gcggatgagt caaccaatac tgcatacatg agctctcct cactcaggag cgaagatacc    720
gcagtgtatt actgtgcccg agggagacca gccatggact actggggtca gggtacccct    780
gtgacagtat ctagcgcggc cgcgctgagc aacagcatca tgtacttcag ccacttcgtg    840
cctgtgttcc tgcctgccaa gcctacaaca acaccagccc ctagacctcc aaccctgcc    900 cctacaattg cctctcagcc tctgtctctg aggcccgaag cttgtagacc tgctgctggc    960
ggagctgtgc acaccagagg actggatttc gcctgctttt gggtgctggt ggtcgtgggc    1020
ggagtgctgg cttgttattc tctgctggtc accgtggcct tcatcatctt ttgggtccga    1080
ctgaagatcc aggtccgaaa ggccgccatc accagctacg agaagtctga tggcgtgtac    1140
accggcctga gcaccagaaa ccaggaaacc tacgagacac tgaagcacga gaagcccccc    1200
cag                                                                  1203
```

<210> SEQ ID NO 42
<211> LENGTH: 1215
<212> TYPE: DNA
<213> ORGANISM: Artificial Sequence
<220> FEATURE:
<223> OTHER INFORMATION: artificial sequence

<400> SEQUENCE: 42

```
atggactgga tctggcggat tctgtttctc gtgggagctg ccacaggcgc tcattctgct      60
cagcctgcca acatccagat gacccagtct ccatcttctg tgtctgcatc tgtaggagac     120
agagtcacca tcacttgtcg ggcgagtcag gatattagcc gctggttagc ctggtatcag     180
cagaaaccag ggaaagcccc taaactcctg atctatgctg catccagttt gcaaagtggg     240
gtcccatcga ggttcagcgg cagtggatct gggacagatt tcgctctcac tatcagcagc     300
ctgcagcctg aagattttgc aacttactat tgtcaacagg ctgacagtcg tttctcgatc     360
accttcggcc aagggacacg actggagatt aaaggcggcg aggaagcgg aggcggagga     420
tctggggcg gaggctctgg cggagggga tctgaggtgc agctggtgca gtctggggga     480
ggcttggtac agcctggggg gtccctgaga ctctcctgtg cagcctctgg attcaccttc     540
agtagctata gcatgaactg ggtccgccag gctccaggga aggggctgga gtgggtttca     600
tacattagta gtagtag taccatacag tacgcagact ctgtgaaggg ccgattcacc     660
atctccagag acaatgccaa gaactcactg tatctgcaaa tgaacagcct gagagacgag     720
gacacggctg tgtattactg tgcgagaggg gactactact acggtatgga cgtctggggc     780
caagggacca cggtcaccgt gagctcagcg gccgcgctga gcaacagcat catgtacttc     840
agccacttcg tgcctgtgtt cctgcctgcc aagcctacaa caacaccagc cctagacct     900
ccaaccctg cccctacaat tgcctctcag cctctgtctc tgaggcccga agcttgtaga     960
cctgctgctg gcggagctgt gcacaccaga ggactggatt cgcctgcttt tgggtgctg    1020
gtggtcgtgg gcggagtgct ggcttgttat tctctgctgg tcaccgtggc cttcatcatc    1080
ttttgggtcc gactgaagat ccaggtccga aaggccgcca tcaccagcta cgagaagtct    1140
gatggcgtgt acaccggcct gagcaccaga accaggaaa cctacgagac actgaagcac    1200
gagaagcccc cccag                                                    1215
```

<210> SEQ ID NO 43
<211> LENGTH: 1203
<212> TYPE: DNA
<213> ORGANISM: Artificial Sequence
<220> FEATURE:
<223> OTHER INFORMATION: artificial sequence

<400> SEQUENCE: 43

```
atggactgga tctggcgcat cctcttcctc gtcggcgctg ctaccggcgc tcattcggcc      60
cagccggccg acattcaaat gactcagtcc ccttccagct tgtcagcctc agtaggggac     120
cgggtcacga tcacctgtcg agcgtctgag tcagtggata ctacgggat ttctttcatg     180
aactggttcc agcagaagcc cggcaaagct cctaagctcc ttatatatgc agcctcaaat     240
caggggagcg gtgttcctag tcgcttcagt ggaagcggta gcgtacggaa ctttacgttg     300
acgataagta gccttcagcc agatgacttt gccacttatt attgtcagca gtctaaggaa     360
gttccttgga cgtttggcca aggaacgaag gtcgaaatca aaggggagg ggctcagga     420
gggggcggca gtggtggtgg aggctctcaa gtccaactcg tacagtctgg cgcggaggtt     480
aaaaagccgg gaagctccgt gaaagtatcc tgtaaggcaa gcggatacac ctttaccgat     540
```

| | | |
|---|---|---|
| tataacatgc actgggttag gcaggcgccc ggccaaggtc tggaatggat cggttatatt | 600 |
| tatccataca acggtggtac cggctataat cagaagttta agagtaaggc tactattaca | 660 |
| gcggatgagt caaccaatac tgcatacatg gagctctcct cactcaggag cgaagatacc | 720 |
| gcagtgtatt actgtgcccg agggagacca gccatggact actggggtca gggtacccct | 780 |
| gtgacagtat ctagcgcggc cgcgctgagc aacagcatca tgtacttcag ccacttcgtg | 840 |
| cctgtgttcc tgcctgccaa gcctacaaca acaccagccc ctagacctcc aaccctgcc | 900 |
| cctacaattg cctctcagcc tctgtctctg aggcccgaag cttgtagacc tgctgctggc | 960 |
| ggagctgtgc acaccagagg actggatttc gcctgctttt gggtgctggt ggtcgtgggc | 1020 |
| ggagtgctgg cttgttattc tctgctggtc accgtggcct tcatcatctt ttgggtccga | 1080 |
| ctgaagatcc aggtccgaaa ggccgccatc accagctacg agaagtctga tggcgtgtac | 1140 |
| accggcctga gcaccagaaa ccaggaaacc tacgagacac tgaagcacga aagccccc | 1200 |
| cag | 1203 |

```
<210> SEQ ID NO 44
<211> LENGTH: 1596
<212> TYPE: DNA
<213> ORGANISM: Artificial Sequence
<220> FEATURE:
<223> OTHER INFORMATION: artificial sequence

<400> SEQUENCE: 44
```

| | | |
|---|---|---|
| atgaaccggg gagtcccttt taggcacttg cttctggtgc tgcaactggc gctcctccca | 60 |
| gcagccactc agggaaagaa agtggtgctg gcaaaaaag gggatacagt ggaactgacc | 120 |
| tgtacagctt cccagaagaa gagcatacaa ttccactgga aaaactccaa ccagataaag | 180 |
| attctgggaa atcagggctc cttcttaact aaaggtccat ccaagctgaa tgatcgcgct | 240 |
| gactcaagaa gaagcctttg ggaccaagga actttcccc tgatcatcaa gaatcttaag | 300 |
| atagaagact cagatactta catctgtgaa gtggaggacc agaaggagga ggtgcaattg | 360 |
| ctagtgttcg gattgactgc caactctgac acccacctgc ttcaggggca gagcctgacc | 420 |
| ctgaccttgg agagccccc tggtagtagc ccctcagtgc aatgtaggag tccaagggt | 480 |
| aaaaacatac aggggggaa gaccctctcc gtgtctcagc tggagctcca ggatagtggc | 540 |
| acctggacat gcactgtctt gcagaaccag aagaaggtgg agttcaaaat agacatcgtg | 600 |
| gtgctagctt ccagaaggc ctccagcata gtctataaga agaggggga acaggtggag | 660 |
| ttctccttcc cactcgcctt tacagttgaa agctgacgg gcagtggcga gctgtggtgg | 720 |
| caggcggaga gggcttcctc ctccaagtct tggatcacct ttgacctgaa gaacaaggaa | 780 |
| gtgtctgtaa acgggttac ccaggaccct aagctccaga tggcaagaa gctcccgctc | 840 |
| cacctcaccc tgccccaggc cttgcctcag tatgctggct ctggaaacct caccctggcc | 900 |
| cttgaagcga aaacaggaaa gttgcatcag gaagtgaacc tggtggtgat gagagccact | 960 |
| cagctccaga aaaatttgac ctgtgaggtg tggggaccca cctcccctaa gctgatgctg | 1020 |
| agtttgaaac tggagaacaa ggaggcaaag gtctcgaagc gggagaaggc ggtgtgggtg | 1080 |
| ctgaaccctg aggcggggat gtggcagtgt ctgctgagtg actcgggaca ggtcctgctg | 1140 |
| gaatccaaca tcaaggttct gcccacatgg tccaccccgg tgcagccagc ggccgcgctg | 1200 |
| agcaacagca tcatgtactt cagccacttc gtgcctgtgt tcctgcctgc caagcctaca | 1260 |
| acaacaccag cccctagacc tccaaccct gcccctacaa ttgcctctca gcctctgtct | 1320 |

| | |
|---|---|
| ctgaggcccg aagcttgtag acctgctgct ggcggagctg tgcacaccag aggactggat | 1380 |
| ttcgcctgct tttgggtgct ggtggtcgtg gcggagtgc tggcttgtta ttctctgctg | 1440 |
| gtcaccgtgg ccttcatcat cttttgggtc cgactgaaga tccaggtccg aaaggccgcc | 1500 |
| atcaccagct acgagaagtc tgatggcgtg tacaccggcc tgagcaccag aaaccaggaa | 1560 |
| acctacgaga cactgaagca cgagaagccc ccccag | 1596 |

<210> SEQ ID NO 45
<211> LENGTH: 1215
<212> TYPE: DNA
<213> ORGANISM: Artificial Sequence
<220> FEATURE:
<223> OTHER INFORMATION: artificial sequence

<400> SEQUENCE: 45

| | |
|---|---|
| atggactgga tctggcggat tctgtttctc gtgggagctg ccacaggcgc tcattctgct | 60 |
| cagcctgccg aagttcagct tgtagaatct ggaggtggat tggttcaacc tggtggctct | 120 |
| cttcgcctga gttgtgcagc ctctggtttt actttcaata gttacgctat gcattgggtt | 180 |
| cgtcaggctc ctgggaaagg cctggaatgg gtttcagcta ttagtggtaa tggaggtagt | 240 |
| actcgttacg cagacagtgt gaaaggtcgc ttcaccatca gccgtgataa ttctaagaac | 300 |
| actttgtacc tgcaaatgaa ctccttgcgc gcagaagaca cggctgtgta ctattgtgcc | 360 |
| cgtgatcgct tcggaaggt tcatggtttc gatgtatggg acaaggtac cctggtaacg | 420 |
| gtttctagcg gaggtggtgg gagtggtgga ggcggctcgg gtggaggtgg ttcaggagga | 480 |
| ggcggagata tccaaatgac tcaatctcct agttcactgt cagcctctgt tggtgatcgc | 540 |
| gtgaccatta cctgccaagc tagccaggat attagcaact acttgaactg gtatcagcag | 600 |
| aagcctggca agcccccaaa gctgttgatc tacgatgcaa gtaacttgga aactggcgtc | 660 |
| ccaagccgct ctctggatc tggttcaggc accgacttca ctttcactat cagcagcctg | 720 |
| cagcctgaag atatcgcaac ctactattgc cagcaggatg ctacttttcc tttgactttc | 780 |
| ggccaaggca ccaaggtgga gatcaaggcg ccgcgctga gcaacagcat catgtacttc | 840 |
| agccacttcg tgcctgtgtt cctgcctgcc aagcctacaa caacaccagc ccctagacct | 900 |
| ccaaccccctg cccctacaat tgcctctcag cctctgtctc tgaggcccga agcttgtaga | 960 |
| cctgctgctg gcggagctgt gcacaccaga ggactggatt tcgcctgctt ttgggtgctg | 1020 |
| gtggtcgtgg gcggagtgct ggcttgttat tctctgctgg tcaccgtggc cttcatcatc | 1080 |
| ttttgggtcc gactgaagat ccaggtccga aaggccgcca tcaccagcta cgagaagtct | 1140 |
| gatggcgtgt acaccggcct gagcaccaga aaccaggaaa cctacgagac actgaagcac | 1200 |
| gagaagcccc ccag | 1215 |

<210> SEQ ID NO 46
<211> LENGTH: 1194
<212> TYPE: DNA
<213> ORGANISM: Artificial Sequence
<220> FEATURE:
<223> OTHER INFORMATION: artificial sequence

<400> SEQUENCE: 46

| | |
|---|---|
| atggactgga tctggcggat tctgtttctc gtgggagctg ccacaggcgc tcattctgct | 60 |
| cagcctgccg tccagctgca gcagtctgga cctgagctgg taaagcctgg ggcttcagtg | 120 |
| aagatgtcct gcaaggcttc tggatacaca ttcactagct atgttatgca ctgggtgaag | 180 |
| cagaagcctg ggcaggcct gagtggatt ggatatatta ttccttacaa tgatgctact | 240 |

```
aagtacaatg agaagttcaa aggcaaggcc acactgactt cagacaaatc ctccagcaca      300
gcctacatgg agctcagcag cctgacctct gaggactctg cggtctatta ctgtgcacgc      360
tataattacg acgggtactt cgatgtctgg ggcgcaggga ccacggtcac cgtctcctca      420
ggcggcggag aagcggagg cggaggatct ggggggcggag gctctgacat tgtgatgact      480
cagtctccag ccaccctgtc tgtgactcca ggagatagag tctctctttc ctgcagggcc      540
agccagagta ttagcgacta cttacactgg tatcaacaaa aatcacatga gtctccaagg      600
cttctcatca aatatgcttc ccaatccatc tctggaatcc cctccaggtt cagtggcagt      660
ggatcagggt cagatttcac tctcagtatc aacagtgtgg aacctgaaga tgttggagtg      720
tattactgtc aaaatggtca cagctttcct ccgacgttcg gtggaggcac caagctggaa      780
atcaaagcgg ccgcgctgag caacagcatc atgtacttca gccacttcgt gcctgtgttc      840
ctgcctgcca agcctacaac aacaccagcc cctagacctc caaccctgc ccctacaatt      900 gcctctcagc ctctgtctct gaggcccgaa gcttgtagac ctgctgctgg cggagctgtg      960
cacaccagag gactggattt cgcctgcttt tgggtgctgg tggtcgtggg cggagtgctg     1020
gcttgttatt ctctgctggt caccgtggcc ttcatcatct ttgggtccg actgaagatc     1080 caggtccgaa aggccgccat caccagctac gagaagtctg atggcgtgta caccggcctg     1140
agcaccagaa accaggaaac ctacgagaca ctgaagcacg agaagccccc ccag           1194

<210> SEQ ID NO 47
<211> LENGTH: 1206
<212> TYPE: DNA
<213> ORGANISM: Artificial Sequence
<220> FEATURE:
<223> OTHER INFORMATION: artificial sequence

<400> SEQUENCE: 47
atggactgga tctggcggat tctgtttctc gtgggagctg ccacaggcgc tcattctgct       60
cagcctgccc aggtgcaagt gaaagagtct ggccctggac tggtggcccc aagccagtct      120
ctgagcatca catgtaccgt gtccggcttc agcctgacca actatggcgt gcactgggtc      180
cgacagcctc caggcaaagg actggaatgg ctggagtga tttgggctgg cggcagcacc      240
aactacaaca gcgccctgat gagccggctg agcatctcca aggacaacag caagagccag      300
gtgttcctga gatgaacag cctgcagacc gacgacaccg ccatgtacta ctgtgctagc      360
agaggcggca actacggcta cgccctggat tattgggggcc agggcacaag cgtgaccgtg      420
tcatctggcg gcggaggaag cggaggcgga ggatctgggg gcggaggctc tggcggaggg      480
ggatctagca tcgtgatgac ccagactcct aagttcctgc tggtgtctgc cggcgacaga      540
gtgaccatca cctgtaaagc cagccagagc gtgtccaacg acgtggcctg gtatcagcag      600
aagcctggac agagccccaa gctgctgatc tacagcgcca gcaacagata caccggcgtg      660
cccgatagat tcaccggctc tggctacggc accgacttca cctttaccat cagcaccgtg      720
caggccgagg atctggccgt gtacttctgc cagcaagact acagctctct cggcggaggc      780
accaagctgg aaatcaaagc ggccgcgctg agcaacagca tcatgtactt cagccacttc      840
gtgcctgtgt tcctgcctgc caagcctaca acaaccagc cctagacc tccaaccct       900 gccccctacaa ttgcctctca gcctctgtct ctgaggcccg aagcttgtag acctgctgct      960
ggcggagctg tgcacaccag aggactggat ttcgcctgct tttgggtgct ggtggtcgtg     1020
ggcggagtgc tggcttgtta ttctctgctg gtcaccgtgg ccttcatcat cttttgggtc     1080
```

```
cgactgaaga tccaggtccg aaaggccgcc atcaccagct acgagaagtc tgatggcgtg    1140
tacaccggcc tgagcaccag aaaccaggaa acctacgaga cactgaagca cgagaagccc    1200
ccccag                                                                1206
```

<210> SEQ ID NO 48
<211> LENGTH: 1248
<212> TYPE: DNA
<213> ORGANISM: Artificial Sequence
<220> FEATURE:
<223> OTHER INFORMATION: artificial sequence

<400> SEQUENCE: 48

```
atggactgga tctggcggat tctgtttctc gtgggagctg ccacaggcgc tcattctgct      60
cagcctgccc aggttcagct gcagcagtct ggacctgagc tggttaagcc tggcgcctcc     120
gtgaagatga gctgcaagac cagccggtac accttcaccg agtacaccat ccactgggtc     180
cgacagagcc acggcaagag cctggaatgg atcggcggca tcaacccaa caacggcatc     240 cccaactaca accagaagtt caagggcaga gccacactga ccgtgggcaa gtctagcagc    300
accgcctaca tggaactgcg gagcctgaca agcgaggaca cgccgtgta cttctgcgcc     360 agaagaagaa tcgcctacgg ctacgatgag ggccacgcca tggattattg gggccaggga    420
acaagcgtga ccgtgtctag tggcggcgga ggaagcggag cggaggatc tggggcgga    480 ggctctggcg aggggggatc tgacatcgtg atgacacaga gccttctag cctggccgtg    540 tccgtgggag agaaagtgac catgagctgc aagagcagcc agagcctgct gtactcccgg     600
aaccagaaga ctacctggc ctggttccag cagaagcccg gccagtctcc taagctgctg     660
atcttctggg ccagcaccag agaaagcggc gtgcccgata gattcaccgg cagcggcttt    720
ggcaccgact caacctgac aatcagcagc gtgcaggccg aggacctggc tgtgtacgat    780
tgccagcagt acttcagcta ccctctgacc tttggagccg gcaccaagct ggaactgaga   840
gcggccgcgc tgagcaacag catcatgtac ttcagccact cgtgcctgt gttcctgcct   900 gccaagccta caacaacacc agcccctaga cctccaaccc ctgcccctac aattgcctct   960
cagcctctgt ctctgaggcc cgaagcttgt agacctgctg ctggcggagc tgtgcacacc   1020
agaggactgg atttcgcctg cttttgggtg ctggtggtcg tgggcggagt gctggcttgt   1080
tattctctgc tggtcaccgt ggccttcatc atcttttggg tccgactgaa gatccaggtc   1140
cgaaaggccg ccatcaccag ctacgagaag tctgatggcg tgtacaccgg cctgagcacc   1200
agaaaccagg aaacctacga gacactgaag cacgagaagc cccccag                1248
```

<210> SEQ ID NO 49
<211> LENGTH: 510
<212> TYPE: DNA
<213> ORGANISM: Artificial Sequence
<220> FEATURE:
<223> OTHER INFORMATION: artificial sequence

<400> SEQUENCE: 49

```
atgcgcatca gcaagcccca cctgcgcagc atcagcatcc agtgctacct gtgcctgctg      60
ctgaacagcc acttcctgac cgaggccggc atccacgtgt tcatcctggg ctgcttcagc    120
gccggcctgc ccaagaccga ggccaactgg gtgaacgtga tcagcgacct gaagaagatc    180
gaggacctga tccagagcat gcacatcgac gccaccctgt acaccgagag cgacgtgcac    240
cccagctgca aggtgaccgc catgaagtgc ttcctgctgg agctgcaggt gatcagcctg    300
gagagcggcg acgccagcat ccacgacacc gtggagaacc tgatcatcct ggccaacaac    360
```

| | |
|---|---:|
| agcctgagca gcaacggcaa cgtgaccgag agcggctgca aggagtgcga ggagctggag | 420 |
| gagaagaaca tcaaggagtt cctgcagagc ttcgtgcaca tcgtgcagat gttcatcaac | 480 |
| accagcggct ccgagaagga cgagctgtaa | 510 |

<210> SEQ ID NO 50
<211> LENGTH: 169
<212> TYPE: PRT
<213> ORGANISM: Artificial Sequence
<220> FEATURE:
<223> OTHER INFORMATION: artificial sequence

<400> SEQUENCE: 50

Met Arg Ile Ser Lys Pro His Leu Arg Ser Ile Ser Ile Gln Cys Tyr
1               5                   10                  15

Leu Cys Leu Leu Leu Asn Ser His Phe Leu Thr Glu Ala Gly Ile His
            20                  25                  30

Val Phe Ile Leu Gly Cys Phe Ser Ala Gly Leu Pro Lys Thr Glu Ala
        35                  40                  45

Asn Trp Val Asn Val Ile Ser Asp Leu Lys Lys Ile Glu Asp Leu Ile
    50                  55                  60

Gln Ser Met His Ile Asp Ala Thr Leu Tyr Thr Glu Ser Asp Val His
65                  70                  75                  80

Pro Ser Cys Lys Val Thr Ala Met Lys Cys Phe Leu Leu Glu Leu Gln
                85                  90                  95

Val Ile Ser Leu Glu Ser Gly Asp Ala Ser Ile His Asp Thr Val Glu
            100                 105                 110

Asn Leu Ile Ile Leu Ala Asn Asn Ser Leu Ser Ser Asn Gly Asn Val
        115                 120                 125

Thr Glu Ser Gly Cys Lys Glu Cys Glu Glu Leu Glu Glu Lys Asn Ile
    130                 135                 140

Lys Glu Phe Leu Gln Ser Phe Val His Ile Val Gln Met Phe Ile Asn
145                 150                 155                 160

Thr Ser Gly Ser Glu Lys Asp Glu Leu
                165

<210> SEQ ID NO 51
<211> LENGTH: 1215
<212> TYPE: DNA
<213> ORGANISM: Artificial Sequence
<220> FEATURE:
<223> OTHER INFORMATION: artificial sequence

<400> SEQUENCE: 51

| | |
|---|---:|
| atggactgga tctggcgcat cctcttcctc gtcggcgctg ctaccggcgc tcattcggcc | 60 |
| cagccggcca tggcgcaagt aaaactccaa gaatctgggg cggagctggt gaaaccgggg | 120 |
| gcgtctgtga agatgagctg taaagcatca ggctacacct tcacctccta taatatgcac | 180 |
| tgggtgaaac aaacacccgg acagggcctc gaatggattg tgccatcta tcctggaaat | 240 |
| ggtgataccc tcatataatca gaagtttaag ggcaaggcta cgcttactgc ggataaaagc | 300 |
| tcttccactg cttacatgca actgagcagt ctcacttcag aggactcagc cgattattat | 360 |
| tgtgcccgca gcaactacta tggtagttca tactggtttt tcgacgtttg ggggcaaggt | 420 |
| accaccgtca cggtttcttc tggtggggggc ggaagcgggg gtggaggatc tgggggcggt | 480 |
| ggttcagaca ttgaactcac ccagagccct actattctga gcgcgtctcc aggtgaaaaa | 540 |
| gttacgatga cgtgcagagc atcaagtagt gtgaattata tggattggta tcaaaagaag | 600 |

```
ccaggctcat ccccaaaacc gtggatctat gcaactagca acctcgcgtc aggggtgcca      660
gcaaggtttt ccggaagtgg ttctggcaca tcttatagtc tcaccatttc ccgagtggag      720
gctgaggatg cggccactta ttactgccag caatggtcat tcaatccccc aacatttggt      780
ggcggaacaa aactcgaaat taaacgggcg ccgcgctga gcaacagcat catgtacttc       840
agccacttcg tgcctgtgtt cctgcctgcc aagcctacaa caacaccagc ccctagacct      900
ccaacccctg ccctacaat tgcctctcag cctctgtctc tgaggcccga agcttgtaga       960
cctgctgctg gcggagctgt gcacaccaga ggactggatt tcgcctgctt ttgggtgctg     1020
gtggtcgtgg gcggagtgct ggcttgttat tctctgctgg tcaccgtggc cttcatcatc     1080
ttttgggtcc gactgaagat ccaggtccga aaggccgcca tcaccagcta cgagaagtct     1140
gatggcgtgt acaccggcct gagcaccaga aaccaggaaa cctacgagac actgaagcac     1200
gagaagcccc cccag                                                      1215

<210> SEQ ID NO 52
<211> LENGTH: 1248
<212> TYPE: DNA
<213> ORGANISM: Artificial Sequence
<220> FEATURE:
<223> OTHER INFORMATION: artificial sequence

<400> SEQUENCE: 52
atggactgga tctggcgcat cctcttcctc gtcggcgctg ctaccggcgc tcattcggcc       60
cagccggccg atatcgagct cacccaatct ccaaaattca gtccacatc agtaggagac      120 agggtcagcg tcacctgcaa ggccagtcag aatgtggata ctaatgtagc gtggtatcaa     180
caaaaaccag gcaatctcc tgaaccactg cttttctcgg catcctaccg ttacactgga     240
gtccctgatc gcttcacagg cagtggatct gggacagatt tcactctcac catcagcaat     300
gtgcagtctg aagacttggc agagtatttc tgtcagcaat ataacagcta tcctctgacg    360
ttcggtggcg gcaccaagct ggaaatcaaa cgggctgccg cagaaggtgg aggcggttca     420
ggtggcggag gttccggcgg aggtggctct ggcggtggcg gatcggccat ggcccaggtg    480
aagctgcagc agtcaggagg gggcttggtg caacctggag ctccatgaa actctcctgt    540 gttgtctctg gattcacttt cagtaattac tggatgaact gggtccgcca gtctccagag    600
aaggggcttt agtggattgc agaaattaga ttgaaatcca ataattttgg aagatattat    660
gcggagtctg tgaaagggag gttcaccatc tcaagagatg attccaaaag tagtgcctac    720
ctgcaaatga tcaacctaag agctgaagat actggcattt attactgtac cagttatggt    780
aactacgttg ggcactattt tgaccactgg ggccaaggga ccacggtcac cgtatcgagt    840
gcggccgcgc tgagcaacag catcatgtac ttcagccact cgtgcctgt gttcctgcct    900 gccaagccta acaacaccc ccccctaga cctccaaccc ctgcccctac aattgcctct    960
cagcctctgt ctctgaggcc cgaagcttgt agacctgctg ctggcggagc tgtgcacacc    1020
agaggactgg atttcgcctg cttttgggtg ctggtggtcg tgggcggagt gctggcttgt     1080
tattctctgc tggtcaccgt ggccttcatc atcttttggg tccgactgaa gatccaggtc    1140
cgaaaggccg ccatcaccag ctacgagaag tctgatggcg tgtacaccgg cctgagcacc    1200
agaaaccagg aaacctacga gacactgaag cacgagaagc ccccccag               1248

<210> SEQ ID NO 53
<211> LENGTH: 6787
<212> TYPE: DNA
```

<213> ORGANISM: Artificial Sequence
<220> FEATURE:
<223> OTHER INFORMATION: artificial sequence

<400> SEQUENCE: 53

```
tgtatttaga aaaataaaca aatagggtt ccgcgcacat ttccccgaaa agtgccacct      60
gacgtcgacg gatcgggaga tctcccgatc ccctatggtg cactctcagt acaatctgct    120
ctgatgccgc atagttaagc cagtatctgc tccctgcttg tgtgttggag gtcgctgagt    180
agtgcgcgag caaaatttaa gctacaacaa ggcaaggctt gaccgacaat tgcatgaaga    240
atctgcttag ggttaggcgt tttgcgctgc ttcgggatcc gctgaccaaa agagcaccaa    300
aggcgccctg accttcagcc cctacctgcg ctccggtgcc cgtcagtggg cagagcgcac    360
atcgcccaca gtccccgaga agttgggggg aggggtcggc aattgaaccg gtgcctagag    420
aaggtggcgc ggggtaaact gggaaagtga tgtcgtgtac tggctccgcc ttttttcccga    480
gggtgggggga gaaccgtata taagtgcagt agtcgccgtg aacgttcttt ttcgcaacgg    540
gtttgccgcc agaacacagg taagtgccgt gtgtggttcc cgcgggcctg gcctcttttac    600
gggttatggc ccttgcgtgc cttgaattac ttccacctgg ctgcagtacg tgattcttga    660
tcccgagctt cggttggaa gtgggtggga gagttcgagg ccttgcgctt aaggagccccc    720
ttcgcctcgt gcttgagttg aggcctggcc tgggcgctgg ggccgccgcg tgcgaatctg    780
gtggcacctt cgcgcctgtc tcgctgcttt cgataagtct ctagccattt aaaattttttg    840
atgacctgct gcgacgcttt tttttctggca agatagtctt gtaaatgcgg gccaagatct    900
gcacactggt atttcggttt ttggggccgc gggcggcgac ggggcccgtg cgtcccagcg    960
cacatgttcg gcgaggcggg gcctgcgagc gcggccaccg agaatcggac ggggtagtc    1020
tcaagctggc cggcctgctc tggtgcctgg cctcgcgccg ccgtgtatcg ccccgccctg   1080
ggcggcaagg ctggcccggt cggcaccagt tgcgtgagcg gaaagatggc cgcttcccgg   1140
ccctgctgca gggagctcaa aatgaggac cggcgctcg ggagagcggg cgggtgagtc    1200
acccacacaa aggaaaaggg cctttccgtc ctcagccgtc gcttcatgtg actccacgga   1260
gtaccgggcg ccgtccaggc acctcgatta gttctcgagc ttttggagta cgtcgtcttt   1320
aggttggggg gagggttttt atgcgatgga gtttccccac actgagtggg tggagactga   1380
agttaggcca gcttggcact tgatgtaatt ctccttggaa tttgcccttt ttgagtttgg   1440
atcttggttc attctcaagc ctcagacagt ggttcaaagt tttttttcttc catttcaggt   1500
gtcgtgataa tacgactcac tatagggaga cccaagctgg aattcgccac catggactgg   1560
atctggcgga ttctgtttct cgtgggagct gccacaggcg ctcattctgc tcagcctgcc   1620
gatgttgtaa tgacgcagtc acccctgtca ctcccggtca cacccggaga accagcgtca   1680
attagctgcc gatctagcca aagtttgctt cattccaatg gttacaatta tctcgactgg   1740
tacttgcaga aacccggcca atcccctcag ctgctcatct accttgggtc taatagggca   1800
tctggggttc ccgataggtt ctctggctcc gggagcggca ccgactttac gttgaaaatc   1860
tctagggttg aggcggaaga cgtaggcgtt tactattgca tgcaggggac ccactggccg   1920
ctgaccttcg gccagggcac caaggttgaa ataaaaggcg gcgaggaag cggaggcgga   1980
ggatctgggg gcggaggctc tggcggaggg ggatctcagg tacagctcca ggaatcagga   2040
cccggtttgg ttaagccctc cgggacccctt tccctcacgt gtgcagtctc aggtgggtca   2100
attagttctt ccaattggtg gtcttgggtg cggcaaccac ctggtaaagg tctcgagtgg   2160
ataggggaaa tttatcatag tggctccacc aattataacc cctcactcaa gtccagggtt   2220
```

```
acgatatctg tggacaaaag taaaaaccaa ttctccctca aacttagtag tgtaacagcg    2280
gcagacaccg cggtgtacta ctgcgcacgg tggacaggcc gaactgatgc ctttgacatt    2340
tggggacagg gaactatggt gactgtgtca tccgcggccg cgctgagcaa cagcatcatg    2400
tacttcagcc acttcgtgcc tgtgttcctg cctgccaagc ctacaacaac accagcccct    2460
agacctccaa cccctgcccc tacaattgcc tctcagcctc tgtctctgag gcccgaagct    2520
tgtagacctg ctgctggcgg agctgtgcac accagaggac tggatttcgc ctgcttttgg    2580
gtgctggtgg tcgtgggcgg agtgctggct tgttattctc tgctggtcac cgtggccttc    2640
atcatctttt gggtccgact gaagatccag gtccgaaagg ccgccatcac cagctacgag    2700
aagtctgatg gcgtgtacac cggcctgagc accagaaacc aggaaaccta cgagacactg    2760
aagcacgaga agcccccccca gggatctgga gctactaact tcagcctgct gaagcaggct    2820
ggagacgtgg aggagaaccc tggacctatg tggcagctgc tgctgcctac agctctcctg    2880
ctgctggtgt ccgccggcat gagaaccgag gatctgccta aggccgtggt gttcctggaa    2940
ccccagtggt acagagtgct ggaaaaggac agcgtgaccc tgaagtgcca gggcgcctac    3000 agccccgagac acaatagcac ccagtggttc acaacgagac gcctgatcag cagccaggcc    3060
agcagctact tcatcgacgc cgccaccgtg gacgacagcg gcgagtatag atgccagacc    3120
aacctgagca ccctgagcga ccccgtgcag ctggaagtgc acatcggatg gctgctgctg    3180
caggccccca gatgggtgtt caaagaagag acccccatcc acctgagatg ccactcttgg    3240
aagaacaccg ccctgcacaa agtgacctac ctgcagaacg gcaagggcag aaagtacttc    3300
caccacaaca gcgacttcta catccccaag gccaccctga aggactccgg ctcctacttc    3360
tgcagaggcc tcgtgggcag caagaacgtg tccagcgaga cagtgaacat caccatcacc    3420
cagggcctgg ccgtgtctac catcagcagc tttttcccac ccggctacca ggtgtccttc    3480
tgcctcgtga tggtgctgct gttcgccgtg gacaccggcc tgtacttcag cgtgaaaaca    3540
aacatcagaa gcagcacccg ggactggaag gaccacaagt tcaagtggcg gaaggacccc    3600
caggacaagt gaaattccgc ccctctcccc ccccccctc tccctccccc ccccctaacg    3660
ttactggccg aagccgcttg gaataaggcc ggtgtgcgtt tgtctatatg ttattttcca    3720
ccatattgcc gtcttttggc aatgtgaggg cccggaaacc tggccctgtc ttcttgacga    3780
gcattcctag gggtctttcc cctctcgcca aggaatgca aggtctgttg aatgtcgtga    3840
aggaagcagt tcctctggaa gcttcttgaa gacaaacaac gtctgtagcg acccctttgca    3900 ggcagcggaa ccccccacct ggcgacaggt gcctctgcgg ccaaaagcca cgtgtataag    3960
atacacctgc aaaggcggca aaccccagt gccacgttgt gagttggata gttgtggaaa    4020
gagtcaaatg gctctcctca gcgtattca acaaggggct gaaggatgcc cagaaggtac    4080
cccattgtat gggatctgat ctggggcctc ggtgcacatg ctttacatgt gtttagtcga    4140
ggttaaaaaa acgtctaggc cccccgaacc acgggacg ggttttcctt tgaaaaacac    4200
gataaccgcc accatgtacc ggatgcagct gctgagctgt atcgccctgt ctctggccct    4260
cgtgaccaac agcgcccta ccagcagcag caccaagaaa acccagctgc agctggaaca    4320
tctgctgctg gacctgcaga tgatcctgaa cggcatcaac aactacaaga accccaagct    4380
gacccggatg ctgaccttca agttctacat gcccaagaag gccaccgaac tgaaacatct    4440
gcagtgcctg gaagaggaac tgaagcccct ggaagaagtg ctgaacctgg cccagagcaa    4500
gaacttccac ctgaggccca gggacctgat cagcaacatc aacgtgatcg tgctggaact    4560
```

-continued

```
gaaaggcagc gagacaacct tcatgtgcga gtacgccgac gagacagcta ccatcgtgga      4620
atttctgaac cggtggatca ccttctgcca gagcatcatc agcaccctga ccggctccga      4680
gaaggacgag ctgtgagcgg ccgcccgctg atcagcctcg aacgagattt cgattccacc      4740
gccgccttct atgaaaggtt gggcttcgga atcgttttcc gggacgccgg ctggatgatc      4800
ctccagcgcg gggatctcat gctggagttc ttcgcccacc ccaacttgtt tattgcagct      4860
tataatggtt acaaataaag caatagcatc acaaatttca caaataaagc atttttttca      4920
ctgcattcta gttgtggttt gtccaaactc atcaatgtat cttatcatgt ctgtgcggtg      4980
ggctctatgg cttctgaggc ggaaagaacc agctggggct ctaggggta tccccgatc        5040 ctgagcaaaa ggccagcaaa aggccaggaa ccgtaaaaag gccgcgttgc tggcgttttt      5100
ccataggctc cgcccccctg acgagcatca caaaaatcga cgctcaagtc agaggtggcg      5160
aaacccgaca ggactataaa gataccaggc gtttccccct ggaagctccc tcgtgcgctc      5220
tcctgttccg accctgccgc ttaccggata cctgtccgcc tttctccctt cgggaagcgt      5280
ggcgctttct catagctcac gctgtaggta tctcagttcg gtgtaggtcg ttcgctccaa      5340
gctgggctgt gtgcacgaac cccccgttca gcccgaccgc tgcgccttat ccggtaacta      5400
tcgtcttgag tccaacccgg taagacacga cttatcgcca ctggcagcag ccactggtaa      5460
caggattagc agagcgaggt atgtaggcgg tgctacagag ttcttgaagt ggtggcctaa      5520
ctacggctac actagaagaa cagtatttgg tatctgcgct ctgctgaagc cagttacctt      5580
cggaaaaaga gttggtagct cttgatccgg caaacaaacc accgctggta gcggtggttt      5640
ttttgtttgc aagcagcaga ttacgcgcag aaaaaaagga tctcaagaag atcctttgat      5700
cttttctacg gggtctgacg ctcagtggaa cgaaaactca cgttaaggga ttttggtcat      5760
gagattatca aaaaggatct tcacctagat ccttttaaat taaaaatgaa gttttaaatc      5820
aatctaaagt atatatgagt aaacttggtc tgacagttac caatgcttaa tcagtgaggc      5880
acctatctca gcgatctgtc tatttcgttc atccatagtt gcctgactcc ccgtcgtgta      5940
gataactacg atacgggagg gcttaccatc tggccccagt gctgcaatga taccgcgaga     6000
accacgctca ccggctccag atttatcagc aataaaccag ccagccggaa gggccgagcg     6060
cagaagtggt cctgcaactt tatccgcctc catccagtct attaattgtt gccgggaagc     6120
tagagtaagt agttcgccag ttaatagttt gcgcaacgtt gttgccattg ctacaggcat     6180
cgtggtgtca cgctcgtcgt ttggtatggc ttcattcagc tccggttccc aacgatcaag     6240
gcgagttaca tgatccccca tgttgtgcaa aaaagcggtt agctccttcg gtcctccgat     6300
cgttgtcaga agtaagttgg ccgcagtgtt atcactcatg gttatggcag cactgcataa     6360
ttctcttact gtcatgccat ccgtaagatg cttttctgtg actggtgagt actcaaccaa     6420
gtcattctga gaatagtgta tgcggcgacc gagttgctct tgcccggcgt caatacggga     6480
taataccgcg ccacatagca gaactttaaa agtgctcatc attggaaaac gttcttcggg     6540
gcgaaaactc tcaaggatct taccgctgtt gagatccagt tcgatgtaac ccactcgtgc     6600
acccaactga tcttcagcat cttttacttt caccagcgtt tctgggtgag caaaaacagg     6660
aaggcaaaat gccgcaaaaa agggaataag ggcgacacgg aaatgttgaa tactcatact     6720 cttcctttt caatattatt gaagcattta tcagggttat tgtctcatga gcggatacat      6780
atttgaa                                                                6787
```